United States Patent
Sasaki et al.

(10) Patent No.: US 8,538,234 B2
(45) Date of Patent: Sep. 17, 2013

(54) DISPLAY DEVICE AND METHOD, TRANSMISSION DEVICE AND METHOD, AND RECEPTION DEVICE AND METHOD

(75) Inventors: Taiji Sasaki, Osaka (JP); Hiroshi Yahata, Osaka (JP); Tomoki Ogawa, Osaka (JP)

(73) Assignee: Panasonic Corporation, Osaka (JP)

( * ) Notice: Subject to any disclaimer, the term of this patent is extended or adjusted under 35 U.S.C. 154(b) by 94 days.

(21) Appl. No.: 13/203,313

(22) PCT Filed: Dec. 24, 2010

(86) PCT No.: PCT/JP2010/007524
§ 371 (c)(1),
(2), (4) Date: Aug. 25, 2011

(87) PCT Pub. No.: WO2011/080911
PCT Pub. Date: Jul. 7, 2011

(65) Prior Publication Data
US 2011/0305443 A1    Dec. 15, 2011

Related U.S. Application Data

(60) Provisional application No. 61/290,326, filed on Dec. 28, 2009.

(51) Int. Cl.
*H04N 5/775* (2006.01)
*H04N 5/765* (2006.01)

(52) U.S. Cl.
USPC .......................................... 386/232; 386/230

(58) Field of Classification Search
USPC ................. 386/232, 230, 224, 248, 323, 353, 386/223
See application file for complete search history.

(56) References Cited

U.S. PATENT DOCUMENTS

| 6,574,423 | B1 | 6/2003 | Oshima et al. |
| 2008/0292287 | A1 | 11/2008 | Oshima et al. |
| 2009/0185029 | A1 | 7/2009 | Mitsuhashi et al. |
| 2010/0074594 | A1* | 3/2010 | Nakamura et al. ............. 386/92 |

FOREIGN PATENT DOCUMENTS

| JP | 7-336729 | 12/1995 |
| JP | 2006-121553 | 5/2006 |
| JP | 3935507 | 3/2007 |
| WO | 97/32437 | 9/1997 |
| WO | 2008/018165 | 2/2008 |

OTHER PUBLICATIONS

International Search Report issued Mar. 29, 2011 in International (PCT) Application No. PCT/JP2010/007524.

* cited by examiner

*Primary Examiner* — Robert Chevalier
(74) *Attorney, Agent, or Firm* — Wenderoth, Lind & Ponack, L.L.P.

(57) ABSTRACT

A device for displaying stereoscopic video images on a screen includes a receiving unit, signal processing unit, and display unit. The receiving unit receives stream data including left-view frames and right-view frames of stereoscopic images. The signal processing unit alternately extracts left-view frames and right-view frames from the stream data. Over one frame period of the stereoscopic video images, the signal processing transmits a pair of a left-view frame and a right-view frame when the control information indicates a 3D playback mode, and transmits only a left-view frame when the control information indicates a 2D playback mode. The display unit displays each frame transmitted from the signal processing unit for a predetermined time on the screen.

17 Claims, 81 Drawing Sheets

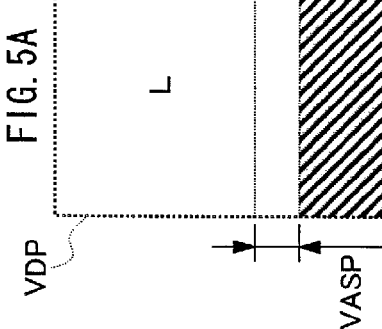
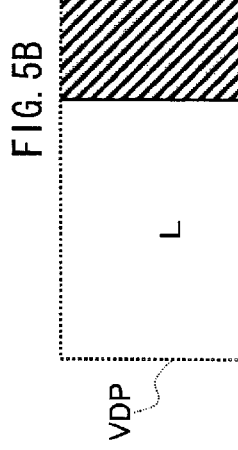
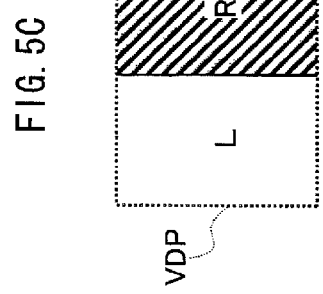
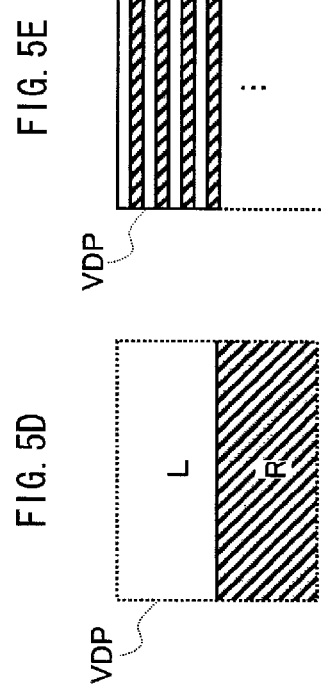
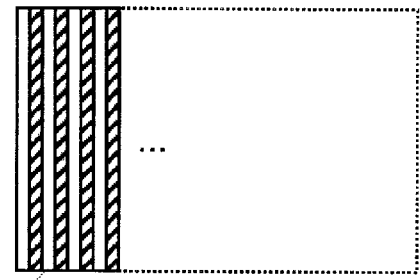

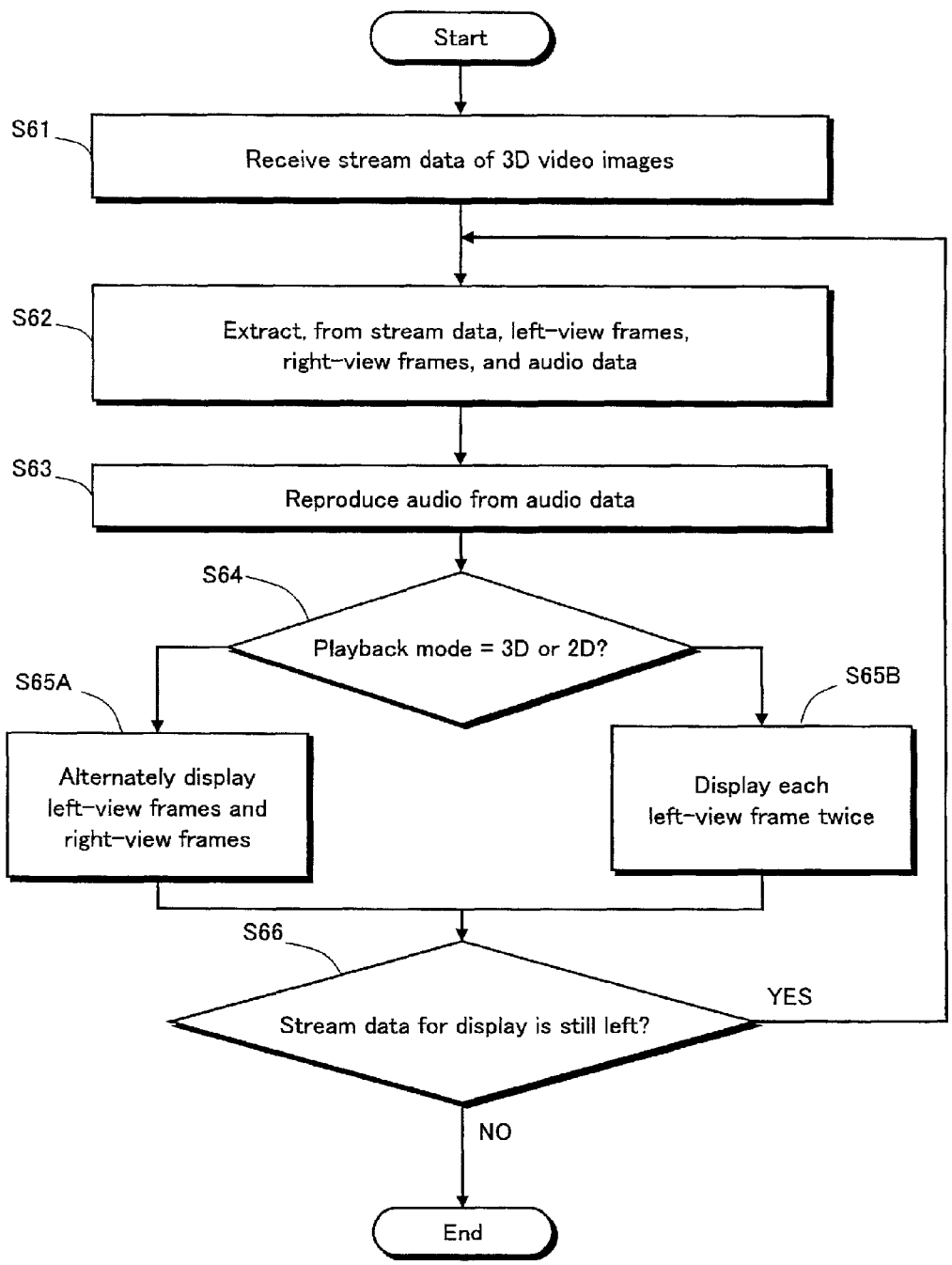

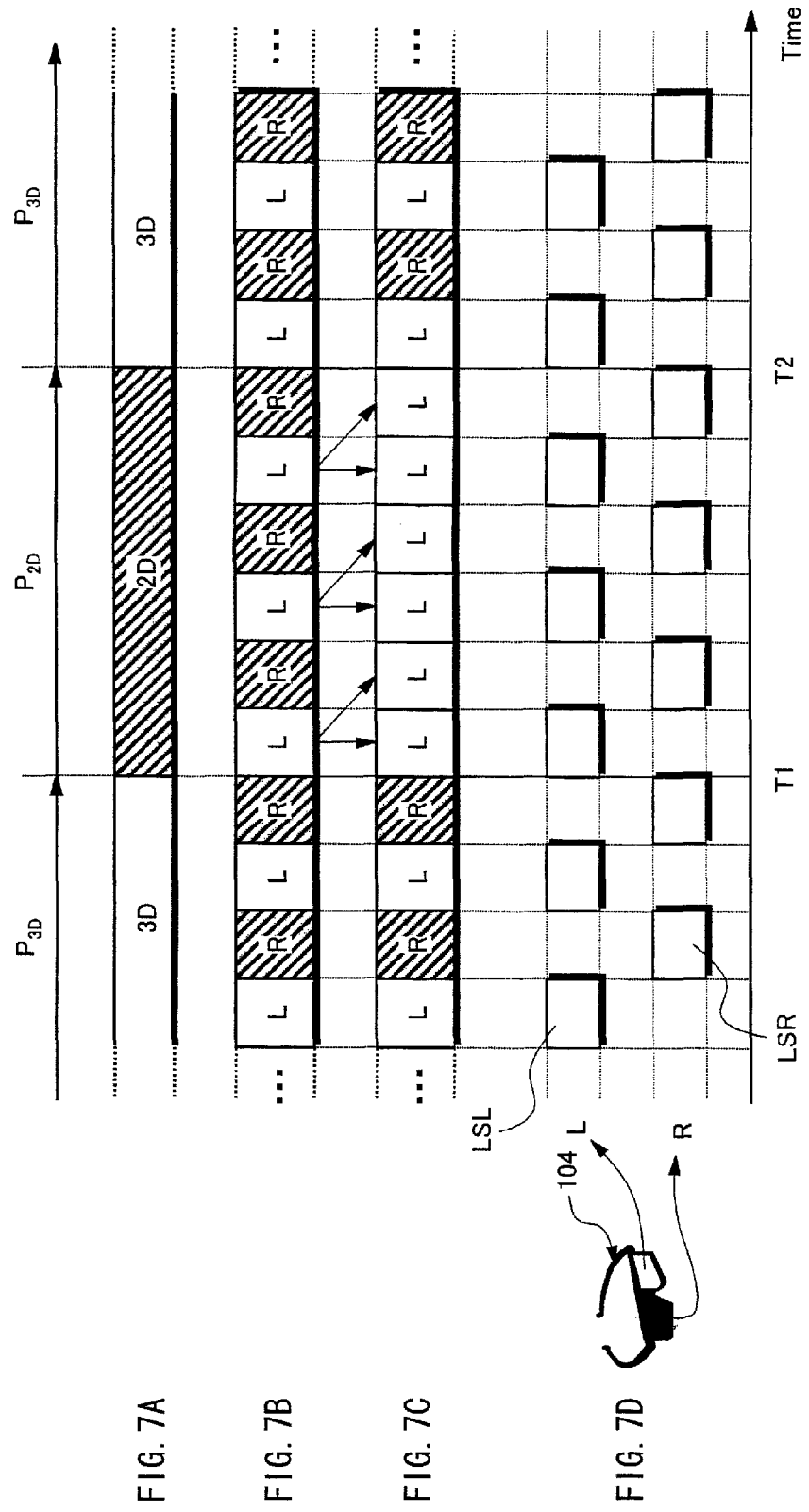

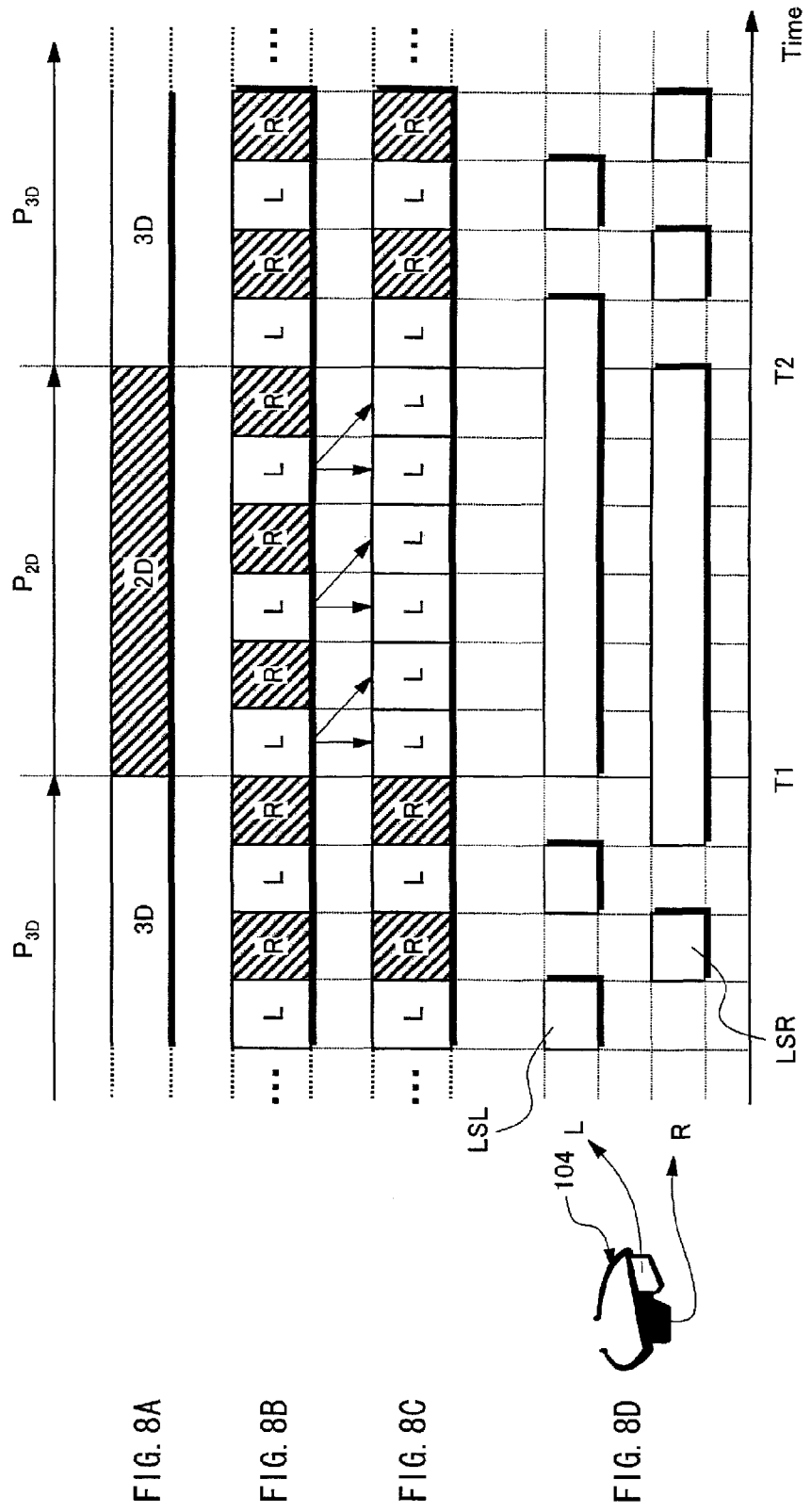

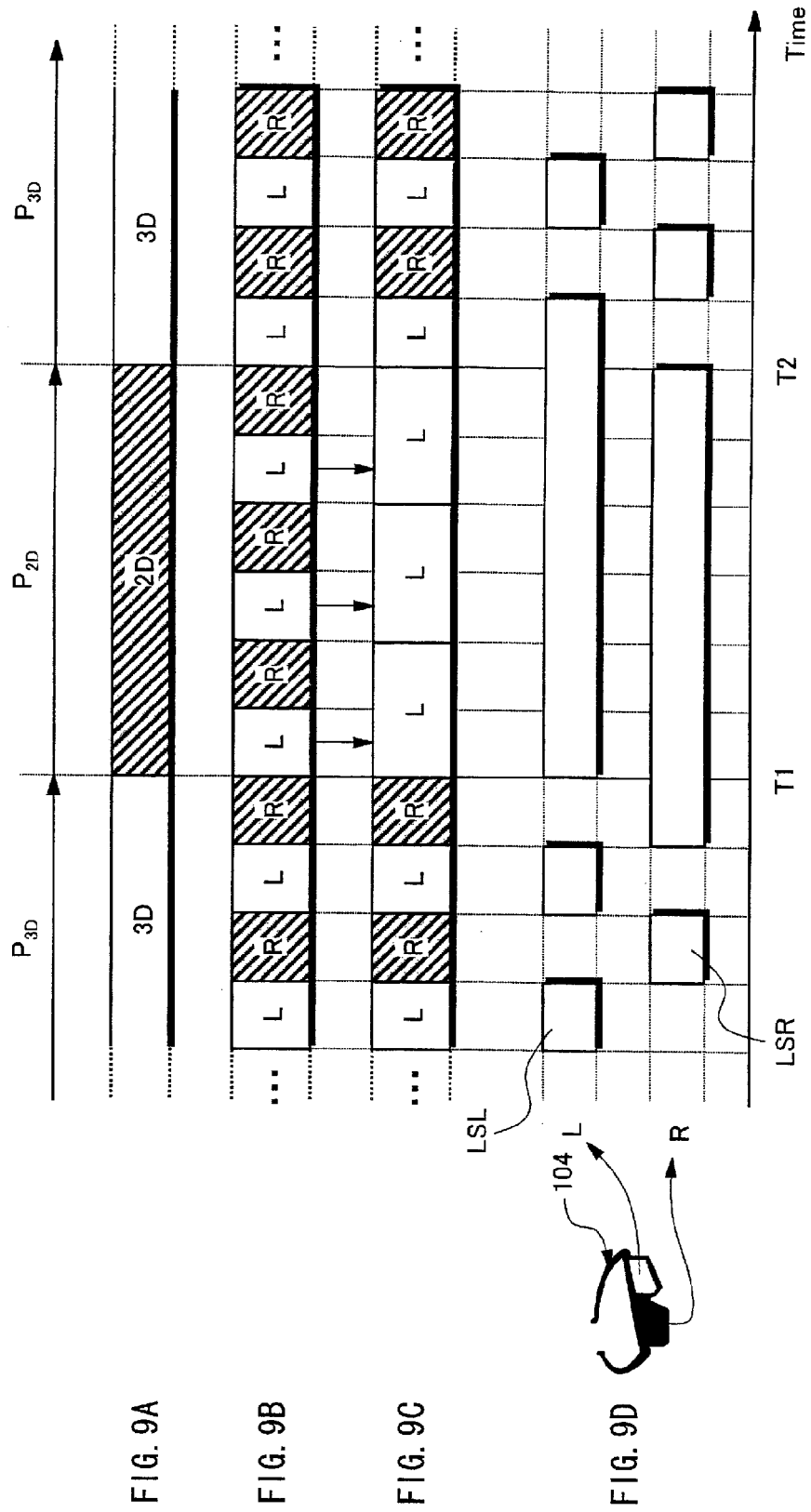

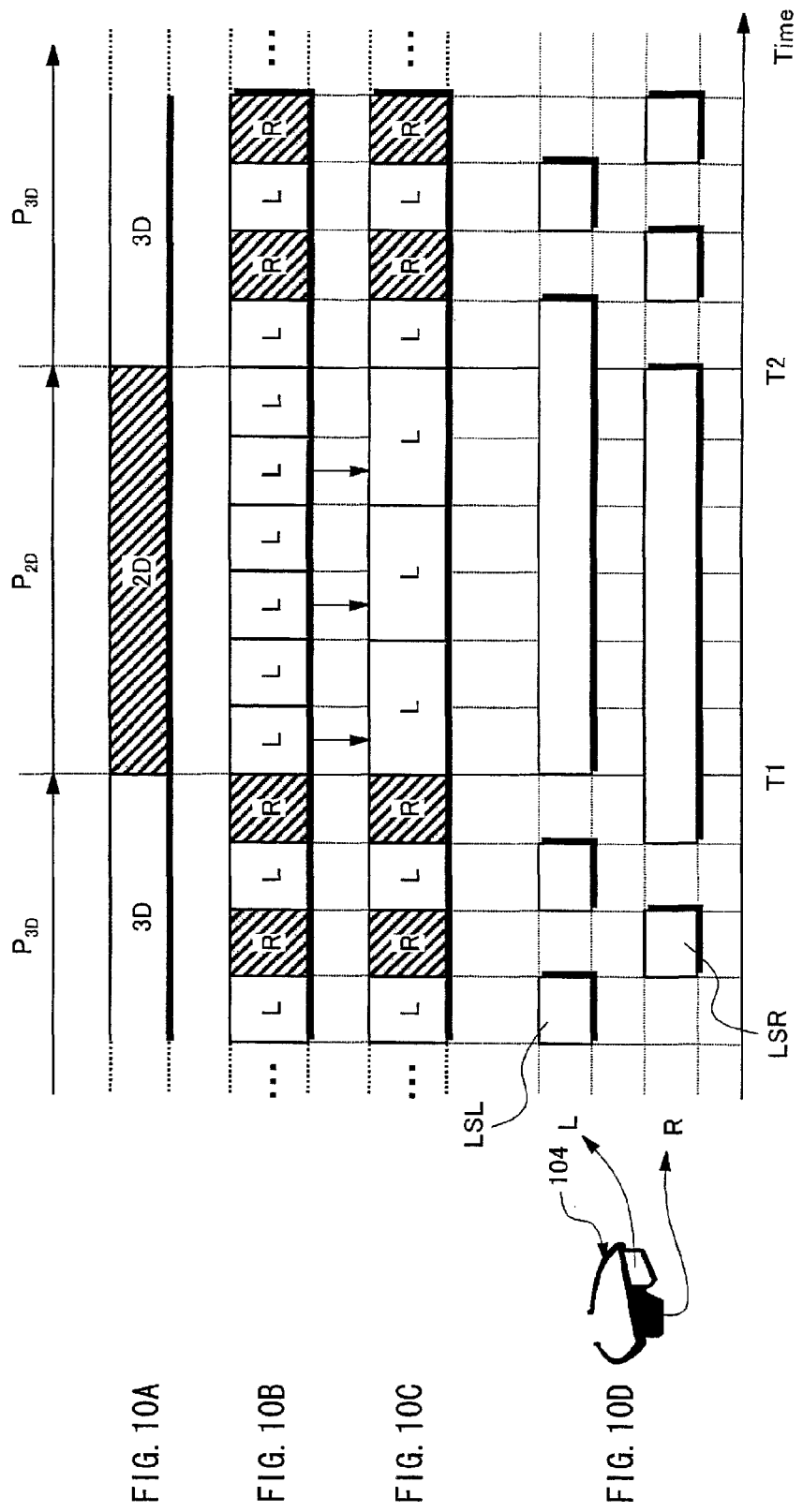

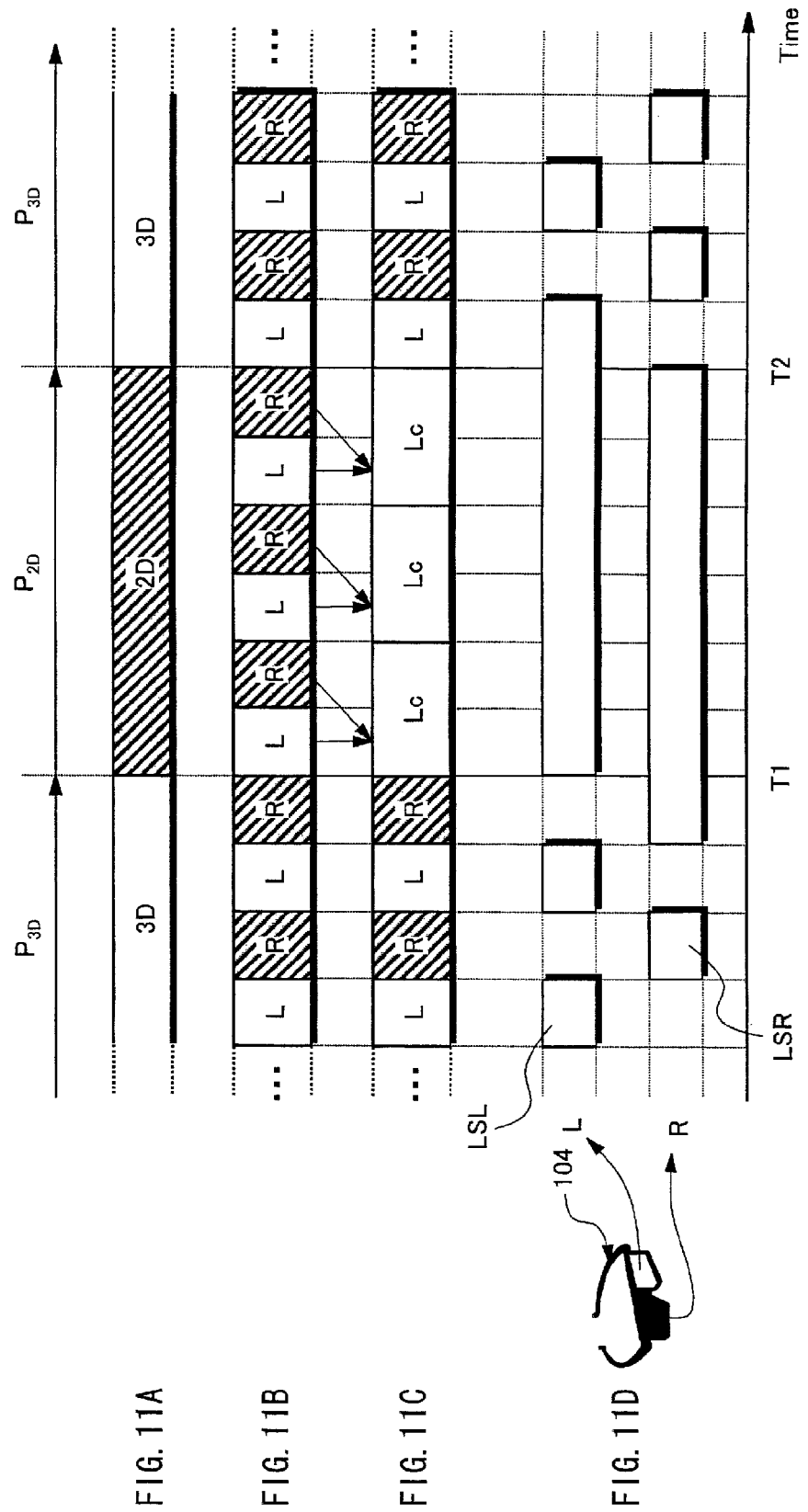

FIG. 13A

| PID=0x1011 | Primary video stream |
|---|---|
| 0x1100 | Primary audio stream |
| 0x1101 | Primary audio stream |
| 0x1200 | PG stream |
| 0x1201 | PG stream |
| 0x1400 | IG stream |
| 0x1A00 | Secondary audio stream |
| 0x1B00 | Secondary video stream |

FIG. 13B

| PID=0x1012 | Primary video stream |
|---|---|
| 0x1220 | Left-view PG stream |
| 0x1221 | Left-view PG stream |
| 0x1240 | Right-view PG stream |
| 0x1241 | Right-view PG stream |
| 0x1420 | Left-view IG stream |
| 0x1440 | Right-view IG stream |
| 0x1B20 | Secondary video stream |

FIG. 13C

| PID=0x1013 | Primary video stream |
|---|---|
| 0x1260 | Depth map PG stream |
| 0x1261 | Depth map PG stream |
| 0x1460 | Depth map IG stream |
| 0x1B40 | Secondary video stream |

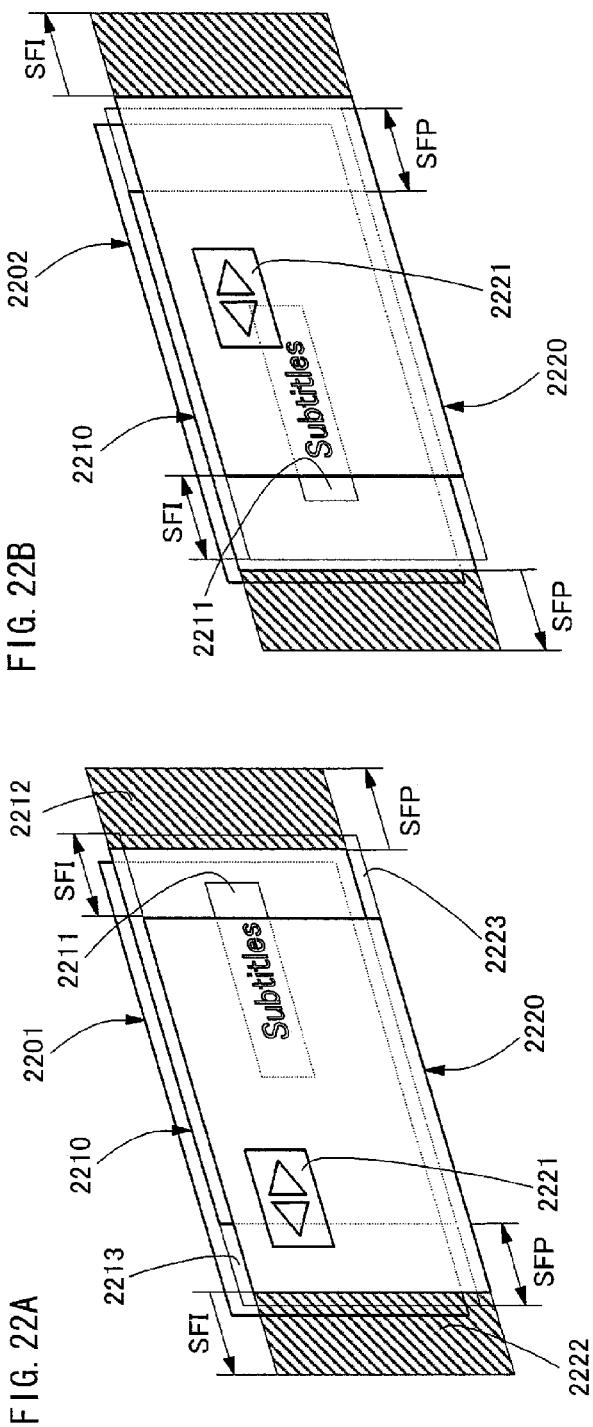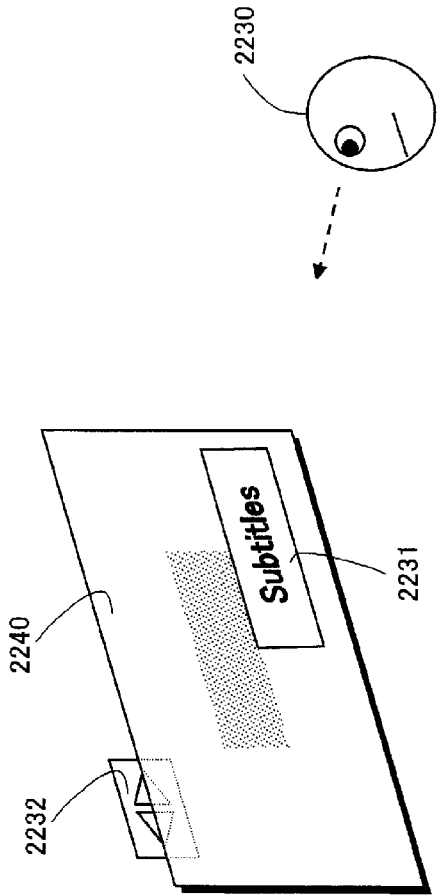
FIG. 22A
FIG. 22B
FIG. 22C

FIG. 31

| $S_{JUMP}$ (sectors) | 0 | 1 – 10000 | 10001 – 20000 | 20001 – 40000 | 40000 – 1/10 of a stroke | 1/10 of a stroke or greater |
|---|---|---|---|---|---|---|
| $T_{JUMP\_MAX}$ (ms) | $0 = T_{JUMP0}$ | 250 | 300 | 350 | 700 | 1400 |

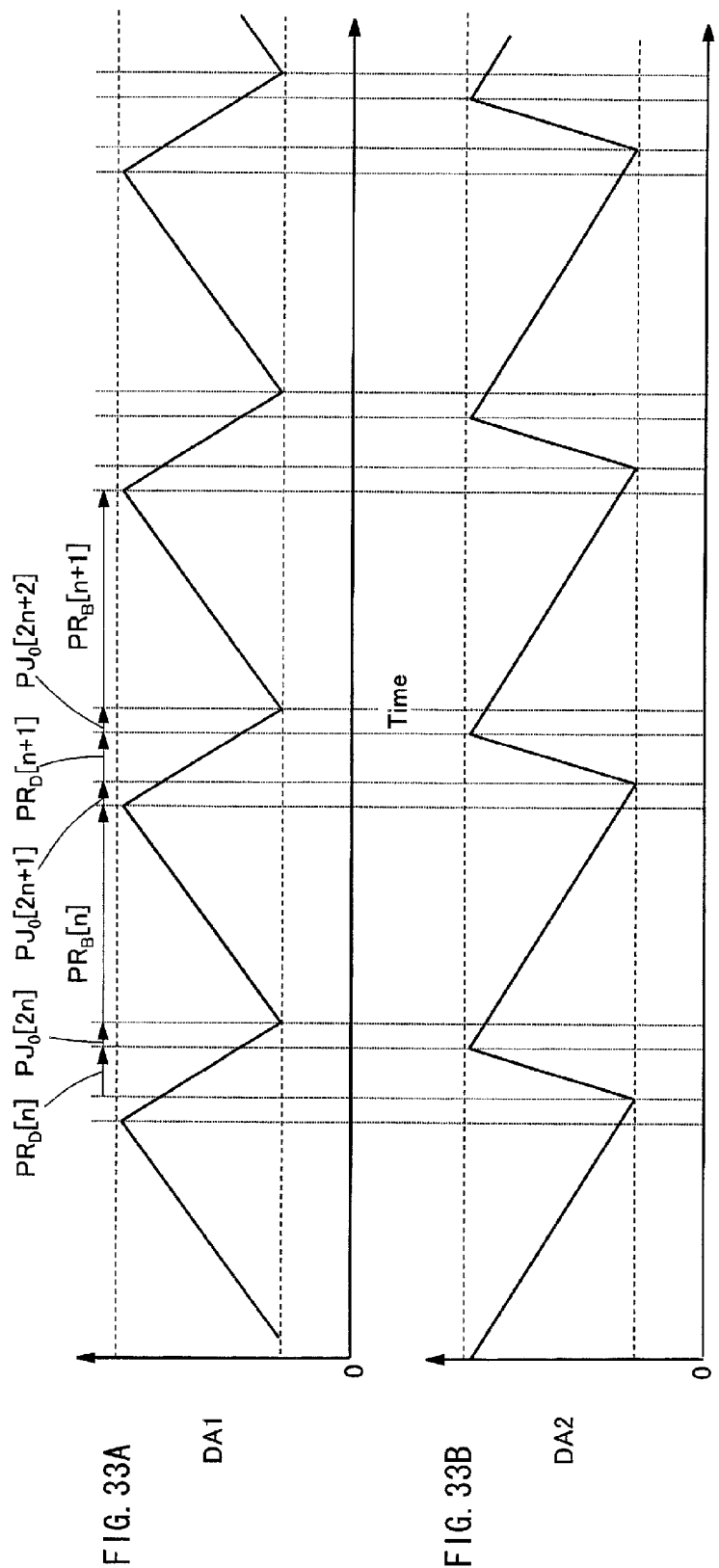
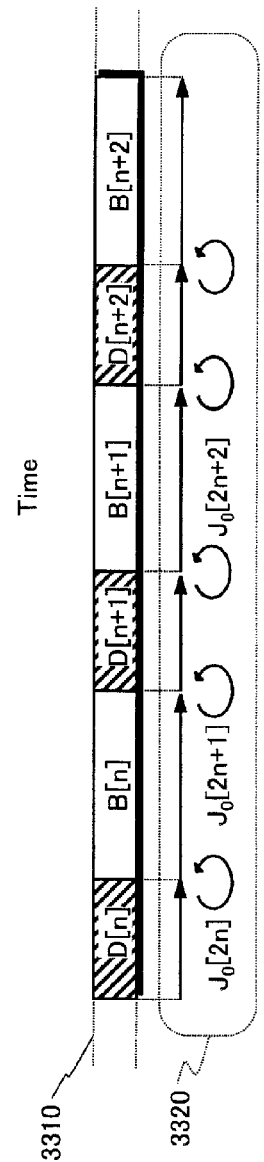
FIG. 33A DA1
FIG. 33B DA2
FIG. 33C

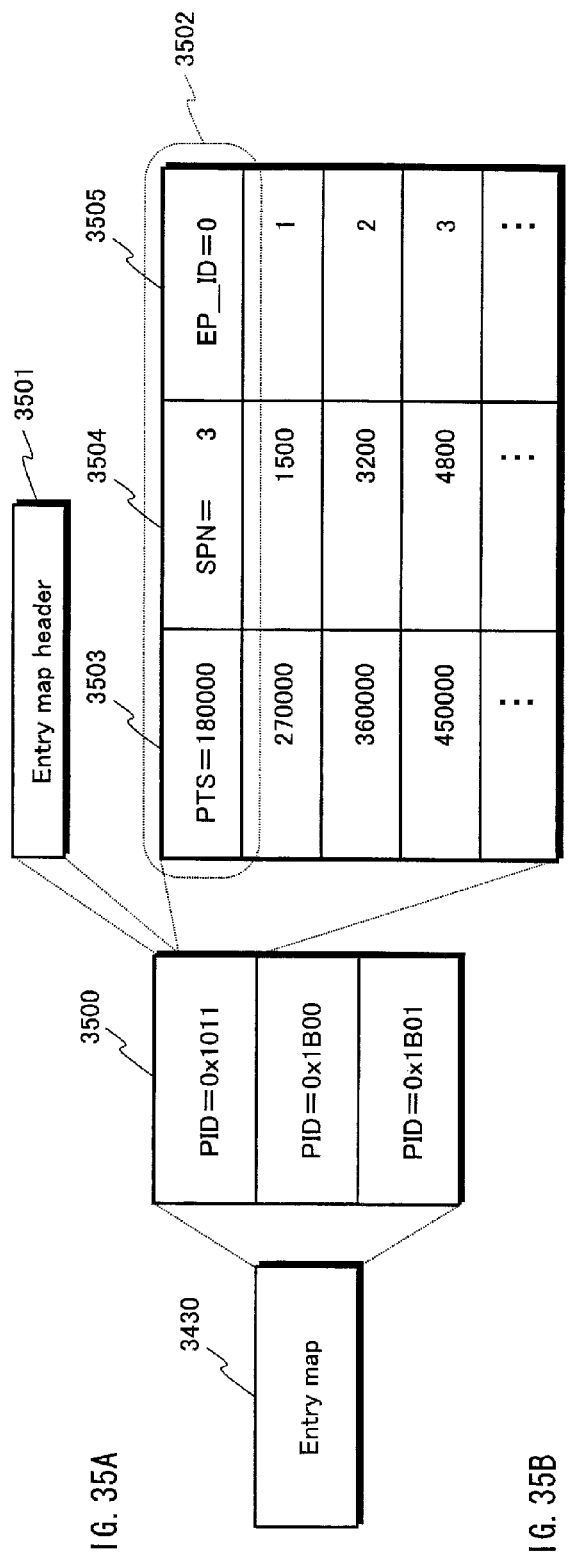
FIG. 35A
FIG. 35B
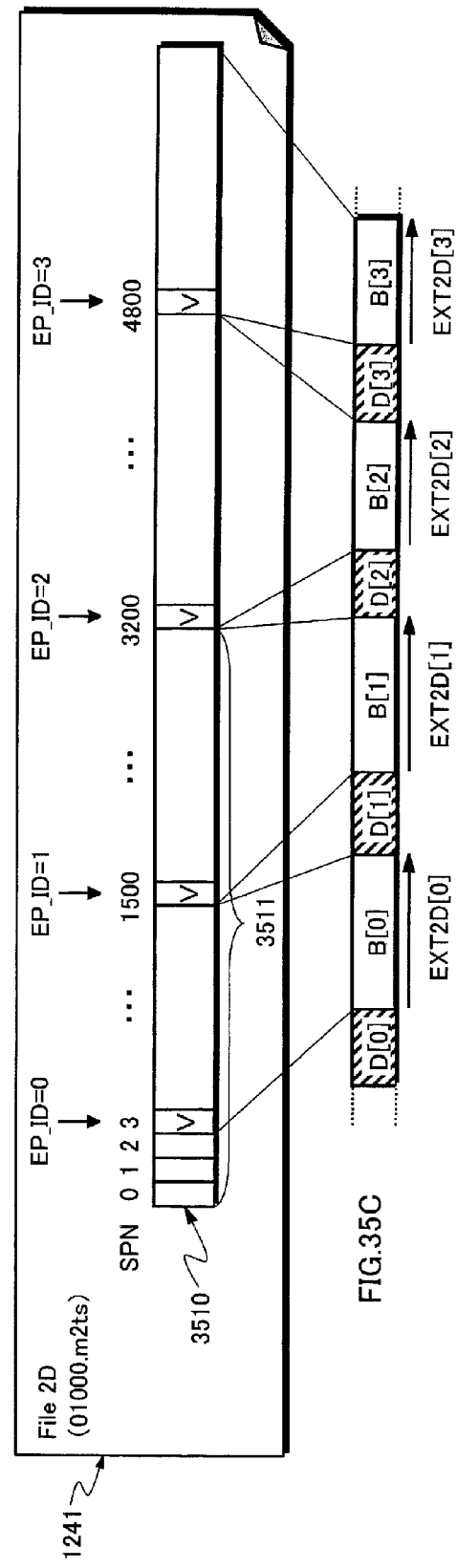
FIG. 35C

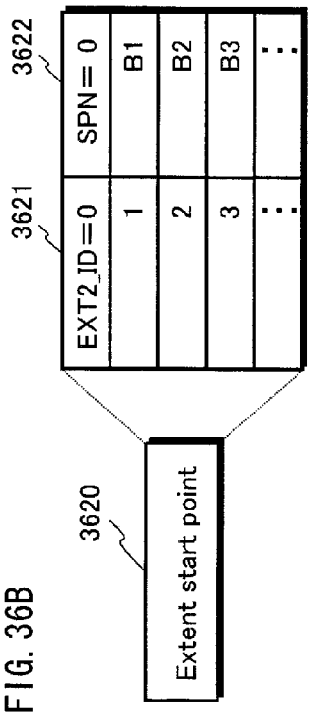
F I G. 36A
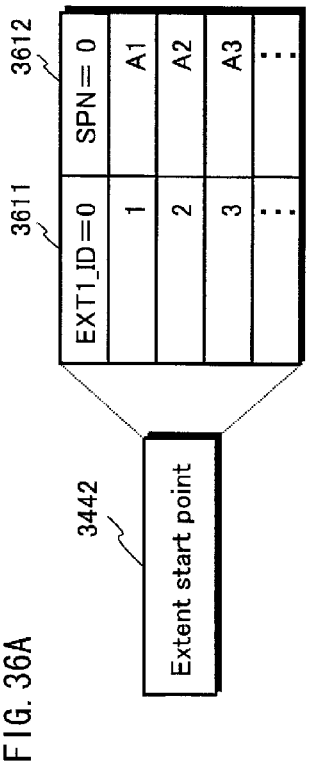
F I G. 36B
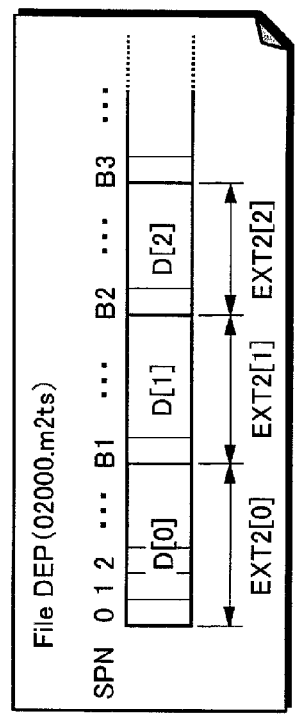
F I G. 36C
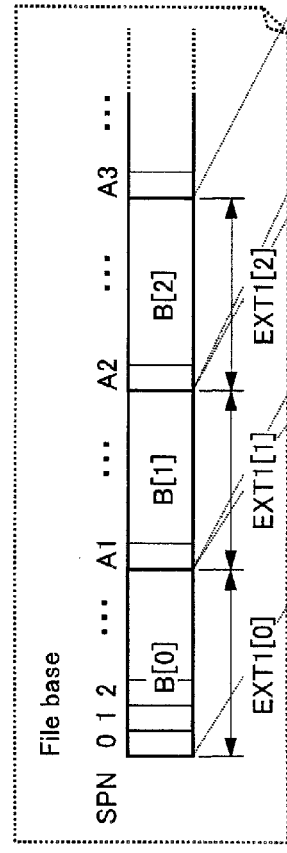
F I G. 36D
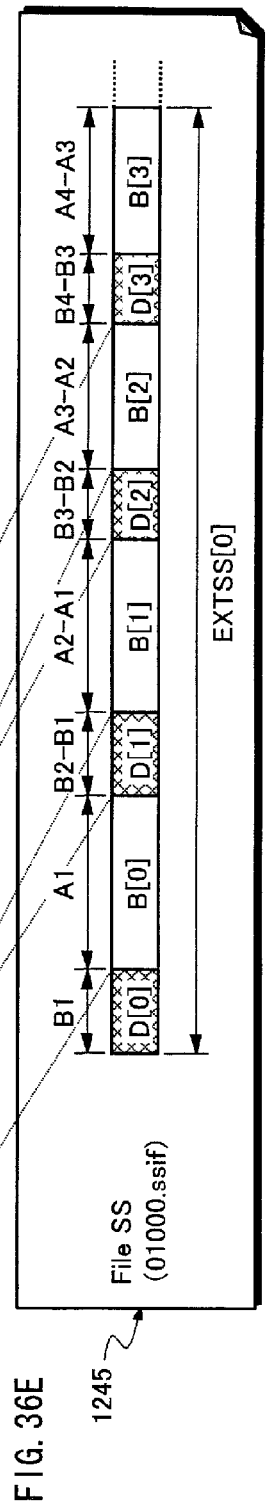
F I G. 36E

FIG. 50

| 5001 | 5002 |
|---|---|
| 0 | Language Code |
| 1 | Audio stream number |
| 2 | Subtitle stream number |
| 3 | Angle number |
| 4 | Title number |
| 5 | Chapter number |
| 6 | Program number |
| 7 | Cell number |
| 8 | Key name |
| 9 | Navigation timer |
| 10 | Current playback time |

| 5001 | 5002 |
|---|---|
| 11 | Player audio mixing mode for Karaoke |
| 12 | Country code for parental management |
| 13 | Parental level |
| 14 | Player configuration for Video |
| 15 | Player configuration for Audio |
| 16 | Language code for AST |
| 17 | Language code ext. for AST |
| 18 | Language code for STST |
| 19 | Language coded ext. for STST |
| 20 | Player region code |
| 21 | Secondary Video Stream number |

| 5001 | 5002 |
|---|---|
| 22 | Secondary Audio Stream number |
| 23 | Player status |
| 24 | reserved |
| 25 | reserved |
| 26 | reserved |
| 27 | reserved |
| 28 | reserved |
| 29 | reserved |
| 30 | |
| ... | |
| 63 | reserved |

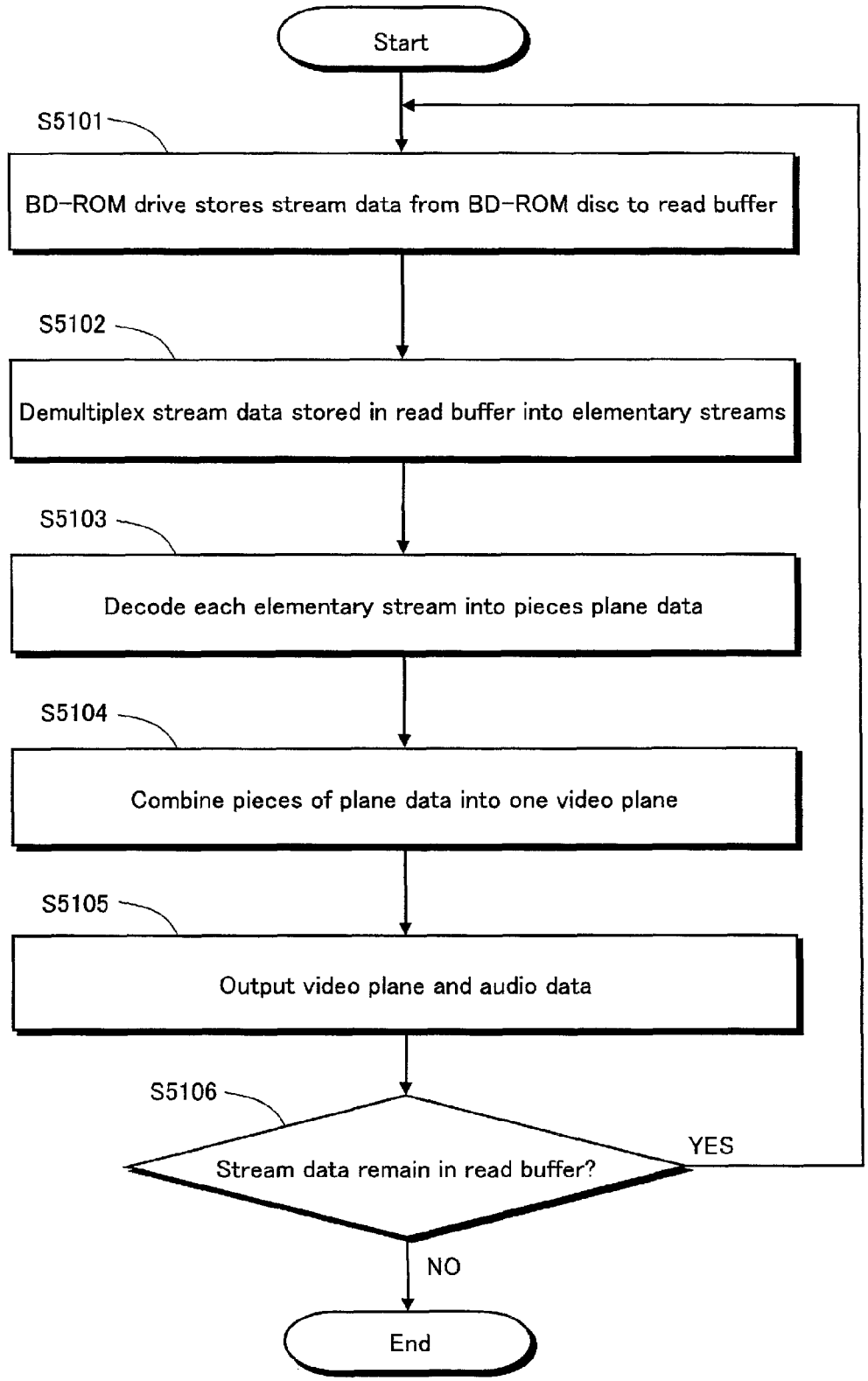

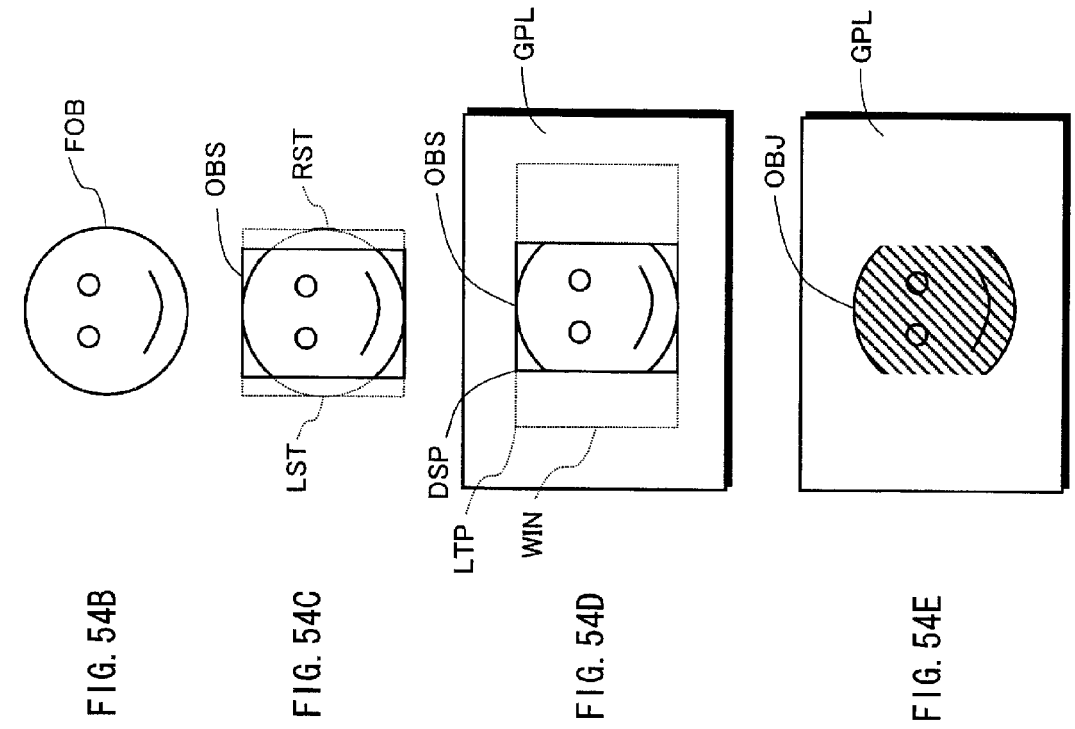
FIG. 54B
FIG. 54C
FIG. 54D
FIG. 54E
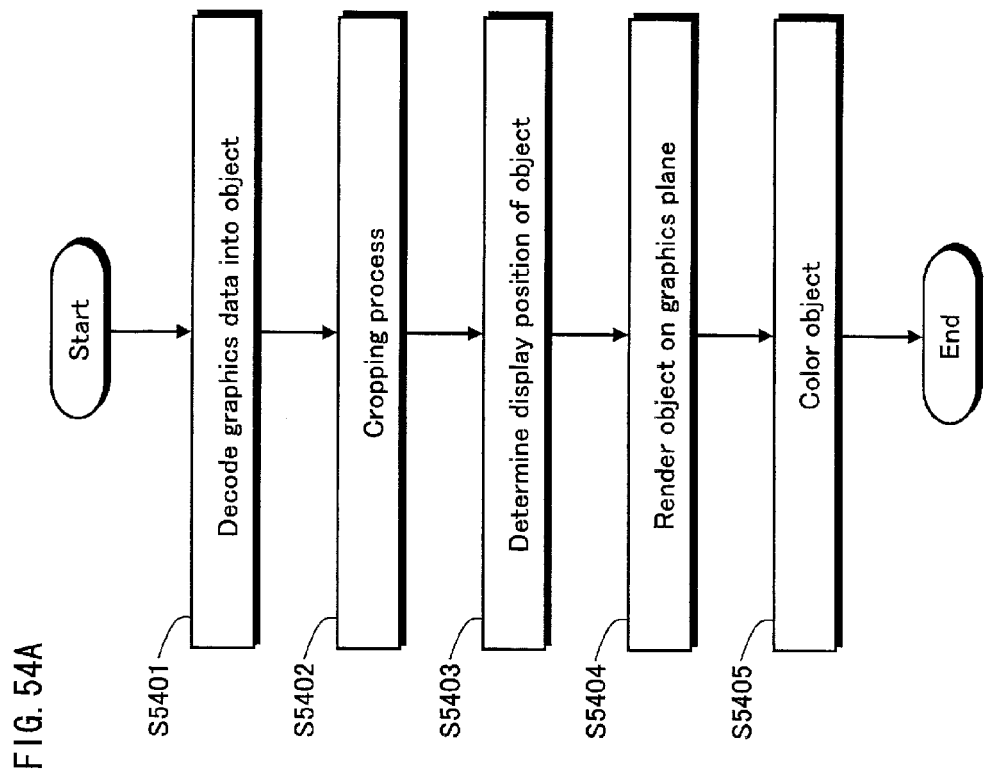
FIG. 54A

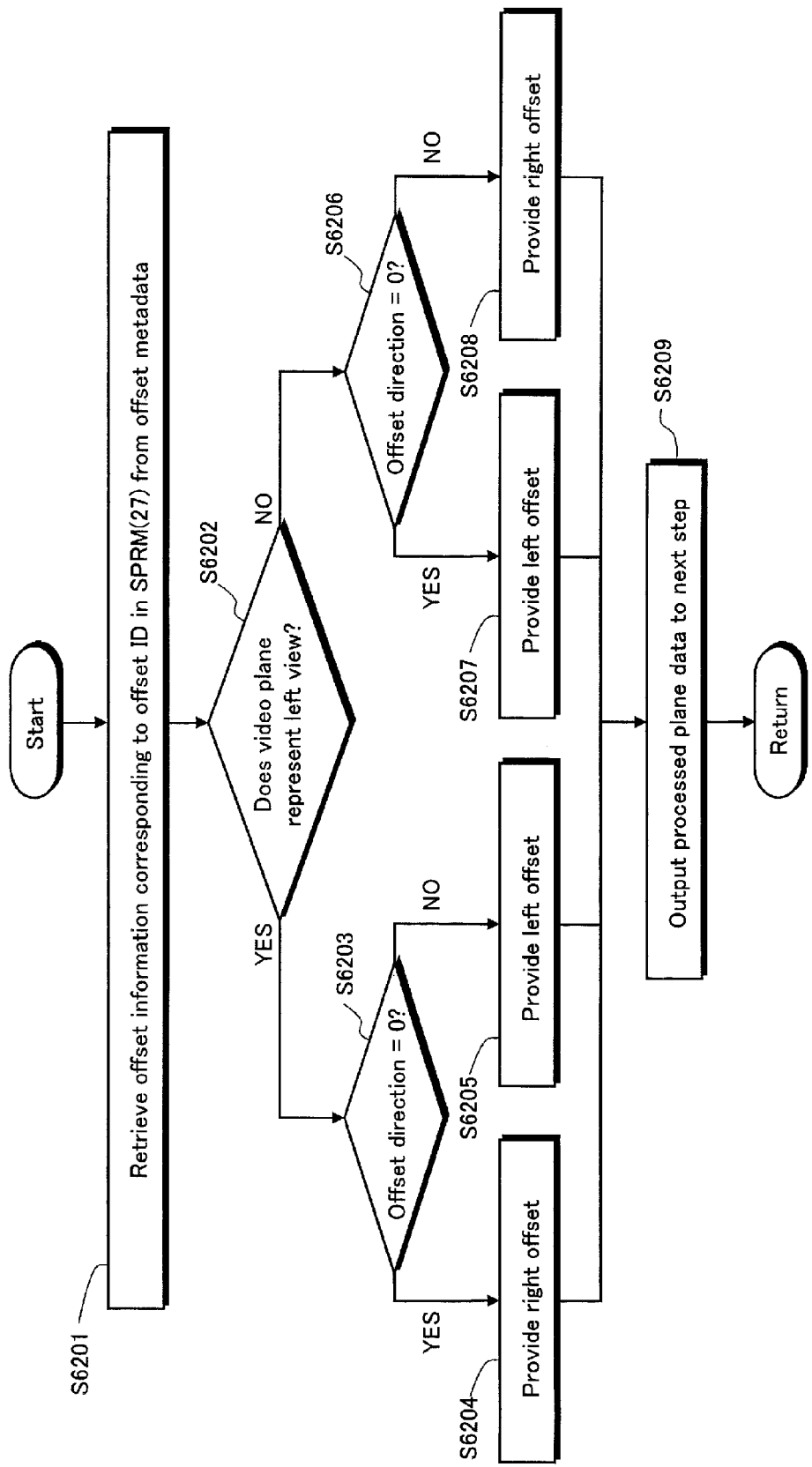

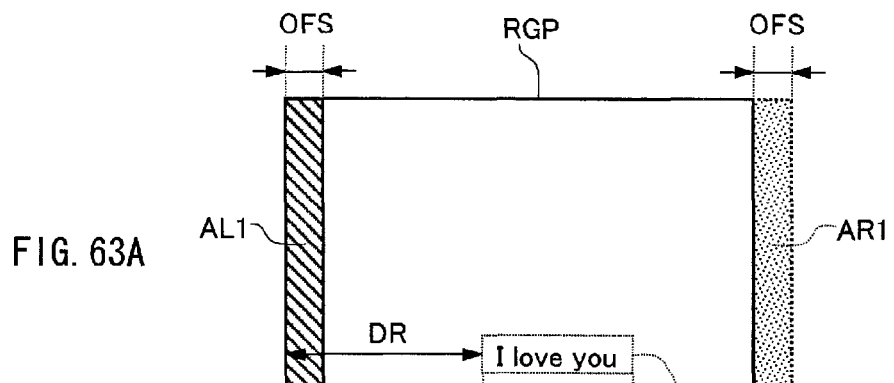
FIG. 63A
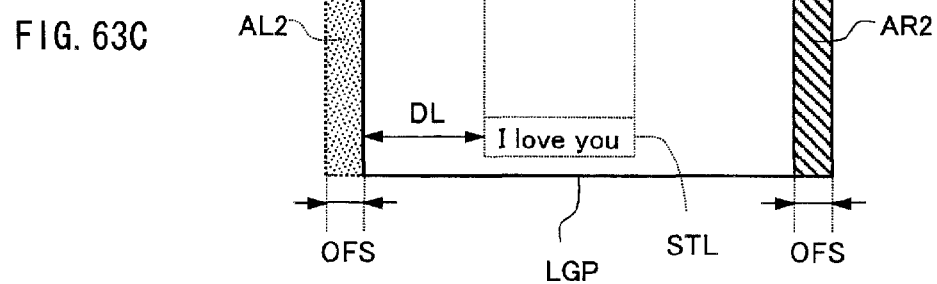
FIG. 63B
FIG. 63C

FIG. 65

| Type | Playback mode | Video | | Graphics | |
|---|---|---|---|---|---|
| | | First plane | Second plane | First plane | Second plane |
| A | 2D | L | R | C | C |
| B | 2D | L | L | C | C |
| C | 3D | L | R | L | R |
| D | 3D | L | L | L | R |

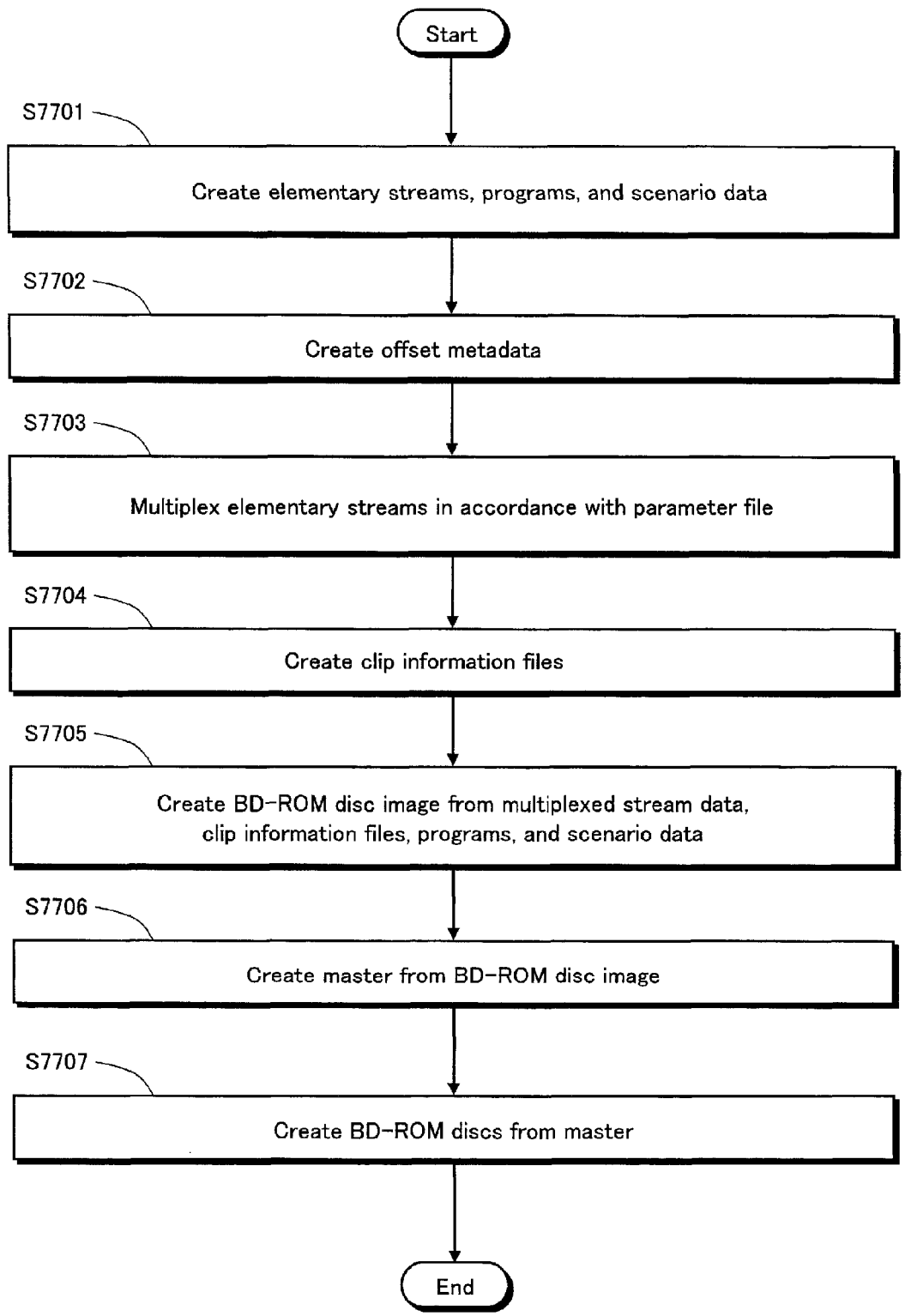

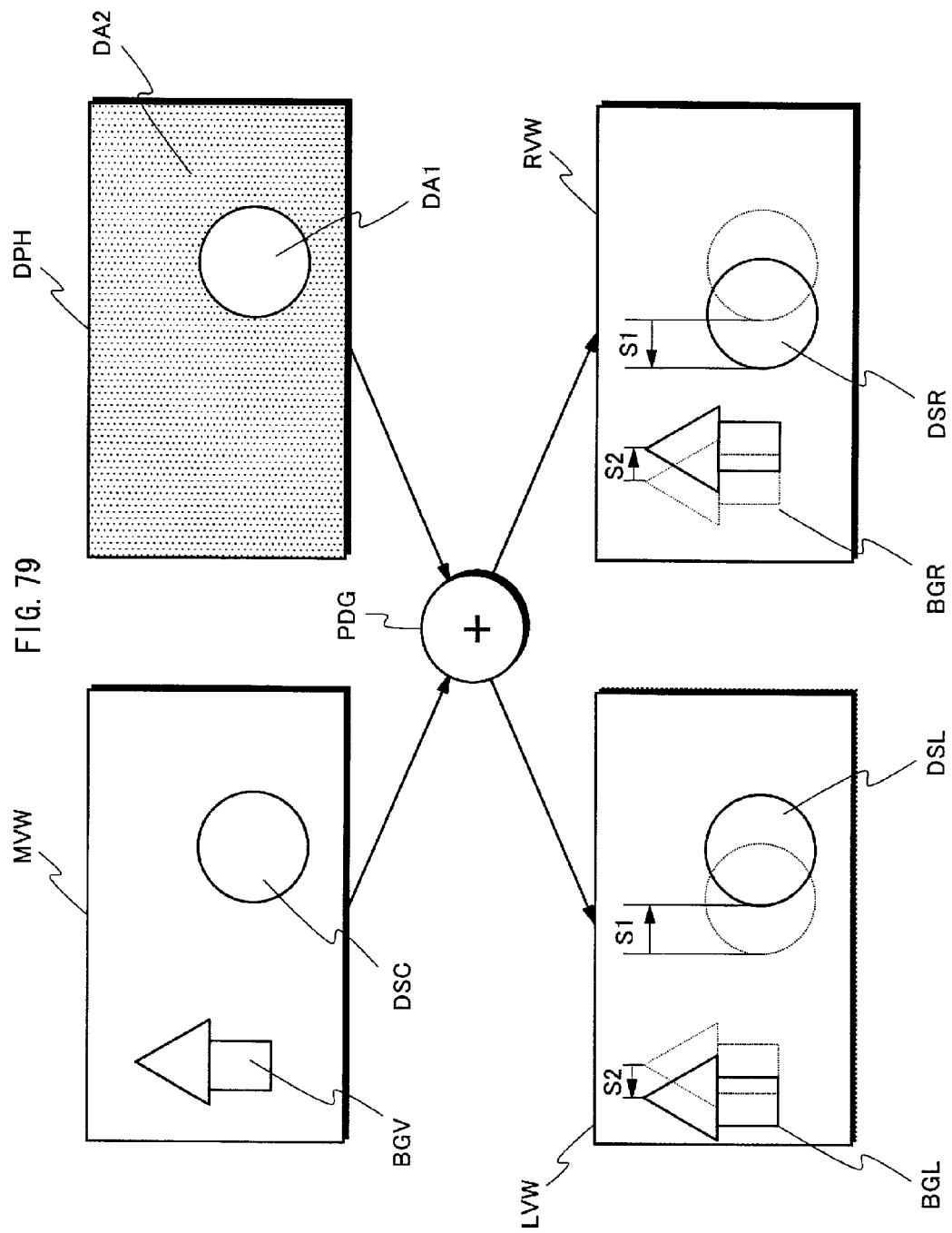

DISPLAY DEVICE AND METHOD, TRANSMISSION DEVICE AND METHOD, AND RECEPTION DEVICE AND METHOD

This application claims benefit to U.S. Provisional Application Ser. No. 61/290,326, filed Dec. 28, 2009.

TECHNICAL FIELD

The present invention relates to a technology for displaying stereoscopic, i.e. three-dimensional (3D), video images.

BACKGROUND ART

In recent years, general interest in 3D video images has been increasing. For example, amusement park attractions that incorporate 3D video images are popular. Furthermore, throughout the country, the number of movie theaters showing 3D movies is increasing. Along with this increased interest in 3D video images, the development of technology that enables playback of 3D video images in the home has also been progressing. There is demand for this technology to store 3D video content on a portable recording medium, such as an optical disc, while maintaining the 3D video content in high image quality. Furthermore, there is demand for the recording medium to be compatible with a two-dimensional (2D) playback device. That is, it is preferable for a 2D playback device to be able to play back 2D video images and a 3D playback device to be able to play back 3D video images from the same 3D video content recorded on the recording medium. Here, a "2D playback device" refers to a conventional playback device that can only play back monoscopic video images, i.e. 2D video images, whereas a "3D playback device" refers to a playback device that can play back 3D video images. Note that in the present description, a 3D playback device is assumed to be able to also play back conventional 2D video images.

FIG. 81 is a schematic diagram illustrating the technology for ensuring compatibility with 2D playback devices for an optical disc on which 3D video content is recorded (see, for example, Patent literature 1). An optical disc PDS stores two types of video streams. One is a 2D/left-view video stream, and the other is a right-view video stream. A "2D/left-view video stream" represents 2D video images to be shown to the left eye of a viewer during 3D playback, i.e. a "left view". During 2D playback, this stream constitutes the 2D video image. A "right-view video stream" represents 2D video images to be shown to the right eye of the viewer during 3D playback, i.e. a "right view". The left- and right-view video streams have the same frame rate but different presentation times shifted from each other by half a frame period. For example, when the frame rate of each video stream is 24 fps (frames per second), the frames of the 2D/left-view video stream and the right-view video stream are alternately displayed every 1/48 seconds.

As shown in FIG. 81, each the left-view and right-view video streams are divided into a plurality of extents EX1A-C and EX2A-C respectively on the optical disc PDS. Each extent contains at least one group of pictures (GOP), GOPs being read together by the optical disc drive. Hereinafter, the extents belonging to the 2D/left-view video stream are referred to as "2D/left-view extents", and the extents belonging to the right-view video stream are referred to as "right-view extents". The 2D/left-view extents EX1A-C and the right-view extents EX2A-C are alternately arranged on a track TRC of the optical disc PDS. Each two contiguous extents EX1A+EX2A, EX1B+EX2B, and EX1C+EX2C have the same length of playback time. Such an arrangement of extents is referred to as an "interleaved arrangement". A group of extents recorded in an interleaved arrangement on a recording medium is used both in 3D video playback and 2D video image playback, as described below.

From among the extents recorded on the optical disc PDS, a 2D playback device PL2 causes an optical disc drive DD2 to read only the 2D/left-view extents EX1A-C sequentially from the top, skipping the reading of right-view extents EX2A-C. Furthermore, an image decoder VDC sequentially decodes the extents read by the optical disc drive DD2 into a video frame VFL. In this way, a display device DS2 only displays left views, and viewers can watch normal 2D video images.

A 3D playback device PL3 causes an optical disc drive DD3 to alternately read 2D/left-view extents and right-view extents from the optical disc PDS. When expressed as codes, the extents are read in the order EX1A, EX2A, EX1B, EX2B, EX1C, and EX2C. Furthermore, from among the read extents, those belonging to the 2D/left-view video stream are supplied to a left-video decoder VDL, whereas those belonging to the right-view video stream are supplied to a right-video decoder VDR. The video decoders VDL and VDR alternately decode the video streams into video frames VFL and VFR, respectively. Thus, left views and right views are alternately displayed on a display device DS3. In synchronization with the switching of the views by the display device DS3, shutter glasses SHG cause the left and right lenses to become nontransparent alternately. Consequently, left views are perceived by the left eye of a viewer wearing the shutter glasses SHG, whereas right views are perceived by the right eye of the viewer. In this way, a pair of a left view and a right view, a pair of 2D video images that are alternately displayed on the display device DS3, appear to the viewer as a single 3D video image.

When 3D video content is stored on any recording medium, not only on an optical disc, the above-described interleaved arrangement of extents is used. The recording medium can thus be used both for playback of 2D video images and 3D video images.

CITATION LIST

Patent Literature

Patent Literature 1
JP Patent No. 3935507

SUMMARY OF INVENTION

Technical Problem 3D video content generally includes a part of 2D video images. The 2D video images are included for the purpose of providing advertisements, creating effect, etc. When a 3D playback device plays back the 3D video content up to the part of the 2D video images, an application program associated with the 3D video content instructs the 3D playback device to switch 3D video images to 2D video images. Also, suppose that in response to a user operation, the 3D playback device displays a pop-up menu superimposed on a 3D video image. In this case, it is preferable that the 3D video image is changed to a 2D video image while the pop-up menu is displayed. This improves the visibility of the pop-up menu. In this way, a technology for displaying 3D video images is generally required to have a capability of switching to 2D video images during display of the 3D video images. In particular, the switching to 2D video images needs to be performed seamlessly. This avoids the viewer from feeling uncomfortable due to the interruption of video images caused by the switching.

In a conventional technology for displaying 3D video images, the following is known as a means of realizing seamless switching between 3D video images and 2D video images. First, two types of operation modes are prepared as the operation mode of a 3D playback device, i.e., base-view (B)-dependent-view (D) presentation mode and B-B presentation mode. In B-D presentation mode, the 3D playback device alternately decodes and outputs a left-view video stream and a right-view video stream. At this point, since left-view and right-view frames are alternately displayed on a screen of a display device, the viewer perceives these frames as 3D video images. In B-B presentation mode, the 3D playback device outputs only frame data decoded from a base-view video stream, e.g., only left-view frames, twice per frame, while maintaining the frame rate at a value (e.g., 48 fps) in B-D presentation mode. At this point, since only the left-view frame is displayed on the screen of the display device, the viewer perceives the frame as a 2D video image. Suppose that during playback of 3D video images, switching from the 3D video images to 2D video images is requested by a user operation or an instruction from an application program. In this case, the 3D playback device switches from B-D presentation mode to B-B presentation mode. At this point, since the frame rate is not changed, the 3D playback device can promptly switch to B-B presentation mode. The display device simply needs to maintain the original operation. As a result, switching from 3D video images to 2D video images is performed seamlessly.

However, not all 3D playback devices on the market support B-B presentation mode. In order for a 3D playback device not supporting B-B presentation mode to switch 3D video images to 2D video images, stream data for 3D playback must be switched to stream data for 2D playback. In this case, since the frame rate needs to be changed (e.g., from 48 fps to 24 fps), the 3D playback device needs to temporarily stop transmitting data to a display device. Accordingly, in order to resume the data transmission after switching the stream data, the 3D playback device needs to restart processing for establishing connection with the display device, such as authentication processing. Since such processing generally takes time, it is difficult to seamlessly switch 3D video images to 2D video images.

Furthermore, data transmission between a playback device and a display device is generally performed in HDMI (High-Definition Multimedia Interface) format. In this case, although an operation signal from a remote control is directly received by one of the playback device and the display device, the operation signal is also transmitted to the other via an HDMI cable. Accordingly, the user can operate both the playback device and the display device by using only one remote control. However, a display device according to a conventional technology for displaying 3D video images, when instructed by a remote control to display a pop-up menu, needs to request the 3D playback device to switch to B-B presentation mode via the HDMI cable. Since communication in HDMI format takes time, it is difficult to more reliably perform seamless switching from 3D video images to 2D video images.

An object of the present invention is to provide a display device for seamlessly switching 3D video images to 2D video images.

Solution to Problem

A display device according to the present invention is for displaying stereoscopic video images on a screen, and comprises: a reception unit; a signal processing unit; and a display unit. The reception unit receives stream data that includes left-view frames and right-view frames of the stereoscopic video images and control information. The signal processing unit alternately extracts the left-view frames and the right-view frames from the stream data. Furthermore, the signal processing unit transmits a pair of a left-view frame and a right-view frame over one frame period of the stereoscopic video images when the control information indicates a 3D playback mode, and transmits only a left-view frame over one frame period of the stereoscopic video images when the control information indicates a 2D playback mode. The display unit displays each frame transmitted from the signal processing unit on the screen for a predetermined time period.

Advantageous Effects of Invention

The display device according to the present invention decodes the control information from the stream data. When the control information indicates the 3D playback mode, the display device alternately displays the left-view frames and the right-view frames. When the control information indicates the 2D playback mode, the display device displays only the left-view frames. In this way, the display device switches 3D video images to 2D video images without changing the frame rate or transmitting an instruction to a device from which the stream data is transmitted. As a result, switching from the 3D video images to the 2D video images is performed seamlessly.

BRIEF DESCRIPTION OF DRAWINGS

FIGS. 5A-5E are schematic diagrams each showing an arrangement of a left-view frame and a right-view frame in an active display area VACT×HACT shown in FIG. 4.

FIG. 6 is a flowchart of processing steps of displaying 3D video images by the display device 103 shown in FIG. 2.

FIGS. 7A to 7D are schematic diagrams showing: changes in a playback mode and frames L and R outputted from a playback device 102; changes in frames L and R displayed by the display device 103; and periods LSL and LSR during which shutter glasses 104 cause the left and right lenses to be transparent, when a playback period $P_{2D}$ of 2D video images is inserted into a playback period $P_{3D}$ of 3D video images.

FIG. 8A to 8D are schematic diagrams pertaining to Modification 1 and showing: changes in a playback mode and frames L and R outputted from the playback device 102; changes in frames L and R displayed by the display device 103; and the periods LSL and LSR during which the shutter glasses 104 cause the left and right lenses to be transparent, when the playback period $P_{2D}$ of 2D video images is inserted into the playback period $P_{3D}$ of 3D video images.

FIGS. 9A to 9D are schematic diagrams pertaining to Modification 2 and showing: changes in a playback mode and frames L and R outputted from the playback device 102; changes in frames L and R displayed by the display device 103; and the periods LSL and LSR during which the shutter glasses 104 cause the left and right lenses to be transparent, when the playback period P$_{2D}$ of 2D video images is inserted into the playback period P$_{3D}$ of 3D video images.

FIGS. 10A to 10D are schematic diagrams pertaining to Modification 3 and showing: changes in a playback mode and frames L and R outputted from the playback device 102; changes in frames L and R displayed by the display device 103; and the periods LSL and LSR during which the shutter glasses 104 cause the left and right lenses to be transparent, when the playback period P$_{2D}$ of 2D video images is inserted into the playback period P$_{3D}$ of 3D video images.

FIGS. 11A to 11D are schematic diagrams pertaining to Modification 4 and showing: changes in a playback mode and frames L and R outputted from the playback device 102; changes in frames L and R displayed by the display device 103; and the periods LSL and LSR during which the shutter glasses 104 cause the left and right lenses to be transparent, when the playback period P$_{2D}$ of 2D video images is inserted into the playback period P$_{3D}$ of 3D video images.

FIGS. 13A, 13B, and 13C each show a list of elementary streams multiplexed in a main TS, a first sub-TS, and a second sub-TS on the BD-ROM disc 101 shown in FIG. 2.

FIGS. 22A and 22B are schematic diagrams each showing offset controls for a PG plane 2210 and an IG plane 2220 respectively. FIG. 22C is a schematic diagram showing a 3D graphics image that a viewer 2230 is made to perceive from 2D graphics images represented by the graphics planes shown in FIGS. 22A and 22B.

FIG. 31 is an example of a correspondence table between jump distances S$_{JUMP}$ and maximum jump times T$_{JUMP\_MAX}$ for a BD-ROM disc.

FIGS. 33A and 33B are graphs showing changes in data amounts DA1 and DA2 stored in read buffers RB1 3211 and RB2 3212 shown in FIG. 32, when 3D video images are seamlessly played back from one extent block. FIG. 33C is a schematic diagram showing a correspondence between an extent block 3310 for playback and a playback path 3320 in 3D playback mode.

FIG. 35A is a schematic diagram showing a data structure of an entry map 3430 shown in FIG. 34. FIG. 35B is a schematic diagram showing source packets that are associated with respective EP_IDs 3505 by an entry map 3430, from among a source packet group 3510 belonging to a file 2D 1241 shown in FIG. 12. FIG. 35C is a schematic diagram showing a data block group D[n], B[n] (n=0, 1, 2, 3, . . . ) on the BD-ROM disc 101 corresponding to the source packet group 3510.

FIG. 36A is a schematic diagram showing a data structure of an extent start point 3442 shown in FIG. 34. FIG. 36B is a schematic diagram showing a data structure of extent start points 3620 included in a second clip information file (02000.clpi) 1232 shown in FIG. 12. FIG. 36C is a schematic diagram showing base-view data blocks B[0], B[1], B[2], . . . extracted from a first file SS 1245 (shown in FIG. 12) by the playback device 102 in 3D playback mode. FIG. 36D is a schematic diagram showing a correspondence between dependent-view extents EXT2[0], EXT2[1], . . . belonging to a first file DEP (02000.m2ts) 1242 (shown in FIG. 12) and SPNs 3622 shown by the extent start point 3620. FIG. 36E is a schematic diagram showing a correspondence between an extent SS EXTSS[0] belonging to the first file SS 1245 and an extent block on the BD-ROM disc 101.

FIG. 50 is a list of system parameters (SPRMs) stored in a player variable storage unit 4936 shown in FIG. 49.

FIG. 51 is a flowchart of playback processing by the 2D playback device 4900 shown in FIG. 49.

FIG. 54A is a flowchart of processing whereby a PG decoder 5372 shown in FIG. 51 decodes a graphics object from one data entry in the PG stream. FIGS. 54B-54E are schematic diagrams showing the graphics object changing as the processing proceeds.

FIG. 62 is a flowchart of offset control by cropping units 6131-6134 shown in FIG. 61.

FIGS. 63A to 63C are schematic diagrams showing PG planes RGP, GP, and LGP before and after offset control by the second cropping unit 6132 shown in FIG. 61, and the PG plane RGP shown in FIG. 63A is with a right offset, the PG plane GP shown in FIG. 63B is before offset control, the PG plane data LGP shown in FIG. 63C is with a left offset.

FIG. 65 is a table showing, for each type of playback status shown by the SPRM (33), the value of a playback mode corresponding to the type, a video plane and a graphics plane to be outputted from a playback unit 5602.

FIG. 77 is a flowchart of a method for recording movie content onto a BD-ROM disc by using the recording device 7500 shown in FIG. 75.

FIG. 79 is a schematic diagram showing an example of constructing a left-view LVW and a right-view RVW from the combination of a 2D video image MVW and a depth map DPH.

DESCRIPTION OF EMBODIMENT

The following describes preferred embodiments of the present invention, with reference to the drawings.

Embodiment 1

Figure 1:
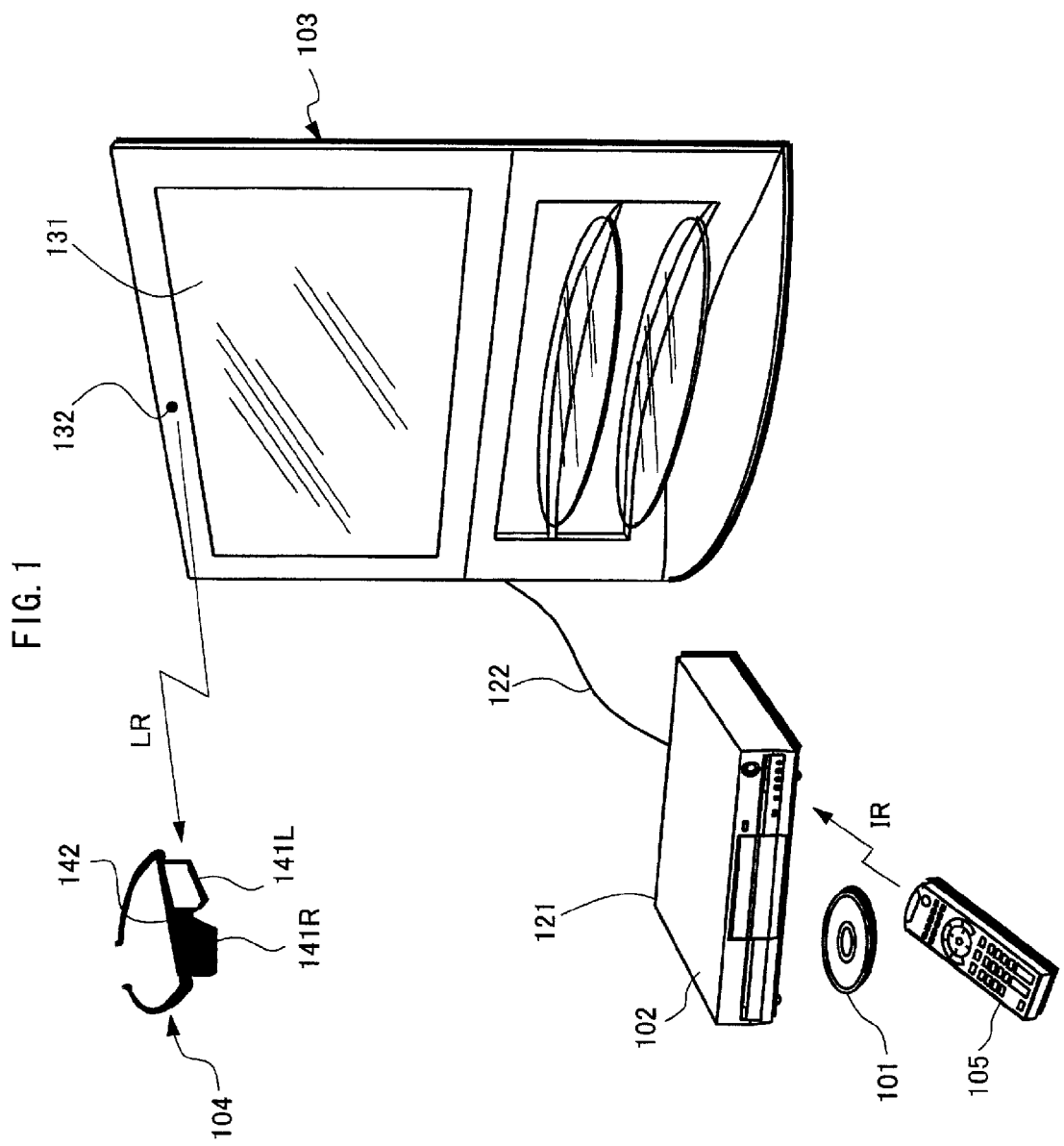
FIG. 1 is a schematic diagram showing a home theater system according to Embodiment 1 of the present invention.

FIG. 1 is a schematic diagram showing a home theater system according to Embodiment 1 of the present invention. This home theater system adopts a 3D video image (stereoscopic video image) playback method that uses parallax video images, and in particular adopts an alternate-frame sequencing method as a display method (see <<Supplementary Explanation>> for details). As shown in FIG. 1, this home theater system includes a recording medium 101, a playback device 102, a display device 103, a pair of shutter glasses 104, and a remote control 105.

The recording medium 101 is a read-only Blu-ray disc (BD)™, i.e. a BD-ROM disc. The recording medium 101 can be a different portable recording medium, such as an optical disc with a different format such as DVD or the like, a removable hard disk drive (HDD), or a semiconductor memory device such as an SD memory card. This recording medium, i.e. the BD-ROM disc 101, stores movie content as 3D video images. This content includes a "left-view video stream" and a "right-view video stream". The respective video streams represent sequences of left-view frames and of right-view frames of 3D video images. The content mentioned above may further include a "depth-map stream". The depth-map stream represents a depth map for each frame of 3D video images. These video streams are arranged on the BD-ROM disc 101 in units of data blocks as described below and are accessed using a file structure described below. The left-view or right-view video stream is used by both a 2D playback device and a 3D playback device to play the content back as 2D video images. Conversely, a pair of left-view and right-view video streams, or a pair of a left-view or right-view video stream and a depth-map stream are used by a 3D playback device to play the content back as 3D video images.

A BD-ROM drive 121 is mounted on the playback device 102. The BD-ROM drive 121 is an optical disc drive conforming to the BD-ROM format. The playback device 102 uses the BD-ROM drive 121 to read content from the BD-ROM disc 101. The playback device 102 further decodes the content into video data/audio data. The playback device 102 is a 3D playback device and can play the content back as both 2D video images and as 3D video images. Hereinafter, the operational modes of the playback device 102 when playing back 2D video images and 3D video images are respectively referred to as "2D playback mode" and "3D playback mode". In 2D playback mode, the playback device 102 decodes and outputs only one of left-view frames and right-view frames. In 3D playback mode, there are two types of decoding processing: "L/R mode" and "depth mode". In L/R mode, the 3D playback device decodes pairs of left-view and right-view frames from a combination of the left-view and right-view video streams. In depth mode, the playback device decodes pairs of left-view and right-view frames from a combination of the depth-map stream with either the left-view stream or right-view video stream. The playback device 102 is provided with L/R mode. The playback device 102 may be further provided with depth mode. On the other hand, there are two types of output modes for video data in 3D playback mode: "base-view(B)—dependent view(D) presentation mode" and "B-B presentation mode". In B-D presentation mode, the 3D playback device alternately outputs a left-view video stream and a right-view video stream. At this point, since left-view and right-view frames are alternately displayed on a screen of a display device, the viewer perceives these frames as 3D video images. In B-B presentation mode, the 3D playback device outputs only frame data decoded from a base-view video stream, e.g., only a left-view frame, twice per frame, while maintaining the frame rate at a value (e.g., 48 fps) in B-D presentation mode. The playback device 102 is provided with B-D presentation mode. The playback device 102 may be further provided with B-B presentation mode.

The playback device 102 is connected to the display device 103 with an HDMI cable 122. The playback device 102 converts video data, audio data, and control information into serial signals in the HDMI format and transmits the signals to the display device 103 through the Transition Minimized Differential Signaling (TMDS) channel in the HDMI cable 122. The playback device 102 in 2D playback mode or B-B presentation mode multiplexes only left-view frames into video data. The playback device 102 in B-D presentation mode time-multiplexes both left-view frames and right-view frames into video data. The control information includes "info frame (HDMI Vendor-Specific Info Frame)", in addition to a horizontal synchronous signal and a vertical synchronous signal. The info frame is auxiliary data, which is necessary for playback of video images in addition to video data, and includes "playback mode". The playback mode is a parameter indicating whether the playback device 102 is in 2D playback mode or in 3D playback mode.

Additionally, the playback device 102 exchanges Consumer Electronics Control (CEC) messages with the display device 103 through a CEC line in the HDMI cable 122. The playback device 102 can thus issue an inquiry to the display device 103 as to whether it supports playback of 3D video images. Additionally, the playback device 102 reads Extended Display Identification Data (EDID), which is data representing a response to the inquiry, from the display device 103 through a Display Data Channel (DDC) in the HDMI cable 122. In particular, the EDID includes a data area (HDMI Vendor-Specific Data Block) unique to the display device 103. The data area has stored therein information indicating whether the display device 103 supports playback of 3D video images, and information indicating a display pattern of 3D video images supported by the display device 103. Besides the above, the playback device 102 performs High-bandwidth Digital Content Protection (HDCP) authentication with the display device 103 through the DDC. With the use of a private key obtained as a result of the authentication, the playback device 102 encrypts video data and other data and transmits the encrypted data to the display device 103 via the HDMI cable 122.

The display device 103 is a liquid crystal display. Alternatively, the display device 103 can be another type of flat panel display, such as a plasma display, an organic EL display, etc., or a projector. The display device 103 displays video images on a screen 131 in response to a video signal, and causes the built-in speaker to produce audio in response to an audio signal. There are two types of operation modes for the display device 103: 2D presentation mode and 3D presentation mode. The display device 103 in 2D presentation mode displays, on the screen 131, video data received from the playback device 102 at a frame rate (e.g., 60 fps) for 2D video images. At this point, left-views are displayed on the screen 131. The display device 103 in 3D presentation mode first decodes "playback mode" included in control information from the info frame received from the playback device 102. When the playback mode indicates "3D", the display device 103 displays, on the screen 131, video data received from the playback device 102 at a frame rate (e.g., 120 fps) for 3D video images. At this point, left-views and right-views are alternately displayed on the screen 131. When the playback mode indicates "2D", the display device 103 displays, on the screen 131, only left-view frames of video data received from the playback device 102 at a frame rate (e.g., 120 fps) for 3D video images. At this point, the display device 103 displays each left-view frame twice. Therefore, only left-views are displayed on the screen 131.

The display device 103 includes a left/right signal transmitting unit 132. The left/right signal transmitting unit 132 transmits a left/right signal LR to the shutter glasses 104 via infrared rays or by radio transmission. The left/right signal LR indicates whether the image currently displayed on the screen 131 is a left-view or a right-view image. In 2D presentation mode, the display device 103 does not allow the left/right signal transmitting unit 132 to transmit a left/right signal. In 3D presentation mode, the display device 103 detects switching of frames by distinguishing between a left-view frame and a right-view frame based on a control signal, such as a synchronous signal, or auxiliary data that accompanies a video signal. Then, the display device 103 causes the left/right signal transmitting unit 132 to change the left/right signal LR in sync with the detected switching of frames.

The shutter glasses 104 include two liquid crystal display panels 141L and 141R and a left/right signal receiving unit 142. The liquid crystal display panels 141L and 141R respectively constitute the left and right lens parts. The liquid crystal display panels 141L and 141R are of normally white type, and the entirety thereof transmits light in the state of not receiving a signal from the left/right signal receiving unit 142. The display device 103 in 2D presentation mode does not transmit a left/right signal LR. Therefore, when a viewer looks at the screen 131 through the shutter glasses 104, both eyes of the viewer see left views on the screen 131. The left/right signal receiving unit 142 receives a left/right signal LR, and in accordance with changes therein, transmits the signal to the left and right liquid crystal display panels 141L and 141R. In response to the signal, each of the liquid crystal display panels 141L and 141R either lets light pass through the entire panel or shuts light out. For example, when the left/right signal LR indicates a left-view display, the liquid crystal display panel 141L for the left eye lets light pass through, while the liquid crystal display panel 141R for the right eye shuts light out. When the left/right signal LR indicates a right-view display, the display panels act oppositely. In this way, while the display device 103 in 3D presentation mode changes the left/right signal LR in sync with switching of frames, the two liquid crystal display panels 141L and 141R alternately transmit light in sync with the switching of frames. Accordingly, when the viewer looks at the screen 131 while wearing the shutter glasses 104, the left view is shown only to the viewer's left eye, and the right view is shown only to the viewer's right eye. The viewer is made to perceive the difference between the images seen by each eye as the binocular parallax for the same stereoscopic image, and thus the video image appears to be stereoscopic.

The remote control 105 includes an operation unit and a transmitting unit. The operation unit includes a plurality of buttons. The buttons correspond to each of the functions of the playback device 102 and the display device 103, such as turning the power on or off, starting or stopping playback of the BD-ROM disc 101, etc. The operation unit detects when the user presses a button and conveys identification information for the button to the transmitting unit as a signal. The transmitting unit converts this signal into a signal IR and outputs it via infrared rays or radio transmission to the playback device 102 or the display device 103. On the other hand, the playback device 102 or display device 103 receives this signal IR, determines the button indicated by this signal IR, and executes the function associated with the button. If the function is of the playback device 102 or display device 103, the playback device 102 or display device 103 simply executes the function. If the function is of the other device, the playback device 102 or display device 103 causes the other device to execute the function with the use of, for example, a CEC message. In this way, the user can remotely control both the playback device 102 and the display device 103 with the same remote control 105.

<Display Device>

Figure 2:
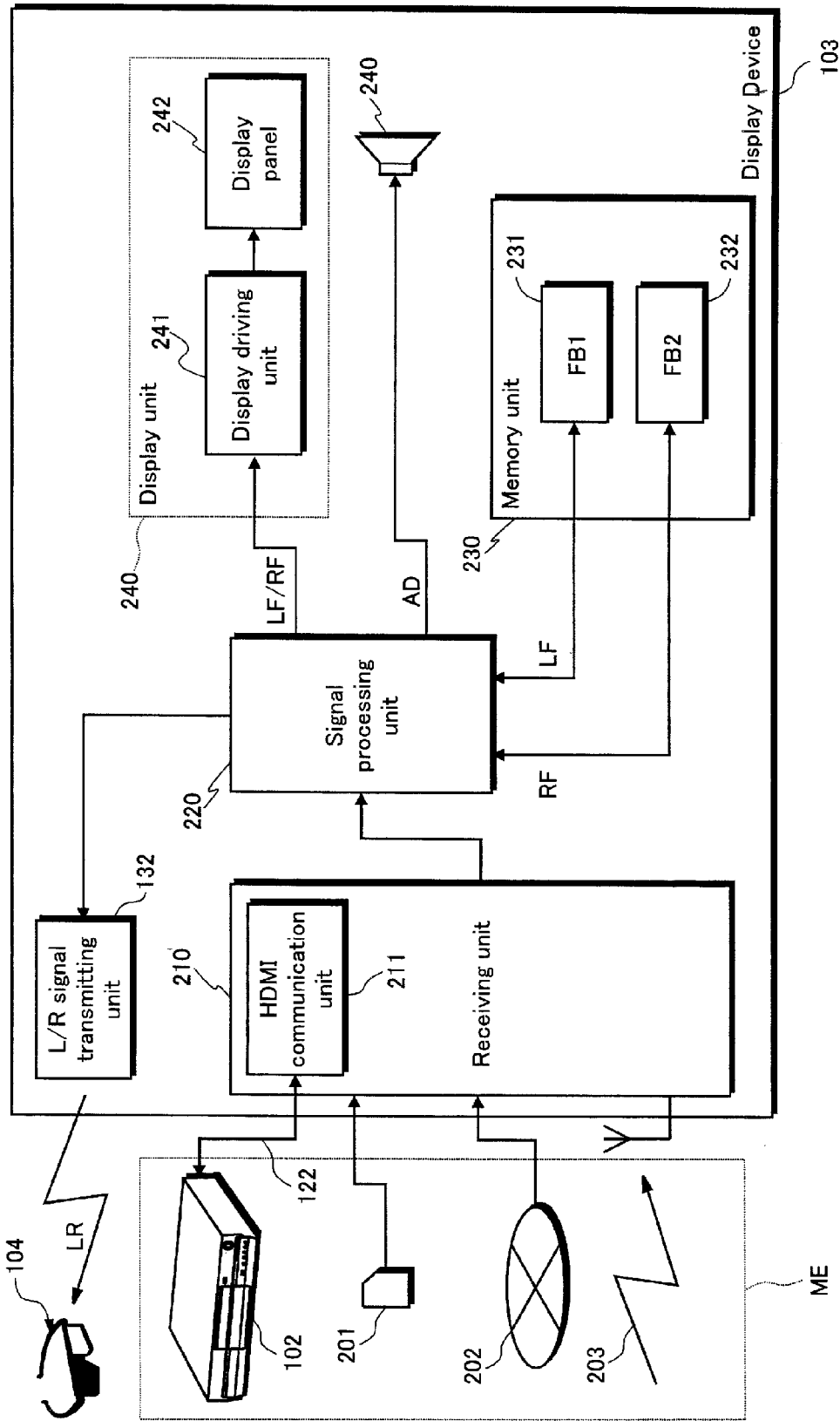
FIG. 2 is a functional block diagram showing a structure of a display device 103 shown in FIG. 1.

FIG. 2 is a functional block diagram showing a structure of the display device 103 shown in FIG. 1. As shown in FIG. 2, the display device 103 includes a receiving unit 210, a signal processing unit 220, a memory unit 230, a display unit 240 and a speaker 250, in addition to the left/right signal transmitting unit 132.

The receiving unit 210 receives stream data from the playback device 102 and also from any of various media including a memory card 201, an external network 202, and a broadcast wave 203. The stream data includes movie content of 3D video images. In particular, the receiving unit 210 includes an HDMI communication unit 211.

The signal processing unit 220 separates various types of data such as video, audio, graphics, etc., from the stream data, and individually processes the various types of data. Furthermore, the signal processing unit 220 stores left-view frames LF and right-view frames RF into the memory unit 230, and outputs audio data AD to the speaker 250. Also, the signal processing unit 220 controls the display unit 240 based on a control signal, such as a synchronous signal, accompanying a video signal and auxiliary data (i.e., info frame). The signal processing unit 220 in 2D presentation mode reads only left-view frames LF from video data in the memory unit 230, and outputs the frames to the display unit 240 at a frame rate (e.g., 60 fps) for 2D video images. Furthermore, the display device 103 in 2D presentation mode does not allow the left/right signal transmitting unit 132 to transmit a left/right signal LR. The signal processing unit 220 in 3D presentation mode first decodes a playback mode from an info frame accompanying video data. When the playback mode indicates "3D", the signal processing unit 220 alternately outputs left-view frames LF and right-view frames RF from the memory unit 230 to the display unit 240 at a frame rate (e.g., 120 fps) for 3D video images. When the playback mode indicates "2D", the signal processing unit 220 outputs only left-view frames LF from the memory unit 230 to the display unit 240 at a frame rate (e.g., 120 fps) for 3D video images. At this point, each of the left-view frames is output twice. In parallel with the transmission of the frames, the signal processing unit 220 issues instructions to the left/right signal transmitting unit 132 to change the left/right signal LR in sync with the switching of frames.

The memory unit 230 is a semiconductor memory device or Hard Disk Drive (HDD) internally provided in the display device 103. Alternatively, the memory unit 230 may be an external HDD connected to the display device 103. The memory unit 230 includes two frame buffers, namely FB1 231 and FB2 232. FB1 231 and FB2 232 are separate memory elements. Alternatively, FB1 231 and FB2 232 may be different areas of a single memory element or HDD. Each of FB1 231 and FB2 232 can store a two-dimensional array of pixel data. Elements of the array correspond one-to-one with pixels of a screen. FB1 231 receives and stores left-view frames LF from the signal processing unit 220, whereas FB2 232 receives and stores right-view frames RF.

The display unit 240 includes a display driving unit 241 and a display panel 242. The display driving unit 241 controls the display panel 242 in response to a control signal from the signal processing unit 220. As a result, left-view frames LF and right-view frames RF are alternately displayed one by one on the screen of the display panel 242 for a predetermined time period. The display panel 242 is a Liquid Crystal Display (LCD) panel. Alternatively, the display panel 242 may be any other types of display panels, such as a plasma display panel or an organic EL display panel. The speaker 250 is a speaker internally provided in the display device 103. Alternatively, the speaker 250 may be an external speaker connected to the display device 103.

Figure 3:
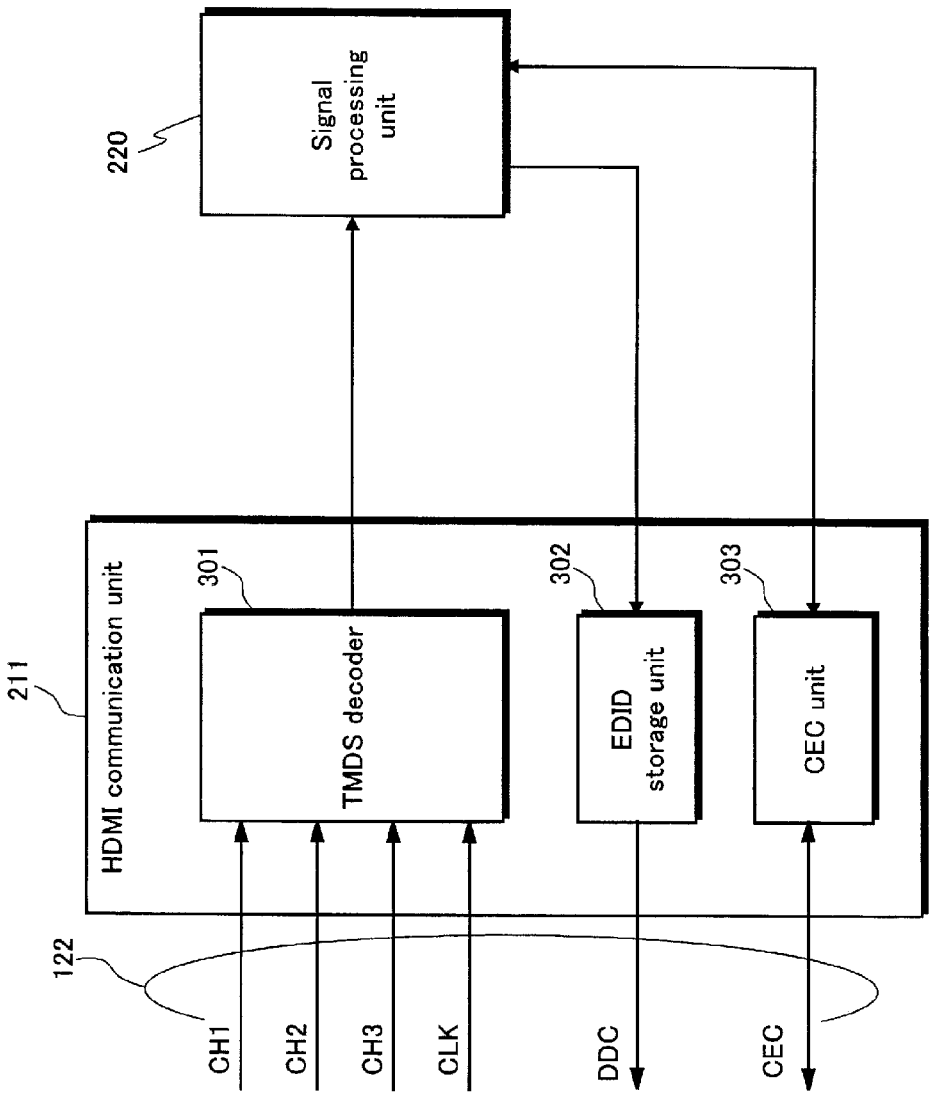
FIG. 3 is a functional block diagram showing a structure of a HDMI communication unit 211 shown in FIG. 2.

FIG. 3 is a functional block diagram showing a structure of the HDMI communication unit 211. The HDMI communication unit 211 is connected to the playback device 102 with the HDMI cable 122. With the connection, the HDMI communication unit 211 relays data to be exchanged between the playback device 102 and the signal processing unit 220. As shown in FIG. 3, the HDMI communication unit 211 includes a TMDS decoder 301, EDID storage unit 302, and CEC unit 303.

The TMDS decoder 301 receives a serial signal carrying video data, audio data, auxiliary data, and control signals, from the playback device 102 through the TMDS channels CH1, CH2, CH3 and CLK in the HDMI cable 122. The TMDS channels include three data channels CH1, CH2, and CH3 and one clock channel CLK. Each channel is composed of a pair of differential signal lines. During one cycle of the state change of the clock channel CLK, each data channel CH1-CH3 transmits 10 bits. For example, 8-bit pixel data of R, G and B, 4-bit audio data and 4-bit auxiliary data (an info frame), and a 2-bit control signal (containing a horizontal sync signal and a vertical sync signal) are each converted 10-bit data, and then transmitted through each data channel CH1-CH3. The TMDS decoder 301 decodes a sequence of the 10-bit data into video data and other data, and then passes the decoded data to the signal processing unit 220.

The EDID storage unit 302 is a semiconductor memory device internally provided with the HDMI communication unit 211 and connected to the playback device 102 through the display data channel DDC in the HDMI cable 122. The display data channel DDC is composed of a set of three differential signal lines including a ground line. The signal processing unit 220 stores parameters (HDMI Vendor-Specific Data Block) indicating functions, characteristics and states of the display device 103 in the EDID storage unit 302; the parameters are used as EDID. In particular, EDID contains information indicating whether or not the display device 103 has the playback function of 3D video images, and information indicating a display pattern of 3D video images supported by the display device 103. In response to a request from the playback device 102, the EDID storage unit 302 supplies EDID through the display data channel DDC. Additionally, the display data channel DDC is used for HDCP authentication performed between the signal processing unit 220 and the playback device 102. The signal processing unit 220 and the playback device 102 share a single key through the HDCP authentication process. The playback device 102 encrypts video data and audio data with the shared key, whereas the signal processing unit 220 decrypts encrypted data into the video data and audio data with the shared key.

The CEC unit 303 exchanges CEC messages with the playback device 102 via a CEC line CEC in the HDMI cable 122. The CEC line CEC is composed of a single signal line. In particular, the CEC unit 303 receives a CEC message indicating information that the playback device 102 receives from the remote control 105 and notifies the signal processing unit 220 of the received CEC message. Reversely, the CEC unit 303 converts information received by the signal processing unit 220 from the remote control 105 into a CEC message and issues the CEC message to the playback device 102.

Figure 4:
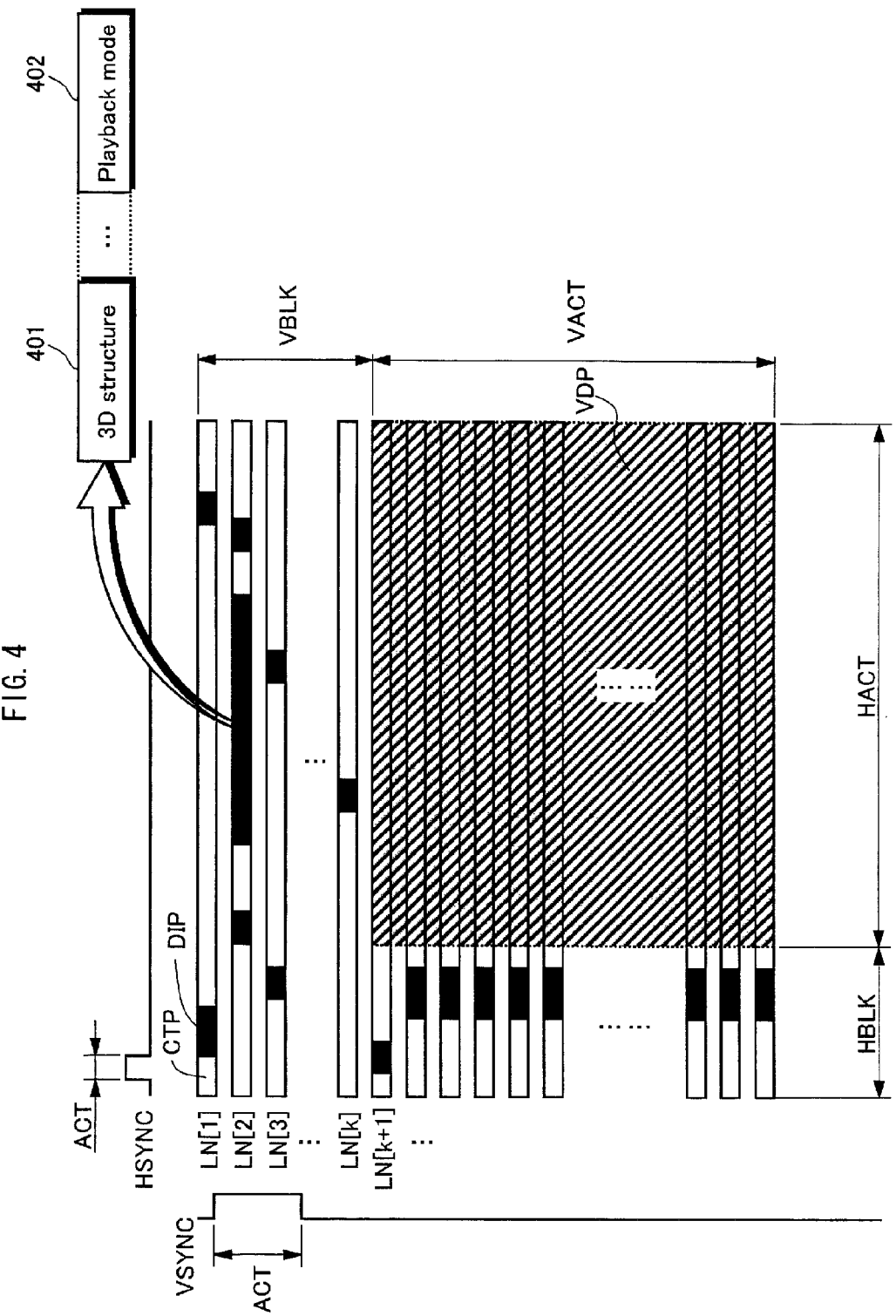
FIG. 4 is a schematic diagram showing a structure of data used to display one frame of 3D video images, out of data transmitted via TMDS data channel CH1-3.

FIG. 4 is a schematic diagram showing a structure of data used to display one frame of 3D video; the data is included in data transmitted through the TMDS data channels CH1-CH3. With reference to FIG. 4, horizontally long rectangles LN[1], LN[2], LN[3] . . . each represent a fixed-length data sequence called a "line". Data used for displaying one 3D video frame is converted into a plurality of lines LN[1], LN[2], LN[3] . . . and sequentially transmitted line by line, starting from the top line shown in FIG. 4. Each line is a sequence of a predetermined number of 8-bit (=1-byte) data pieces and sequentially transmitted, starting from the top data piece that corresponds to the left side shown in FIG. 4. With further reference to FIG. 4, the transmission period of each line is classified into the following three types: a control period CTP (represented by an open rectangle); a data-island period DIP (represented by a solid rectangle); and a video-data period VDP (represented by a hatched rectangle). In a control period CTP, a horizontal synchronous signal HSYNC, a vertical synchronous signal VSYNC, and other control signals are transmitted. In a data-island period DIP, audio data and an info frame are mainly transmitted. In a video-data period VDP, video data, especially pixel data, is transmitted.

As shown in FIG. 4, k lines from the top line LN[1] to the k-th line LN[k] (the letter k denotes an integer greater than or equal to 1) do not include any video-data period VDP and constitute a vertical blanking period VBLK. The remaining lines LN[k+1] . . . each include a video-data period VDP and constitute a vertical active period VACT. A vertical synchronous signal VSYNC stays active only during the first few lines LN[1], LN[2], LN[3] . . . in the vertical blanking period VBLK to indicate the transmission start of a new 3D video frame. In the vertical active period VACT, the top portion of each line does not include a video-data period VDP and constitutes a horizontal blanking period HBLK, and the remaining portion of each line only includes a video-data period VDP and constitutes a horizontal active period HACT. The horizontal synchronous signal VSYNC stays active only during the control periods CTP at the tops of the lines LN[1], LN[2], LN[3] . . . to indicate the respective transmission starts of the lines. A portion shared by the vertical active period VACT and the horizontal active period HACT is an active display area VACT×HACT and includes a pair of a left-view frame and a right-view frame that together constitutes one 3D video frame. The arrangements of a left-view frame L and a right-view frame R in an active display area come in various types. A parameter indicating one of the types, namely "3D structure (3D_structure)" 401 is stored together with the playback mode 402, and as a part of an info frame, in a data-island period DIP in a vertical blanking period VBLK.

FIGS. 5A-5E are schematic diagrams showing the types of arrangements of a left-view frame and a right-view frame in the active display area VACT×HACT shown in FIG. 4. Each dashed rectangle VDP shown in the figures represents the active display area VACT×HACT. Each hatched portion shown in the figures represents the transmission period of a right-view frame. The arrangement of each figure is allocated a different value indicating a 3D structure. FIG. 5A illustrates a "frame packing method". In this method, the number of lines constituting a vertical active period VACT is set to more than twice the number of lines constituting one 2D video frame. The left-view frame L is arranged in the first half of the active display area VACT×HACT, i.e., the upper portion of FIG. 5A, and the right-view frame R is arranged in the last half of the active display area, i.e., the lower portion of FIG. 5B. In addition, an active space VASP is provided between the frames L and R. The number of lines in the active space VASP equals to the number of lines in the vertical blanking period VBLK. The playback device 102 fills the active space VASP with fixed pixel data. On the other hand, the signal processing unit 220 ignores the pixel data in the active space VASP. FIG. 5B illustrates a "side-by-side method (full)". In this method, the number of pixels constituting the horizontal active period HACT is set to twice the number of pixels in one 2D video frame. The first half of the horizontal active period HACT in each line includes a left-view frame L, whereas the last half thereof includes a right-view frame R. FIG. 5C illustrates a "side-by-side method (half)". Unlike the active display area shown in FIG. 5B, the horizontal active period HACT is equal in number of pixels to one 2D video frame. The horizontal resolution of each of the left-view frame L and the right-view frame R is compressed by half, and then the left-view frame L is arranged in the first half of the horizontal active period HACT in each line and the right-view frame R is arranged in the last half thereof. FIG. 5D illustrates a "top-bottom method" (also referred to as over-under method). Unlike the active display area shown in FIG. 5B, the vertical active period VACT is equal in number of lines to one 2D video frame. The vertical resolution of each of the left-view frame L and the right-view frame is compressed by half, and then the left-view frame L is arranged in the first half of the vertical active period VACT and the right-view frame R is arranged in the last half thereof. FIG. 5E illustrates a "line alternative method". Odd-numbered lines in the vertical active period VACT include a left-view frame, whereas even-numbered lines therein include a right-view frame. In this method, the number of lines constituting a vertical active period VACT is set to twice the number of lines constituting one 2D video frame.

FIG. 6 is a flowchart of processing of displaying 3D video images by the display device 103. The processing is started when a display request for 3D video images is received from a transmission source, such as the playback device 102, of stream data carrying the 3D video images.

In Step S61, the receiving unit 210 receives the stream data from the transmission source. For example, when the transmission source is the playback device 102, the HDMI communication unit 211 first performs EDID transmission and HDCP authentication. Here, EDID particularly indicates whether the display device 103 supports displaying of 3D video images, and also indicates a display pattern supported by the display device 103 among the display patterns shown in FIGS. 5A to 5E. When HDCP authentication is successful, the receiving unit 210 receives encrypted stream data over the TMDS data channels CH1-3. Thereafter, processing proceeds to step S62.

In step S62, the signal processing unit 220 decodes the encrypted stream data by using a key obtained in the HDCP authentication processing, and extracts various types of data, such as video, audio, and graphics, from the decoded stream data. Furthermore, the signal processing unit 220 respectively stores the left-view frames LF and the right-view frames RF in the FB1 231 and the FB2 232 provided within the the memory unit 230, and transmits the audio data AD to the speaker 250. Also, the signal processing unit 220 controls the display unit 240, based on a vertical synchronous signal VSYNC, a horizontal synchronous signal HSYNC, other control signals, and auxiliary data. In particular, the signal processing unit 220 reads a 3D structure and a playback mode from an info frame transmitted during the vertical blanking period VBLK. From a value indicating the 3D structure, an arrangement is identified of a left-view frame L and a right-view frame R in an active display area. Thereafter, processing proceeds to step S63.

In Step S63, the speaker 250 reproduces sounds from the audio data AD. In parallel with the above step, processing proceeds to Step S64.

In step S64, the signal processing unit 220 identifies whether the playback mode indicates "3D" or "2D". If the playback mode indicates "3D", the processing proceeds to step S65A. If the playback mode indicates "2D", the processing proceeds to step S65B.

In step S65A, the playback mode indicates "3D". Therefore, the signal processing unit 220 shifts to 3D presentation mode. The signal processing unit 220 alternately reads frames LF and RF from FB1 231 and FB2 232 within the memory unit 230 and outputs the read frames to the display unit 240. At this point, the signal processing unit 220 sets the frame rate to, for example, 120 fps. In the display unit 240, the display driving unit 241 controls the display panel 242 in response to a control signal received from the signal processing unit 220. This allows the left-view frames LF and the right-view frames RF to alternately appear on the screen of the display panel 242, for example, every 1/120 seconds. In addition, the signal processing unit 220 controls the left/right signal transmitting unit 132 to switch the left/right signal LR synchronously with the switching of frames. In accordance with the switching, the shutter glasses 104 alternately cause the left and right liquid crystal display panels 141L and 141R to be transparent. As a result, a viewer watching the screen 131 through the shutter glasses 104 perceives a pair of a left-view frame LF and a right-view frame RF as a single frame of 3D video images. Thereafter, processing proceeds to step S66.

In step S65B, the playback mode indicates "2D". Therefore, the signal processing unit 220 shifts to 2D presentation mode. The signal processing unit 220 reads only the frames LF stored in the FB1 231 provided within the memory unit 230 and outputs the read frames to the display unit 240. At this point, the signal processing unit 220 maintains the frame rate at a value in 3D presentation mode, for example, at 120 fps. In the display unit 240, the display driving unit 241 controls the display panel 242 in response to a control signal received from the signal processing unit 220. As a result, only the left-view frames LF are each outputted twice every 1/120 seconds, and thereby displayed on the screen of the display panel 242. In addition, the signal processing unit 220 controls the left/right signal transmitting unit 132 to switch the left/right signal LR synchronously with the switching of frames, in the same manner as in step S65A. In accordance with the switching, the shutter glasses 104 alternately cause the left and right liquid crystal display panels 141L and 141R to be transparent. As a result, only left-view frames LF are displayed on the screen 131, and therefore a viewer watching the screen 131 through the shutter glasses 104 perceives these frames simply as one frame of 2D video images. Thereafter, processing proceeds to step S66.

In Step S66, the signal processing unit 220 checks whether or not the memory unit 230 still holds any stream data yet to be displayed. If any stream data is left, processing is repeated from Step S62. If no stream data is left, processing terminates.

FIGS. 7A to 7D are schematic diagrams showing: changes in a playback mode and frames L and R outputted from the playback device 102; changes in frames L and R displayed by the display device 103; and periods LSL and LSR during which shutter glasses 104 cause the left and right lenses to be transparent, when a playback period $P_{2D}$ of 2D video images is inserted into a playback period $P_{3D}$ of 3D video images. Referring to FIG. 7A, the playback period $P_{3D}$ of 3D video images continues up to first time T1, and the playback device 102 operates in B-D presentation mode. Therefore, as shown in FIG. 7A, the playback device 102 sets the playback mode in an info frame to "3D", and outputs the info frame to the display device 103. As shown in FIG. 7B, the playback device 102 alternately outputs left-view frames L and right-view frames R to the display device 103. Note that a transmission format of a pair of frames L and R is preferably the frame packing method shown in FIG. 5A. It is also possible to adopt any of the formats shown in FIGS. 5B to 5E. The playback device 102 sets, in the 3D structure within an info frame, a value indicating a transmission format that has been adopted. The display device 103 identifies the transmission format indicated by the 3D structure in the info frame, and detects that the playback mode indicates "3D". As shown in FIG. 7C, the display device 103 alternately displays received left-view frames L and right-view frames R, by using the information pieces in the info frame. In parallel, as shown in FIG. 7D, the display device 103 alternately causes the left and right lenses of the shutter glasses 104 to be transparent synchronously with the switching of the frames L and R.

Further referring to FIG. 7A, the playback period $P_{3D}$ of 3D video images is changed to the playback period $P_{2D}$ of 2D video images at the first time T1. Specifically, in response to a user operation or an instruction from an application program, the playback device 102 changes the playback mode in an info frame from "3D" to "2D", and outputs the info frame to the display device 103. The playback device 102 continues to operate in B-D presentation mode even after the first time T1. Therefore, as shown in FIG. 7B, left-view frames L and right-view frames R continue to be alternately outputted to the display device 103 even after the first time T1, in the same manner as in the playback period $P_{3D}$ of 3D video images. The display device 103 detects from the info frame that the playback mode is changed to "2D", and displays only left-view frames L twice per frame, as shown in FIG. 7C. However, as shown in FIG. 7D, the display device 103 alternately causes the left and right lenses of the shutter glasses 104 to be transparent synchronously with the switching of the frames L and R, in the same manner as in the playback period $P_{3D}$ of 3D video images even after the first time T1.

Referring again to FIG. 7A, the playback period $P_{2D}$ of 2D video images continues from the first time T1 to second time T2, and the playback period $P_{3D}$ of 3D video images starts again from the second time T2. Specifically, in response to a user operation or an instruction from an application program, the playback device 102 changes the playback mode in an info frame from "2D" back to "3D". The playback device 102 continues to operate in B-D presentation mode even after the second time T2. Therefore, as shown in FIG. 7B, left-view frames L and right-view frames R continue to be alternately outputted to the display device 103 even after the second time T2, in the same manner as before. The display device 103 detects from the info frame that the playback mode is changed back to "3D", and alternately displays received left-view frames L and right-view frames R, as shown in FIG. 7C. In parallel, as shown in FIG. 7D, the display device 103 alternately causes the left and right lenses of the shutter glasses 104 to be transparent synchronously with the switching of the frames L and R.

As is clear from FIGS. 7A to 7D, when switching from 3D video images to 2D video images, the playback device 102 simply needs to change the playback mode in an info frame from "3D" to "2D" while maintaining B-D presentation mode. In this way, the switching operation is performed promptly. On the other hand, the display device 103 alternately displays left-view frames L and right-view frames R while the playback mode in an info frame indicates "3D", and displays only left-view frames L twice per frame while the playback mode in an info frame indicates "2D". The frame rate does not need to be changed. In this way, even if the playback device 102 does not support B-B presentation mode, the display device 103 can switch 3D video images to 2D video images seamlessly.

<Modifications>

(1-A) FIGS. 8A to 8D are schematic diagrams pertaining to Modification 1 and showing: changes in a playback mode and frames L and R outputted from the playback device 102; changes in frames L and R displayed by the display device 103; and the periods LSL and LSR during which the shutter glasses 104 cause the left and right lenses to be transparent, when the playback period $P_{2D}$ of 2D video images are inserted into the playback period $P_{3D}$ of 3D video images. FIGS. 8A to 8D are different from FIGS. 7A to 7D in that during the playback period $P_{2D}$ of 2D video images, the display device 103 causes the shutter glasses 104 to maintain both the left and right lenses to be transparent. In all other respects, FIGS. 8A to 8D are the same as FIGS. 7A to 7D. Accordingly, details thereof can be found in the descriptions provided for FIGS. 7A to 7D.

Further referring to FIG. 8A, the playback period $P_{2D}$ of 2D video images continues from the first time T1 to the second time T2, and the playback mode in an info frame indicates "2D". In this case, as shown in FIG. 8D, the display device 103 causes the shutter glasses 104 to maintain both the left and right lenses to be transparent. Specifically, the left/right signal transmitting unit 132 stops transmitting the left/right signal LR. Alternatively, the left/right signal LR may include a state indicating that "images currently displayed on the screen 131 are 2D video images". Then, while the playback mode in an info frame is set to "2D", the display device 103 may cause the left/right signal transmitting unit 132 to maintain the left/right signal LR at the above state. The shutter glasses 104 maintain both the left and right lenses to be transparent, whereby the screen 131 is constantly viewed by both eyes of the viewer. Accordingly, the viewer feels as if the brightness of the screen has improved. This structure also prevents the risk where the viewer notices flicker of displayed images caused by the left and right lenses alternately blocking light. As a result, the viewer feels as if the quality of 2D video images has improved.

(1-B) FIGS. 9A to 9D are schematic diagrams pertaining to Modification 2 and showing: changes in a playback mode and frames L and R outputted from the playback device 102; changes in frames L and R displayed by the display device 103; and the periods LSL and LSR during which shutter glasses 104 cause the left and right lenses to be transparent, when the playback period $P_{2D}$ of 2D video images is inserted into the playback period $P_{3D}$ of 3D video images. FIGS. 9A to 9D are different from FIGS. 8A to 8D in that during the playback period $P_{2D}$ of 2D video images, the display device 103 changes the frame rate back to a value for 2D presentation mode. In all other respects, FIGS. 9A to 9D are the same as FIGS. 8A to 8D. Accordingly, details thereof can be found in the descriptions provided for FIGS. 7A to 7D and FIGS. 8A to 8D.

Referring to FIG. 9A, the playback period $P_{2D}$ of 2D video images continues from the first time T1 to the second time T2, and the playback mode in an info frame indicates "2D". In this case, as shown in FIG. 9D, the display device 103 causes the shutter glasses 104 to maintain both the left and right lenses to be transparent. The frame rate is sufficient as long as flicker caused by switching of frames is prevented. Therefore, the display device 103 lowers the frame rate from a value for 3D presentation mode (e.g., 120 fps) to a value for 2D presentation mode (e.g., 60 fps). The frame rate may be set at any value as long as each left-view frame L is displayed once. As a result, the speed and the frequency required for the processing for switching frames are both reduced. This enables reduction in power consumed by the switching.

(1-C) FIGS. 10A to 10D are schematic diagrams pertaining to Modification 3 and showing: changes in a playback mode and frames L and R outputted from the playback device 102; changes in frames L and R displayed by the display device 103; and the periods LSL and LSR during which the shutter glasses 104 cause the left and right lenses to be transparent, when the playback period $P_{2D}$ of 2D video images is inserted into the playback period $P_{3D}$ of 3D video images. FIGS. 10A to 10D are different from FIGS. 9A to 9D in that during the playback period $P_{2D}$ of 2D video images, the playback device 102 operates in B-B presentation mode. In all other respects, FIGS. 10A to 10D are the same as FIGS. 9A to 9D. Accordingly, details thereof can be found in the descriptions provided for FIGS. 7A to 7D and FIGS. 9A to 9D.

Referring to FIG. 10A, the playback period $P_{2D}$ of 2D video images continues from the first time T1 to the second time T2, and the playback mode in an info frame indicates "2D". In this case, as shown in FIG. 10B, the playback device 102 shifts from B-D presentation mode to B-B presentation mode. In B-B presentation mode, the playback device 102 outputs only left-view frames twice per frame, while maintaining the frame rate at a value for B-D presentation mode (e.g., 48 fps). On the other hand, the display device 103 lowers the frame rate from a value for 3D presentation mode (e.g., 120 fps) to a value for 2D presentation mode (e.g., 60 fps), and thereby displays each left-view frame L once. In this way, regardless of whether the playback device 102 supports B-B presentation mode, the display device 103 can switch 3D video images to 2D video images seamlessly. Also, since the display device 103 is maintained at a low frame rate, power consumed by switching frames is reduced.

(1-D) FIGS. 11A to 11D are schematic diagrams pertaining to Modification 4 and showing: changes in a playback mode and frames L and R outputted from the playback device 102; changes in frames L and R displayed by the display device 103; and the periods LSL and LSR during which the shutter glasses 104 cause the left and right lenses to be transparent, when the playback period $P_{2D}$ of 2D video images is inserted into the playback period $P_{3D}$ of 3D video images. FIGS. 11A to 11D are different from FIGS. 9A to 9D in that during the playback period $P_{2D}$ of 2D video images, the display device 103 reconstructs a pair of a left-view frame L and a right-view frame R into a left-view frame Lc. In all other respects, FIGS. 11A to 11D are the same as FIGS. 9A to 9D. Accordingly, details thereof can be found in the descriptions provided for FIGS. 7A to 7D and FIGS. 9A to 9D.

Referring to FIG. 11A, the playback period $P_{2D}$ of 2D video images continues from the first time T1 to the second time T2, and the playback mode in an info frame indicates "2D". In this case, the display device 103 first reconstructs a pair of a left-view frame L and a right-view frame R, which constitutes a frame of 3D video images, into a new left-view frame Lc. Between the frames L and R, only a viewpoint from which an object is seen is slightly different, and a video image presented by the frame L is similar to a video image presented by the frame R. Accordingly, it is generally possible to use the similarity to improve the resolution and quality of the new left-view frames Lc compared to those of the left-view frames L. Next, the display device 103 lowers the frame rate from a value for 3D presentation mode (e.g., 120 fps) to a value for 2D presentation mode (e.g., 60 fps). In this way, each of the new left-view frames Lc is displayed once. This improves the resolution and quality of video images in the playback period $P_{2D}$ of 2D video images, and reduces power consumed by switching frames.

<Data Structure of the BD-ROM Disc>

Figure 12:
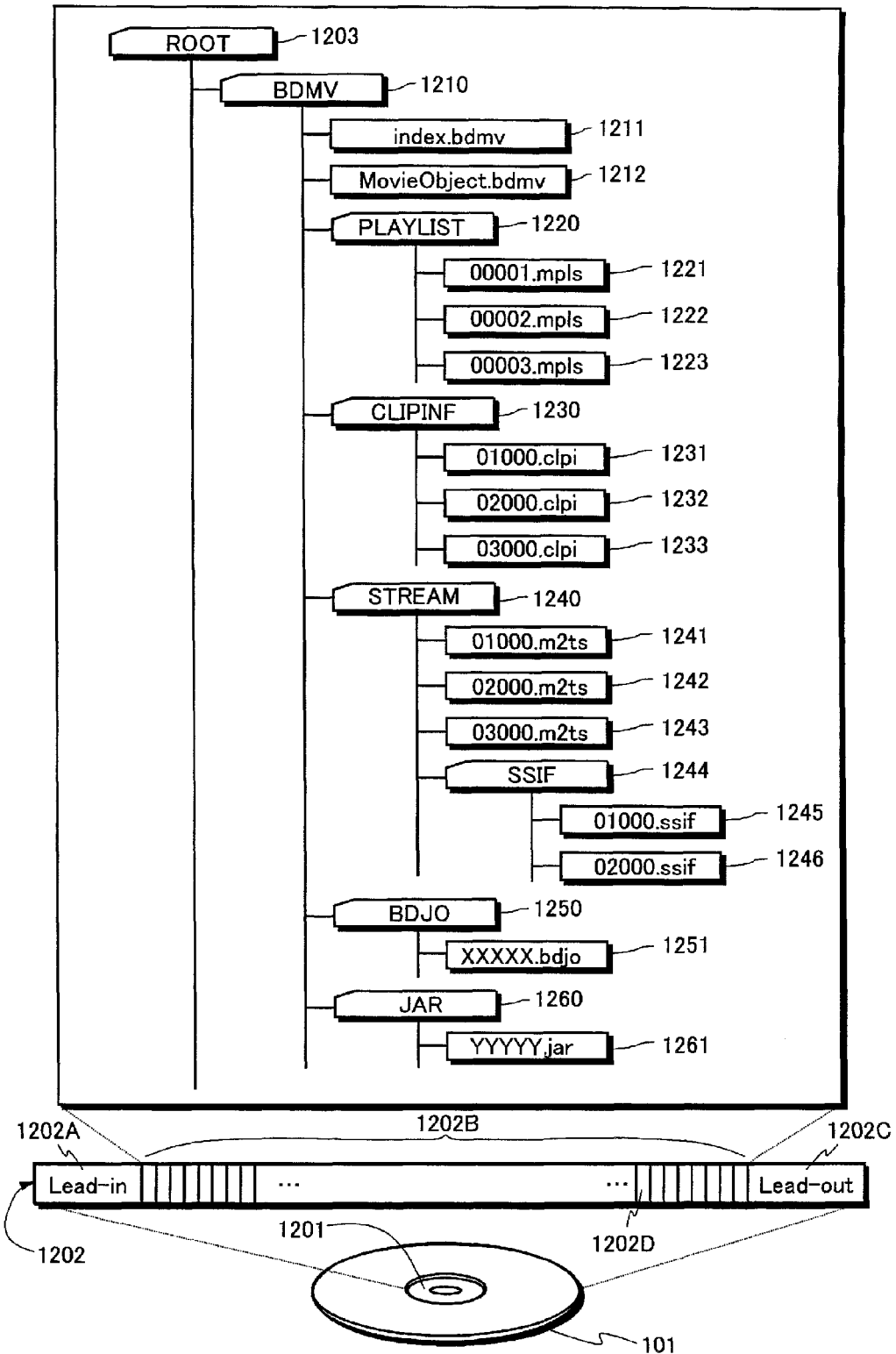
FIG. 12 is a schematic diagram showing a structure of data recorded on a BD-ROM disc 101 shown in FIG. 1.

FIG. 12 is a schematic diagram showing a structure of data recorded on a BD-ROM disc 101 shown in FIG. 1. As shown in FIG. 12, a Burst Cutting Area (BCA) 1201 is provided at the innermost part of the data recording area on the BD-ROM disc 101. Only the BD-ROM drive 121 is permitted to access the BCA, and access by application programs is prohibited. The BCA 1201 can thus be used as technology for copyright protection. In the data recording area outside of the BCA 1201, tracks spiral from the inner to the outer circumference. In FIG. 12, a track 1202 is schematically extended in a transverse direction. The left side represents the inner circumferential part of the disc 101, and the right side represents the outer circumferential part. As shown in FIG. 12, the track 1202 contains a lead-in area 1202A, a volume area 1202B, and a lead-out area 1202C in order from the inner circumference. The lead-in area 1202A is provided immediately on the outside edge of the BCA 1201. The lead-in area 1202A includes information necessary for the BD-ROM drive 121 to access the volume area 1202B, such as the size, the physical address, etc. of the data recorded in the volume area 1202B. The lead-out area 1202C is provided on the outermost circumferential part of the data recording area and indicates the end of the volume area 1202B. The volume area 1202B includes application data such as video images, audio, etc.

The volume area 1202B is divided into small areas 1202D called "sectors". The sectors have a common size, for example 2048 bytes. Each sector 1202D is consecutively assigned a serial number in order from the top of the volume area 1202B. These serial numbers are called logical block numbers (LBN) and are used in logical addresses on the BD-ROM disc 101. During reading of data from the BD-ROM disc 101, data to be read is specified through designation of the LBN for the destination sector. The volume area 1202B can thus be accessed in units of sectors. Furthermore, on the BD-ROM disc 101, logical addresses are substantially the same as physical addresses. In particular, in an area where the LBNs are consecutive, the physical addresses are also substantially consecutive. Accordingly, the BD-ROM drive 121 can consecutively read data from sectors having consecutive LBNs without making the optical pickup perform a seek.

The data recorded in the volume area 1202B is managed under a predetermined file system. Universal Disc Format (UDF) is adopted as this file system. Alternatively, the file system may be ISO 9660. The data recorded on the volume area 1202B is represented in a directory/file format in accordance with the file system (see the <<Supplementary Explanation>> for details). In other words, the data is accessible in units of directories or files.

<<Directory/File Structure on the BD-ROM Disc>>

FIG. 12 further shows the directory/file structure of the data stored in the volume area 1202B on the BD-ROM disc 101. As shown in FIG. 12, in this directory/file structure, a BD movie (BDMV) directory 1210 is located directly below a ROOT directory 1203. Below the BDMV directory 1210 are an index file (index.bdmv) 1211 and a movie object file (MovieObject.bdmv) 1212.

The index file 1211 contains information for managing as a whole the content recorded on the BD-ROM disc 101. In particular, this information includes both information to make the playback device 102 recognize the content, as well as an index table. The index table is a correspondence table between a title constituting the content and a program to control the operation of the playback device 102. This program is called an "object". Object types are a movie object and a BD-J (BD Java™) object.

The movie object file 1212 generally stores a plurality of movie objects. Each movie object includes a sequence of navigation commands. A navigation command is a control command causing the playback device 102 to execute playback processes similar to general DVD players. Types of navigation commands are, for example, a read-out command to read out a playlist file corresponding to a title, a playback command to play back stream data from an AV stream file indicated by a playlist file, and a transition command to make a transition to another title. Navigation commands are written in an interpreted language and are deciphered by an interpreter, i.e. a job control program, included in the playback device 102, thus making the control unit of the playback device 102 execute the desired job. A navigation command is composed of an opcode and an operand. The opcode describes the type of operation that the playback device 102 is to execute, such as dividing, playing back, or calculating a title, etc. The operand indicates identification information targeted by the operation such as the title's number, etc. The control unit of the playback device 102 calls a movie object in response, for example, to a user operation and executes navigation commands included in the called movie object in the order of the sequence. In a manner similar to general DVD players, the playback device 102 first displays a menu on the display device 103 to allow the user to select a command. The playback device 102 then executes playback start/stop of a title, switches to another title, etc. in response to the selected command, thereby dynamically changing the progress of video playback.

As shown in FIG. 12, the BDMV directory 1210 further contains a playlist (PLAYLIST) directory 1220, a clip information (CLIPINF) directory 1230, a stream (STREAM) directory 1240, a BD-J object (BDJO: BD Java Object) directory 1250, and a Java™ archive (JAR: Java Archive) directory 1260.

Three types of AV stream files, (01000.m2ts) 1241, (02000.m2ts) 1242, and (03000.m2ts) 1243, as well as a Stereoscopic Interleaved File (SSIF) directory 1244 are located directly under the STREAM directory 1240. Two types of AV stream files, (01000.ssif) 1245 and (02000.ssif) 1246 are located directly under the SSIF directory 1244.

An "AV stream file" refers to a file, from among actual video content recorded on the BD-ROM disc 101, that complies with the file format determined by the file system. Such actual video content generally refers to stream data in which different types of stream data representing video, audio, subtitles, etc., i.e. elementary streams, have been multiplexed. This multiplexed stream data can be broadly divided into two types: a main transport stream (TS) and a sub-TS. A "main TS" is multiplexed stream data that includes a base-view video stream as a primary video stream. A "base-view video stream" is a video stream that can be played back independently and that represents 2D video images. A "sub-TS" is multiplexed stream data that includes a dependent-view video stream as a primary video stream. A "dependent-view video stream" is a video stream that requires a base-view video stream for playback and represents 3D video images by being combined with the base-view video stream. The types of dependent-view video streams are a right-view video stream, left-view video stream, and depth-map stream. When a playback device in L/R mode uses the 2D video images represented by the base-view video stream as the left view of 3D video images, the "right-view video stream" is used as a video stream representing the right view of the 3D video images. The reverse is true for a "left-view video stream". When the 2D video images represented by the base-view video stream are used by a playback device in depth mode to project 3D video images on a virtual 2D screen, the "depth-map stream" is used as stream data representing a depth map for the 3D video image. In particular, the depth-map stream that is used when the base-view video stream represents the left view of 3D video images is referred to as a "left-view depth-map stream", and the depth-map stream that is used when the base-view video stream represents the right view is referred to as a "right-view depth-map stream".

Depending on the type of multiplexed stream data stored therein, AV stream files are divided into three types: file 2D, file dependent (hereinafter, abbreviated as "file DEP"), and interleaved file (hereinafter, abbreviated as "file SS"). A "file 2D" is an AV stream file for playback of 2D video images in 2D playback mode and includes a main TS. A "file DEP" is an AV stream file that includes a sub-TS. A "file SS" is an AV stream file that includes a main TS and a sub-TS representing the same 3D video images. In particular, a file SS shares its main TS with a certain file 2D and shares its sub-TS with a certain file DEP. In other words, in the file system on the BD-ROM disc 101, a main TS can be accessed by both a file SS and a file 2D, and a sub TS can be accessed by both a file SS and a file DEP. This setup, whereby a sequence of data recorded on the BD-ROM disc 101 is common to different files and can be accessed by all of the files, is referred to as "file cross-link".

In the example shown in FIG. 12, the first AV stream file (01000.m2ts) 1241 is a file 2D, the second AV stream file (02000.m2ts) 1242 and the third AV stream file (03000.m2ts) 1243 are both a file DEP. In this way, files 2D and files DEP are located directly below the STREAM directory 1240. The first AV stream file, i.e. the base-view video stream that is included in the file 2D 1241, represents the left view of 3D video images. The second AV stream file, i.e. the dependent-view video stream that is included in the first file DEP 1242 represents a right view of the 3D video images. The third AV stream file, i.e. the dependent-view video stream that is included in the second file DEP 1243 is a depth-map stream.

In the example shown in FIG. 12, the fourth AV stream file (01000.ssif) 1245 and the fifth AV stream file (02000.ssif) 1246 are both a file SS. In this way, files SS are located directly below the SSIF directory 1244. The fourth AV stream file, i.e. the first file SS 1245, shares a main TS, and in particular a base-view video stream, with the file 2D 1241 and shares a sub-TS, in particular a right-view video stream, with the first file DEP 1242. The fifth AV stream file, i.e. the second file SS 1246, shares a main TS, and in particular a base-view video stream, with the file 2D 1241 and shares a sub-TS, in particular a depth-map stream, with the second file DEP 1243.

Three types of clip information files, (01000.clpi) 1231, (02000.clpi) 1232, and (03000.clpi) 1233 are located in the CLIPINF directory 1230. A "clip information file" is a file associated on a one-to-one basis with a file 2D and file DEP and in particular contains an entry map for each file. An "entry map" is a correspondence table between the presentation time for each scene represented by the file 2D or file DEP and the address within each file at which the scene is recorded. Among the clip information files, a clip information file associated with a file 2D is referred to as a "2D clip information file", and a clip information file associated with a file DEP is referred to as a "dependent-view clip information file". When a file DEP includes a right-view video stream, a dependent-view clip information file associated with the file DEP is referred to as a "right-view clip information file". When a file DEP includes a depth-map stream, a dependent-view clip information file associated with the file DEP is referred to as a "depth map clip information file". In the example shown in FIG. 12, the first clip information file (01000.clpi) 1231 is a 2D clip information file and is associated with the file 2D 1241. The second clip information file (02000.clpi) 1232 is a right-view clip information file and is associated with the first file DEP 1242. The third clip information file (03000.clpi) 1233 is a depth map clip information file and is associated with the second file DEP 1243.

Three types of playlist files, (00001.mpls) 1221, (00002.mpls) 1222, and (00003.mpls) 1223 are located in the PLAYLIST directory 1220. A "playlist file" is a file that specifies the playback path of an AV stream file, i.e. the part of an AV stream file for playback, and the order of playback. The types of playlist files are a 2D playlist file and a 3D playlist file. A "2D playlist file" specifies the playback path of a file 2D. A "3D playlist file" specifies, for a playback device in 2D playback mode, the playback path of a file 2D, and for a playback device in 3D playback mode, the playback path of a file SS. As shown in the example in FIG. 12, the first playlist file (00001.mpls) 1221 is a 2D playlist file and specifies the playback path of the file 2D 1241. The second playlist file (00002.mpls) 1222 is a 3D playlist file that specifies, for a playback device in 2D playback mode, the playback path of the file 2D 1241, and for a playback device in L/R mode, the playback path of the first file SS 1245. The third playlist file (00003.mpls) 1223 is a 3D playlist file that specifies, for a playback device in 2D playback mode, the playback path of the file 2D 1241, and for a playback device in depth mode, the playback path of the second file SS 1246.

A BD-J object file (XXXXX.bdjo) 1251 is located in the BDJO directory 1250. The BD-J object file 1251 includes a single BD-J object. The BD-J object is a bytecode program to cause a Java virtual machine mounted on the playback device 102 to play back a title and render graphics images. The BD-J object is written in a compiler language such as Java or the like. The BD-J object includes an application management table and identification information for the playlist file to which is referred. The "application management table" is a list of the Java application programs to be executed by the Java virtual machine and their period of execution, i.e. life-cycle. The "identification information of the playlist file to which is referred" identifies a playlist file that corresponds to a title to be played back. The Java virtual machine calls a BD-J object in response to a user operation or an instruction from an application program and executes the Java application program according to the application management table included in the BD-J object. Consequently, the playback device 102 dynamically changes the progress of the video for each title played back, or causes the display device 103 to display graphics images independently of the title video.

A JAR file (YYYYY.jar) 1261 is located in the JAR directory 1260. The JAR directory 1261 generally includes a plurality of actual Java application programs to be executed in accordance with the application management table shown in the BD-J object. A "Java application program" is a bytecode program written in a compiler language such as Java or the like, as is the BD-J object. Types of Java application programs include programs causing the Java virtual machine to perform playback of a title and programs causing the Java virtual machine to render graphics images. The JAR file 1261 is a Java archive file, and when it is read by the playback device 102, it is unarchived in internal memory. In this way, a Java application program is stored in memory.

<<Structure of Multiplexed Stream Data>>

FIG. 13A is a list of elementary streams multiplexed into a main TS on the BD-ROM disc 101. The main TS is a digital stream in MPEG-2 Transport Stream (TS) format and includes the file 2D 1241 shown in FIG. 12. As shown in FIG. 13A, the main TS includes a primary video stream 1301 and primary audio streams 1302A and 1302B. The main TS may additionally include presentation graphics (PG) streams 1303A and 1303B, an interactive graphics (IG) stream 1304, a secondary audio stream 1305, and a secondary video stream 1306.

The primary video stream 1301 represents primary video of a movie and a secondary video stream 1306 represents secondary video. The primary video is the main video pertaining to the content, such as the main feature of a movie, and is displayed on the entire screen, for example. On the other hand, the secondary video is displayed on the screen simultaneously with the primary video with the use, for example, of a picture-in-picture method, so that the secondary video images are displayed in a smaller window within the primary video images. The primary video stream 1301 and the secondary video stream 1306 are both a base-view video stream. Each of the video streams 1301 and 1306 is encoded by a video compression encoding method, such as MPEG-2, MPEG-4 AVC, or SMPTE VC-1.

The primary audio streams 1302A and 1302B represent the primary audio of the movie. In this case, the two primary audio streams 1302A and 1302B are in different languages. The secondary audio stream 1305 represents secondary audio to be mixed with the primary audio, such as sound effects accompanying operation of an interactive screen. Each of the audio streams 1302A, 1302B, and 1305 is encoded by a method such as AC-3, Dolby Digital Plus ("Dolby Digital" is a registered trademark), Meridian Lossless Packing™ (MLP), Digital Theater System™ (DTS), DTS-HD, or linear Pulse Code Modulation (PCM).

Each of the PG streams 1303A and 1303B represents graphics images, such as subtitles formed by graphics, to be displayed superimposed on the video images represented by the primary video stream 1301. The two PG streams 1303A and 1303B represent, for example, subtitles in a different language. The IG stream 1304 represents Graphical User Interface (GUI) graphics elements, and the arrangement thereof, for constructing an interactive screen on the screen 131 in the display device 103.

The elementary streams 1301-1306 are identified by packet identifiers (PIDs). PIDs are assigned, for example, as follows. Since one main TS includes only one primary video stream, the primary video stream 1301 is assigned a hexadecimal value of 0x1011. When up to 32 other elementary streams can be multiplexed by type into one main TS, the primary audio streams 1302A and 1302B are each assigned any value from 0x1100 to 0x111F. The PG streams 1303A and 1303B are each assigned any value from 0x1200 to 0x121F. The IG stream 1304 is assigned any value from 0x1400 to 0x141F. The secondary audio stream 1305 is assigned any value from 0x1A00 to 0x1A1F. The secondary video stream 1306 is assigned any value from 0x1B00 to 0x1B1F.

FIG. 13B is a list of elementary streams multiplexed into a first sub-TS on the BD-ROM disc 101. The first sub-TS is multiplexed stream data in MPEG-2 TS format and is included in the first file DEP 1242 shown in FIG. 12. As shown in FIG. 13B, the first sub-TS includes a primary video stream 1311. Additionally, the first sub-TS may include left-view PG streams 1312A and 1312B, right-view PG streams 1313A and 1313B, left-view IG stream 1314, right-view IG stream 1315, and secondary video stream 1316. The primary video stream 1311 is a right-view video stream. When the primary video stream 1301 in the main TS represents the left view of 3D video images, the primary video stream 1311 represents the right view of the 3D video images. The pairs of left-view and right-view PG streams 1312A+1313A and 1312B+1313B represent the left view and right view of graphics images, such as subtitles, when these graphics images are displayed as 3D video images. The pair of left-view and right-view IG streams 1314 and 1315 represents the left view and right view of graphics images for an interactive screen when these graphics images are displayed as 3D video images. When the secondary video stream 1306 in the main TS represents the left view of 3D video images, the secondary video stream 1316 is a right-view video stream and represents the right view of the 3D video images.

PIDs are assigned to the elementary streams 1311-1316 as follows, for example. A PID of 0x1012 is assigned to the primary video stream 1311. When up to 32 other elementary streams can be multiplexed by type into one sub-TS, the left-view PG streams 1312A and 1312B are assigned any value from 0x1220 to 0x123F, and the right-view PG streams 1313A and 1313B are assigned any value from 0x1240 to 0x125F. The left-view IG stream 1314 is assigned any value from 0x1420 to 0x143F, and the right-view IG stream 1315 is assigned any value from 0x1440 to 0x145F. The secondary video stream 1316 is assigned any value from 0x1B20 to 0x1B3F.

FIG. 13C is a list of elementary streams multiplexed into a second sub-TS on the BD-ROM disc 101. The second sub-TS is multiplexed stream data in MPEG-2 TS format and is included in the second file DEP 1243 shown in FIG. 12. As shown in FIG. 13C, the second sub-TS includes a primary video stream 1321. Additionally, the second sub-TS may include depth map PG streams 1323A and 1323B, a depth map IG stream 1324 and a secondary video stream 1326. The primary video stream 1321 is a depth-map stream and represents 3D video images in combination with the primary video stream 1301 in the main TS. When the 2D video images represented by the PG streams 1303A and 1303B in the main TS are used to project 3D video images on a virtual 2D screen, the depth map PG streams 1323A and 1323B are each used as the PG streams representing a depth map for the 3D video images. When the 2D video images represented by the IG stream 1304 in the main TS are used to project 3D video images on a virtual 2D screen, the depth map IG stream 1324 is used as the IG stream representing a depth map for the 3D video images. The secondary video stream 1326 is a depth-map stream and represents 3D video images in combination with the secondary video stream 1306 in the main TS.

PIDs are assigned to the elementary streams 1321-1326 as follows, for example. A PID of 0x1013 is assigned to the primary video stream 1321. When up to 32 other elementary streams can be multiplexed by type into one sub-TS, the depth map PG streams 1323A and 1323B are assigned any value from 0x1260 to 0x127F. The depth map IG stream 1324 is assigned any value from 0x1460 to 0x147F. The secondary video stream 1326 is assigned any value from 0x1B40 to 0x1B5F.

Figure 14:
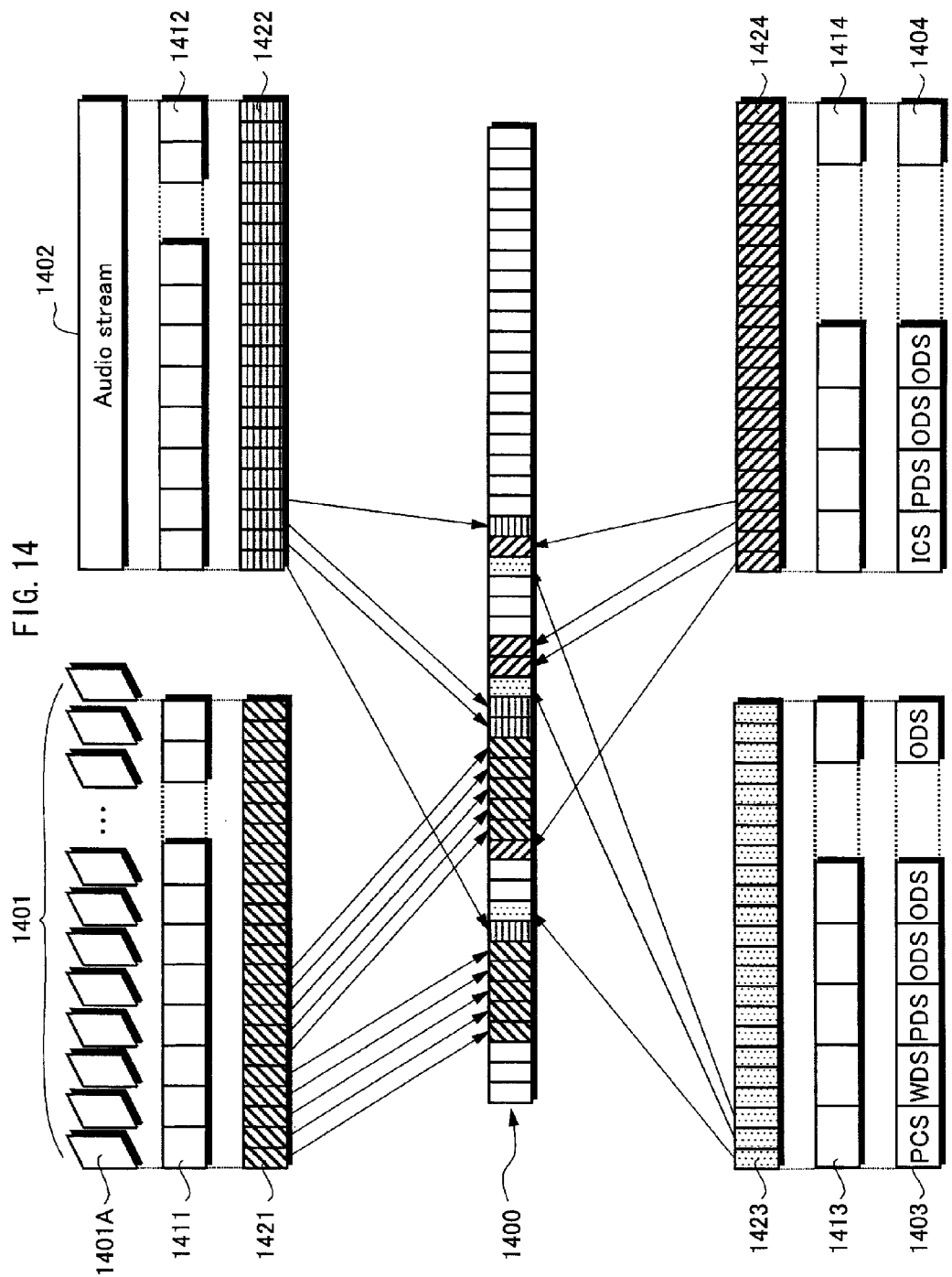
FIG. 14 is a schematic diagram showing an arrangement of TS packets in multiplexed stream data 1400.

FIG. 14 is a schematic diagram showing the arrangement of TS packets in the multiplexed stream data 1400. The main TS and sub TS share this packet structure. In the multiplexed stream data 1400, the elementary streams 1401, 1402, 1403, and 1404 are respectively converted into TS packet sequences 1421, 1422, 1423, and 1424. For example, in the video stream 1401, each frame 1401A or each field is first converted into one Packetized Elementary Stream (PES) packet 1411. Next, each PES packet 1411 is generally converted into a plurality of TS packets 1421. Similarly, the audio stream 1402, PG stream 1403, and IG stream 1404 are respectively first converted into PES packet sequences 1412, 1413, and 1414, after which they are converted into TS packet sequences 1422, 1423, and 1424. Finally, the TS packets 1421, 1422, 1423, and 1424 obtained from the elementary streams 1401, 1402, 1403, and 1404 are time-multiplexed into one piece of stream data, i.e. the main TS 1400.

Figure 15:
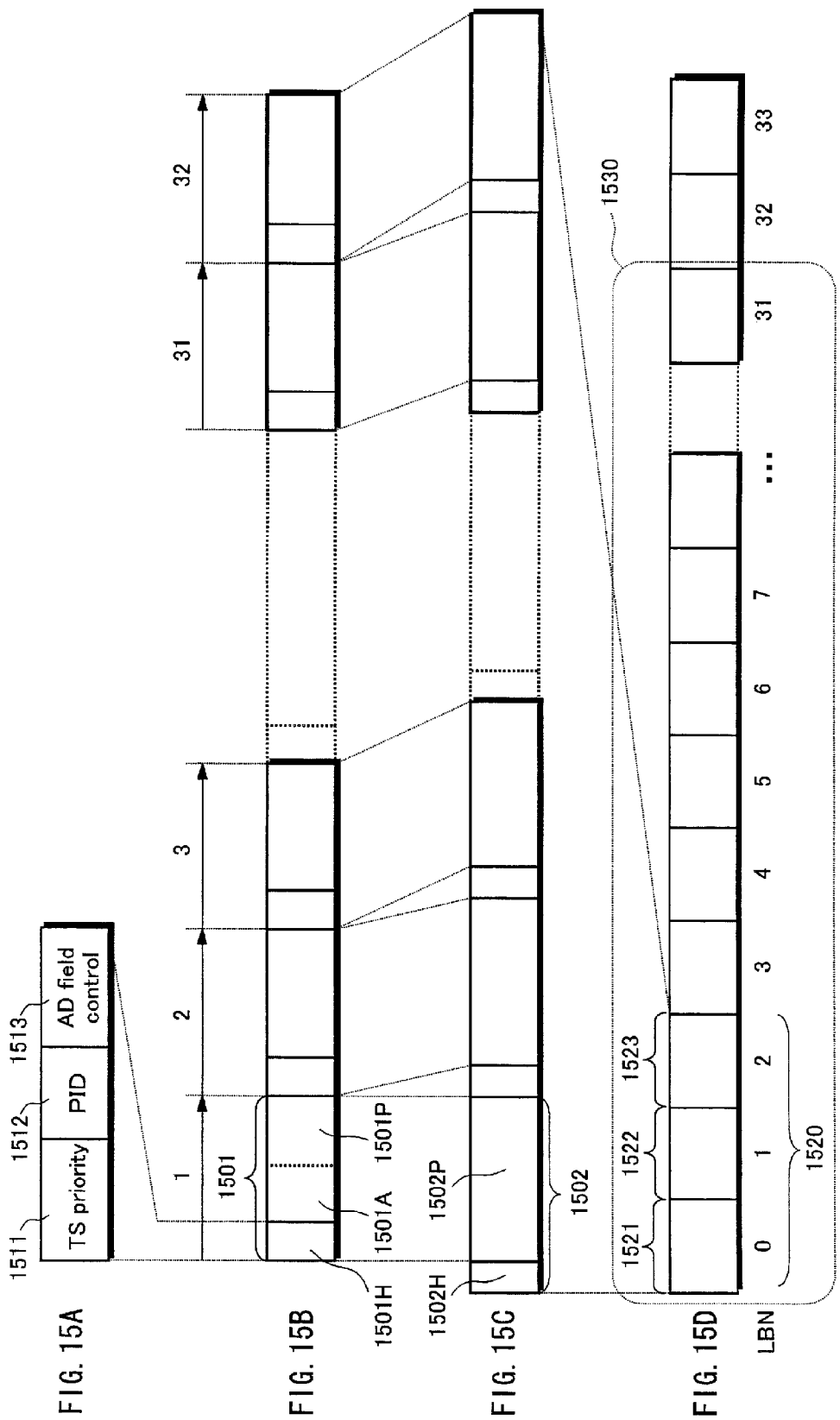
FIG. 15A is a schematic diagram showing a data structure of a TS header 1501H of each of TS packets constituting multiplexed stream data.
FIG. 15B is a schematic diagram showing a format of the TS packet sequence.
FIG. 15C is a schematic diagram of a format of a source packet sequence composed of the TS packet sequence.
FIG. 15D is a schematic diagram of a sector group, in which a series of source packets 1502 are consecutively recorded, in the volume area of the BD-ROM disc 101.

FIG. 15B is a schematic diagram showing a TS packet sequence constituting multiplexed stream data. Each TS packet 1501 is 188 bytes long. As shown in FIG. 15B, each TS packet 1501 includes a TS header 1501H and either, or both, a TS payload 1501P and an adaptation field (hereinafter abbreviated as "AD field") 1501A. The TS payload 1501P and AD field 1501A together constitute a 184 byte long data area. The TS payload 1501P is used as a storage area for a PES packet. The PES packets 1411-1414 shown in FIG. 14 are typically divided into a plurality of parts, and each part is stored in a different TS payload 1501P. The AD field 1501A is an area for storing stuffing bytes (i.e. dummy data) when the amount of data in the TS payload 1501P does not reach 184 bytes. Additionally, when the TS packet 1501 is, for example, a PCR as described below, the AD field 1501A is used to store such information. The TS header 1501H is a four-byte long data area.

FIG. 15A is a schematic diagram showing the data structure of a TS header 1501H. As shown in FIG. 15A, the TS header 1501H includes TS priority (transport_priority) 1511, PID 1512, and AD field control (adaptation_field_control) 1513. The PID 1512 indicates the PID for the elementary stream whose data is stored in the TS payload 1501P of the TS packet 1501 containing the PID 1512. The TS priority 1511 indicates the priority level of the TS packet 1501 among the TS packets that share the PID 1512 having the same value. The AD field control 1513 indicates whether the TS packet 1501 contains an AD field 1501A and/or a TS payload 1501P. For example, if the AD field control 1513 indicates "1", then the TS packet 1501 does not include an AD field 1501A but includes a TS payload 1501P. If the AD field control 1513 indicates "2", then the reverse is true. If the AD field control 1513 indicates "3", then the TS packet 1501 includes both an AD field 1501A and a TS payload 1501P.

FIG. 15C is a schematic diagram showing the formation of a source packet sequence composed of the TS packet sequence for multiplexed stream data. As shown in FIG. 15C, each source packet 1502 is 192 bytes long and includes one TS packet 1501 and a four-byte long header (TP_Extra_Header) 1302H both shown in FIG. 15B. When the TS packet 1501 is recorded on the BD-ROM disc 101, a source packet 1502 is constituted by attaching a header 1502H to the TS packet 1501. The header 1502H includes an ATS (Arrival_Time_Stamp). The "ATS" is time information used as follows. When a source packet 1502 is sent from the BD- ROM disc 101 to a system target decoder in the playback device 102, the TS packet 1502P is extracted from the source packet 1502 and transferred to a PID filter in the system target decoder. The ATS in the header 1502H indicates the time at which this transfer is to begin. The "system target decoder" is a device that decodes multiplexed stream data one elementary stream at a time. Details regarding the system target decoder and its use of the ATS are provided below.

Figure 32:
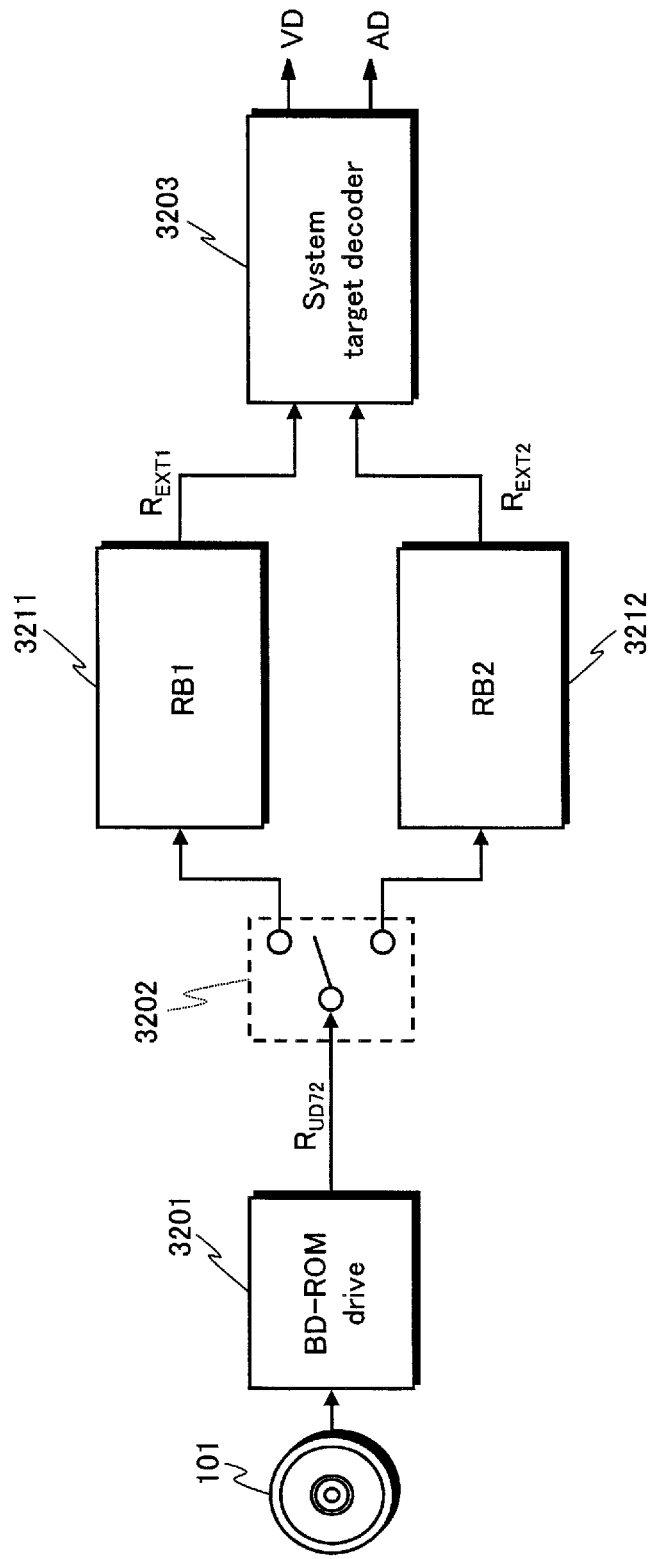
FIG. 32 is a block diagram showing playback processing in the playback device 102 in 3D playback mode.

FIG. 15D is a schematic diagram of a sector group, in which a series of source packets 1502 are contiguously recorded, in the volume area 1202B of the BD-ROM disc 101. As shown in FIG. 15D, 32 source packets 1502 are recorded at a time as a sequence in three contiguous sectors 1521, 1522, and 1523. This is because the data amount for 32 source packets, i.e. 192 bytes×32=6144 bytes, is the same as the total size of three sectors, i.e. 2048 bytes×3=6144 bytes. Hereinafter, 32 source packets 1502 that are recorded in this way in three contiguous sectors 1521, 1522, and 1523 are referred to as an "aligned unit" 1520. The playback device 102 reads source packets 1502 from the BD-ROM disc 101 by each aligned unit 1520, i.e. 32 source packets at a time. Also, the sector group 1521, 1522, 1523, . . . is divided into 32 pieces in order from the top, and each forms one error correction code block 1530. The BD-ROM drive 121 performs error correction processing for each ECC block 1530.

<<Data Structure of PG Stream>>

Figure 16:
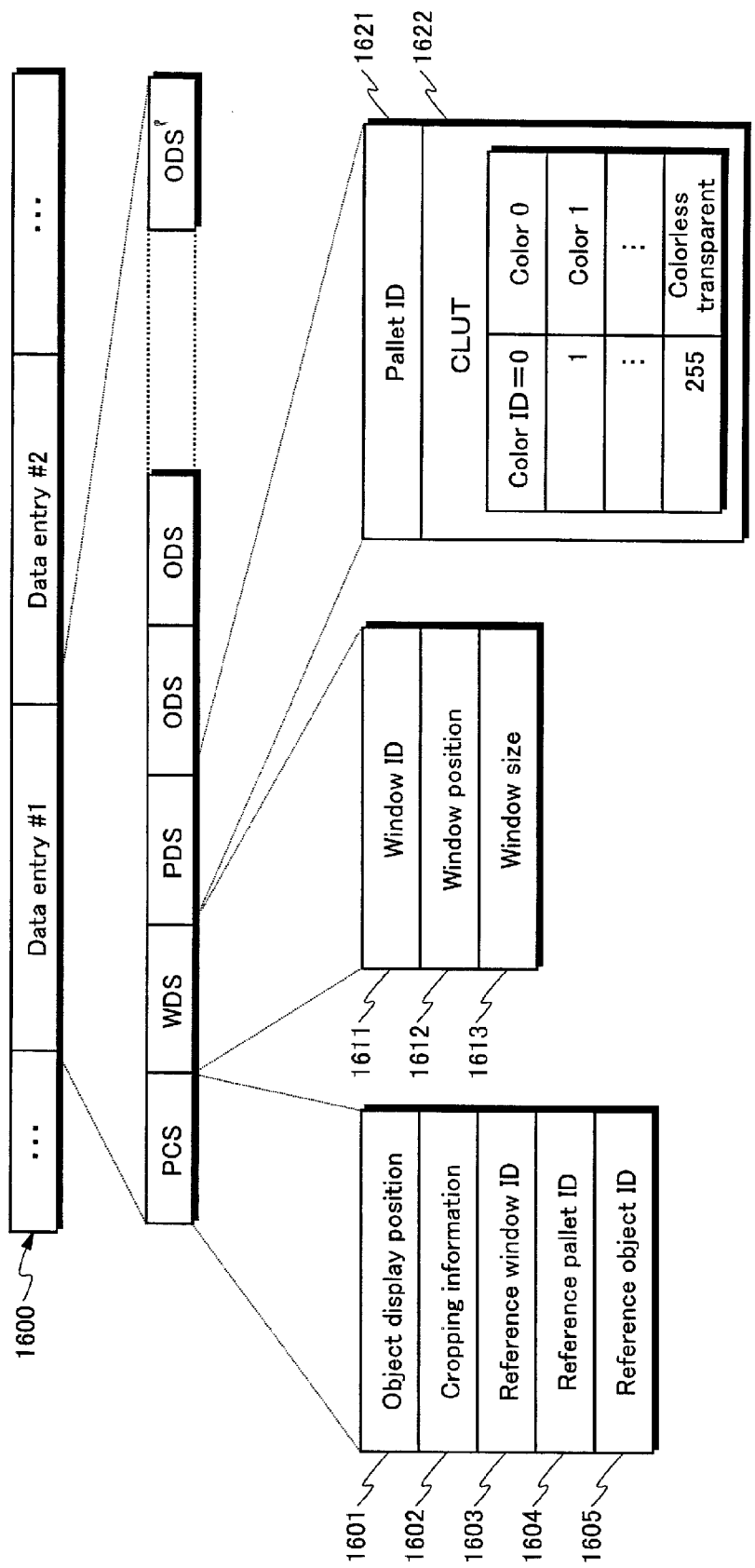
FIG. 16 is a schematic diagram showing a data structure of a PG stream 1600.

FIG. 16 is a schematic diagram showing a data structure of a PG stream 1600. As shown in FIG. 16, the PG stream 1600 includes a plurality of data entries #1, #2 . . . . Each data entry represents a display set in the PG stream 1600 and is composed of data necessary for the playback device 102 to construct one graphics plane. A "graphics plane" refers to plane data generated from graphics data representing a 2D graphics image. In addition, "plane data" is a two-dimensional array of pixel data. The size of the array is the same as the resolution of the video frame. A set of pixel data is formed by a combination of a chromatic coordinate value and an α value (opaqueness). The chromatic coordinate value is expressed as an RGB value or a YCrCb value. Types of graphics planes include a PG plane, IG plane, image plane, and On-Screen Display (OSD) plane. A PG plane is generated from a PG stream included in the main TS. An IG plane is generated from an IG stream included in the main TS. An image plane is generated in accordance with a BD-J object. An OSD plane is generated in accordance with firmware in the playback device 102.

Referring again to FIG. 16, each data entry includes a plurality of functional segments. The functional segments include a Presentation Control Segment (PCS), Window Define Segment (WDS), Pallet Define Segment (PDS), and Object Define Segment (ODS) in the stated order.

WDS defines a rectangular region inside the graphics plane, i.e. a window. In particular, the WDS includes a window ID 1611, window position 1612, and window size 1613. The window ID 1611 is identification information (ID) of the WDS. The window position 1612 indicates the position, such as the coordinates defining the top left corner, of the window on the graphics plane. The window size 1613 indicates the height and width of the window.

The PDS defines the correspondence between a predetermined type of color ID and a chromatic coordinate value (for example, luminance Y, red-difference Cr, blue-difference Cb, opaqueness α). In particular, the PDS includes a pallet ID 1621 and a Color Look-up Table (CLUT) 1622. The pallet ID 1621 is an ID of the PDS. The CLUT 1622 is a list of colors used for rendering graphics objects. In the CLUT 1622, up to 256 colors can be registered and color IDs ranging from "0" to "255" are assigned to different colors. Note that the color ID=255 is always assigned to "colorless transparent".

Generally, a plurality of ODSs together represent one graphics object. A "graphics object" is data that represents a graphics image by the correspondence between pixel codes and color IDs. The graphics object is compressed by the run-length coding method and then divided into parts, which are then distributed to each ODS. Each ODS further includes an object ID, namely an ID of the graphics object.

The PCS shows details of a display set that belongs to the same data entry, and in particular defines a display composition that uses graphics objects Types of display composition include Cut-In/Out, Fade-In/Out, Color Change, Scroll, and Wipe-In/Out. In particular, the PCS includes an object display position 1601, cropping information 1602, reference window ID 1603, reference pallet ID 1604, and reference object ID 1605. The object display position 1601 indicates a position in the graphics plane at which the graphics object is to be displayed, e.g., coordinates defining the top left corner of an area in which the graphics object is to be displayed, by using coordinates within a window defined by a WDS. The cropping information 1602 indicates the range of a rectangular part that is to be cut out of the graphics object by the cropping process. The range is defined, for example, by the coordinates of the top left corner, height, and width. The part is actually rendered at a position indicated by the object display position 1601. The reference window ID 1603, reference pallet ID 1604, and reference object ID 1605 indicate IDs of the WDS, PDS, and graphics object that are to be referred to in the graphics object rendering process, respectively. The content provider indicates the display composition to the playback device 102 by using these parameters in the PCS. This allows the playback device 102 to realize a display effect whereby "a certain subtitle gradually disappears, and the next subtitle is displayed", for example.

<<Data Structure of IG Stream>>

Referring yet again to FIG. 14, the IG stream 1404 includes an Interactive Composition Segment (ICS), PDS, and ODS. The PDS and ODS are the same functional segments as included in the PG stream 1403. In particular, a graphics object that includes an ODS represents a GUI graphics element, such as a button, pop-up menu, etc., that forms an interactive screen. An ICS defines interactive operations that use these graphics objects. Specifically, an ICS defines the states that each graphics object, such as a button, pop-up menu, etc. can take when changed in response to user operation, states such as normal, selected, and active. An ICS also includes button information. Button information includes a command that the playback device is to perform when the user performs a certain operation on the button or the like.

<<Data Structure of Video Stream>>

Figure 17:
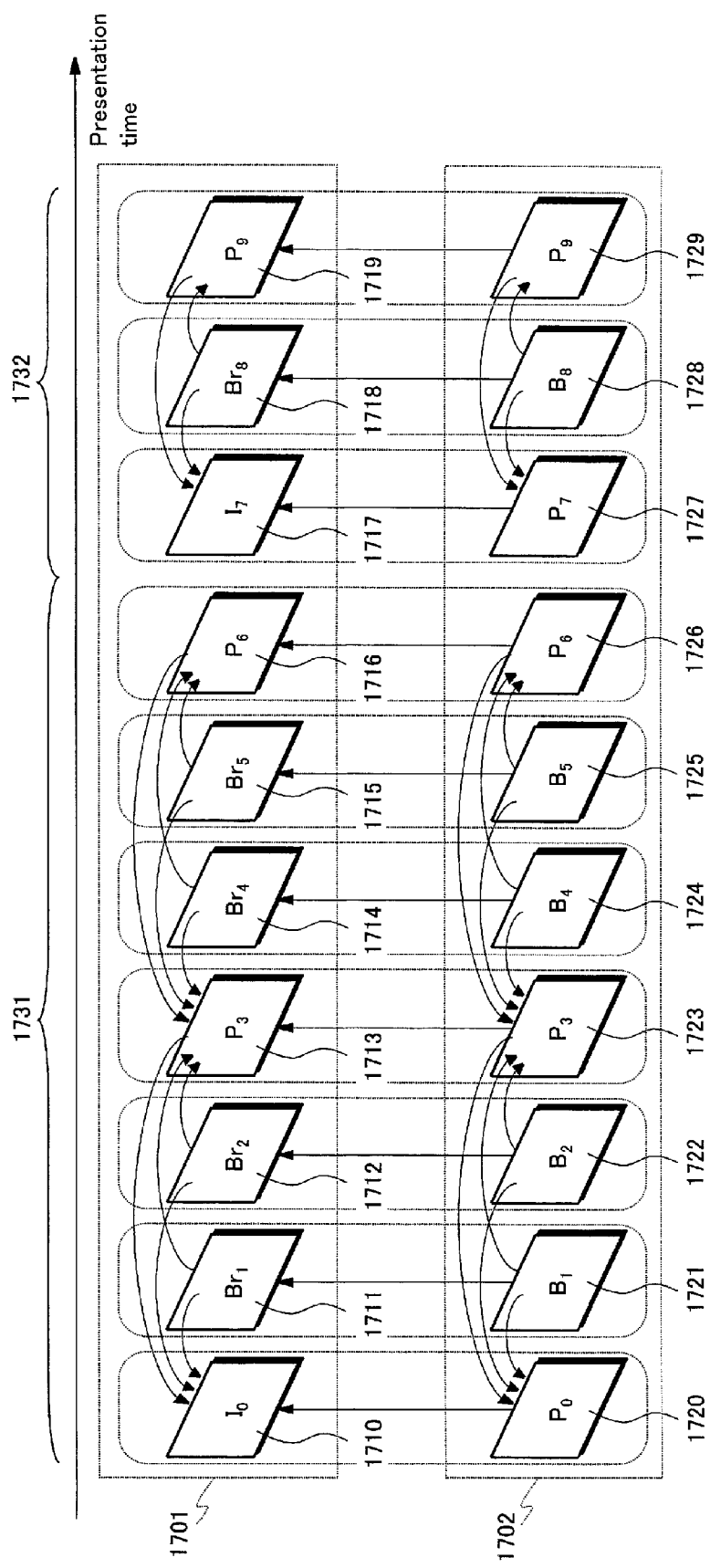
FIG. 17 is a schematic diagram showing the pictures for a base-view video stream 1701 and a right-view video stream 1702 in order of presentation time.

FIG. 17 is a schematic diagram showing the pictures for a base-view video stream 1701 and a right-view video stream 1702 in order of presentation time. As shown in FIG. 17, the base-view video stream 1701 includes pictures 1710, 1711, 1712, . . . , 1719 (hereinafter "base-view pictures"), and the right-view video stream 1702 includes pictures 1720, 1721, 1722, . . . , 1729 (hereinafter "right-view pictures"). Each of the pictures 1710-1719 and 1720-1729 represents one frame or one field and is compressed by a video compression encoding method, such as MPEG-2, MPEG-4 AVC, etc.

This compression of each picture uses the spatial or temporal redundancy of that picture. Here, picture encoding that only uses the picture's spatial redundancy is referred to as "intra-picture encoding". On the other hand, picture encoding that uses temporal redundancy, i.e. the similarity between data for a plurality of pictures displayed sequentially, is referred to as "inter-picture predictive encoding". In inter-picture predictive encoding, first, a picture earlier or later in presentation time is assigned to the picture to be encoded as a reference picture. Next, a motion vector is detected between the picture to be encoded and the reference picture, and then motion compensation is performed using the motion vector. Furthermore, the difference value between the picture after the motion compensation and the picture to be encoded is sought, and spatial redundancy is removed using the difference value. In this way, the amount of data for each picture is compressed.

As shown in FIG. 17, the base-view pictures 1710-1719 are typically divided into a plurality of GOPs 1731 and 1732. A "GOP" refers to a sequence of pictures having an I (Intra) picture at the top of the sequence. An "I (Intra) picture refers to a picture compressed by intra-picture encoding. A GOP typically includes P (Predictive) pictures and B (Bidirectionally Predictive) pictures, in addition to the I picture. Here "P picture" refers to a picture compressed by the inter-picture predictive encoding by using one reference picture, which is either I picture or another P picture whose presentation time is before the presentation time of the picture to be compressed. On the other hand, "B picture" refers to a picture compressed by the inter-picture predictive encoding by using two reference pictures, each of which is either I picture or P picture whose presentation time is before or after the presentation time of the picture to be compressed. Furthermore, B pictures that are used as reference pictures for other pictures in inter-picture predictive encoding are particularly referred to as "Br (reference B) pictures".

In the example shown in FIG. 17, the base-view pictures in the GOPs 1731 and 1732 are compressed in the following order. In the first GOP 1731, the top base-view picture is compressed as I0 picture 1710. The subscripted number indicates the serial number allotted to each picture in order of presentation time. Next, the fourth base-view picture is compressed as P3 picture 1713 using I0 picture 1710 as a reference picture. Each arrow shown in FIG. 17 indicates that the picture at the head of the arrow is a reference picture for the picture at the tail of the arrow. Next, the second and third base-view pictures are respectively compressed as Br1 picture 1711 and Br2 picture 1712, using both I0 picture 1710 and P3 picture 1713 as reference pictures. Furthermore, the seventh base-view picture is compressed as P6 picture 1716 using P3 picture 1713 as a reference picture. Next, the fourth and fifth base-view pictures are respectively compressed as Br4 picture 1714 and Br5 picture 1715, by using both P3 picture 1713 and P6 picture 1716 as reference pictures. Similarly, in the second GOP 1732, the top base-view picture is first compressed as I7 picture 1717. Next, the third base-view picture is compressed as P9 picture 1719 using I7 picture 1717 as a reference picture. Subsequently, the second base-view picture is compressed as Br8 picture 1718 using both I7 picture 1717 and P9 picture 1719 as reference pictures.

In the base-view video stream 1701, each GOP 1731 and 1732 always contains an I picture at the top, and thus base-view pictures can be decoded GOP by GOP. For example, in the first GOP 1731, the I0 picture 1710 is first decoded independently. Next, the P3 picture 1713 is decoded using the decoded I0 picture 1710. Then, the Br1 picture 1711 and Br2 picture 1712 are decoded using both the decoded I0 picture 1710 and P3 picture 1713. The subsequent picture group 1714, 1715, . . . is similarly decoded. In this way, the base-view video stream 1701 can be decoded independently and furthermore can be randomly accessed in units of GOPs.

As further shown in FIG. 17, the right-view pictures 1720-1729 are compressed by inter-picture predictive encoding. However, the encoding method differs from the encoding method for the base-view pictures 1710-1719, since in addition to redundancy in the temporal redundancy of video images, redundancy between the left and right-video images is also used. Specifically, as shown by the arrows in FIG. 17, the reference picture for each of the right-view pictures 1720-1729 is selected not only from the right-view video stream 1702 but also from the base-view video stream 1701. In particular, the presentation time is substantially the same for each of the right-view pictures 1720-1729 and the corresponding base-view picture selected as a reference picture. These pictures represent a right view and a left view for the same scene of a 3D video image, i.e. a parallax video image. The right-view pictures 1720-1729 and the base-view pictures 1710-1719 are thus in one-to-one correspondence. In particular, the GOP structure is the same between these pictures.

In the example shown in FIG. 17, the top right-view picture in the first GOP 1731 is compressed as P0 picture 1720 using I0 picture 1710 in the base-view video stream 1701 as a reference picture. These pictures 1710 and 1720 represent the left view and right view of the top frame in the 3D video images. Next, the fourth right-view picture is compressed as P3 picture 1723 by using P3 picture 1513 in the base-view video stream 1501 and P0 picture 1720 as reference pictures. Next, the second right-view picture is compressed as B1 picture 1721, using Br1 picture 1711 in the base-view video stream 1701 in addition to P0 picture 1720 and P3 picture 1723 as reference pictures. Similarly, the third right-view picture is compressed as B2 picture 1722, using Br2 picture 1712 in the base-view video stream 1701 in addition to P0 picture 1720 and P3 picture 1730 as reference pictures. For each of the remaining right-view pictures 1724-1729, a base-view picture with a presentation time substantially the same as the right-view picture is similarly used as a reference picture.

The revised standards for MPEG-4 AVC/H.264, called Multiview Video Coding (MVC), are known as a video compression encoding method that makes use of correlation between left and right-video images as described above. MVC was created in July of 2008 by the Joint Video Team (JVT), a joint project between ISO/IEC MPEG and ITU-T VCEG, and is a standard for collectively encoding video that can be seen from a plurality of perspectives. With MVC, not only is temporal similarity in video images used for inter-video predictive encoding, but so is similarity between video images from differing perspectives. This type of predictive encoding has a higher video compression ratio than predictive encoding that individually compresses data of video images seen from each perspective.

As described above, a base-view picture is used as a reference picture for compression of each of the right-view pictures 1720-1729. Therefore, unlike the base-view video stream 1701, the right-view video stream 1702 cannot be decoded independently. On the other hand, however, the difference between parallax video images is generally very small; that is, the correlation between the left view and the right view is high. Accordingly, the right-view pictures generally have a significantly higher compression rate than the base-view pictures, meaning that the amount of data is significantly smaller.

Although not shown in FIG. 17, the depth-map stream includes a plurality of depth maps. The depth maps are in one-to-one correspondence with the base-view pictures and each represent a depth map for one frame or one field of a 2D video image represented by the corresponding base-view picture. The depth maps are compressed by a video compression encoding method, such as MPEG-2, MPEG-4 AVC, etc., in the same way as the base-view pictures. In particular, inter-picture predictive encoding is used in this encoding method. In other words, each depth map is compressed using another depth map as a reference picture. Furthermore, the depth-map stream is divided into units of GOPs in the same way as the base-view video stream, and each GOP always contains an I picture at the top. Accordingly, depth maps can be decoded GOP by GOP. However, since a depth map itself is only information representing the depth of each part of a 2D video image pixel by pixel, the depth-map stream cannot be used independently for playback of video images. The depth-map stream is compressed by the same video compression encoding method as that used to compress the right-view video stream. For example, if the right-view video stream is encoded in MVC format, the depth map stream is also encoded in MVC format. In this case, during playback of 3D video images, the playback device 102 can smoothly switch between L/R mode and depth mode, while maintaining a constant encoding method.

Figure 18:
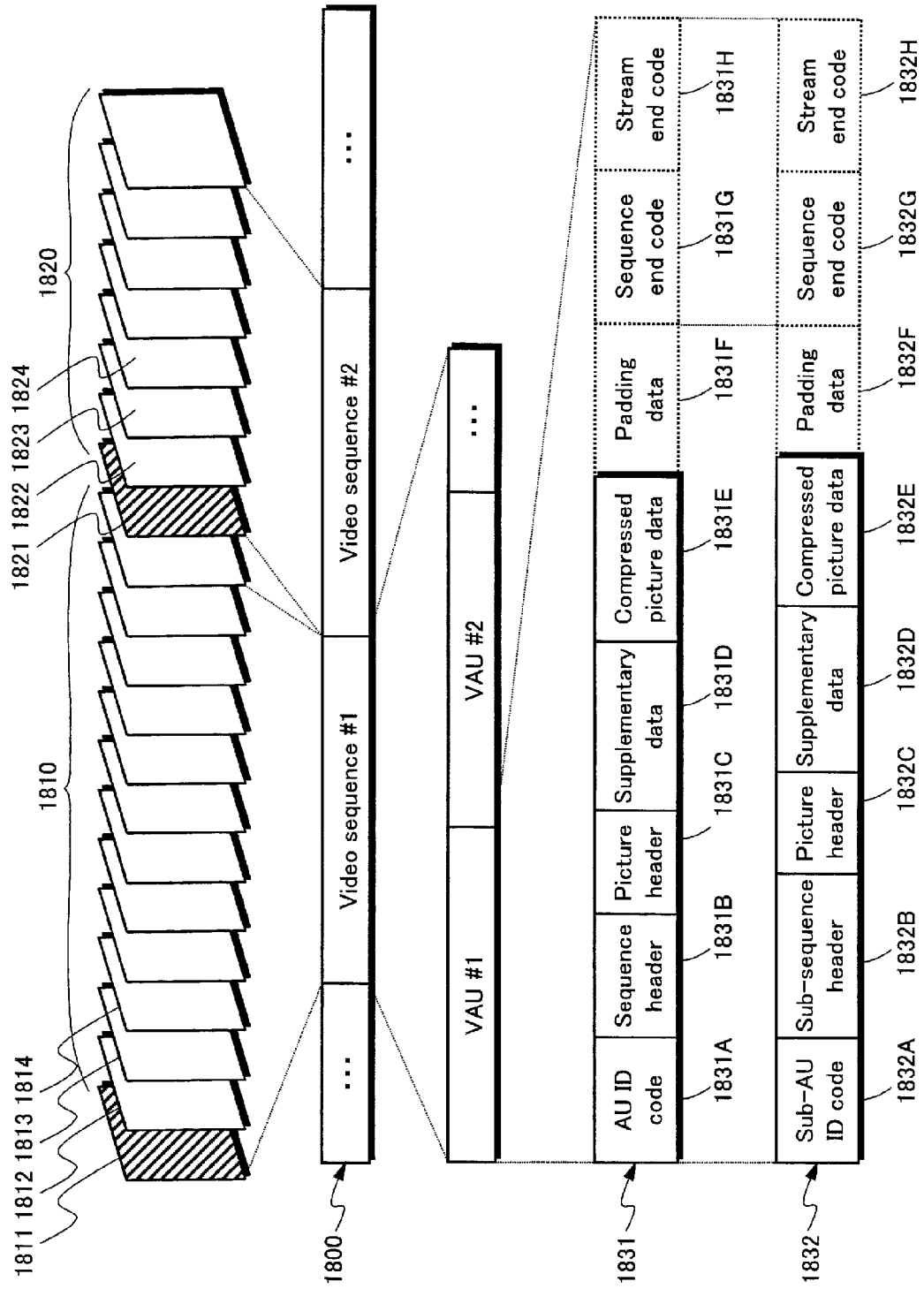
FIG. 18 is a schematic diagram showing a data structure of a video stream 1800.

FIG. 18 is a schematic diagram showing details on a data structure of a video stream 1800. This data structure is substantially the same for the base-view video stream and the dependent-view video stream. As shown in FIG. 18, the video stream 1800 is typically composed of a plurality of video sequences #1, #2 .... A "video sequence" is a combination of pictures 1811, 1812, 1813, 1814, ... that constitute a single GOP 1810 and to which additional information, such as a header, has been individually attached. The combination of this additional information and a picture is referred to as a "video access unit (VAU)". That is, in the GOPs 1810 and 1820, a single VAU #1, #2, ... is formed for each picture. Each picture can be read from the video stream 1800 in units of VAUs.

FIG. 18 further shows the structure of VAU #1 1831 located at the top of each video sequence in the base-view video stream. The VAU #1 1831 includes an access unit (AU) identification code 1831A, sequence header 1831B, picture header 1831C, supplementary data 1831D, and compressed picture data 1831E. Except for not including a sequence header 1831B, VAUs from the second VAU #2 onward have the same structure as VAU #1 1631. The AU identification code 1831A is a predetermined code indicating the top of the VAU #1 1831. The sequence header 1831B, also called a GOP header, includes an identification number for the video sequence #1 which includes the VAU #1 1831. The sequence header 1831B further includes information shared by the whole GOP 1810, e.g. resolution, frame rate, aspect ratio, and bit rate. The picture header 1831C indicates its own identification number, the identification number for the video sequence #1, and information necessary for decoding the picture, such as the type of encoding method. The supplementary data 1831D includes additional information regarding matters other than the decoding of the picture, for example closed caption text information, information on the GOP structure, and time code information. In particular, the supplementary data 1831D includes decoding switch information, described below (see <<Supplementary Explanation>> for detail). The compressed picture data 1831E includes a base-view picture. Additionally, the VAU #1 1831 may include any or all of padding data 1831F, a sequence end code 1831G, and a stream end code 1831H as necessary. The padding data 1831F is dummy data. By adjusting the size of the padding data 1831F in conjunction with the size of the compressed picture data 1831E, the bit rate of the VAU #1 1831 can be maintained at a predetermined value. The sequence end code 1831G indicates that the VAU #1 1831 is located at the end of the video sequence #1. The stream end code 1831H indicates the end of the base-view video stream 1800.

FIG. 18 also shows the structure of a VAU #1 1832 located at the top of each video sequence in the dependent-view video stream. The VAU #1 1832 includes a sub-AU identification code 1832A, sub-sequence header 1832B, picture header 1882C, supplementary data 1682D, and compressed picture data 1832E. Except for not including a sub-sequence header 1832B, VAUs from the second VAU #2 onward have the same structure as VAU #1 1832. The sub-AU identification code 1832A is a predetermined code indicating the top of the VAU #1 1832. The sub-sequence header 1832B includes an identification number for the video sequence #1 which includes the VAU #1 1832. The sequence header 1832B further includes information shared by the whole GOP 1810, e.g. resolution, frame rate, aspect ratio, and bit rate. These values are the same as the values set for the corresponding GOP in the base-view video stream, i.e. the values shown by the sequence header 1831B in the VAU #1 1831. The picture header 1832C indicates its own identification number, the identification number for the video sequence #1, and information necessary for decoding the picture, such as the type of encoding method. The supplementary data 1832D includes only offset metadata (details of which will be described later). Here, the supplementary data 1832D that includes only offset metadata is one type of supplementary data, and there is another type of supplementary data that includes additional information regarding matters other than the decoding of the picture, for example, closed caption text information, information on the GOP structure, time code information, and decoding switch information. Therefore, VAU #1 1832 may further include one or more pieces of other supplementary data, in addition to the supplementary data 1832D. The compressed picture data 1832E includes a dependent-view picture. Additionally, the VAU #1 1832 may include any or all of padding data 1832F, a sequence end code 1832G, and a stream end code 1832H as necessary. The padding data 1832F is dummy data. By adjusting the size of the padding data 1832F in conjunction with the size of the compressed picture data 1832E, the bit rate of the VAU #1 1832 can be maintained at a predetermined value. The sequence end code 1832G indicates that the VAU #1 1832 is located at the end of the video sequence #1. The stream end code 1832H indicates the end of the dependent-view video stream 1800.

The specific content of each component in a VAU differs according to the encoding method of the video stream 1800. For example, when the encoding method is MPEG-4 AVC or MVC, the components in the VAUs shown in FIG. 18 are composed of a single Network Abstraction Layer (NAL) unit. Specifically, the AU identification code 1831A, sequence header 1831B, picture header 1831C, supplementary data 1831D, compressed picture data 1831E, padding data 1831F, sequence end code 1831G, and stream end code 1831H respectively correspond to an Access Unit (AU) delimiter, Sequence Parameter Set (SPS), Picture Parameter Set (PPS), Supplemental Enhancement Information (SEI), View Component, Filler Data, End of Sequence, and End of Stream. In particular, in the VAU #1 1832, the supplementary data 1832D including the offset metadata is composed of one NAL unit, wherein the NAL unit does not include any data other than the offset metadata.

Figure 19:
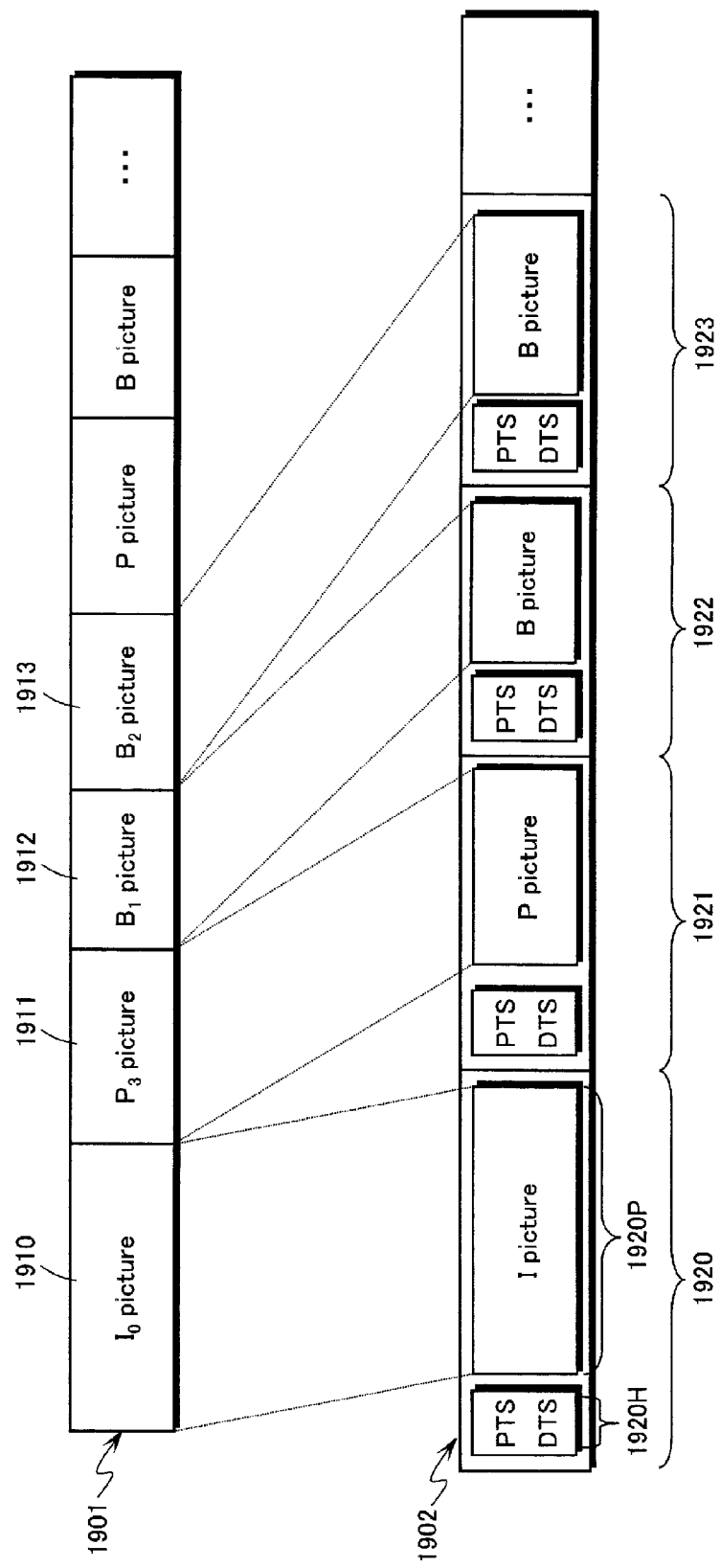
FIG. 19 is a schematic diagram showing details on a method for storing a video stream 1901 into a PES packet sequence 1902.

FIG. 19 is a schematic diagram showing details on a method for storing a video stream 1901 into a PES packet sequence 1902. This data structure is substantially the same for the base-view video stream and the dependent-view video stream. As shown in FIG. 19, in the actual video stream 1901, pictures are multiplexed in the order of encoding, not in the order of presentation time. For example, in the VAUs in the base-view video stream, as shown in FIG. 19, I0 picture 1910, P3 picture 1911, B1 picture 1912, B2 picture 1913 . . . are stored in order from the top. The subscripted number indicates the serial number allotted to each picture in order of presentation time. Note that I0 picture 1910 is used as a reference picture for encoding P3 picture 1911, and both I0 picture 1910 and P3 picture 1911 are used as reference pictures for encoding B1 picture 1912 and B2 picture 1913. Each of these VAUs is stored as a different PES packet 1920, 1921, 1922, 1923 . . . . Each PES packet 1920 . . . includes a PES payload 1920P and a PES header 1920H. Each VAU is stored in a PES payload 1920P. Each PES header 1920H includes a presentation time (Presentation Time-Stamp, or PTS), and a decoding time (Decoding Time-Stamp, or DTS) for the picture stored in the PES payload 1920P in the same PES packet 1920.

As with the video stream 1901 shown in FIG. 19, the other elementary streams shown in FIGS. 13 and 14 are stored in PES payloads in a sequence of PES packets. Furthermore, the PES header in each PES packet includes the PTS for the data stored in the PES payload for the PES packet.

Figure 20:
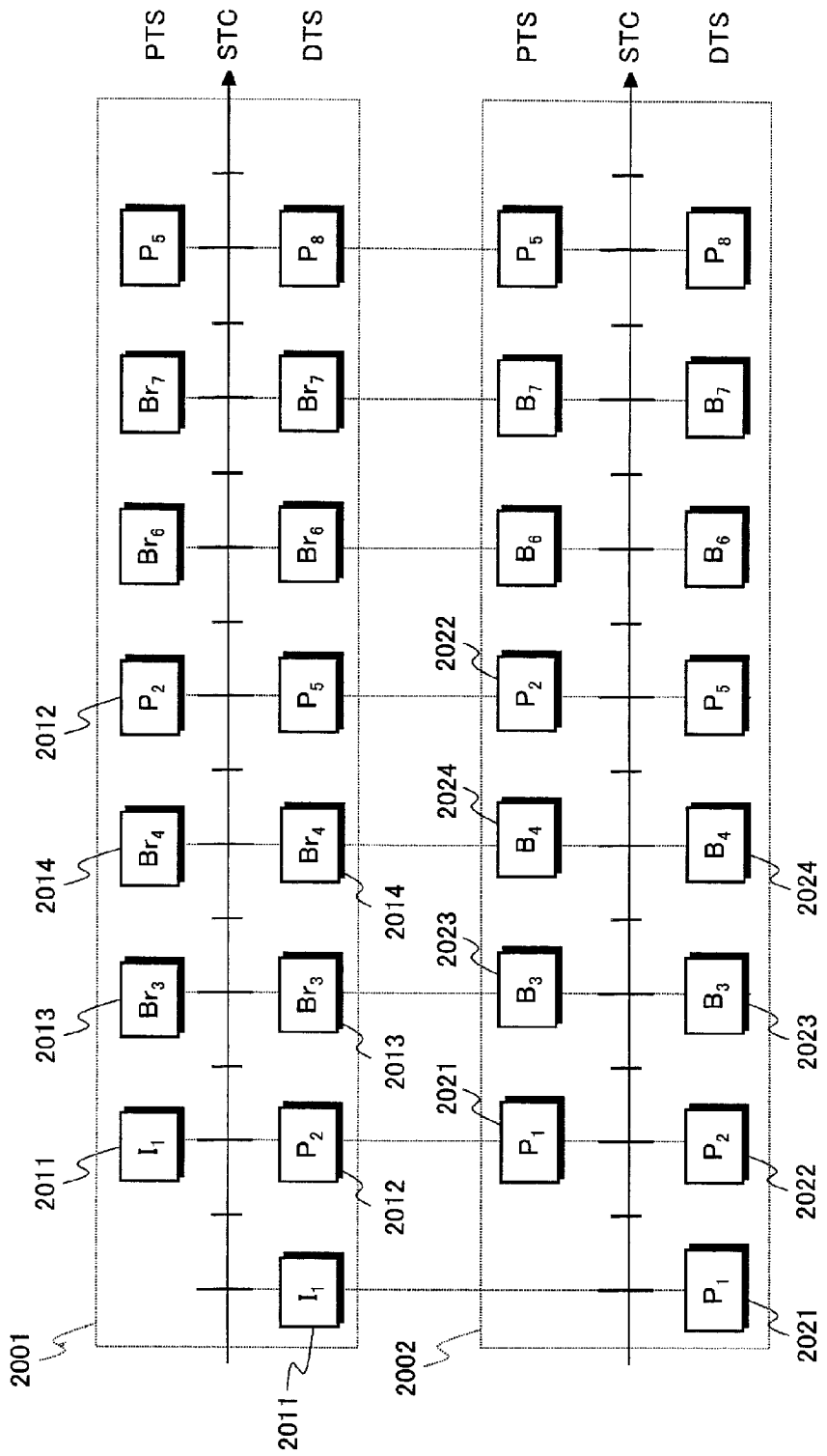
FIG. 20 is a schematic diagram showing a correspondence between PTSs and DTSs assigned to each picture in a base-view video stream 2001 and a dependent-view video stream 2002.

FIG. 20 is a schematic diagram showing a correspondence between PTSs and DTSs assigned to each picture in a base-view video stream 2001 and a dependent-view video stream 2002. As shown in FIG. 20, between the video streams 2001 and 2002, the same PTSs and DTSs are assigned to a pair of pictures representing the same frame or field in a 3D video image. For example, the top frame or field in the 3D video image is rendered from a combination of I1 picture 2011 in the base-view video stream 2001 and P1 picture 2021 in the dependent-view video stream 2002. Accordingly, the PTS and DTS for these two pictures 2011 and 2021 are the same. The subscripted numbers indicate the serial number allotted to each picture in the order of DTSs. Also, when the dependent-view video stream 2002 is a depth-map stream, P1 picture 2021 is replaced by an I picture representing a depth map for the I1 picture 2011. Similarly, the second pictures in the video streams 2001 and 2002, i.e., P2 pictures 2012 and 2022 have the same PTS and the same DTS. The third pictures in the video streams 2001 and 2002, i.e. Br3 picture 2013 and B3 picture 2023 have the same PTS and the same DTS. The same is also true for the Br4 picture 2014 and B4 picture 2024.

A pair of VAUs that include pictures for which the PTS and DTS are the same between the base-view video stream 2001 and the dependent-view video stream 2002 is called a "3D VAU". Using the allocation of PTSs and DTSs shown in FIG. 20, it is easy to cause the decoder in the playback device 102 in 3D playback mode to process the base-view video stream 2001 and the dependent-view video stream 2002 in parallel in units of 3D VAUs. In this way, the decoder definitely processes a pair of pictures representing the same frame or field in a 3D video image in parallel. Furthermore, the sequence header in the 3D VAU at the top of each GOP includes the same resolution, the same frame rate, and the same aspect ratio. In particular, this frame rate is equal to the value when the base-view video stream 2001 is decoded independently in 2D playback mode.

<<Offset Metadata>>

Figure 21:
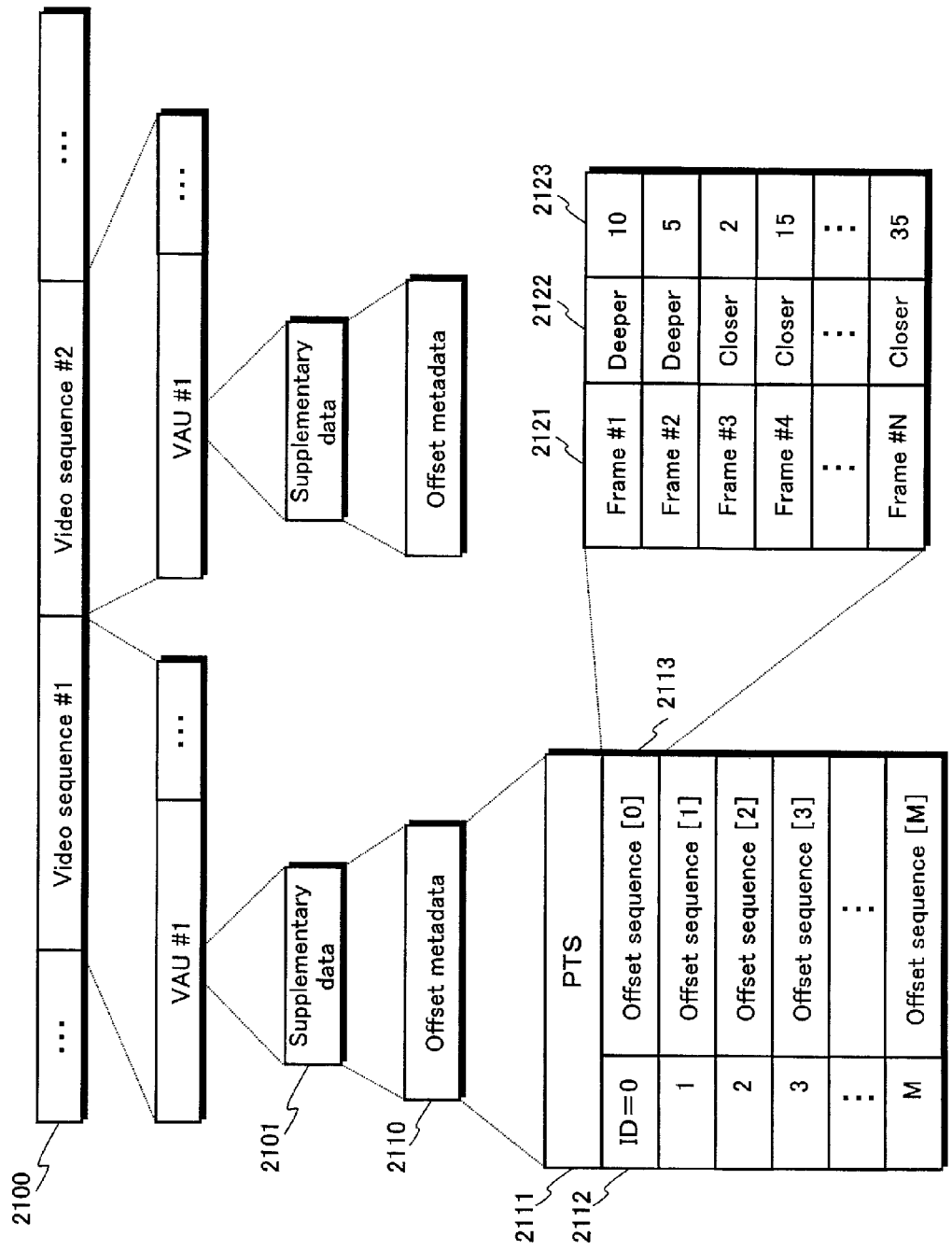
FIG. 21 is a schematic diagram showing a data structure of offset metadata 2110 included in a dependent-view video stream 2100.

FIG. 21 is a schematic diagram showing a data structure of offset metadata 2110 included in a dependent-view video stream 2100. As shown in FIG. 21, the offset metadata 2110 is stored in supplementary data 2101 of VAU #1 located at the top of each video sequence (i.e. each GOP). As shown in FIG. 21, the offset metadata 2110 includes a PTS 2111, offset sequence ID 2112, and offset sequence 2113. The PTS 2111 is the same as a PTS of a frame represented by compressed picture data in VAU #1, namely a PTS of the first frame of each GOP.

The offset sequence IDs 2112 are serial numbers 0, 1, 2, . . . , M allotted in order to the offset sequences 2113. The letter M represents an integer greater than or equal to 1 and indicates the total number of offset sequences 2113. An offset sequence ID 2112 is allocated to the graphics plane and a secondary video plane to be combined in a video plane. In this way, an offset sequence 2113 is associated with each piece of plane data. A "video plane" refers to plane data generated from a picture included in a video sequence, i.e. to a two-dimensional array of pixel data. The size of the array is the same as the resolution of the video frame. A set of pixel data is formed by a combination of a chromatic coordinate value (an RGB value or a YCrCb value) and an α value.

Each offset sequence 2113 is a correspondence table between frame numbers 2121 and offset information 2122 and 2123. Frame numbers 2121 are serial numbers 1, 2, . . . , N allocated in order of presentation to frames #1, #2, . . . , #N represented by a single video sequence (for example, video sequence #1). The letter N represents an integer greater than or equal to "1" and indicates the total number of frames included in the video sequence. The pieces of offset information 2122 and 2123 are control information defining offset control for a single piece of plane data.

Note that "offset control" refers to a process to provide left and right offsets for the horizontal coordinates in a graphics plane (or secondary video plane) and combine the resulting planes respectively with the left-view video plane and right-view video plane. A "left-view/right-view video plane" refers to a video plane that represents a left view/right view and is generated from a combination of the base-view video stream and the dependent-view video stream. "Providing horizontal offsets to a graphics plane" refers to horizontally shifting each piece of pixel data in the graphics plane. From a single graphics plane, this generates a pair of graphics planes representing a left view and a right view. The presentation position of each element in the 2D graphics images played back from this pair of planes is shifted to the left or right from the original presentation position. The viewer is made to perceive a pair of a left view and a right view as a single 3D graphics image due to the binocular parallax produced by these shifts. The same holds with respect to images represented by the secondary video plane.

An offset is determined by a direction and a size. Therefore, as shown in FIG. 21, each piece of offset information includes an offset direction 2122 and offset value 2123. The offset direction 2122 indicates whether a 3D graphics image is closer to the viewer than the screen or further back. Whether the presentation position in the left view and the right view is shifted to the left or to the right from the original presentation position of the 2D graphics image depends on the value of the offset direction 2122. The offset value 2123 indicates the number of horizontal pixels of the distance between the original presentation position of the 2D graphics image and the presentation position of the left view or the right view.

FIGS. 22A and 22B are schematic diagrams showing offset controls for a PG plane 2210 and IG plane 2220, respectively. Via these offset controls, two types of graphics planes, 2210 and 2220, are respectively combined with the left-view video plane 2201 and the right-view video plane 2202. In the following description, it is assumed that a subtitle 2211 indicated by the PG plane 2210 is displayed closer than the screen, and a button 2221 indicated by the IG plane 2220 is displayed further back than the screen.

As shown in FIG. 22A, a right offset is provided to the PG plane 2210. Specifically, the position of each piece of pixel data in the PG plane 2210 is first shifted to the right (virtually) from the corresponding position of the pixel data in the left-view video plane 2201 by a number of pixels SFP equal to the offset value. Next, a strip 2212 (virtually) protruding from the right edge of the range of the left-view video plane 2201 is "cut off" from the right edge of the PG plane 2210. In other words, the pixel data for this region 2212 is discarded. Conversely, a transparent strip 2213 is added to the left edge of the PG plane 2210. The width of this strip 2213 is the width of the strip 2212 at the right edge; i.e. the width is the same as the offset value SFP. A PG plane representing the left view is thus generated from the PG plane 2210 and combined with the left-view video plane 2201. In particular, in this left-view PG plane, the presentation position of the subtitle 2211 is shifted to the right from the original presentation position by the offset value SFP.

Conversely, a left offset is provided to the IG plane 2220. Specifically, the position of each piece of pixel data in the IG plane 2220 is first shifted to the left (virtually) from the corresponding position of the pixel data in the left-view video plane 2201 by a number of pixels SFI equal to the offset value. Next, a strip 2222 (virtually) protruding from the left edge of the range of the left-view video plane 2210 is cut off from the left edge of the IG plane 2220. Conversely, a transparent strip 2223 is added to the right edge of the IG plane 2220. The width of this strip 2223 is the width of the strip 2222 at the left edge; i.e. the width is the same as the offset value SFI. An IG plane representing the left view is thus generated from the IG plane 2220 and combined with the left-view video plane 2201. In particular, in this left-view IG plane, the presentation position of the button 2221 is shifted to the left from the original presentation position by the offset value SFI.

As shown in FIG. 22B, a left offset is provided to the PG plane 2210, and a right offset is added to the IG plane 2220. In other words, the above operations are performed in reverse for the PG plane 2210 and the IG plane 2220. As a result, plane data representing the right view is generated from the plane data 2210 and 2220 and combined with the right-view video plane 2202. In particular, in the right-view PG plane, the presentation position of the subtitle 2211 is shifted to the left from the original presentation position by the offset value SFP. On the other hand, in the right-view IG plane, the presentation position of the button 2221 is shifted to the right from the original presentation position by the offset value SFI.

FIG. 22C is a schematic diagram showing 3D graphics images that a viewer 2230 is made to perceive from 2D graphics images represented by graphics planes shown in FIGS. 22A and 22B. When the 2D graphics images represented by these graphics planes are alternately displayed on the screen 2240, the viewer 2230 perceives the subtitle 2231 to be closer than the screen 2240 and the button 2232 to be further back than the screen 2240, as shown in FIG. 22C. The distance between the 3D graphics images 2231 and 2232 and the screen 2240 can be adjusted via the offset values SFP and SFI.

Figure 23B:
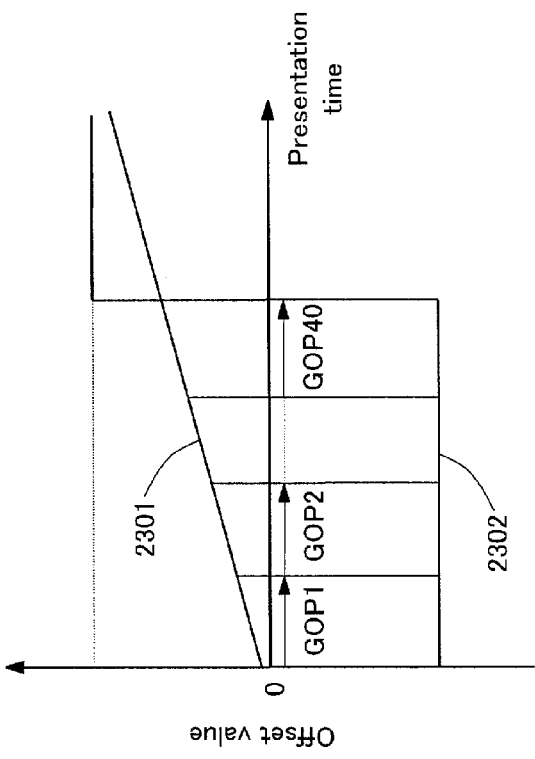
FIGS. 23A and 23B are graphs each showing an example of an offset sequence.
Figure 23A:
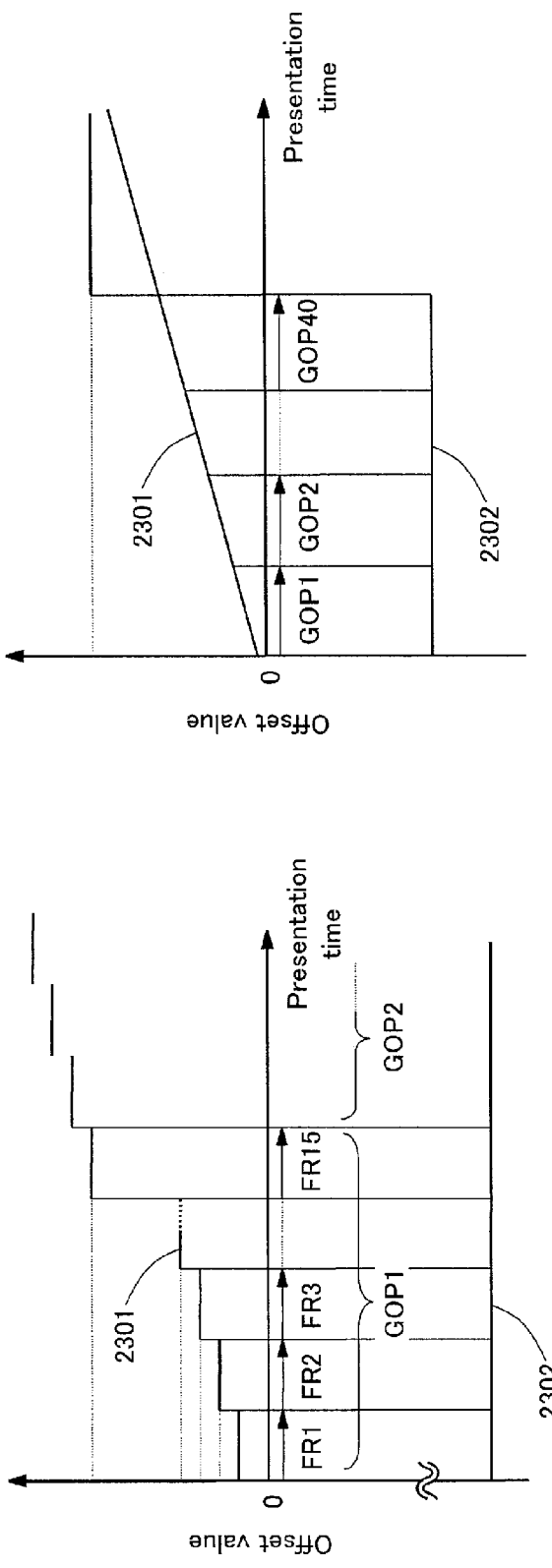

FIGS. 23A and 23B are graphs showing examples of offset sequences. In these graphs, the offset value is positive when the offset direction is toward the viewer from the screen. FIG. 23A is an enlargement of the graph for the presentation period GOP1 of the first GOP in FIG. 23B. As shown in FIG. 23A, the stepwise line 2301 shows offset values for the offset sequence with an offset sequence ID equaling 0, i.e., offset sequence [0]. On the other hand, the horizontal line 2302 shows offset values for the offset sequence with an offset sequence ID equaling 1, i.e., offset sequence [1]. The offset value 2301 of the offset sequence [0] increases stepwise during the presentation period GOP1 of the first GOP in the order of frames FR1, FR2, FR3, . . . , FR15, . . . . As shown in FIG. 23B, the stepwise increase in the offset value 2301 similarly continues in the presentation periods GOP2, GOP3, . . . , GOP40, . . . for the second and subsequent GOPs. The amount of increase per frame is sufficiently small for the offset value 2301 in FIG. 23B to appear to increase continually as a line. On the other hand, the offset value 2302 in offset sequence [1] is maintained at a constant negative value during the presentation period GOP1 of the first GOP. As shown in FIG. 23B, the offset value 2302 increases to a positive value at the end of the presentation period GOP40 for the 40th GOP. Offset values may thus exhibit discontinuous change.

Figure 23C:
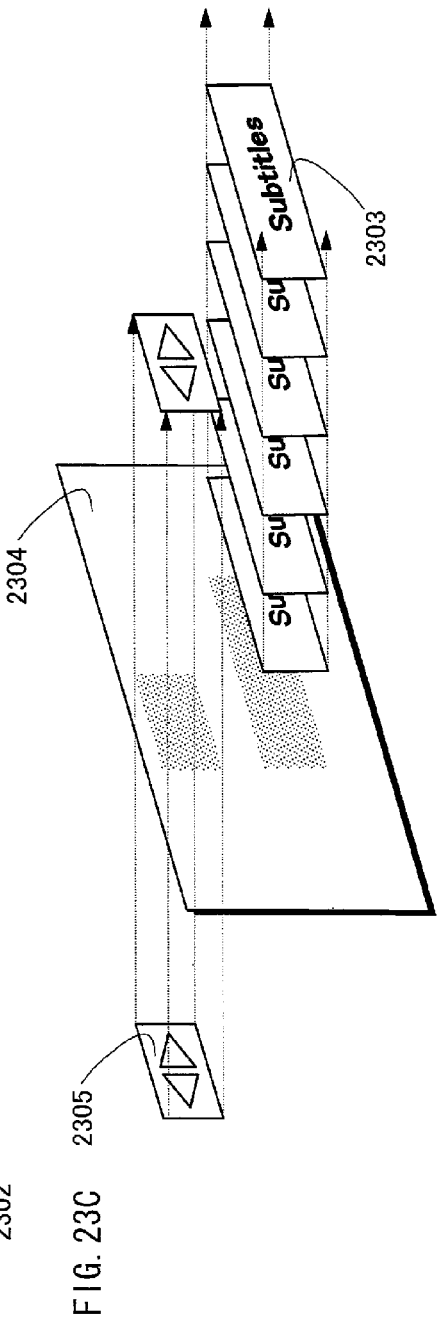
FIG. 23C is a schematic diagram showing 3D graphics images reproduced in accordance with the offset sequences shown in FIGS. 23A and 23B.

FIG. 23C is a schematic diagram showing 3D graphics images reproduced in accordance with the offset sequences shown in FIGS. 23A and 23B. When the subtitle 3D video image 2303 is displayed in accordance with the offset sequence [0], the 3D video image 2303 appears to start from right in front of the screen 2304 and gradually approach the viewer. On the other hand, when the button 3D video image 2305 is displayed in accordance with the offset sequence [1], the 3D video image 2305 appears to suddenly jump from a fixed position behind the screen 2304 to the front of the screen 2304. As described, the patterns by which offset values increase and decrease frame by frame are changed in a variety of ways from one offset sequence to another. Individual changes in the depth of a plurality of 3D graphics images can thereby be represented in a variety of ways.

<<Other TS Packets Included in AV Stream File>>

The types of TS packets that may be included in an AV stream file include, in addition to those converted from the elementary streams shown in FIG. 14, Program Association Table (PAT), Program Map Table (PMT), and Program Clock Reference (PCR). The PCR, PMT, and PAT are specified by the European Digital Broadcasting Standard and are intended to regulate the partial transport stream constituting a single program. By using PCR, PMT, and PAT, the AV stream file can also be regulated in the same way as the partial transport stream. Specifically, the PAT shows the PID of a PMT included in the same AV stream file. The PID of the PAT itself is 0. The PMT includes the PIDs for the elementary streams representing video, audio, subtitles, etc. included in the same AV stream file, as well as the attribute information for the elementary streams. The PMT also includes various descriptors relating to the AV stream file. The descriptors particularly include copy control information showing whether copying of the AV stream file is permitted or not. The PCR includes information indicating the value of a system time clock (STC) to be associated with the ATS assigned to the PCR itself. The STC referred to here is a clock used as a reference for the PTS and the DTS by a decoder in the playback device 102. This decoder uses the PCR to synchronize the STC with the ATC.

Figure 24:
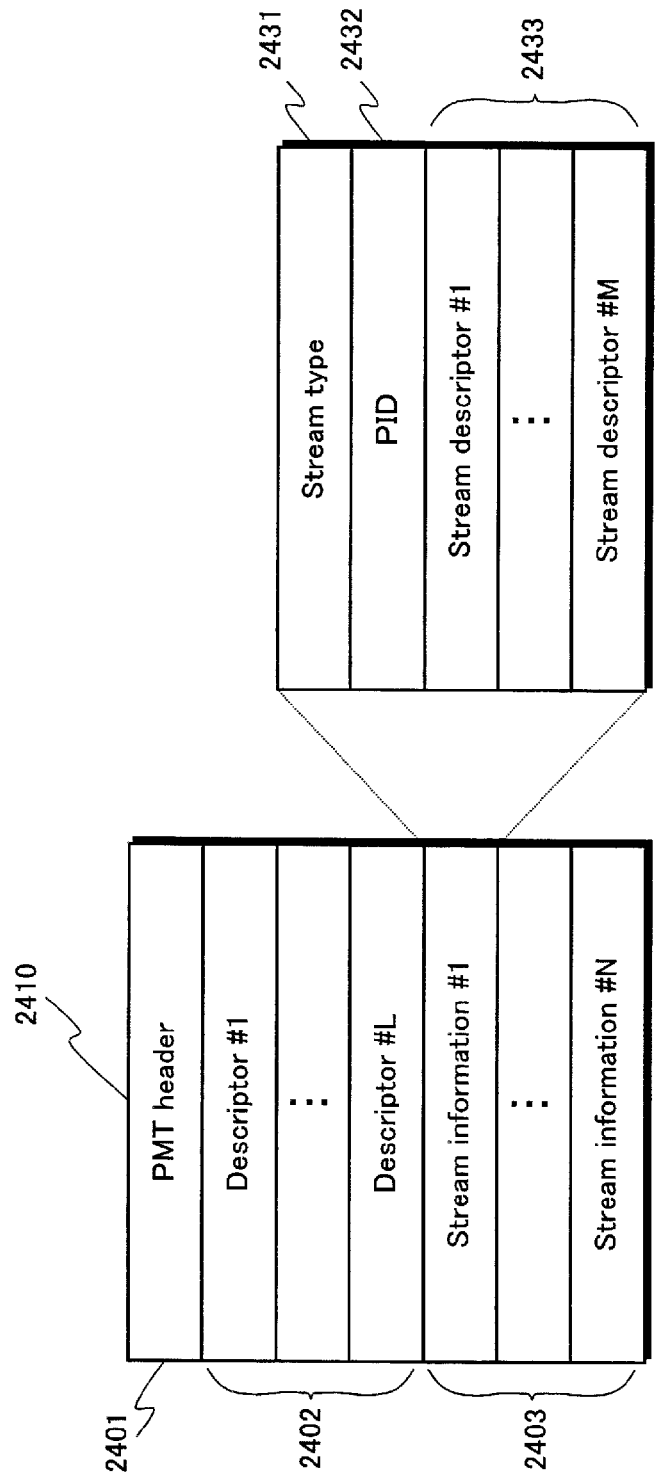
FIG. 24 is a schematic diagram showing a data structure of a PMT 2410.

FIG. 24 is a schematic diagram showing a data structure of a PMT 2410. The PMT 2410 includes a PMT header 2401, descriptors 2402, and pieces of stream information 2403. The PMT header 2401 indicates the length of data, etc. stored in the PMT 2410. Each descriptor 2402 relates to the entire AV stream file that includes the PMT 2410. The copy control information is included in one of the descriptors 2402. Each piece of stream information 2403 relates to one of the elementary streams included in the AV stream file and is assigned to a different elementary stream. Each piece of stream information 2403 includes a stream type 2431, a PID 2432, and stream descriptors 2433. The stream type 2431 includes identification information for the codec used for compressing the elementary stream. The PID 2432 indicates the PID of the elementary stream. The stream descriptors 2433 include attribute information of the elementary stream, such as a frame rate and an aspect ratio.

By using PCR, PMT, and PAT, the decoder in the playback device 102 can be made to process the AV stream file in the same way as the partial transport stream in the European Digital Broadcasting Standard. In this way, it is possible to ensure compatibility between a playback device for the BD-ROM disc 101 and a terminal device conforming to the European Digital Broadcasting Standard.

<<Interleaved Arrangement of Multiplexed Stream Data>>

For seamless playback of 3D video images, the physical arrangement of the base-view video stream and dependent-view video stream on the BD-ROM disc 101 is important. This "seamless playback" refers to playing back video and audio from multiplexed stream data without interruption.

Figure 25:
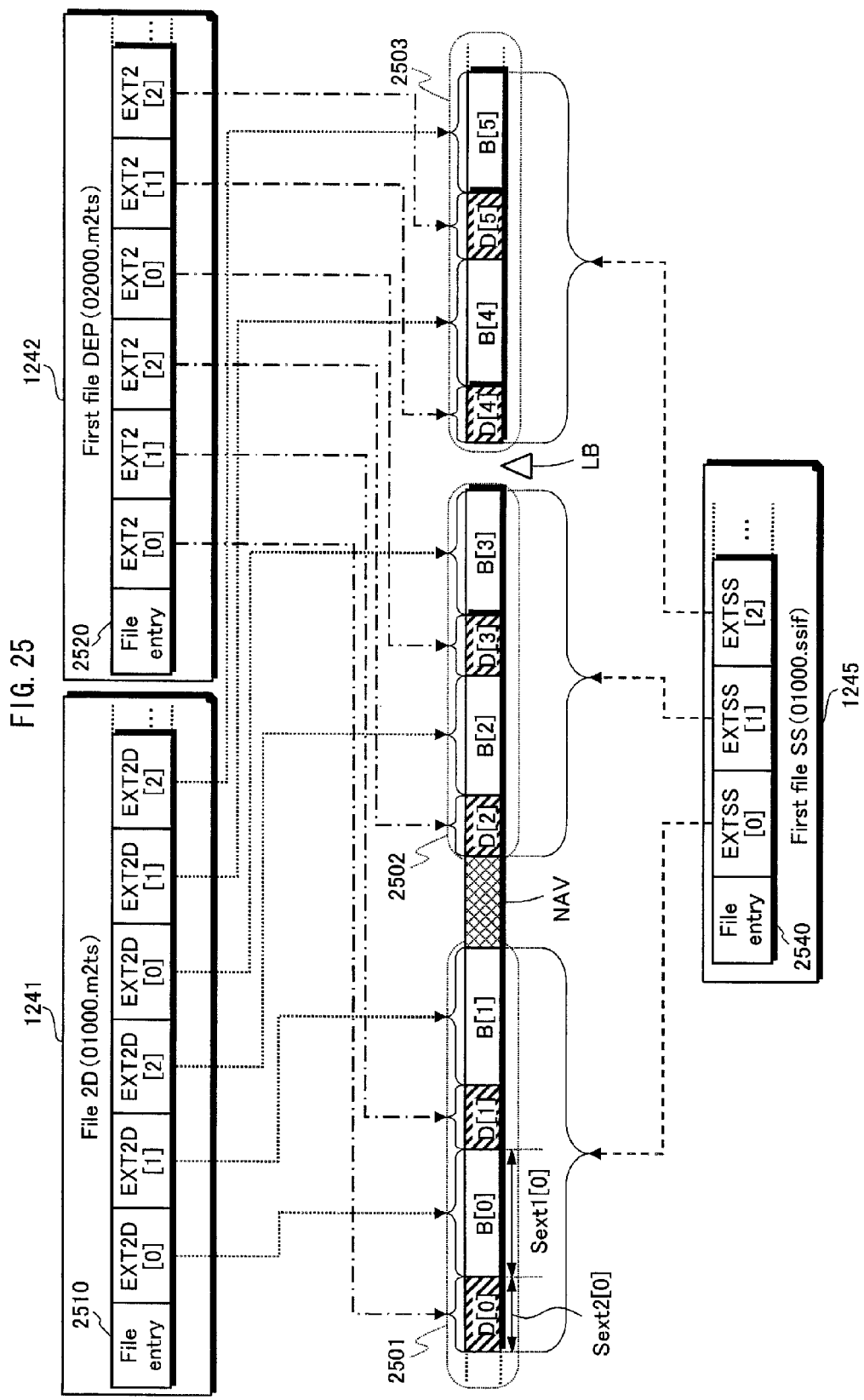
FIG. 25 is a schematic diagram showing a physical arrangement of the main TS and one of the first sub-TS and the second sub-TS shown in FIG. 13 on the BD-ROM disc 101.

FIG. 25 is a schematic diagram showing a physical arrangement on the BD-ROM disc 101 of the main TS and first sub-TS shown in FIG. 13. Note that the second sub-TS may be recoded instead of the first sub-TS. As shown in FIG. 25, the respective TSs are divided into a plurality of data blocks D[n], B[n] (n=0, 1, 2, 3, . . . ) and arranged on the BD-ROM disc 101. A "data block" refers to a sequence of data recorded on a contiguous area on the BD-ROM disc 101, i.e., a plurality of physically contiguous sectors. Since physical addresses and logical addresses on the BD-ROM disc 101 are substantially the same, the LBNs within each data block are also continuous. Accordingly, the BD-ROM drive 121 can continuously read a data block without causing the optical pickup to perform a seek. Hereinafter, data blocks B[n] belonging to a main TS are referred to as "base-view data blocks", and data blocks D[n] belonging to a sub-TS are referred to as "dependent-view data blocks". In particular, data blocks belonging to the first sub-TS are referred to as "right-view data blocks", and the data blocks belonging to the second sub-TS are referred to as "depth-map data blocks".

In the file system on the BD-ROM disc 101, each data block B[n] and D[n] can be accessed as one extent in the files 2D or the files DEP. In other words, the logical address for each data block can be known from the file entry of a file 2D or a file DEP.

In the example shown in FIG. 25, the file entry 2510 in the file 2D (01000.m2ts) 1241 indicates the sizes of the base-view data blocks B[n] and the LBNs of their tops. Accordingly, the base-view data blocks B[n] can be accessed as extents EXT2D[n] in the file 2D 1241. Hereinafter, the extents EXT2D[n] belonging to the file 2D 1241 are referred to as "2D extents". On the other hand, the file entry 2520 of the first file DEP (02000.m2ts) 1242 indicates the sizes of the dependent-view data blocks D[n] and the LBNs of their tops. Accordingly, each dependent-view data block D[n] is a right-view data block and can be accessed as an extent EXT2[$n$] in the first file DEP 1242. Hereinafter, the extents EXT2[$n$] belonging to the first file DEP 1242 are referred to as "right-view extents". Accordingly, in the case where the dependent-view data block D[n] is a depth-map data block, each depth-map data block can also be accessed as an extent in the second file DEP (03000.m2ts) 1243. Hereinafter, the extents belonging to the second file DEP 1243 are referred to as "depth-map extents". Furthermore, extents belonging to a specific file DEP, such as the right-view extents and depth-map extents, are collectively referred to as "dependent-view extents".

As shown in FIG. 25, a data block group is recorded continuously along a track on the BD-ROM disc 101. Furthermore, the base-view data blocks B[n] and the dependent-view data blocks D[n] are arranged alternately one by one. This type of arrangement of a data block group is referred to as an "interleaved arrangement". In particular, one series of data blocks recorded in an interleaved arrangement is referred to as an "extent block". Three extent blocks 2501, 2502, and 2503 are shown in FIG. 25. As shown in the first two extent blocks 2501 and 2502, a storage area NAV for data other than multiplexed stream data exists between the extent blocks, thus separating the extent blocks. Also, when the BD-ROM disc 101 is a multi-layer disc, i.e., when the BD-ROM disc 101 includes a plurality of recording layers, the extent blocks may also be separated by a layer boundary LB between the recording layers, as in the second and third extent blocks 2502 and 2503. In this way, one series of multiplexed stream data is generally arranged so as to be divided into a plurality of extent blocks. In this case, for the playback device 102 to seamlessly play back video images from the multiplexed stream data, it is necessary for video images to be played back from the extent blocks to be seamlessly connected. Hereinafter, processing required by the playback device 102 for that purpose is referred to as "seamless connection between extent blocks".

The extent blocks 2501-2503 have the two types of data blocks, D[n] and B[n] that are equal in total number. In particular, the extent ATC times are the same between the $(n+1)^{th}$ pair of data blocks D[n] and B[n]. Hereinafter, such a pair of data blocks is referred to as an "extent pair". In this context, an "Arrival Time Clock (ATC)" refers to a clock that acts as a standard for an ATS. The "extent ATC time" represents the range of the ATS assigned to source packets in one data block, i.e. the difference between the ATS of the source packet at the top of the data block and the ATS of the source packet at the top of the next data block. The difference is equal to the ATC value indicating the time required for the playback device 102 to transfer all of the source packets in the data block from the read buffer to the system target decoder. The "read buffer" is a buffer memory in the playback device 102 where data blocks read from the BD-ROM disc 101 are temporarily stored before being transmitted to the system target decoder. Details on the read buffer are provided later. In the example shown in FIG. 25, since three extent blocks 2501-2503 are connected together seamlessly, the extent ATC times are the same between the extent pairs D[n], B[n] (n=0, 1, 2, . . . ).

The VAUs located at the top of each extent pair D[n] and B[n] belong to the same 3D VAU, and in particular include the top picture of the GOP representing the same 3D video image. In FIG. 25, for example, the top of the right-view data block D[n] includes a P picture for the right-view video stream, and the top of the base-view data block B[n] includes an I picture for the base-view video stream. The P picture for the right-view video stream represents the right view when the 2D video image represented by the I picture in the base-view video stream is used as the left view. In particular, the P picture, as shown in FIG. 17, is compressed using the I picture as a reference picture. Accordingly, the playback device 102 in 3D playback mode can start playback of 3D video images from any extent pair D[n] and B[n]. That is to say, processing that requires random access of video streams, such as interrupt playback, is possible.

In the interleaved arrangement shown in FIG. 25, in any extent pair D[n] and B[n], the dependent-view data block D[n] is located before the base-view data block B[n]. This is because the amount of data is generally smaller in the dependent-view data block D[n] than the base-view data block B[n], i.e., the bit rate is lower. For example, the picture included in the $(n+1)^{th}$ right-view data block D[n] is compressed, as shown in FIG. 17, using the picture included in the $(n+1)^{th}$ base-view data block B[n] as a reference picture. Accordingly, the size $S_{EXT2}$[n] of the right-view data block D[n] is equal to or less than the size $S_{EXT1}$[n] of the base-view data block B[n]: $S_{EXT2}$[n]$\leq S_{EXT1}$[n]. On the other hand, the amount of data per pixel in the depth map, i.e. the number of bits of the depth value, is in general smaller than the amount of data per pixel of the base-view picture, i.e. the sum of the number of bits of the chromatic coordinate value and the α value (opaqueness). Furthermore, as shown in FIGS. 13A and 13C, unlike the second sub-TS, the main TS includes other elementary streams, such as a primary audio stream, in addition to the primary video stream. Accordingly, the size $S_{EXT3}$[n] of the right-view data block D[n] is equal to or less than the size $S_{EXT1}$[n] of the base-view data block B[n]: $S_{EXT3}$[n]$\leq S_{EXT1}$[n].

[Significance of Dividing Multiplexed Stream Data into Data Blocks]

In order to play 3D video images back seamlessly from the BD-ROM disc 101, the playback device 102 has to process the main TS and sub-TS in parallel. The read buffer capacity usable in such processing, however, is generally limited. In particular, there is a limit to the amount of data that can be continuously read into the read buffer from the BD-ROM disc 101. Accordingly, the playback device 102 has to read sections of the main TS and sub-TS with the same extent ATC time by dividing the sections.

Figure 26A:
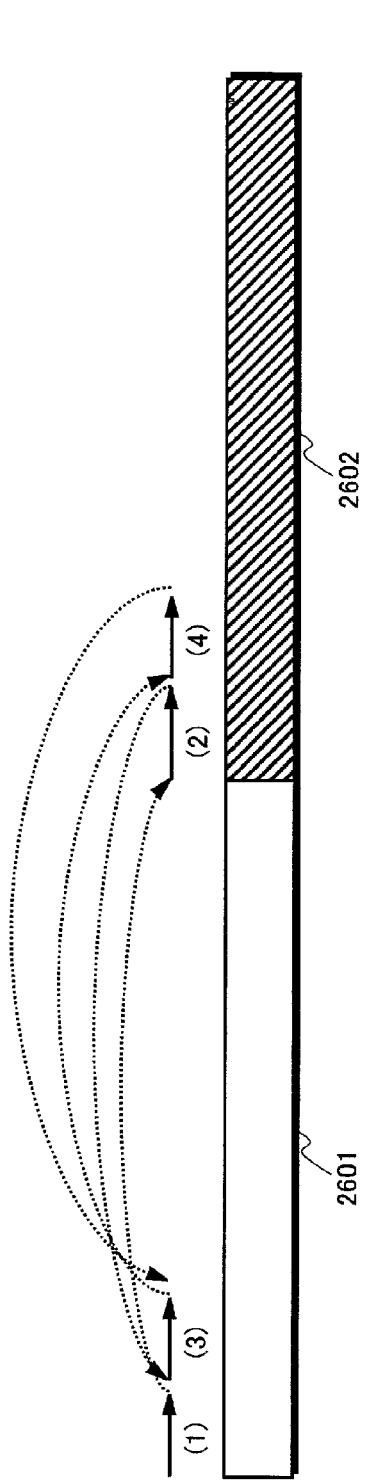
FIG. 26A is a schematic diagram showing an arrangement of a main TS 2601 and a sub-TS 2602 recorded separately and consecutively on a BD-ROM disc.

FIG. 26A is a schematic diagram showing the arrangement of the main TS 2601 and sub-TS 2602 recorded separately and contiguously on a BD-ROM disc. When the playback device 102 processes the main TS 2601 and sub-TS 2602 in parallel, as shown by the arrows (1)-(4) on the solid lines in FIG. 26A, the BD-ROM drive 121 alternately reads sections of the main TS 2601 and the sub-TS 2602 that have the same extent ATC time. At this time, as shown by the arrows in the dashed lines in FIG. 26A, during read processing the BD-ROM drive 121 has to make a large change in the area to be read on the BD-ROM disc. For example, after the top section of the main TS 2601 shown by arrow (1) is read, the BD-ROM drive 121 temporarily stops the read operation by the optical pickup and increases the rotation speed of the BD-ROM disc. In this way, the BD-ROM drive 121 rapidly moves the sector on the BD-ROM disc on which the top section of the sub-TS 2602 shown by arrow (2) is recorded to the position of the optical pickup. This operation to temporarily stop reading by the optical pickup and, while reading is stopped, position the optical pickup above the next area to be read is referred to as a "jump". Each arrow in a dashed line shown in FIG. 26A indicates the range of a jump necessary during read processing. During each jump period, read processing by the optical pickup stops, and only decoding processing by the decoder progresses. Since the jump is excessive in the example shown in FIG. 26A, it is difficult to cause read processing to keep up with decoding processing. As a result, it is difficult to stably maintain seamless playback.

Figure 26B:
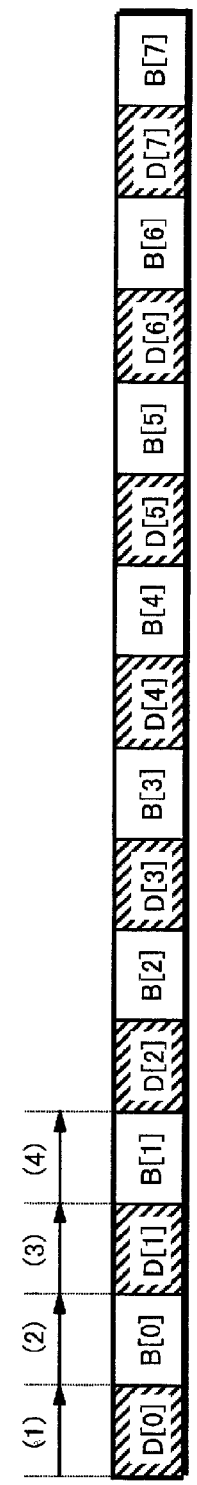
FIG. 26B is a schematic diagram showing an interleaved arrangement of dependent-view data blocks D[0], D[1], D[2], . . . and base-view data blocks B[0], B[1], B[2], . . . recorded alternately on the BD-ROM disc 101 according to Embodiment 1 of the present invention.

FIG. 26B is a schematic diagram showing an arrangement of dependent-view data blocks D[0], D[1], D[2], . . . and base-view data blocks B[0], B[1], B[2], . . . recorded alternately on the BD-ROM disc 101 according to Embodiment 1 of the present invention. As shown in FIG. 26B, the main TS and sub-TS are divided into a plurality of data blocks and are arranged alternately. In this case, during playback of 3D video images, the playback device 102 reads data blocks D[0], B[0], D[1], B[1] . . . in order from the top, as shown by arrows (1)-(4) in FIG. 26B. By simply reading these data blocks in order, the playback device 102 can smoothly read the main TS and sub-TS alternately. In particular, since no jump occurs during read processing, seamless playback of 3D video images can be stably maintained.

[Significance of Providing Contiguous Data Blocks with the Same Extent ATC Time]

Figure 26C:
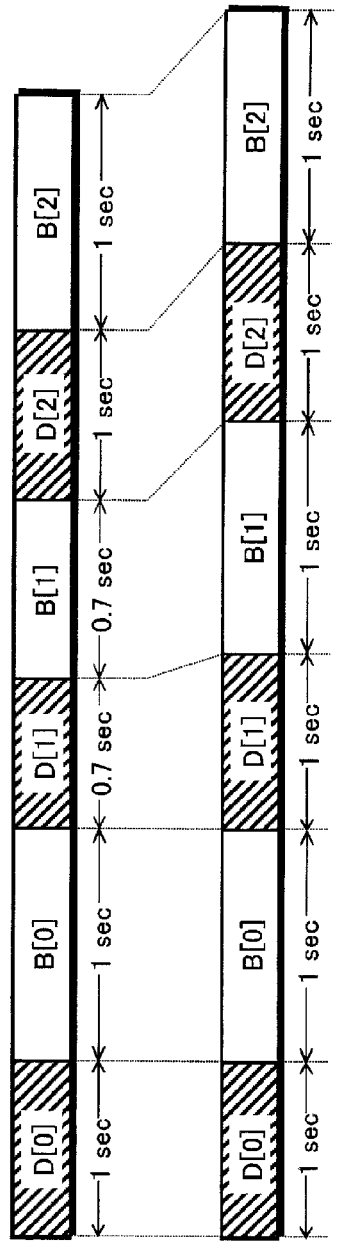
FIGS. 26C and 26D are schematic diagrams showing examples of the extent ATC times of a dependent-view data block group D[n] and a base-view data block group B[n] recorded in an interleaved arrangement (n=0, 1, 2).

FIG. 26C is a schematic diagram showing an example of the extent ATC times for a dependent-view data block group D[n] and a base-view data block group B[n] recorded in an interleaved arrangement (n=0, 1, 2). As shown in FIG. 26C, the extent ATC time is the same between each dependent-view data block D[n] and the immediately subsequent base-view data block B[n]. For example, the extent ATC time is equal to one second for each of D[0] and B[0] in the top data block pair. Accordingly, when the data blocks D[0] and B[0] are read by the read buffer in the playback device 102, all of the TS packets therein are sent from the read buffer to the system target decoder in the same one-second interval. Similarly, since the extent ATC time is equal to 0.7 seconds for each of D[1] and B[1] in the second data block pair, all of the TS packets in each data block are transmitted from the read buffer to the system target decoder in the same 0.7-second interval.

Figure 26D:
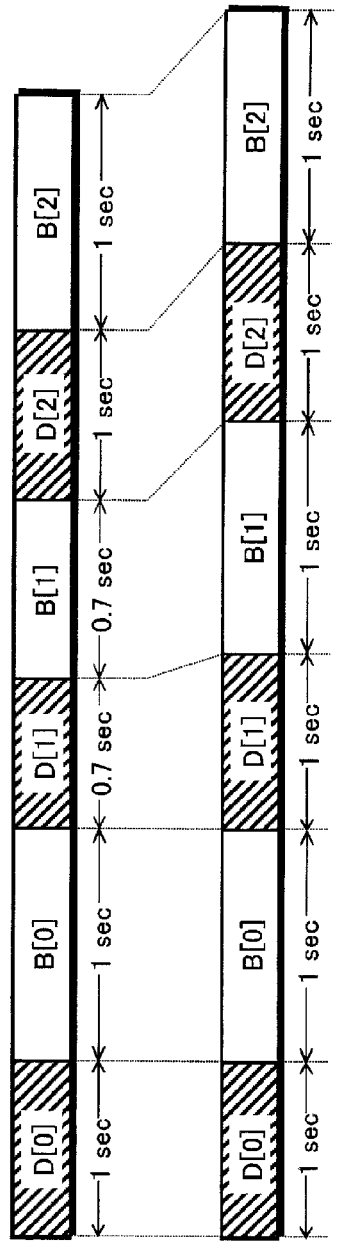

FIG. 26D is a schematic diagram showing another example of the extent ATC times for a dependent-view data block group D[n] and a base-view data block group B[n] recorded in an interleaved arrangement. As shown in FIG. 26D, the extent ATC times in all of the data blocks D[n] and B[n] are equal to one second. Accordingly, in the same one-second interval in which any of the data blocks D[n] and B[n] are read by the read buffer in the playback device 102, all of the TS packets in each of those data blocks are transmitted from the read buffer to the system target decoder.

As described above, the compression rate of the dependent-view data blocks is generally higher than the compression rate of the base-view data blocks. Accordingly, decoding processing of the dependent-view data blocks is generally slower than decoding processing of the base-view data blocks. On the other hand, when the extent ATC times are equal, the dependent-view data blocks generally have a smaller amount of data than the base-view data blocks. Therefore, when the extent ATC times are the same between contiguous data blocks as in FIGS. 26C and 26D, the speed at which the data to be decoded is provided to the system target decoder can easily be maintained uniformly with the speed of processing by the decoder. In other words, the system target decoder facilitates synchronization between the decoding processing of the base-view data blocks and the decoding processing of the dependent-view data blocks, particularly in interrupt playback.

[Method for Aligning Extent ATC Times]

Figure 27:
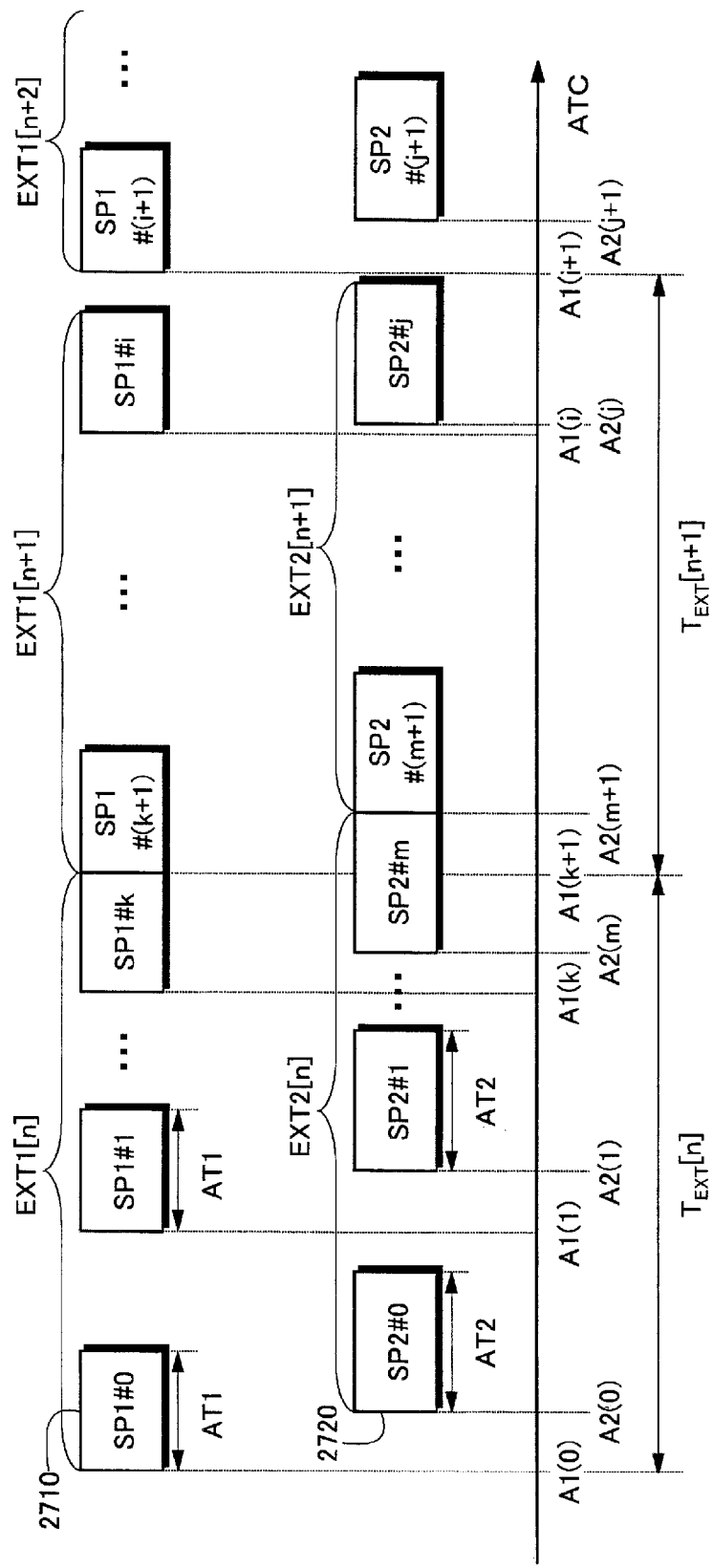
FIG. 27 is a schematic diagram showing a method for aligning extent ATC times between contiguous data blocks.

FIG. 27 is a schematic diagram showing a method for aligning extent ATC times between contiguous data blocks. First, ATSs along the same ATC time axis are assigned to source packets stored in a base-view data block (hereinafter, SP1) and source packets stored in a dependent-view data block (hereinafter, SP2). As shown in FIG. 27, the rectangles 2710 and 2720 respectively represent SP1 #p (p=0, 1, . . . , k, k+1, . . . , i, i+1) and SP2 #q (q=0, 1, . . . , m, m+1, . . . , j, j+1). Here, the letters k, i, m, and j each denote an integer greater than or equal to 0. These rectangles 2710 and 2720 are arranged in order along the time axis by the ATS of each source packet. Each of the positions A1($p$) and A2($q$) of the top of the rectangles 2710 and 2720 represents the value of the ATS of the source packet. The lengths AT1 and AT2 of the rectangles 2710 and 2720 each represent the amount of time needed for the 3D playback device to transfer one source packet from the read buffer to the system target decoder.

SP1 transferred from the read buffer to the system target decoder during the time from the ATS A1(0) of SP1 #0 until the extent ATC time $T_{EXT}[n]$ has elapsed, SP1 #0, 1, ... k, are stored in the $(n+1)^{th}$ base-view data block EXT1[$n$] in one base-view data block. Similarly, SP1 transferred from the read buffer to the system target decoder during the time from the ATS A1($k$+1) of SP1 #($k$+1) until the extent ATC time $T_{EXT}[n+1]$ has elapsed, i.e., SP1 #($k$+1), i, are stored in the $(n+2)^{th}$ base-view data block EXT1[n+1].

On the other hand, SP2 to be stored in the $(n+1)^{th}$ dependent-view data block EXT2[$n$] is selected as follows. First, the extent ATC time $T_{EXT}[n]$ is added to the ATS A1(0) of SP1 #0. That is, ATS of SP1 #($k$+1), A1($k$+1)=A1(0)+$T_{EXT}[n]$, is sought. Next, SP2 #0, 1, ... , m, are selected. Transfer of each of these SP2 from the read buffer to the system target decoder begins during the period from ATS A1(0) of SP1 #0 until ATS A1($k$+1) of SP1 #($k$+1). Accordingly, the top SP2, i.e., ATS A2(0) of SP2 #0, is always equal to or greater than the top SP1, i.e., ATS A1(0) of SP1 #0: A2(0)≧A1(0). Furthermore, the ATS of the last SP2, i.e., ATS A2($m$) of SP2 #m, is less than ATS A1($k$+1) of SP1 #($k$+1): A2($m$)≦A1($k$+1). In this context, completion of transfer of SP2 #m may be at or after ATS A1 ($k$+1) of SP1 #($k$+1).

Similarly, SP2 to be stored in the $(n+2)^{th}$ dependent-view data block EXT2[n+1] is selected as follows. First, ATS A1($i$+1)=A1($k$+1)+$T_{EXT}[n+1]$ is sought as the ATS of SP1 #($i$+1) located at the top of the $(n+3)^{th}$ base-view data block EXT1 [n+2]. Next, SP2 #(m+1)–SP2 #j are selected. Transfer of each of these SP2 from the read buffer to the system target decoder begins during the period from ATS A1 ($k$+1) of SP1 #($k$+1) until ATS A1 ($i$+1) of SP1 #($i$+1). Accordingly, the top SP2, i.e., ATS A2($m$+1) of SP2 #(m+1), is always equal to or greater than the top SP1, i.e., ATS A1($k$+1) of SP1 #($k$+1): A2($m$+1)≧A1($k$+1). Furthermore, the ATS A2($j$) of the last SP2#j is equal to or less than ATS A1($i$+1) of SP1 #($i$+1) located at the top of the next base-view data block EXT1[n+2]: A2($j$)≦A1($i$+1).

[Significance of Placing Smaller-Data-Amount Data Blocks First]

When reading a data block located at the top or at the playback start position of each extent block, the playback device 102 in 3D playback mode first reads the entirety of the data block into the read buffer. The data block is not transferred to the system target decoder during that period. After finishing reading the data block, the playback device 102 transfers the data block to the system target decoder in parallel with the next data block. The above processing of reading the entirety of a data block into the read buffer and then transferring the data block to the system target decoder is called "preloading".

The technical significance of preloading is as follows. First, in L/R mode, base-view data blocks are necessary for decoding the dependent-view data blocks. Therefore, to maintain the buffer at the minimum necessary capacity for storing the decoded data until output processing, it is preferable to simultaneously provide the data blocks to the system target decoder to be decoded. In depth mode, processing is necessary to generate a pair of video planes representing parallax images from a pair of a decoded base-view picture and a decoded depth map. Accordingly, to maintain the buffer at the minimum necessary capacity for storing the decoded data until this processing, it is preferable to provide the base-view data blocks simultaneously with the depth map data blocks to the system target decoder to be decoded. Therefore, preloading causes the entirety of the data block at the top of an extent block or at the playback start position to be read into the read buffer in advance. This enables the data block and the following data block to be transferred simultaneously from the read buffer to the system target decoder and decoded. Furthermore, the subsequent extent pairs can also be simultaneously decoded by the system target decoder.

When preloading, the entirety of the data block that is read first is stored in the read buffer. Accordingly, the read buffer requires at least a capacity equal to the size of the data block. To maintain the capacity of the read buffer at a minimum, the size of the data block to be preloaded should be as small as possible. Meanwhile, in random access, such as interrupt playback, any extent pair may be selected as the playback start position. Therefore, in any extent pair, the data block having a smaller data amount is placed before the other data block. This enables the minimum capacity to be maintained in the read buffer.

<<Cross-Linking of AV Stream Files to Data Blocks>>

For the data block group shown in FIG. 25, the AV stream files are cross-linked as follows. The file entry 2540 of the first file SS (01000.ssif) 1245 considers each extent block 2501-2503 to each be one extent, indicating the size of each and the LBN of the top thereof. Accordingly, the extent blocks 2501-2503 can be accessed as the extents EXTSS[0], EXTSS[1], and EXTSS[2] of the first file SS1245. Hereinafter, the extents EXTSS[0], EXTSS[1], and EXTSS[2] belonging to the first file SS 1245 are referred to as the "extents SS". Each of the extents SS EXTSS[0], EXTSS[1], and EXTSS[2] share the base-view data blocks B[n] with the file 2D 1241 and share the right-view data blocks D[n] with the first file DEP 1242.

<<Playback Path for Extent Block Group>>

Figure 28:
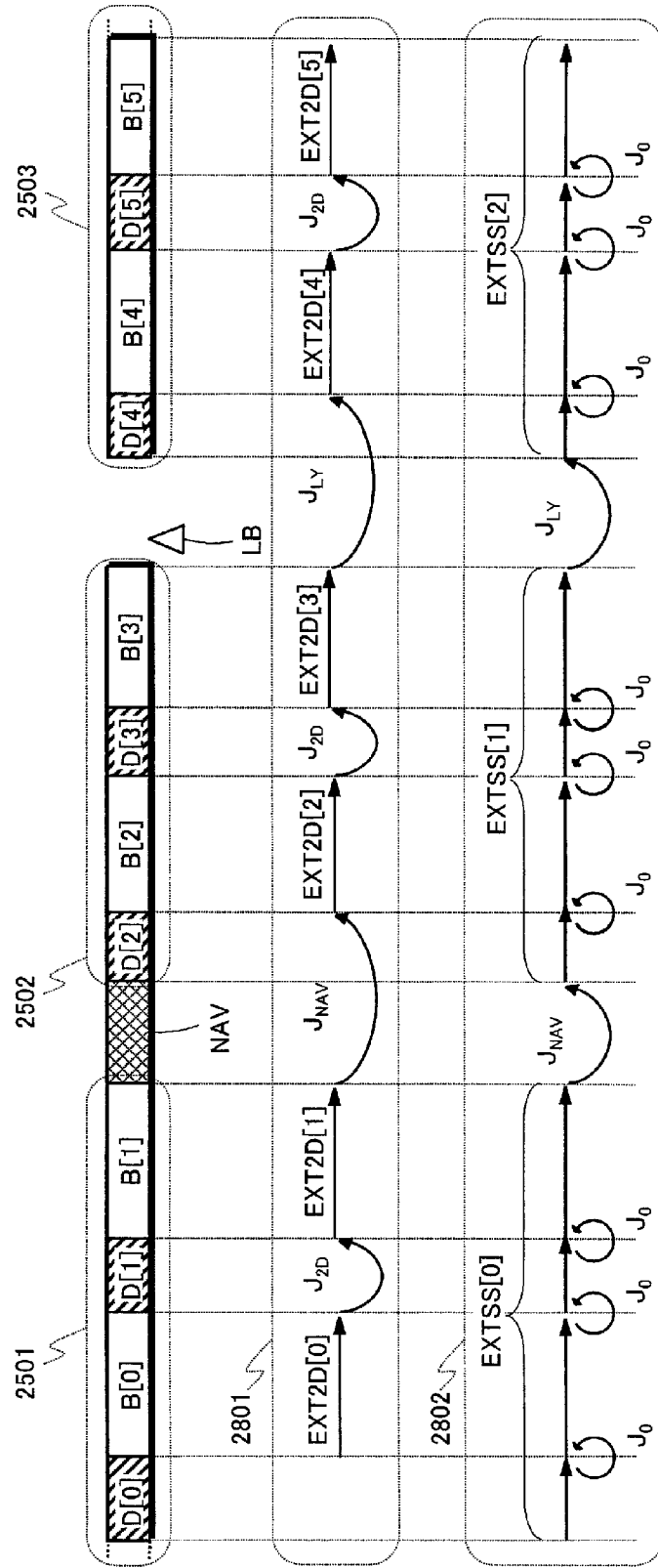
FIG. 28 is a schematic diagram showing a playback path 2801 in 2D playback mode for an extent block group 2501-2503 and a playback path 2802 in 3D playback mode for the extent block group 2501-2503.

FIG. 28 is a schematic diagram showing a playback path 2801 in 2D playback mode for an extent block group 2501-2503. The playback device 102 in 2D playback mode plays back the file 2D 1241. Accordingly, as indicated by the playback path 2801 in 2D playback mode, the base-view data blocks B[n] (n=0, 1, 2, ... ) are read in order from the extent blocks 2501-2503 each as a 2D extent EXT2D[n]. Specifically, first, the top base-view data block B[0] is read from the top extent block 2501, then reading of the immediately subsequent right-view data block D[0] is skipped by a first jump $J_{2D}$. Next, the second base-view data block B[1] is read, and then reading of the immediately subsequent data NAV and right-view data block D[1] is skipped by a second jump $J_{NAV}$. Subsequently, reading of the base-view data blocks and jumps are repeated similarly in the second and subsequent extent blocks 2502 and 2503.

A jump $J_{LY}$ occurring between the second extent block 2502 and the third extent block 2503 is a long jump across the layer boundary LB. The term "long jump" is a collective term for jumps with a long seek time and specifically refers to (i) a jump caused by switching recording layers and (ii) a jump with a distance that exceeds a predetermined threshold value. "Jump distance" refers to the length of the area on the BD-ROM disc 101 whose reading is skipped during a jump period. Jump distance is normally expressed as the number of sectors of the corresponding section. The threshold value mentioned regarding the long jump (ii) above is specified, for example, as 40000 sectors in the BD-ROM standard. This threshold value, however, depends on the type of BD-ROM disc and on the BD-ROM drive's read processing capability. In particular, long jumps include focus jumps and track jumps. A "focus jump" is a jump caused by switching recording layers, and includes processing to change the focus distance of the optical pickup. A "track jump" includes processing to move the optical pickup in a radial direction along the BD-ROM disc 101.

FIG. 28 is a schematic diagram showing a playback path 2802 in L/R mode for the extent block group 2501-2503. The playback device 102 in L/R mode plays back the first file SS 1245. Accordingly, as indicated by the playback path 2802 in L/R mode, the extent blocks 2501, 2502, and 2503 are read in order as the extents SS EXTSS[0], EXTSS[1], and EXTSS [2]. Specifically, the data blocks D[0], B[0], D[1] and B[1] are first sequentially read from the top extent block 2501, then reading of the immediately subsequent data NAV is skipped by a first jump $J_{NAV}$. Next, the data blocks D[2], ..., B[3] are sequentially read from the second extent block 2502. Immediately thereafter, a long jump $J_{LY}$ occurs at the same time as switching the recording layer. Next, the data blocks D[4], B[4], ... are sequentially read from the third extent block 2503.

When reading the extent blocks 2501-2503 as extents of the first file SS 1245, the playback device 102 reads the top LBN of each of the extents SS EXTSS[0], EXTSS[1], ... and the size thereof, from the file entry 2540 in the first file SS 1245 and then outputs the LBNs and sizes to the BD-ROM drive 121. The BD-ROM drive 121 continuously reads data having the input size from the input LBN. In such processing, control of the BD-ROM drive 121 is easier than processing to read the data block groups as the extents in the first file DEP 1242 and the file 2D 1241 for the following reasons (A) and (B): (A) the playback device 102 may refer in order to extents using a file entry in one location, and (B) since the total number of extents to be read substantially halves, the total number of pairs of an LBN and a size that need to be output to the BD-ROM drive 121 halves. However, after the playback device 102 has read the extents SS EXTSS[0], EXTSS [1], ..., it needs to separate each into a right-view data block and a base-view data block and output them to the decoder. The clip information file is used for this separation processing. Details are provided below.

As shown in FIG. 28, when actually reading the extent blocks 2501-2503, the BD-ROM drive 121 performs a zero sector transition $J_0$ in the time from the end of a data block to the top of the next data block. A "zero sector transition" is a movement of the optical pickup between two consecutive data blocks. During a period in which a zero sector transition is performed (hereinafter referred to as a "zero sector transition period"), the optical pickup temporarily suspends its read operation and waits. In this sense, the zero sector transition is considered "a jump in which the jump distance is equal to 0 sectors". The length of the zero sector transition period, that is, the zero sector transition time period, may include, in addition to the time for shifting the position of the optical pickup via revolution of the BD-ROM disc 101, overhead caused by error correction processing. "Overhead caused by error correction processing" refers to excess time caused by performing error correction processing twice using an ECC block when the boundary between ECC blocks does not match the boundary between two data blocks. A whole ECC block is necessary for error correction processing. Accordingly, when two consecutive data blocks share a single ECC block, the whole ECC block is read and used for error correction processing during reading of either data block. As a result, each time one of these data blocks is read, a maximum of 32 sectors of excess data is additionally read. The overhead caused by error correction processing is evaluated as the total time for reading the excess data: (32 sectors×2048 bytes/sector×8 bits/byte×2 instances)/(read rate bits/second). Note that each data block may be configured in ECC block units. In that case, the size of each data block is equal to an integral multiple of ECC blocks, and therefore the overhead caused by error correction processing may be removed from the zero sector transition time.

<<Data Block Size>>

Each data block is configured in aligned units. In particular, the size of each data block is equal to a multiple of the size of an aligned unit (=6144 bytes=approximately 6 KB). In that case, a boundary between data blocks coincides with a boundary between sectors, so that BD-ROM drive is ensured to read any data blocks reliably and contiguously without causing fragmentation.

As shown in FIG. 25, to ensure seamless playback of both 2D video images and 3D video images from these extent blocks 2501-2503, the sizes of each data block and each extent block 2501-2503 should meet the following conditions [1] and [2].

[1] Condition in 2D Playback Mode

Figure 29:
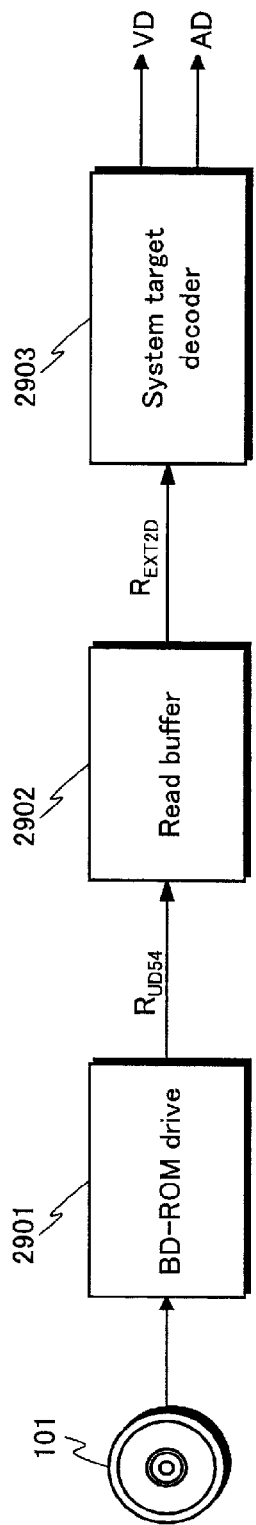
FIG. 29 is a block diagram showing playback processing in the playback device 102 in 2D playback mode.

FIG. 29 is a block diagram showing the playback processing system in the playback device 102 in 2D playback mode. As shown in FIG. 29, this playback processing system includes a BD-ROM drive 2901, read buffer 2902, and system target decoder 2903. The BD-ROM drive 2901 reads 2D extents from the BD-ROM disc 101 and transfers the 2D extents to the read buffer 2902 at a read rate $R_{UD54}$. The read buffer 2902 is a buffer memory provided within the playback device 102 and receives 2D extents from the BD-ROM drive 2901 and stores the received extents therein. The system target decoder 2903 reads source packets from each 2D extent stored in the read buffer 2902 at a mean transfer rate $R_{EXT2D}$ and decodes the source packets into video data VD and audio data AD.

The mean transfer rate $R_{EXT2D}$ equals 192/188 times the mean rate of processing by the system target decoder 2903 to extract TS packets from each source packet buffered in the read buffer 2902. In this case, the coefficient 192/188 is the ratio of bytes in a source packet to bytes in a TS packet. The mean transfer rate $R_{EXT2D}$ is conventionally represented in bits/second and specifically equals the value of the size of a 2D extent expressed in bits divided by the extent ATC time. The "size of an extent expressed in bits" is the number of source packets in the extent multiplied by the number of bits per source packet (=192 bytes×8 bits/byte). In general, this mean transfer rate $R_{EXT2D}$ is different for each 2D extent. The maximum value $R_{MAX2D}$ of the mean transfer rate $R_{EXT2D}$ equals 192/188 times the system rate RTS for the file 2D. The "system rate" refers to the maximum rate of processing by the system target decoder 2903 to process TS packets. The system rate RTS is generally expressed in bits/second (bps) and thus equal to eight times the main TS recording rate, which is generally expressed in bytes/second (Bps).

The mean transfer rate $R_{EXT2D}$ is evaluated as follows. First, the extent ATC time is calculated in the following manner. In the example shown in FIG. 27, the extent ATC time $T_{EXT}[n]$ of the $(n+1)^{th}$ base-view data block EXT1[$n$] is represented by the following equation, which uses the difference between the ATS A1(0) of the SP1 #0 and the ATS A1($k$+1) of the SP1 #($k$+1) located at the top of the $(n+2)^{th}$ base-view data block EXT1[n+1]: $T_{EXT}[n]=(A1(k+1)-A1(0)+WA)/T_{ATC}$. Note that the wraparound value WA represents the sum of the count values each truncated when wraparound occurs during the period when the ATC is counted from the ATS A1(0) of SP1#0 to the ATS A1($k$+1) of SP1#($k$+1). That is, the wraparound value WA is equal to the number of wraparound during the period multiplied by the count value held when wraparound occurs. For example, in the case where the ATC is counted by a 30-bit counter, the wraparound value WA is equal to 230. On the other hand, the constant $T_{ATC}$ represents the ATC cycle and equals to 27 MHz, for example: $T_{ATC}$=27× 106. Next, the size of a 2D extent is calculated in the following manner. In the example shown in FIG. 27, the size $S_{EXT1}$[n] of the (n+1)$^{th}$ base-view data block EXT1[$n$] is equal to the data amount of all the source packets stored in the data block, i.e. SP1 #0, 1 . . . k, and therefore is equal to 192×(k+1)×8 bits. Finally, the size $S_{EXT1}$[n] of the base-view data block EXT1[$n$] divided by the extent ATC time $T_{EXT}$[n] is evaluated as the mean transfer rate $R_{EXT2D}$[n]: $R_{EXT2D}$[n]= $S_{EXT1}$[n]/$T_{EXT}$[n].

In order to ensure accurate calculation of the extent ATC time in the above evaluation, the size of each 2D extent may be equal to a specific multiple of a source packet length. Furthermore, when a 2D extent includes a greater number of source packets than the specific multiple, the extent ATC time of the 2D extent may be calculated in the following manner. First, the specific multiple is subtracted from the total number of source packets, and then the resulting difference is multiplied by the transfer time of one source packet (=188×8/system rate). Next, the extent ATC time corresponding to the specific multiple is added to the product calculated above. Finally, the sum is determined as the extent ATC time of the 2D extent of the interest.

Alternatively, the extent ATC time may be calculated in the following manner. First, for one 2D extent, the time interval from the ATS of the top source packet to the ATS of the last source packet is obtained. Then, the transfer time per source packet is added to the time interval. Finally, the sum is determined as the extent ATC time of the 2D extent of the interest. Specifically, in the example shown in FIG. 27, the extent ATC time $T_{EXT}$[n] of the (n+1)$^{th}$ base-view data block EXT1[$n$] is represented by the following equation, which uses the difference between the ATS A1(0) of the SP1 #0 and the ATS A1(k) of the SP1 #k located at the end of that data block EXT1[$n$]: $T_{EXT}$[n]=(A1(k)−A1(0)+WA)/$T_{ATC}$+188×8/$R_{TS1}$. Note that the wraparound value WA represents the sum of the count values each truncated when wraparound occurs while the ATC is counted from the ATS A1(0) of SP1 #0 to the ATS A1(k) of SP1 #k. On the other hand, the second term in the right-hand side of the above equation is the length of a TS packet (=188 byte×8 bits/byte) divided by the system rate $R_{TS1}$ and is equal to the time required to transfer one TS packet from the read buffer to the system target decoder. The above calculation of extent ATC time does not require reference to the next extent and therefore the extent ATC time can be calculated even when there is no next extent. In addition, when there is a next extent, the calculation of extent ATC time is simplified.

The read rate $R_{UD54}$ is conventionally expressed in bits/second and is set at a higher value, e.g. 54 Mbps, than the maximum value $R_{MAX2D}$ of the mean transfer rate $R_{EXT2D}$: $R_{UD54}$>$R_{MAX2D}$. This prevents underflow in the read buffer 2902 due to decoding processing by the system target decoder 2903 while the BD-ROM drive 2901 is reading a 2D extent from the BD-ROM disc 101.

Figures 30A, 30B:
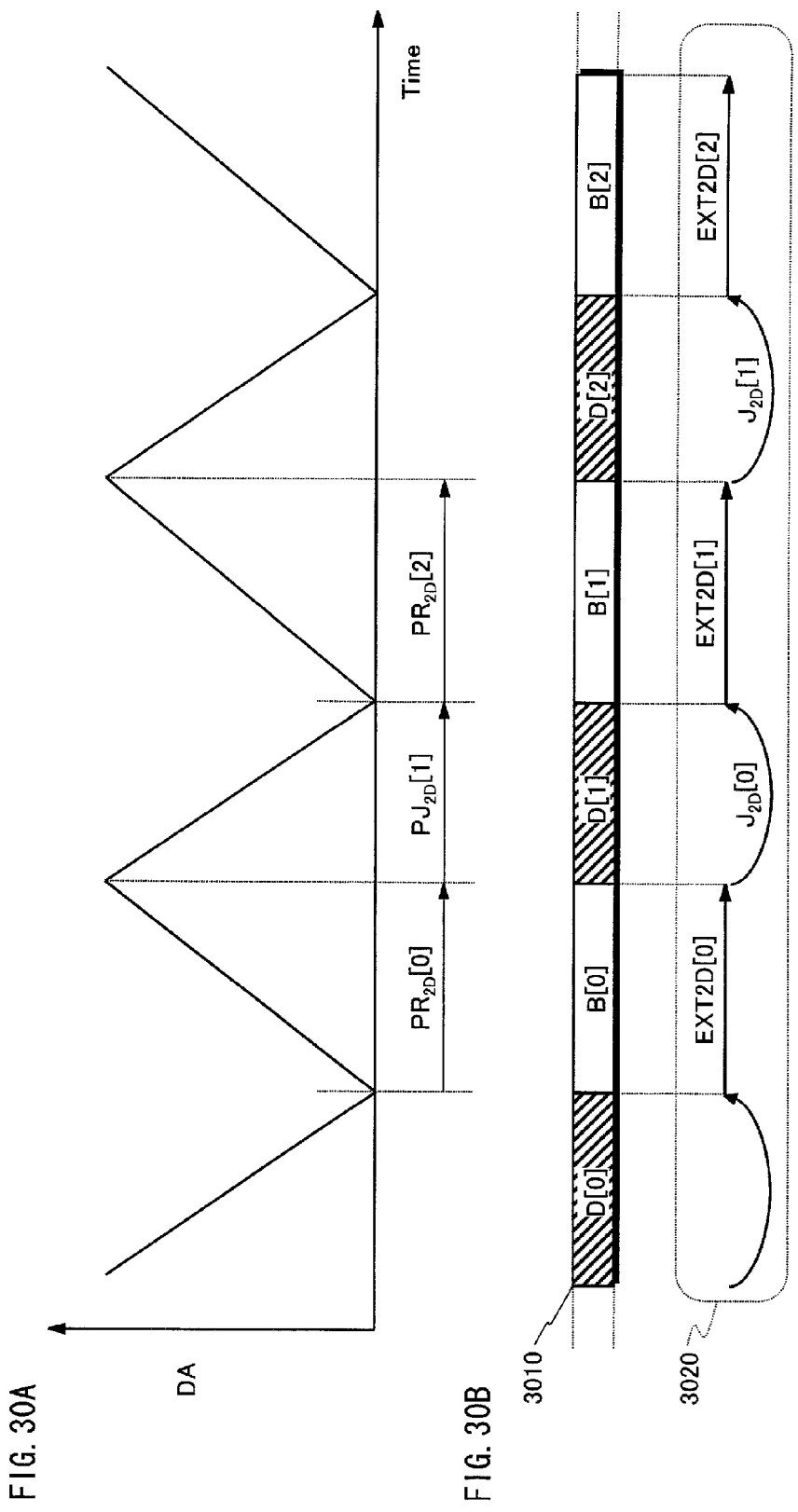
FIG. 30A is a graph showing changes in a data amount DA stored in a read buffer 2902 shown in FIG. 29, during operation in 2D playback mode.
FIG. 30B is a schematic diagram showing a correspondence between an extent block 3010 for playback and a playback path 3020 in 2D playback mode.

FIG. 30A is a graph showing the change in the data amount DA stored in the read buffer 2902 during operation in 2D playback mode. FIG. 30B is a schematic diagram showing the correspondence between an extent block 3010 for playback and a playback path 3020 in 2D playback mode. As shown in FIG. 30B, in accordance with the playback path 3020, the base-view data blocks Bn (n=0, 1, 2, . . . ) in the extent block 3010 are each read as one 2D extent EXT2D[n] from the BD-ROM disc 101 into the read buffer 2902. As shown in FIG. 30A, during the read period PR$_{2D}$[n] for each 2D extent EXT2D[n], the stored data amount DA increases at a rate equal to $R_{UD54}$−$R_{EXT2D}$[n], the difference between the read rate $R_{UD54}$ and the mean transfer rate $R_{EXT2D}$[n]. A jump J$_{2D}$[n], however, occurs between two contiguous 2D extents EXT2D[n−1] and EXT2D[n]. Since the reading of two contiguous dependent-view data blocks Dn is skipped during the corresponding jump period PJ$_{2D}$[n], reading of data from the BD-ROM disc 101 is interrupted. Accordingly, the stored data amount DA decreases at a mean transfer rate $R_{EXT2D}$[n] during each jump period PJ$_{2D}$[n].

Reading and transfer operations by the BD-ROM drive 2901 are not actually performed continuously, as suggested by the graph in FIG. 30A, but rather intermittently. During the read period PR$_{2D}$[n] for each 2D extent, this prevents the stored data amount DA from exceeding the capacity of the read buffer 2902, i.e. overflow in the read buffer 2902. Accordingly, the graph in FIG. 30A represents what is actually a step-wise increase or decrease as an approximated straight increase or decrease.

In order to play back 2D video images seamlessly from the extent block 3010 shown in FIG. 30B, the following conditions should be met. First, the size $S_{EXT2D}$[n] of each 2D extent EXT2D[n] should be equal to or greater than a predetermined lower limit. This lower limit is referred to as the "minimum extent size". Next, the distance between 2D extents should be equal to or greater than predetermined upper limit.

[1-1] Minimum Extent Size of 2D Extent

While data is continuously provided from the read buffer 2902 to the system target decoder 2903 during each jump period PJ$_{2D}$[n], continual output from the system target decoder 2903 needs to be ensured. To do so, the size of a 2D extent should meet the following condition 1.

The size $S_{EXT2D}$[n] of each 2D extent EXT2D[n] is the same as the data amount transferred from the read buffer 2902 to the system target decoder 2903 from the read period PR$_{2D}$[n] through the next jump period PJ$_{2D}$[n+1]. If this is the case, then as shown in FIG. 30A, the stored data amount DA at the end of the jump period PJ$_{2D}$[n+1] does not fall below the value at the start of the read period PR$_{2D}$[n]. In other words, during each jump period PJ$_{2D}$[n], data is continuously provided from the read buffer 2902 to the system target decoder 2903. In particular, underflow does not occur in the read buffer 2902. In this case, the length of the read period PR$_{2D}$[n] equals $S_{EXT2D}$[n]/$R_{UD54}$, the value obtained by dividing the size $S_{EXT2D}$[n] of a 2D extent EXT2D[n] by the read rate $R_{UD54}$. That is, the condition 1 indicates the following. The minimum extent size of each 2D extent EXT2D[n] is expressed in the right-hand side of Expression 1.

[Expression 1]

$$S_{EXT2D}[n] \geq \left( \frac{S_{EXT2D}[n]}{R_{UD54}} + T_{JUMP-2D}[n] \right) \times R_{EXT2D}[n] \qquad (1)$$

$$\therefore S_{EXT2D}[n] \geq \text{CEIL}\left( \frac{R_{EXT2D}[n]}{8} \times \frac{R_{UD54}}{R_{UD54} - R_{EXT2D}[n]} \times T_{JUMP-2D}[n] \right)$$

In Expression 1, the jump time $T_{JUMP-2D}$[n] represents the length of the jump period PJ$_{2D}$[n] in seconds. The read rate $R_{UD54}$ and the mean transfer rate $R_{EXT2D}$ are both expressed in bits per second. Accordingly, in Expression 1, the mean transfer rate $R_{EXT2D}$ is divided by "8" to convert the size $S_{EXT2D}$[n] of the 2D extent from bits to bytes. That is, the size $S_{EXT2D}$[n] of the 2D extent is expressed in bytes. The function CEIL( ) is an operation to round up fractional numbers after the decimal point of the value in parentheses.

[1-2] Distance Between 2D Extents

Since the capacity of the read buffer 2902 is limited, the maximum value of the jump period $T_{JUMP\text{-}2D}[n]$ is limited. In other words, even if the stored data amount DA immediately before a jump period $PJ_{2D}[n]$ is the maximum capacity of the read buffer 2902, if the jump time $T_{JUMP\text{-}2D}[n]$ is too long, the stored data amount DA will reach zero during the jump period $PJ_{2D}[n]$, and there is a danger of underflow occurring in the read buffer 2902. Hereinafter, the time for the stored data amount DA to decrease from the maximum capacity of the read buffer 2902 to zero while data supply from the BD-ROM disc 101 to the read buffer 2902 has stopped, that is, the maximum value of the jump time $T_{JUMP\text{-}2D}$ that guarantees seamless playback, is referred to as the "maximum jump time $T_{JUMP\_MAX}$".

In standards of optical discs, the correspondence between jump distances and maximum jump times is determined from the access speed of the optical disc drive and other factors. FIG. 31 is an example of a correspondence table between jump distances $S_{JUMP}$ and maximum jump times $T_{JUMP\_MAX}$ for a BD-ROM disc. As shown in FIG. 31, jump distances $S_{JUMP}$ are represented in units of sectors, and maximum jump times $T_{JUMP\_MAX}$ are represented in milliseconds. One sector equals 2048 bytes. When a jump distance $S_{JUMP}$ is zero sectors or is within a range of 1-10000 sectors, 10001-20000 sectors, 20001-40000 sectors, 40001 sectors-1/10 of a stroke, and 1/10 of a stroke or greater, the corresponding maximum jump time $T_{JUMP\_MAX}$ is 0 ms, 200 ms, 300 ms, 350 ms, 700 ms, and 1400 ms, respectively. When the jump distance $S_{JUMP}$ equals zero sectors, the maximum jump time $T_{JUMP\_MAX}$ equals a zero sector transition time $T_{JUMP0}$. In the example in FIG. 31, the zero sector transition time $T_{JUMP0}$ is considered to be zero milliseconds.

Based on the above considerations, the jump time $T_{JUMP\text{-}2D}[n]$ to be substituted into Expression 1 is the maximum jump time $T_{JUMP\_MAX}$ specified for each jump distance by BD-ROM disc standards. Specifically, in the table of FIG. 31, the maximum jump time $T_{JUMP\_MAX}$ corresponding to the jump distance $S_{JUMP}$ between the contiguous 2D extents EXT2D[n] and EXT2D[n+1] is substituted into Expression 1 as the jump time $T_{JUMP\text{-}2D}[n]$. This jump distance $S_{JUMP}$ equals the number of sectors from the end of the $(n+1)^{th}$ 2D extent EXT2D[n] to the top of the $(n+2)^{th}$ 2D extent EXT2D[n+1].

Since the jump time $T_{JUMP\text{-}2D}[n]$ for the jump J2D[n] between two 2D extents EXT2D[n] and EXT2D[n+1] is limited to the maximum jump time $T_{JUMP\_MAX}$, the jump distance $S_{JUMP}$, i.e. the distance between the two 2D extents EXT2D[n] and EXT2D[n+1], is also limited. For example, when the jump time $T_{JUMP\text{-}2D}[n]$ is limited to the maximum jump time $T_{JUMP\_MAX}=700$ ms or less, the jump distance $S_{JUMP}$ between 2D extents EXT2D[n] and EXT2D[n+1] is permitted to be 1/10 of a stroke (=about 1.2 GB) at maximum. When the jump time $T_{JUMP}$ equals a maximum jump time $T_{JUMP\_MAX}$, the jump distance $S_{JUMP}$ reaches a maximum value, referred to as the "maximum jump distance $S_{JUMP\_MAX}$". For seamless playback of 2D video images, the distance between 2D extents needs to be equal to or less than the maximum jump distance $S_{JUMP\_MAX}$.

Within each extent block, the distance between 2D extents equals the size of a dependent-view data block. Accordingly, the size of the dependent-view data block is limited to the maximum jump distance $S_{JUMP\_MAX}$ or less. Specifically, when the maximum jump time $T_{JUMP\_MAX}$ between 2D extents is limited to the minimum value 200 ms specified in FIG. 31, then the size of a dependent-view data block is limited to the corresponding maximum jump distance $S_{JUMP\_MAX}=10000$ sectors (=about 19.5 MB) or less.

When seamlessly playing back two extent blocks arranged on different recording layers, a long jump occurs from the end of the earlier extent block to the top of the later extent block. This long jump is caused by an operation, such as a focus jump, to switch the recording layer. Accordingly, in addition to the maximum jump time $T_{JUMP\_MAX}$ specified in the table in FIG. 31, the time required for this long jump further includes a "layer switching time", which is the time necessary for an operation to switch the recording layer. This "layer switching time" is, for example, 350 ms. Note that the $(n+1)^{th}$ 2D extent EXT2D[n] is located at the end of the extent block to be read earlier, and the $(n+2)^{th}$ 2D extent EXT2D[n+1] is located at the top of the extent block to be read later. As a result, in Expression 1, which the size of the $(n+1)^{th}$ 2D extent EXT2D[n] should satisfy, the jump time $T_{JUMP\text{-}2D}[n]$ is determined by the sum of two parameters TJ[n] and TL[n]: $T_{JUMP\text{-}2D}[n]=TJ[n]+TL[n]$. The first parameter TJ[n] represents the maximum jump time $T_{JUMP\_MAX}$ specified for the jump distance $S_{JUMP}$ of the long jump according to BD-ROM disc standards. This maximum jump time $T_{JUMP\_MAX}$ equals the value, in the table in FIG. 31, corresponding to the number of sectors from the end of the $(n+1)^{th}$ 2D extent EXT2D[n] to the top of the $(n+2)^{th}$ 2D extent EXT2D[n+1]. The second parameter TL[n] represents the layer switching time, for example 350 ms. Accordingly, the distance between two 2D extents EXT2D[n] and EXT2D[n+1] is limited to being equal to or less than the maximum jump distance $S_{JUMP\_MAX}$ corresponding, in the table in FIG. 31, to the maximum jump time $T_{JUMP\_MAX}$ of the long jump minus the layer switching time. For example, when the jump time $T_{JUMP\text{-}2D}[n]$ is limited to the maximum jump time $T_{JUMP\_MAX}=700$ ms or less, the maximum jump distance $S_{JUMP\_MAX}$ between 2D extents EXT2D[n] and EXT2D[n+1] is 40000 sectors (=about 78.1 MB).

[2] Condition in 3D Playback Mode

FIG. 32 is a block diagram showing the playback processing system in the playback device 102 in 3D playback mode. As shown in FIG. 32, this playback processing system includes a BD-ROM drive 3201, switch 3202, a pair of read buffers 3211 and 3212, and system target decoder 3203. The BD-ROM drive 3201 reads extents SS from the BD-ROM disc 101 and transfers the extents SS to the switch 3202 at a read rate $R_{UD72}$. The switch 3202 separates extents SS into base-view data blocks and dependent-view data blocks. Details of the separation processing are provided below. The first read buffer 3011 and the second read buffer 3212 (hereinafter, abbreviated as RB1 and RB2, respectively) are each a buffer memory in the playback device 102 and stores data blocks separated by the switch 3202. The RB1 3211 stores base-view data blocks, whereas the RB2 3212 stores dependent-view data blocks. The system target decoder 3203 reads source packets from the base-view data blocks stored in the RB1 3211 at a base-view transfer rate $R_{EXT1}$ and reads source packets from the dependent-view data blocks stored in the RB2 3212 at a dependent-view transfer rate $R_{EXT2}$. The system target decoder 3203 also decodes pairs of read base-view data blocks and dependent-view data blocks into video data VD and audio data AD.

The base-view transfer rate $R_{EXT1}$ equals 192/188 times the mean rate of processing by the system target decoder 3203 to extract TS packets from each source packet buffered in the RB1 3211. The maximum value $R_{MAX1}$ of the base-view transfer rate $R_{EXT1}$ equals 192/188 times the system rate $R_{TS1}$ for the file 2D: $R_{MAX1}=R_{TS1}\times192/188$. The system rate $R_{TS1}$ is generally expressed in bits/second (bps) and thus equals to eight times the main TS recording rate, which is generally expressed in bytes/second (Bps). The dependent-view transfer rate $R_{EXT2}$ equals 192/188 times the mean rate of processing by the system target decoder 3203 to extract TS packets from each source packet buffered in the RB2 3212. The maximum value $R_{MAX2}$ of the dependent-view transfer rate $R_{EXT2}$ equals 192/188 times the system rate $R_{TS2}$ for the file DEP: $R_{MAX2}=R_{TS2}\times 192/188$. The system rate $R_{TS2}$ is generally expressed in bits/second (bps) and thus equals to eight times the main TS recording rate, which is generally expressed in bytes/second (Bps). The transfer rates $R_{EXT1}$ and $R_{EXT2}$ are conventionally represented in bits/second and specifically equal the value of the size of each data block expressed in bits divided by the extent ATC time. The extent ATC time equals the time required to transfer all of the source packets in the data block from the RB1 3211 or RB2 3212 to the system target decoder 3203. Similarly to the mean transfer rate for 2D extents $R_{EXT2D}$, the base-view transfer rate $R_{EXT1}$ and the dependent-view transfer rate $R_{EXT2}$ are each assessed as the ratio of the value of the data block size to the extent ATC time: $R_{EXT1}[\bullet]=S_{EXT1}[\bullet]/T_{EXT}[\bullet]$ and $R_{EXT2}[\bullet]=S_{EXT2}[\bullet]/T_{EXT}[\bullet]$.

The read rate $R_{UD72}$ is conventionally expressed in bits/second and is set at a higher value, e.g. 72 Mbps, than the maximum value $R_{MAX1}$ of the transfer rate $R_{EXT1}$, and the maximum value $R_{MAX2}$ of the transfer rate $R_{EXT2}$: $R_{UD72}>R_{MAX1}$ and $R_{UD72}>R_{MAX2}$. This prevents underflow in the RB1 3211 and RB2 3212 due to decoding processing by the system target decoder 3203 while the BD-ROM drive 3201 is reading an extent SS from the BD-ROM disc 101.

[2-1] Seamless Connection within Extent Block

FIGS. 33A and 33B are graphs showing changes in data amounts DA1 and DA2 stored in RB1 3211 and RB2 3212 when 3D video images are played back seamlessly from a single extent block. FIG. 33C is a schematic diagram showing a correspondence between the extent block 3310 and a playback path 3320 in 3D playback mode. As shown in FIG. 33C, in accordance with the playback path 3320, the entire extent block 3310 is read all at once as one extent SS. Subsequently, the switch 3202 separates the extent SS into dependent-view data blocks D[k] and base-view data blocks B[k] (k=n, n+1, n+2, ... ).

Reading and transfer operations by the BD-ROM drive 3201 are not actually performed continuously, as suggested by the graphs in FIGS. 33A and 33B, but rather intermittently. During the read periods $PR_D[k]$ and $PR_B[k]$ for the data blocks D[k], B[k], this prevents overflow in the RB1 3211 and RB2 3212. Accordingly, the graphs in FIGS. 33A and 33B represent what is actually a step-wise increase or decrease as an approximated straight increase or decrease.

As shown in FIGS. 33A and 33B, during the read period $PR_D[n]$ of the $(n+1)^{th}$ dependent-view data block D[n], the stored data amount DA2 in the RB2 3212 increases at a rate equal to $R_{UD72}-R_{EXT2}[n]$, which is the difference between the read rate $R_{UD72}$ and the dependent-view transfer rate $R_{EXT2}[n]$, whereas the stored data amount DA1 in the RB1 3211 decreases at the base-view transfer rate $R_{EXT1}[n-1]$. As shown in FIG. 33C, a zero sector transition $J_0[2n]$ occurs from the $(n+1)^{th}$ dependent-view data block D[n] to the $(n+1)^{th}$ base-view data block B[n]. As shown in FIGS. 33A and 33B, during the zero sector transition period $PJ_0[n]$, the stored data amount DA1 in the RB1 3211 continues to decrease at the base-view transfer rate $R_{EXT1}[n-1]$, whereas the stored data amount DA2 in the RB2 3212 decreases at the dependent-view transfer rate $R_{EXT2}[n]$.

As shown in FIGS. 33A and 33B, during the read period $PR_B[n]$ of the $(n+1)^{th}$ base-view data block B[n], the stored data amount DA1 in the RB1 3211 increases at a rate equal to $R_{UD72}-R_{EXT1}[n]$, which is the difference between the read rate $R_{UD72}$ and the base-view transfer rate $R_{EXT1}[n]$. On the other hand, the stored data amount DA2 in the RB2 3212 continues to decrease at the dependent-view transfer rate $R_{EXT2}[n]$. As further shown in FIG. 33C, a zero sector transition $J_0[2n+1]$ occurs from the base-view data block B[n] to the next dependent-view data block D[n+1]. As shown in FIGS. 33A and 33B, during the zero sector transition period $PJ_0[2n+1]$, the stored data amount DA1 in the RB1 3211 decreases at the base-view transfer rate $R_{EXT1}[n]$, and the stored data amount DA2 in the RB2 3212 continues to decrease at the dependent-view transfer rate $R_{EXT2}[n]$.

In order to play back 3D video images seamlessly from one extent block 3310, the size of each of the data blocks B[n] and D[n] belonging to that extent block should satisfy the following conditions [2] and [3].

The size $S_{EXT1}[n]$ of the $(n+1)^{th}$ base-view data block B[n] is at least equal to the data amount transferred from the RB1 3211 to the system target decoder 3203 during the time from the corresponding read period $PR_B[n]$ until immediately before the read period $PR_B[n+1]$ of the next base-view data block B[n+1]. In this case, as shown in FIG. 33A, immediately before the read period $PR_B[n+1]$ of the next base-view data block B[n+1], the stored data amount DA1 in the RB1 3211 does not fall below the amount immediately before the read period $PR_B[n]$ of the $(n+1)^{th}$ base-view data block B[n]. The length of the read period $PR_B[n]$ of the $(n+1)^{th}$ base-view data block B[n] equals $S_{EXT1}[n]/R_{UD72}$, which is the value obtained by dividing the size $S_{EXT1}[n]$ of this base-view data block B[n] by the read rate $R_{UD72}$. On the other hand, the length of the read period $PR_D[n+1]$ of the $(n+2)^{th}$ dependent-view data block D[n+1] equals $SEXT2[n+1]/R_{UD72}$, which is the value obtained by dividing the size SEXT2[n+1] of this dependent-view data block D[n+1] by the read rate $R_{UD72}$. That is, the condition 2 indicates the following. The minimum extent size of the base-view data block B[n] is expressed in the right-hand side of Expression 2.

[Expression 2]

$$S_{EXT1}[n] \geq \qquad (2)$$
$$\left(\frac{S_{EXT1}[n]}{R_{UD72}} + T_{JUMP0}[2n+1] + \frac{S_{EXT2}[n+1]}{R_{UD72}} + T_{JUMP0}[2n+2]\right) \times$$
$$R_{EXT1}[n]$$
$$\therefore S_{EXT1}[n] \geq \text{CEIL}\left\{\frac{R_{EXT1}[n]}{8} \times \frac{R_{UD72}}{R_{UD72}-R_{EXT1}[n]} \times \right.$$
$$\left.\left(T_{JUMP0}[2n+1] + 8 \times \frac{S_{EXT2}[n+1]}{R_{UD72}} + T_{JUMP0}[2n+2]\right)\right\}$$
$$S_{EXT1}[n] \geq \text{CEIL}\left(R_{EXT1}[n] \times \frac{S_{EXT2}[n+1]}{R_{UD72}-R_{EXT1}[n]}\right)$$
(where $T_{JUMP0}[k]=0$ is true)

The size $S_{EXT2}[n]$ of the $(n+1)^{th}$ dependent-view data block D[n] is at least equal to the data amount transferred from the RB2 3212 to the system target decoder 3203 during the time from the corresponding read period $PR_D[n]$ until immediately before the read period $PR_D[n+1]$ of the next dependent-view data block D[n+1]. In this case, as shown in FIG. 33B, immediately before the read period $PR_D[n+1]$ of the next dependent-view data block D[n+1], the stored data amount DA2 in the RB2 3212 does not fall below the amount immediately before the read period $PR_D[n]$ of the $(n+1)^{th}$ dependent-view data block D[n]. The length of the read period $PR_D[n]$ of the $(n+1)^{th}$ dependent-view data block D[n] equals $S_{EXT2}[n]/$ $R_{UD72}$, which is the value obtained by dividing the size $S_{EXT2}[n]$ of this dependent-view data block D[n] by the read rate $R_{UD72}$. That is, the condition 3 indicates the following. The minimum extent size of the dependent-view data block D[n] is expressed in the right-hand side of Expression 3.

[Expression 3]

$$S_{EXT2}[n] \geq \left(\frac{S_{EXT2}[n]}{R_{UD72}} + T_{JUMP0}[2n] + \frac{S_{EXT1}[n]}{R_{UD72}} + T_{JUMP0}[2n+1]\right) \times R_{EXT2}[n] \quad (3)$$

$$\therefore S_{EXT2}[n] \geq \text{CEIL}\left\{\frac{R_{EXT2}[n]}{8} \times \frac{R_{UD72}}{R_{UD72} - R_{EXT2}[n]} \times \left(T_{JUMP0}[2n] + 8 \times \frac{S_{EXT1}[n]}{R_{UD72}} + T_{JUMP0}[2n+1]\right)\right\}$$

$$S_{EXT2}[n] \geq \text{CEIL}\left(R_{EXT2}[n] \times \frac{S_{EXT1}[n]}{R_{UD72} - R_{EXT2}[n]}\right)$$

(where $T_{JUMP0}[k] = 0$ is true)

[2-2] Seamless Connection within Extent Block

As shown in FIG. 25, the extent blocks 2501-2503 are generally separated from each other by a layer boundary LB or a recording area NAV for other data. Such extent blocks separated in the above manner are seamlessly connected as long as a sufficient amount of data is ensured to be stored in each of the RB1 3211 and RB2 3212 during the time one extent block is read. In particular, unlike the graphs shown in FIGS. 33A and 33B, at the time immediately before the read periods $PR_B[n+1]$ and $PR_D[n+1]$ for the $(n+2)^{th}$ data blocks B[n+1] and D[n+1], the data amount DA1 in the RB1 3211 as well as the data amount DA2 in the RB2 3212 should remain slightly more than the data amount stored immediately before the read periods $PR_B[n]$ and $PR_D[n]$ for the $(n+1)^{th}$ data blocks B[n] and D[n]. This is realized, for example, by adjusting the size of each data block to be slightly larger than the minimum extent size given by the right-hand side of each of Expressions 2 and 3. With the above arrangement, the RB1 3211 and RB2 3212 are both ensured to store a sufficient amount of data at the time when the end of one extent block is read.

<<Clip Information File>>

Figure 34:
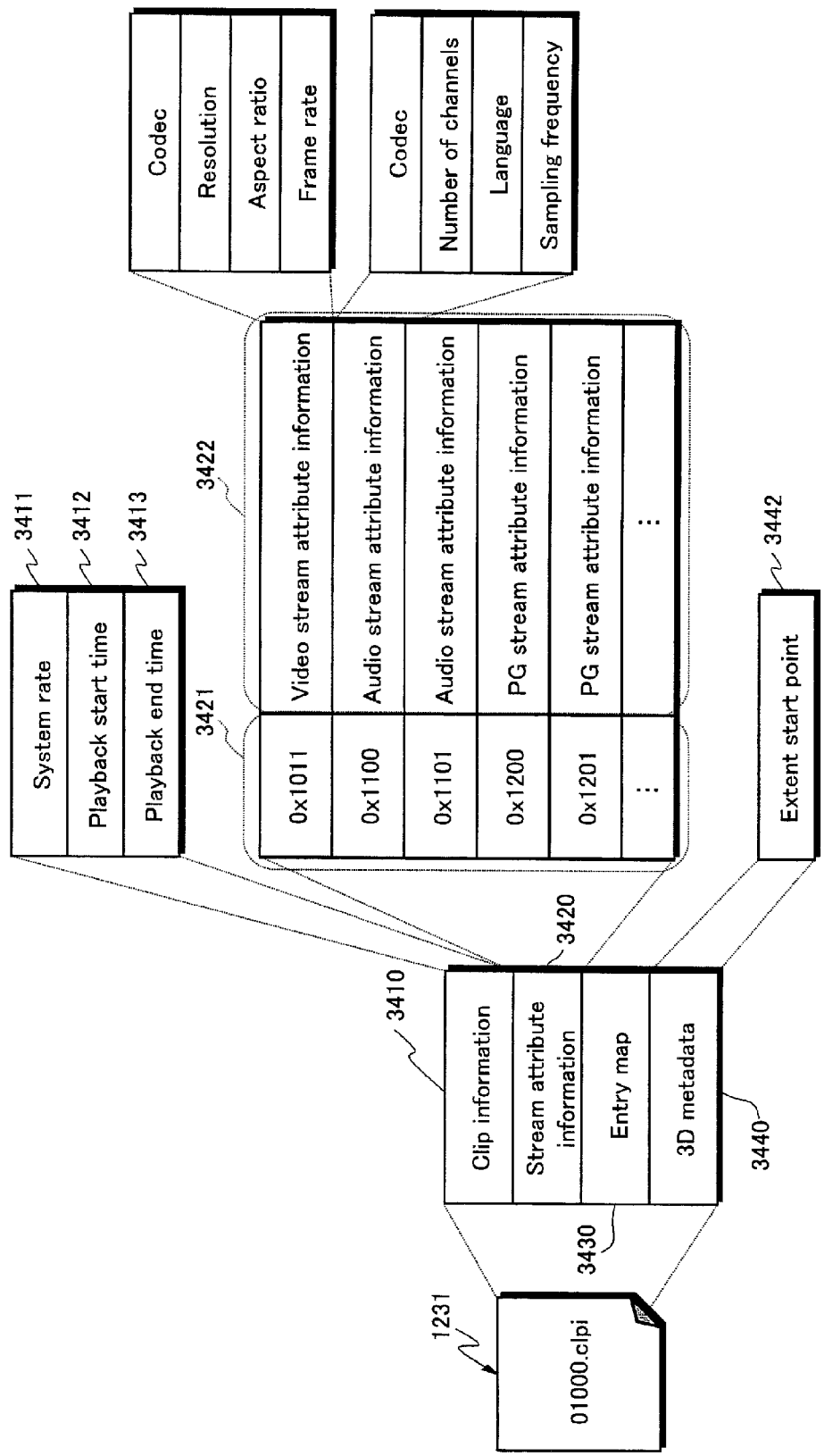
FIG. 34 is a schematic diagram showing a data structure of a first clip information file (01000.clpi) 1231 shown in FIG. 12.

FIG. 34 is a schematic diagram showing a data structure of a first clip information file (01000.clpi), i.e. the 2D clip information file 1231. Each of the dependent-view clip information files (02000.clip and 03000.clpi) 1232 and 1233 also has the same data structure. Below, the data structure common to all clip information files is described, first using the data structure of the 2D clip information file 1231 as an example. Afterwards, the differences in data structure between a 2D clip information file and a dependent-view clip information file are described.

As shown in FIG. 34, the 2D clip information file 1231 includes clip information 3410, stream attribute information 3420, an entry map 3430, and 3D metadata 3440. The 3D metadata 3440 includes extent start points 3442.

As shown in FIG. 34, the clip information 3410 includes a system rate 3411, a playback start time 3412, and a playback end time 3413. The system rate 3411 specifies a system rate $R_{TS}$ for the file 2D (01000.m2ts) 1241. As shown in FIG. 29, the playback device 102 in 2D playback mode transfers "TS packets" belonging to the file 2D 1241 from the read buffer 2902 to the system target decoder 2903. Therefore, the interval between ATSs of the source packets in the file 2D 1241 is set so that the transfer rate for TS packets is limited to the system rate $R_{TS}$ or lower. The playback start time 3412 indicates the PTS of the VAU located at the top of the file 2D 1241, e.g. the PTS of the top video frame. The playback end time 3412 indicates the value of the STC delayed a predetermined time from the PTS of the VAU located at the end of the file 2D 1241, e.g. the sum of the PTS of the last video frame and the playback time of one frame.

As shown in FIG. 34, the stream attribute information 3420 is a correspondence table between the PID 3421 for each elementary stream included in the file 2D 1241 and a corresponding piece of attribute information 3422. Each piece of attribute information 3422 is different for a video stream, audio stream, PG stream, and IG stream. For example, the attribute information corresponding to the PID 0x1011 for the primary video stream includes a codec type used for the compression of the video stream, as well as a resolution, aspect ratio, and frame rate for each picture constituting the video stream. On the other hand, the attribute information corresponding to the PID 0x1100 for the primary audio stream includes a codec type used for compressing the audio stream, the number of channels included in the audio stream, language, and sampling frequency. The playback device 102 uses this attribute information 3422 to initialize the decoder.

[Entry Map]

FIG. 35A is a schematic diagram showing a data structure of an entry map 3430. As shown in FIG. 35A, the entry map 3430 includes tables 3500. There is the same number of tables 3500 as there are video streams multiplexed into the main TS, and tables are assigned one-by-one to each video stream. In FIG. 35A, each table 3500 is distinguished by the PID of the video stream to which it is assigned. Each table 3500 includes an entry map header 3501 and an entry point 3502. The entry map header 3501 includes the PID corresponding to the table 3500 and the total number of entry points 3502 included in the table 3500. An entry point 3502 associates each pair of a PTS 3503 and source packet number (SPN) 3504 with one of individually differing entry points ID (EP_ID) 3505. The PTS 3503 is equivalent to the PTS for one of the I pictures included in the video stream for the PID indicated by the entry map header 3501. The SPN 3504 is equivalent to the SPN for the top of the source packet group stored in the corresponding I picture. The "SPN" is a serial number assigned in order from the top to the source packets belonging to one AV stream file. The SPN is used as the address for each source packet in the AV stream file. In the entry map 3430 in the 2D clip information file 1231, the SPN refers to the number assigned to the source packet group belonging to the file 2D 1241, i.e., the group of source packets carrying the main TS. Accordingly, the entry point 3502 expresses the correspondence between the PTS and the address, i.e. the SPN, of each I picture included in the file 2D 1241.

An entry point 3502 does not need to be set for all of the I pictures in the file 2D 1241. However, when an I picture is located at the top of a GOP, and the TS packet that includes the top of that I picture is located at the top of a 2D extent, an entry point 3502 has to be set for that I picture.

FIG. 35B is a schematic diagram showing source packets in a source packet group 3510 belonging to a file 2D 1241 that are associated with each EP_ID 3505 by the entry map 3430. FIG. 35C is a schematic diagram showing a data block group D[n], B[n] (n=0, 1, 2, 3, . . . ) on the BD-ROM disc 101 corresponding to the source packet group 3510. When playing back 2D video images from the file 2D 1241, the playback device 102 uses the entry map 3430 to specify, from the PTS of a specific frame representing an arbitrary scene, the SPN of the source packet that includes the specific frame. Specifically, when for example a PTS=360000 is indicated as the PTS for a specific entry point for the playback start position, the playback device 102 first retrieves the SPN=3200 allocated to this PTS in the entry map 3430. Next, the playback device 102 seeks the quotient SPN×192/2048, i.e. the value of the SPN multiplied by 192 bytes, the data amount per source packet, and divided by 2048 bytes, the data amount per sector. As can be understood from FIGS. 15C and 15D, the quotient is equal to the total number of sectors recorded in the main TS prior to the source packet to which the SPN is assigned. In the example shown in FIG. 35B, this quotient (3200×192/2048=300) is equal to the total number of sectors on which the source packets 3511 are recorded from SPN 0 through 3199. Next, the playback device 102 refers to the file entry in the file 2D 1241 and specifies the LBN of the (total number+1)$^{th}$ sector, counting from the top of the sector groups in which 2D extent groups are recorded. In the example shown in FIG. 35C, within the sector groups in which the base-view data blocks B[0], B[1], B[2], . . . which can be accessed as 2D extents EXT2D[0], EXT2D[1], EXT2D[2], . . . are recorded, the LBN of the 301$^{st}$ sector counting from the top is specified. The playback device 102 indicates this LBN to the BD-ROM drive. In this way, base-view data block groups are read as aligned units in order from the sector for this LBN. Furthermore, from the first aligned unit that is read in, the playback device 102 selects the source packet indicated by the entry point for the playback start position and then extracts and decodes an I picture. From then on, subsequent pictures are decoded in order referring to already decoded pictures. In this way, the playback device 102 can play back 2D video images from the file 2D 1241 from a specified PTS onwards.

Furthermore, the entry map 3430 is useful for efficient processing during trickplay such as fast forward, reverse, etc. For example, the playback device 102 in 2D playback mode first refers to the entry map 3430 to read SPNs starting at the playback start position, e.g. to read SPN=3200, 4800, . . . in order from the entry points EP_ID=2, 3, . . . that include PTSs starting at PTS=360000. Next, the playback device 102 refers to the file entry in the file 2D 1241 to specify the LBN of the sectors corresponding to each SPN. The playback device 102 then indicates each LBN to the BD-ROM drive. Aligned units are thus read from the sector for each LBN. Furthermore, from each aligned unit, the playback device 102 selects the source packet indicated by each entry point and then extracts and decodes an I picture. The playback device 102 can thus selectively play back an I picture from the file 2D 1241 without analyzing the 2D extent group EXT2D[n] itself.

[Extent Start Point]

FIG. 36A is a schematic diagram showing a data structure of extent start points 3442. As shown in FIG. 36A, an "extent start point (Extent_Start_Point)" 3442 includes base-view extent IDs (EXT1_ID) 3611 and SPNs 3612. The EXT1_IDs 3611 are serial numbers assigned consecutively from the top to the base-view data blocks belonging to the first file SS (01000.ssif) 1245. One SPN 3612 is assigned to each EXT1_ID 3611 and is the same as the SPN for the source packet located at the top of the base-view data block identified by the EXT1_ID 3611. This SPN is a serial number assigned from the top to the source packets included in the base-view data block group belonging to the first file SS 1245.

In the extent blocks 2501-2503 shown in FIG. 25, the file 2D 1241 and the first file SS 1245 share the base-view data blocks B[0], B[1], B[2], . . . in common. However, data block groups placed at locations requiring a long jump, such as at boundaries between recording layers, generally include base-view data blocks belonging to only one of the file 2D 1241 or the first file SS 1245. Accordingly, the SPN 3612 that indicates the extent start point 3442 generally differs from the SPN for the source packet located at the top of the 2D extent belonging to the file 2D 1241.

FIG. 36B is a schematic diagram showing a data structure of extent start points 3620 included in a second clip information file (02000.clpi), i.e. dependent-view clip information file 1232. As shown in FIG. 36B, the extent start point 3620 includes dependent-view extent IDs (EXT2_ID) 3621 and SPNs 3622. The EXT2_IDs 3621 are serial numbers assigned from the top to the dependent-view data blocks belonging to the first file SS 1245. One SPN 3622 is assigned to each EXT2_ID 3621 and is the same as the SPN for the source packet located at the top of the dependent-view data block identified by the EXT2_ID 3621. This SPN is a serial number assigned in order from the top to the source packets included in the dependent-view data block group belonging to the first file SS 1245.

FIG. 36D is a schematic diagram representing correspondence between dependent-view extents EXT2[0], EXT2[1], . . . belonging to the first file DEP (02000.m2ts) 1242 and the SPNs 3622 shown by the extent start points 3620. As shown in FIG. 25, the first file DEP 1242 and the first file SS 1245 share dependent-view data blocks in common. Accordingly, as shown in FIG. 36D, each SPN 3622 shown by the extent start points 3620 is the same as the SPN for the source packet located at the top of each dependent-view extent EXT2[0], EXT2[1], . . . .

As described below, the extent start point 3442 in the 2D clip information file 1231 and the extent start point 3620 in the dependent-view clip information file 1232 are used to detect the boundary between data blocks included in each extent SS during playback of 3D video images from the first file SS 1245.

FIG. 36E is a schematic diagram showing an example of correspondence between an extent SS EXTSS[0] belonging to the first file SS 1245 and an extent block on the BD-ROM disc 101. As shown in FIG. 36E, the extent block includes data block groups D[n] and B[n] (n=0, 1, 2, . . . ) in an interleaved arrangement. Note that the following description is also true for other arrangements. The extent block can be accessed as a single extent SS EXTSS[0]. Furthermore, in the extent SS EXTSS[0], the number of source packets included in the (n+1)$^{th}$ base-view data block B[n] is, at the extent start point 3442, the same as the difference A(n+1)−An between SPNs corresponding to EXT1_ID=n+1 and n. In this case, A0=0. On the other hand, the number of source packets included in the dependent-view data block D[n+1] is, in the extent start point 3620, the same as the difference B(n+1)−Bn between SPNs corresponding to EXT2_ID=n+1 and n. In this case, B0=0.

When playing back 3D video images from the first file SS 1245A, the playback device 102 in 3D playback mode refers to the entry maps and the extent start points 3442 and 3620 respectively found in the clip information files 1231 and 1232. By doing this, the playback device 102 specifies, from the PTS for a frame representing the right view of an arbitrary scene, the LBN for the sector on which a dependent-view data block that is necessary for constructing the frame is recorded. Specifically, the playback device 102 first retrieves the SPN associated with the PTS from the entry map in the dependent-view clip information file 1232, for example. It is assumed that the source packet indicated by the SPN is included in the third dependent-view extent EXT2[2] in the first file DEP 1242, i.e. in the dependent-view data block D[2]. Next, the playback device 102 retrieves "B2", the largest SPN before the target SPN, from among the SPNs 3622 shown by the extent start points 3620 in the dependent-view clip information file 1232. The playback device 102 also retrieves the corresponding EXT2_ID="2". Then the playback device 102 retrieves the value "A2" for the SPN 3612 corresponding to the EXT1_ID, which is the same as the EXT2_ID="2", from the extent start points 3442 in the 2D clip information file 1231. The playback device 102 further seeks the sum B2+A2 of the retrieved SPNs. As can be seen from FIG. 36E, this sum B2+A2 is equal to the total number of source packets included in the data blocks located before the third dependent-view data block D[2] among the data blocks included in the extent SS EXTSS[0]. Accordingly, this sum B2+A2 multiplied by 192 bytes, the data amount per source packet, and then divided by 2048 bytes, the data amount per sector, i.e., the quotient (B2+A2)×192/2048, is the same as the number of sectors from the top of the extent SS EXTSS[0] until immediately before the third dependent-view data block D[2]. Using this quotient, the LBN for the sector on which the top of the dependent-view data block D[2] is recorded can be specified by referencing the file entry for the first file SS 1245.

After specifying the LBN via the above-described procedure, the playback device 102 indicates the LBN to the BD-ROM drive. In this way, the portion of the extent SS EXTSS[0] recorded starting with the sector for this LBN, i.e. the data block group D[2], B[2], D[3], B[3], ... starting from the third right-view data block D[2], is read as aligned units.

The playback device 102 further refers to the extent start points 3442 and 3620 to extract dependent-view data blocks and base-view data blocks alternately from the read extents SS. For example, assume that the data block group D[n], B[n] (n=0, 1, 2, ... ) is read in order from the extent SS EXTSS[0] shown in FIG. 36E. The playback device 102 first extracts B1 source packets from the top of the extent SS EXTSS[0] as the dependent-view data block D[0]. Next, the playback device 102 extracts the B1$^{th}$ source packet and the subsequent (A1–1) source packets, a total of A1 source packets, as the first base-view data block B[0]. The playback device 102 then extracts the (B1+A1)$^{th}$ source packet and the subsequent (B2–B1–1) source packets, i.e. a total of (B2–B1) source packets, as the second dependent-view data block D[1]. The playback device 102 further extracts the (A1+B2)$^{th}$ source packet and the subsequent (A2–A1–1) source packets, i.e. a total of (A2–A1) source packets, as the second base-view data block B[1]. Thereafter, the playback device 102 thus continues to detect the boundary between data blocks in the extent SS based on the number of read source packets, thereby alternately extracting dependent-view and base-view data blocks. The extracted base-view and dependent-view data blocks are transmitted to the system target decoder to be decoded in parallel.

In this way, the playback device 102 in 3D playback mode can play back 3D video images from the first file SS 1245 starting at a specific PTS. As a result, the playback device 102 can in fact benefit from the above-described advantages (A) and (B) regarding control of the BD-ROM drive.

<<File Base>>

FIG. 36C is a schematic diagram representing the base-view data blocks B[0], B[1], B[2], ... extracted from the first file SS 1245 by the playback device 102 in 3D playback mode. As shown in FIG. 36C, when allocating SPNs in order from the top to a source packet group included in the base-view data block B[n] (n=0, 1, 2, ... ), the SPN of the source packet located at the top of the data block B[n] is equal to the SPN 3612 indicating the extent start point 3442. The base-view data block group extracted from a single file SS by referring to extent start points, like the base-view data block group B[n], is referred to as a "file base". Furthermore, the base-view data blocks included in a file base are referred to as "base-view extents". As shown in FIG. 36E, each base-view extent EXT1[0], EXT1[1], ... is referred to with use of the extent start points 3442 and 3620 in a clip information file.

A base-view extent EXT1[n] shares the same base-view data block B[n] with a 2D extent EXT2D[n]. Accordingly, the file base includes the same main TS as the file 2D. Unlike the 2D extent EXT2D[n], however, the base-view extent EXT1[n] is not referred to by any file entry. As described above, the base-view extent EXT1[n] is extracted from the extent SS EXTSS [•] in the file SS with use of the extent start point in the clip information file. The file base thus differs from a conventional file by not including a file entry and by needing an extent start point as a reference for a base-view extent. In this sense, the file base is a "virtual file". In particular, the file base is not recognized by the file system and does not appear in the directory/file structure shown in FIG. 12.

Figure 37:
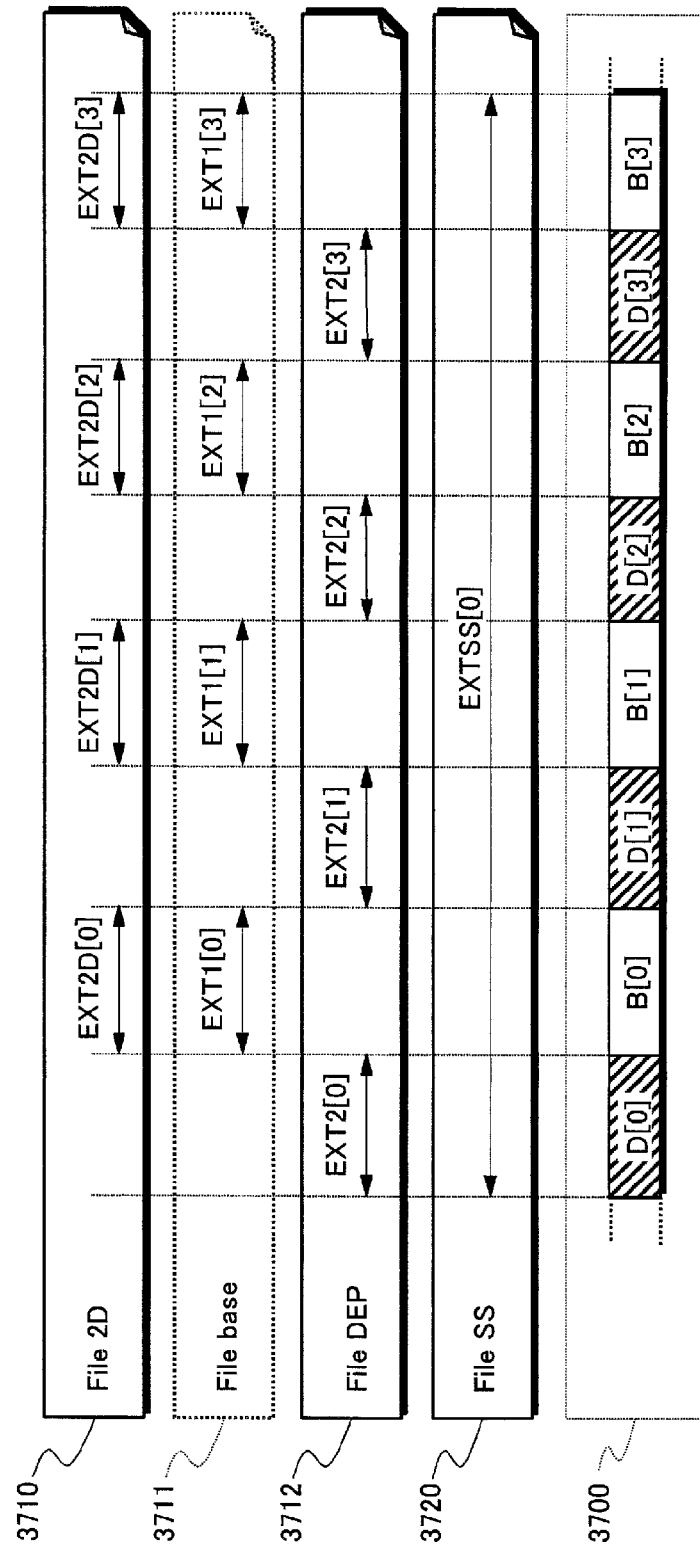
FIG. 37 is a schematic diagram showing a correspondence between one extent block 3700 recorded on the BD-ROM disc 101 and each of the extent block groups in a file 2D 3710, a file base 3711, a file DEP 3712, and a file SS 3720.

FIG. 37 is a schematic diagram showing correspondence between a single extent block 3700 recorded on the BD-ROM disc 101 and each of the extent block groups in a file 2D 3710, file base 3711, file DEP 3712, and file SS 3720. As shown in FIG. 37, the extent block 3700 includes the dependent-view data blocks D[n] and the base-view data blocks B[n] (n=0, 1, 2, 3, ... ). The base-view data block B[n] belongs to the file 2D 3710 as the 2D extent EXT2D[n]. The dependent-view data block D[n] belongs to the file DEP 3712 as the dependent-view extent EXT2[n]. The entirety of the extent block 3700 belongs to the file SS 3720 as one extent SS EXTSS[0]. Accordingly, the extent SS EXTSS[0] shares the base-view data block B[n] in common with the 2D extent EXT2D[n] and shares the dependent-view data block D[n] with the dependent-view extent EXT2[n]. After being read into the playback device 102, the extent SS EXTSS[0] is separated into the dependent-view data block D[n] and the base-view data block B[n]. These base-view data blocks B[n] belong to the file base 3711 as the base-view extents EXT1[n]. The boundary in the extent SS EXTSS [0] between the base-view extent EXT1[n] and the dependent-view extent EXT2[n] is specified with use of the extent start point in the clip information file corresponding to each of the file 2D 3710 and the file DEP 3712.

<<Dependent-View Clip Information File>>

The dependent-view clip information file has the same data structure as the 2D clip information file shown in FIGS. 34 and 35. Accordingly, the following description covers the differences between the dependent-view clip information file and the 2D clip information file. Details on the similarities can be found in the above description.

A dependent-view clip information file differs from a 2D clip information file mainly in the following three points: (i) conditions are placed on the stream attribute information; (ii) conditions are placed on the entry points; and 3D metadata does not include any offset table.

(i) When the base-view video stream and the dependent-view video stream are to be used for playback of 3D video images by the playback device 102 in L/R mode, as shown in FIG. 17, the dependent-view video stream is compressed using the base-view video stream. At this point, the video stream attributes of the dependent-view video stream become equivalent to those of the base-view video stream. The video stream attribute information for the base-view video stream is associated with PID=0x1011 in the stream attribute information 3420 in the 2D clip information file. On the other hand, the video stream attribute information for the dependent-view video stream is associated with PID=0x1012 or 0x1013 in the stream attribute information in the dependent-view clip information file. Accordingly, the items shown in FIG. 34, i.e. the codec, resolution, aspect ratio, and frame rate, have to match between these two pieces of video stream attribute information. If the codec type matches, then a reference relationship between pictures in the base-view video stream and the dependent-view video stream is established during coding, and thus each picture can be decoded. If the resolution, aspect ratio, and frame rate all match, then on-screen display of the left and right videos can be synchronized. Therefore, these videos can be shown as 3D video images without making the viewer feel uncomfortable.

(ii) The entry map in the dependent-view clip information file includes a table allocated to the dependent-view video stream. Like the table 3500 shown in FIG. 35A, this table includes an entry map header and entry points. The entry map header indicates the PID for the dependent-view video stream allocated to the table, i.e. either 0x1012 or 0x1013. In each entry point, a pair of a PTS and an SPN is associated with a single EP_ID. The PTS for each entry point is the same as the PTS for the top picture in one of the GOPs included in the dependent-view video stream. The SPN for each entry point is the same as the top SPN of the source packet group stored in the picture indicated by the PTS belonging to the same entry point. This SPN refers to a serial number assigned consecutively from the top to the source packet group belonging to the file DEP, i.e. the source packet group constituting the sub-TS. The PTS for each entry point has to match the PTS, within the entry map in the 2D clip information file, for the entry point in the table allotted to the base-view video stream. In other words, whenever an entry point is set to the top of a source packet group that includes one of a set of pictures included in the same 3D VAU, an entry point always has to be set to the top of the source packet group that includes the other picture.

Figure 38:
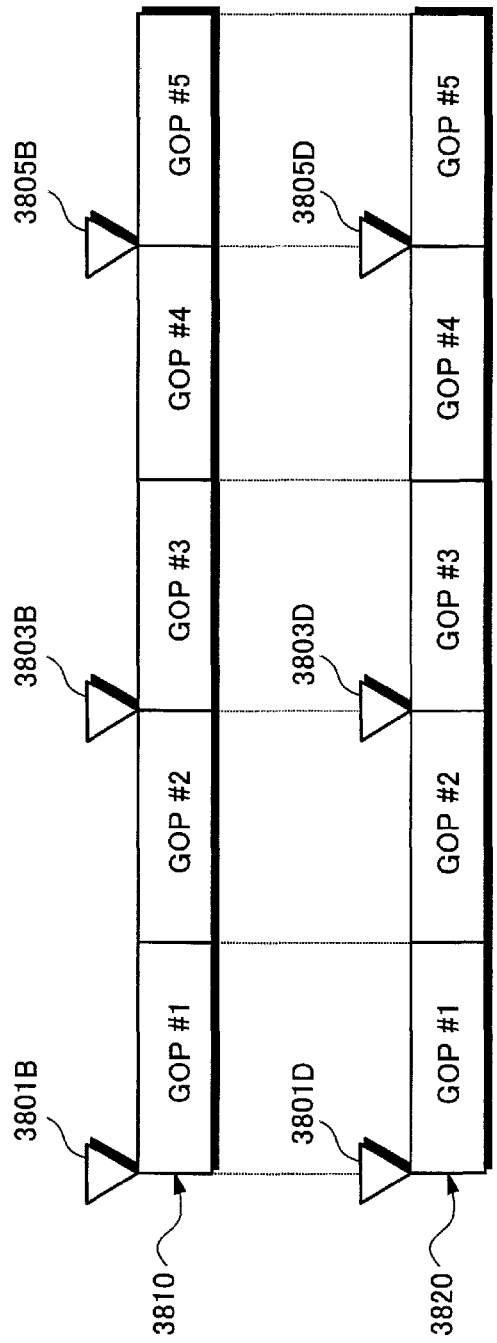
FIG. 38 is a schematic diagram showing an example of entry points set in a base-view video stream 3810 and a dependent-view video stream 3820.

FIG. 38 is a schematic diagram showing an example of entry points set in a base-view video stream 3810 and a dependent-view video stream 3820. In the two video streams 3810 and 3820, GOPs that are the same number from the top represent video images for the same playback period. As shown in FIG. 38, in the base-view video stream 3810, entry points 3801B, 3803B, and 3805B are set to the top of the odd-numbered GOPs as counted from the top, i.e. GOP #1, GOP #3, and GOP #5. Accordingly, in the dependent-view video stream 3820 as well, entry points 3801D, 3803D, and 3805D are set to the top of the odd-numbered GOPs as counted from the top, i.e. GOP #1, GOP #3, and GOP #5. In this case, when the playback device 102 begins playback of 3D video images from GOP #3, for example, it can immediately calculate the address of the playback start position in the file SS from the SPN of the corresponding entry points 3803B and 3803D. In particular, when both entry points 3803B and 3803D are set to the top of a data block, then as can be understood from FIG. 36E, the sum of the SPNs of the entry points 3803B and 3803D equals the SPN of the playback start position within the file SS. As described with reference to FIG. 36E, from this number of source packets, it is possible to calculate the LBN of the sector on which the part of the file SS for the playback start position is recorded. In this way, even during playback of 3D video images, it is possible to improve response speed for processing that requires random access to the video stream, such as interrupt playback or the like.

<<2D Playlist File>>

Figure 39:
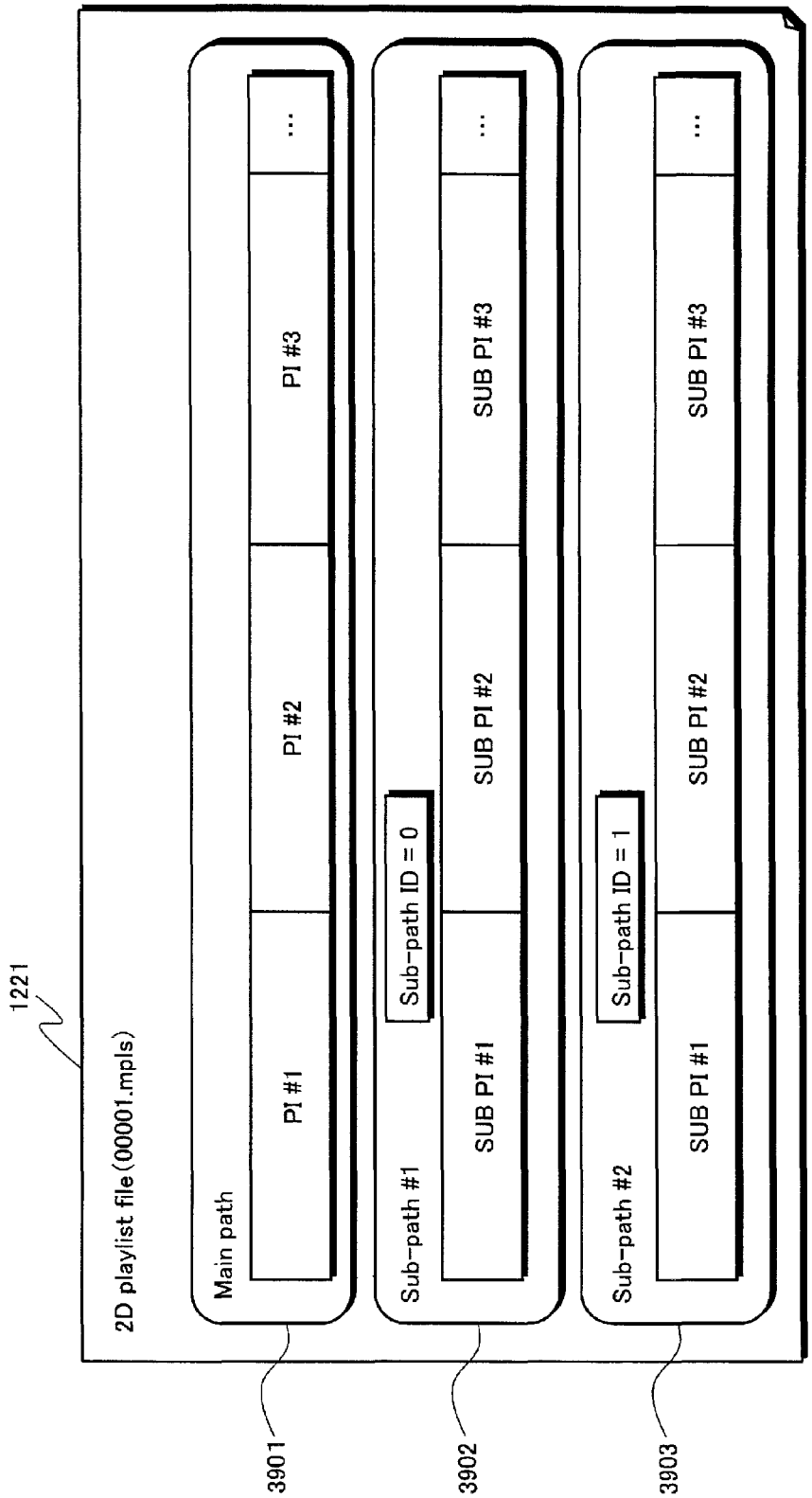
FIG. 39 is a schematic diagram showing a data structure of a 2D playlist file (00001.mpls) 1221 shown in FIG. 12.

FIG. 39 is a schematic diagram showing a data structure of a 2D playlist file. The first playlist file (00001.mpls) 1221 shown in FIG. 12 has this data structure. As shown in FIG. 39, the 2D playlist file 1221 includes a main path 3901 and two sub-paths 3902 and 3903.

The main path 3901 is a sequence of playitem information pieces (hereinafter, abbreviated as PI) that defines the main playback path for the file 2D 1241, i.e. the section for playback and the section's playback order. Each PI is identified with a unique playitem ID=#N (N=1, 2, 3, ... ). Each PI #N defines a different playback section along the main playback path with a pair of PTSs. One of the PTSs in the pair represents the start time (In-Time) of the playback section, and the other represents the end time (Out-Time). Furthermore, the order of the PIs in the main path 3901 represents the order of corresponding playback sections in the playback path.

Each of the sub-paths 3902 and 3903 is a sequence of sub-playitem information pieces (hereinafter, abbreviated as SUB_PI) that defines a playback path that can be associated in parallel with the main playback path for the file 2D 1241. Such a playback path indicates a different section of the file 2D 1241 that is represented by the main path 3901, or is a section of stream data multiplexed into another file 2D, along with the corresponding playback order. The 2D video images represented by the stream data are to be played back simultaneously with 2D video images played back from the file 2D 1241 according to the main path 3901, and include, for example, secondary video images in a picture-in-picture format, a browser window, a pop-up menu, or subtitles. Serial numbers "0" and "1" are assigned to the sub-paths 3902 and 3903 in the order of registration in the 2D playlist file 1221. These serial numbers are used as sub-path IDs to identify the sub-paths 3902 and 3903. In the sub-paths 3902 and 3903, each SUB_PI is identified by a unique sub-playitem ID=#M (M=1, 2, 3, ... ). Each SUB_PI #M defines a different playback section along the playback path with a pair of PTSs. One of the PTSs in the pair represents the playback start time of the playback section, and the other represents the playback end time. Furthermore, the order of the SUB_PIs in the sub-paths 3902 and 3903 represents the order of corresponding playback sections in the playback path.

Figure 40:
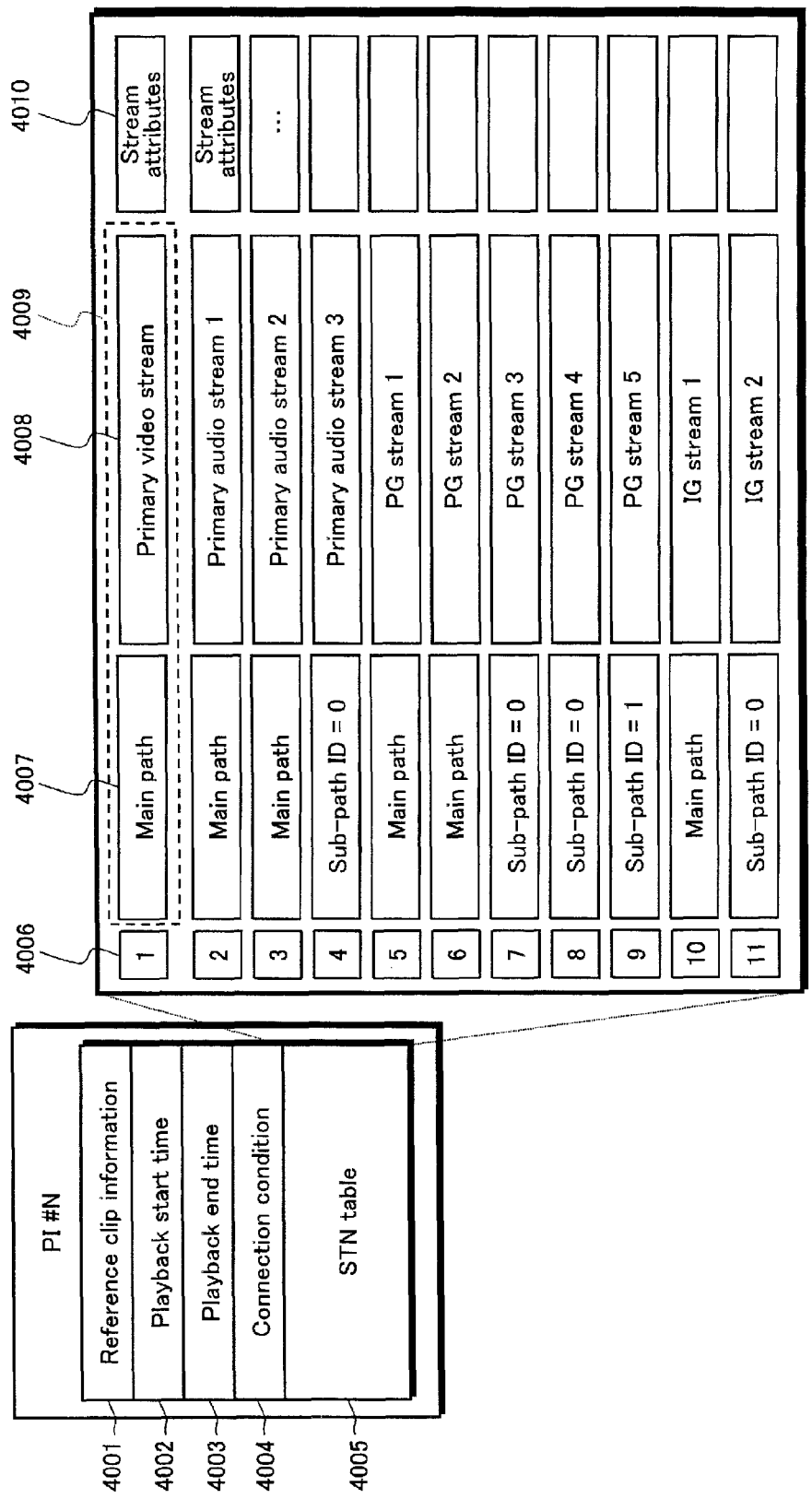
FIG. 40 is a schematic diagram showing a data structure of playitem information PI#N having a playitem ID=#N (N=1, 2, 3 . . . ).

FIG. 40 is a schematic diagram showing a data structure of PI #N. As shown in FIG. 40, a PI #N includes a piece of reference clip information 4001, playback start time (In_Time) 4002, playback end time (Out_Time) 4003, connection condition 4004, and stream selection table (hereinafter abbreviated as "STN table" (stream number table)) 4005. The reference clip information 4001 is information for identifying the 2D clip information file 1231. The playback start time 4002 and playback end time 4003 respectively indicate PTSs for the top and the end of the section for playback of the file 2D 1241. The connection condition 4004 specifies a condition for connecting video in the playback section specified by the playback start time 4002 and the playback end time 4003 to video in the playback section specified by the previous PI #(N−1). The STN table 4005 is a list of elementary streams that can be selected from the file 2D 1241 by the decoder in the playback device 102 from the playback start time 4002 until the playback end time 4003.

The data structure of a SUB_PI is the same as the data structure of the PI shown in FIG. 40 insofar as it includes reference clip information, a playback start time, and a playback end time. In particular, the playback start time and playback end time of a SUB_PI are expressed as values along the same time axis as a PI. The SUB_PI further includes an "SP connection condition" field. The SP connection condition has the same meaning as a PI connection condition.

[Connection Condition]

The connection condition (hereinafter abbreviated as "CC") 4004 can for example be assigned three types of values, "1", "5", and "6". When the CC 4004 is "1", the video to be played back from the section of the file 2D 1241 specified by the PI #N does not need to be seamlessly connected to the video played back from the section of the file 2D 1241 specified by the immediately preceding PI #(N−1). On the other hand, when the CC 4004 indicates "5" or "6", both video images need to be seamlessly connected.

Figure 41A:
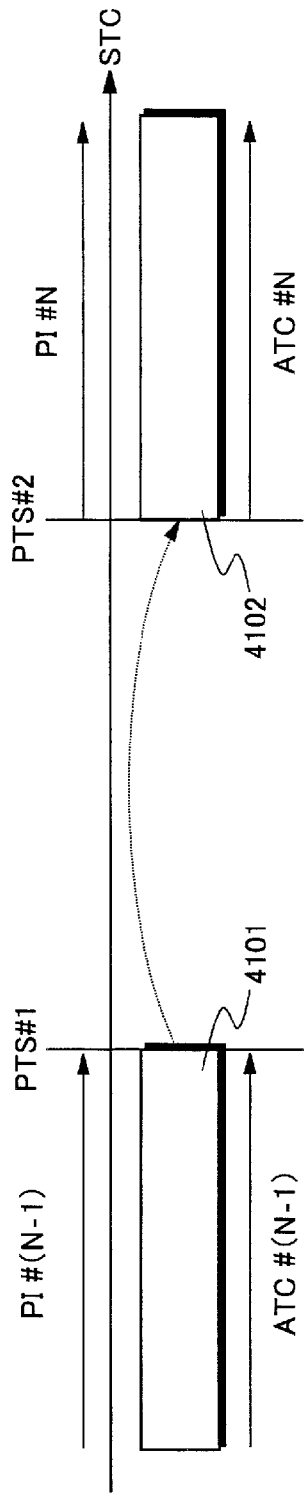
FIG. 41A is a schematic diagram showing a relation between two playback sections PI#(N−1) and PI#N to be connected when the connection condition is "5"
Figure 41B:
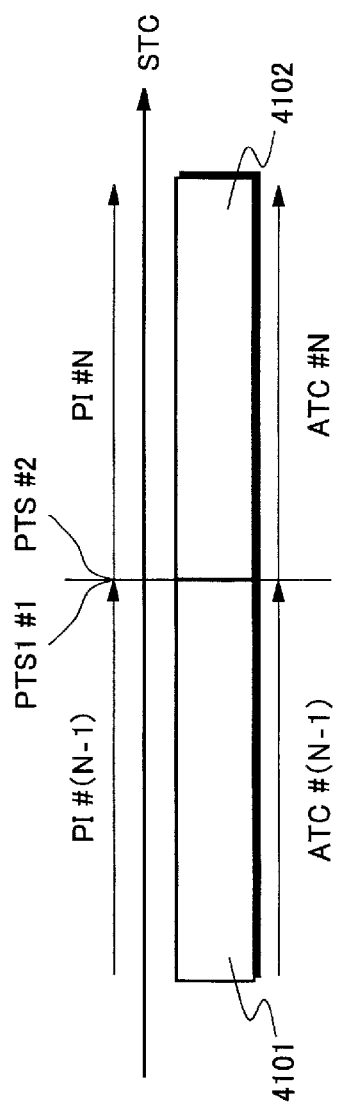
FIG. 41B shows a relation between the two playback sections when the connection condition is "6".

FIGS. 41A and 41B are schematic diagrams showing correspondence between two playback sections PI #(N−1) and PI #N that are to be connected when CC is "5" or "6". In this case, the PI #(N−1) specifies a first section 4101 in the file 2D 1241, and the PI #N specifies a second section 4102 in the file 2D 1241. As shown in FIG. 41A, when the CC 5 indicates "5", the STCs of the two PIs, PI #(N−1) and PI #N, may be noncontiguous. That is, the PTS #1 at the end of the first section 4101 and the PTS #2 at the top of the second section 4102 may be noncontiguous. Several constraint conditions, however, need to be satisfied. For example, the first section 4101 and second section 4102 need to be created so that the decoder can smoothly continue to decode data even when the second section 4102 is supplied to the decoder contiguously after the first section 4101. Furthermore, the last frame of the audio stream contained in the first section 4101 needs to overlap the top frame of the audio stream contained in the second section 4102. On the other hand, as shown in FIG. 41B, when the CC indicates "6", the first section 4101 and the second section 4102 need to be able to be handled as successive sections for the decoder to duly decode. That is, STCs and ATCs need to be contiguous between the first section 4101 and the second section 4102. Similarly, when the SP connection condition is "5" or "6", STCs and ATCs both need to be contiguous between sections of the file 2D specified by two contiguous SUB_PIs.

[STN Table]

Referring again to FIG. 40, the STN table 4005 is an array of stream registration information. Note that "stream registration information" is information listing the individual elementary streams that can be selected for playback from the main TS between the playback start time 4002 and playback end time 4003. The stream number (STN) 4006 is a serial number allocated individually to stream registration information and is used by the playback device 102 to identify each elementary stream. The STN 4006 further indicates priority for selection among elementary streams of the same type. The stream registration information includes a stream entry 4009 and stream attribute information 4010. The stream entry 4009 includes stream path information 4007 and stream identification information 4008. The stream path information 4007 is information indicating the file 2D to which the selected elementary stream belongs. For example, if the stream path information 4007 indicates "main path", the file 2D corresponds to the 2D clip information file indicated by reference clip information 4001. On the other hand, if the stream path information 4007 indicates "sub-path ID=1", the file 2D to which the selected elementary stream belongs corresponds to the 2D clip information file indicated by the reference clip information of the SUB_PI included in the sub-path with a sub-path ID=1. The playback start time and playback end time specified by this SUB_PI are both included in the interval from the playback start time 4002 until the playback end time 4003 specified by the PI included in the STN table 4005. The stream identification information 4008 indicates the PID for the elementary stream multiplexed into the file 2D specified by the stream path information 4007. The elementary stream indicated by this PID can be selected from the playback start time 4002 until the playback end time 4003. The stream attribute information 4010 indicates attribute information for each elementary stream. For example, the attribute information for each of an audio stream, PG stream, and IG stream indicates a language type of the stream.

[Playback of 2D Video Images in Accordance with a 2D Playlist File]

Figure 42:
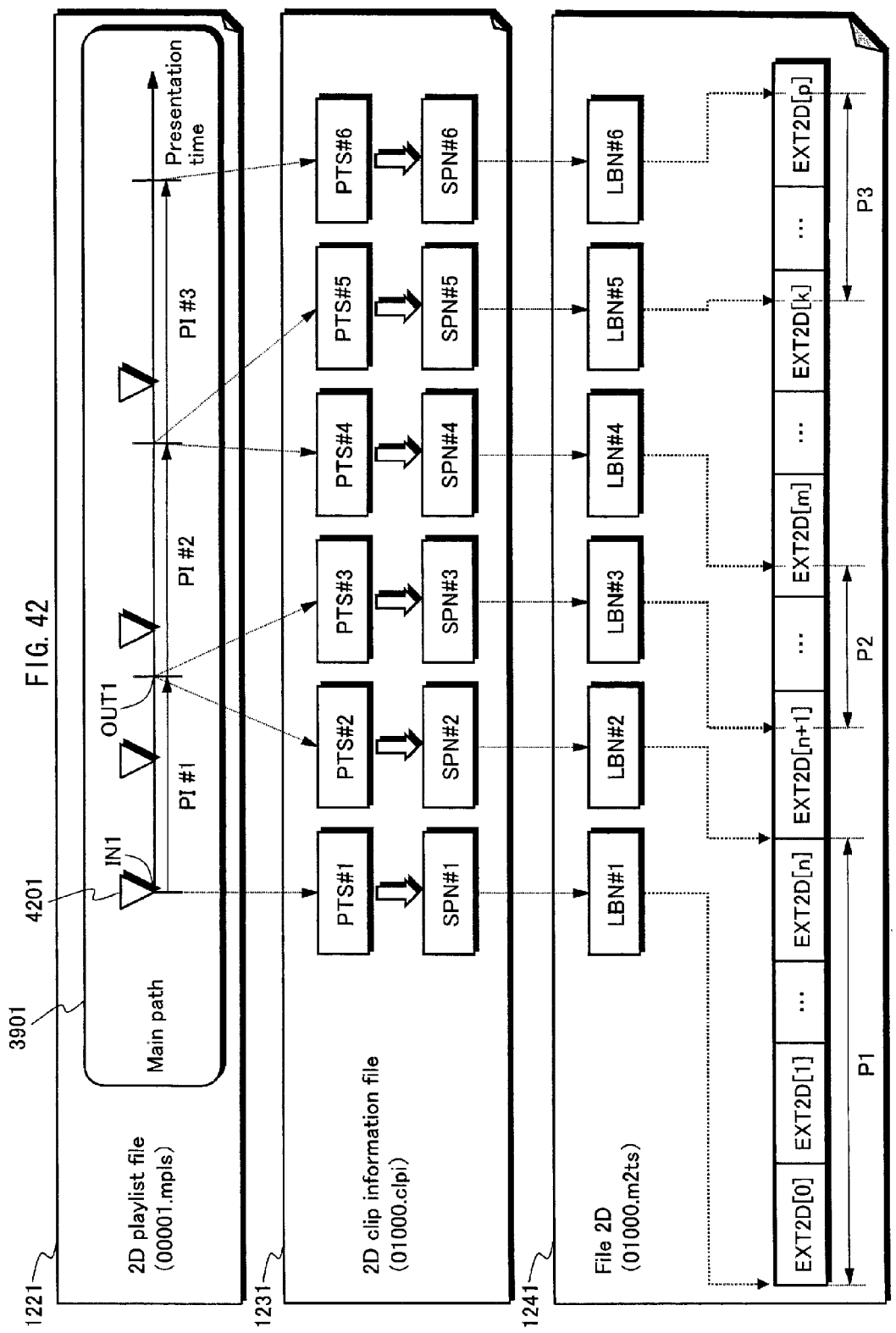
FIG. 42 is a schematic diagram showing a correspondence between PTSs indicated by the 2D playlist file (00001.mpls) 1221 shown in FIG. 39 and sections played back from a file 2D (01000.m2ts) 1241.

FIG. 42 is a schematic diagram showing correspondence between the PTSs indicated by the 2D playlist file (00001.mpls) 1221 and the sections played back from the file 2D (01000.m2ts) 1241. As shown in FIG. 42, in the main path 3901 in the 2D playlist file 1221, the PI #1 specifies a PTS #1, which indicates a playback start time IN1, and a PTS #2, which indicates a playback end time OUT1. The reference clip information for the PI #1 indicates the 2D clip information file (01000.clpi) 1231. When playing back 2D video images in accordance with the 2D playlist file 1221, the playback device 102 first reads the PTS #1 and the PTS #2 from the PI #1. Next, with reference to the entry map of the 2D clip information file 1231, the playback device 102 retrieves the SPN #1 and the SPN #2 corresponding, in the file 2D 1241, to the PTS #1 and the PTS #2. The playback device 102 then calculates the corresponding numbers of sectors from the SPN #1 and the SPN #2. Furthermore, the playback device 102 refers to these numbers of sectors and the file entry for the file 2D 1241 to specify the LBN #1 and LBN #2 at the top and end, respectively, of the sector group P1 on which the 2D extent group EXT2D[0], . . . , EXT2D[n] to be played back is recorded. Calculation of the numbers of sectors and specification of the LBNs are as per the description of FIG. 35. Finally, the playback device 102 indicates the range from LBN #1 to LBN #2 to the BD-ROM drive 121. The source packet group belonging to the 2D extent group EXT2D[0], . . . , EXT2D[n] is thus read from the sector group P1 in this range. Similarly, the pair PTS #3 and PTS #4 indicated by the PI #2 are first converted into a pair of SPN #3 and SPN #4 by referring to the entry map in the 2D clip information file 1231. Then, referring to the file entry for the file 2D 1241, the pair of SPN #3 and SPN #4 are converted into a pair of LBN #3 and LBN #4. Furthermore, a source packet group belonging to the 2D extent group is read from the sector group P2 in a range from the LBN #3 to the LBN #4. Conversion of a pair of PTS #5 and PTS #6 indicated by the PI #3 to a pair of SPN #5 and SPN #6, conversion of the pair of SPN #5 and SPN #6 to a pair of LBN #5 and LBN #6, and reading of a source packet group from the sector group P3 in a range from the LBN #5 to the LBN #6 are similarly performed. The playback device 102 thus plays back 2D video images from the file 2D 1241 in accordance with the main path 3901 in the 2D playlist file 1221.

The 2D playlist file 1221 may include an entry mark 4201. The entry mark 4201 indicates a time point in the main path 3901 at which playback is actually to start. For example, as shown in FIG. 42, a plurality of entry marks 4201 can be set for the PI #1. The entry mark 4201 is particularly used for searching for a playback start position during random access. For example, when the 2D playlist file 1221 specifies a playback path for a movie title, the entry marks 4201 are assigned to the top of each chapter. Consequently, the playback device 102 can play back the movie title by chapters.

<<3D Playlist File>>

Figure 43:
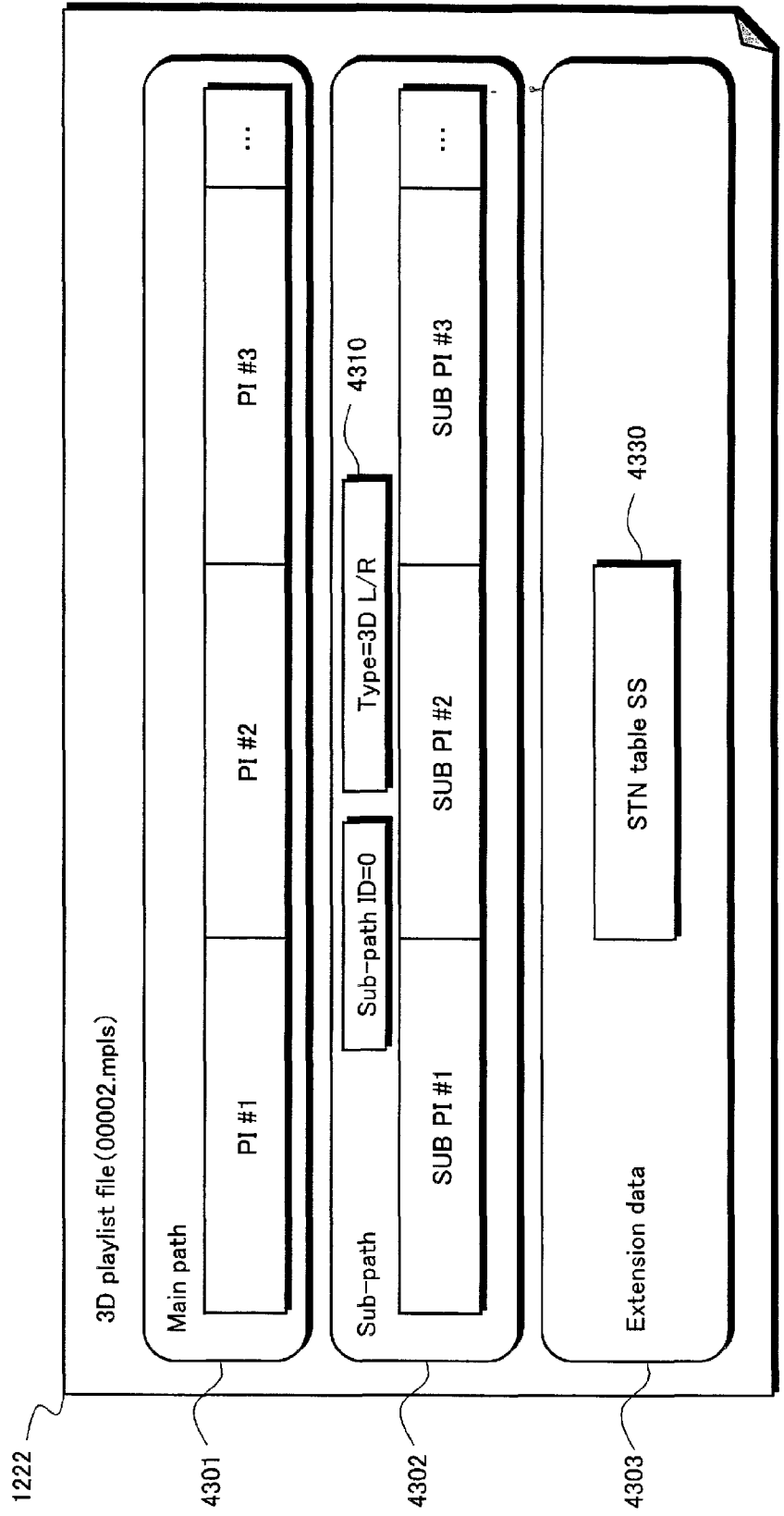
FIG. 43 is a schematic diagram showing a data structure of a 3D playlist file (00002.mpls) 1222 shown in FIG. 12.

FIG. 43 is a schematic diagram showing a data structure of a 3D playlist file. The second playlist file (00002.mpls) 1222 shown in FIG. 12 has this data structure. The same holds with respect to the second playlist file (00003.mpls) 1223. As shown in FIG. 43, the 3D playlist file 1222 includes a main path 4301, sub-path 4302, and extension data 4303.

The main path 4301 specifies the playback path of the main TS shown in FIG. 13A. Accordingly, the main path 4301 is substantially the same as the main path 3901 for the 2D playlist file 1221 shown in FIG. 39. In other words, the playback device 102 in 2D playback mode can play back 2D video images from the file 2D 1241 in accordance with the main path 4301 in the 3D playlist file 1222. On the other hand, the main path 4301 differs from the main path 3901 shown in FIG. 39 in the following respect. That is, when an STN is associated with a PID in a graphics stream, the STN table for each PI allocates an offset sequence ID to the STN.

The sub-path 4302 specifies the playback path for a sub-TS shown in FIGS. 13B and 11C, i.e. the playback path for the first file DEP 1242 or the second file DEP 1243. The data structure of the sub-path 4302 is the same as the data structure of the sub-paths 3902 and 3903 in the 2D playlist file 1241 shown in FIG. 39. Accordingly, details on this similar data structure can be found in the description of FIG. 39, in particular details on the data structure of the SUB_PI.

The SUB_PI #N (N=1, 2, 3, . . . ) in the sub-path 4302 are in one-to-one correspondence with the PI #N in the main path 4301. Furthermore, the playback start time and playback end time specified by each SUB_PI #N are the same as the playback start time and playback end time specified by the corresponding PI #N. The sub-path 4302 additionally includes a sub-path type 4310. The "sub-path type" generally indicates whether playback processing should be synchronized between the main path and the sub-path. In the 3D playlist file 1222, the sub-path type 4310 in particular indicates the type of the 3D playback mode, i.e. the type of the dependent-view video stream to be played back in accordance with the sub-path 4302. In FIG. 43, the value of the sub-path type 4310 is "3D L/R", thus indicating that the 3D playback mode is L/R mode, i.e. that the right-view video stream is to be played back. On the other hand, a value of "3D depth" for the sub-path type 4310 indicates that the 3D playback mode is depth mode, i.e. that the depth-map stream is to be played back. When the playback device 102 in 3D playback mode detects that the value of the sub-path type 4310 is "3D L/R" or "3D depth", the playback device 102 synchronizes playback processing that conforms to the main path 4301 with playback processing that conforms to the sub-path 4302.

Extension data 4303 is interpreted only by the playback device 102 in 3D playback mode; the playback device 102 in 2D playback mode ignores the extension data 4303. In particular, the extension data 4303 includes an extension stream selection table 4330. The "extension stream selection table (STN_table_SS)" (hereinafter abbreviated as "STN table SS") is an array of stream registration information to be added to the STN tables indicated by each PI in the main path 4301 during 3D playback mode. This stream registration information indicates elementary streams that can be selected for playback from the sub TS.

[STN Table]

Figure 44:
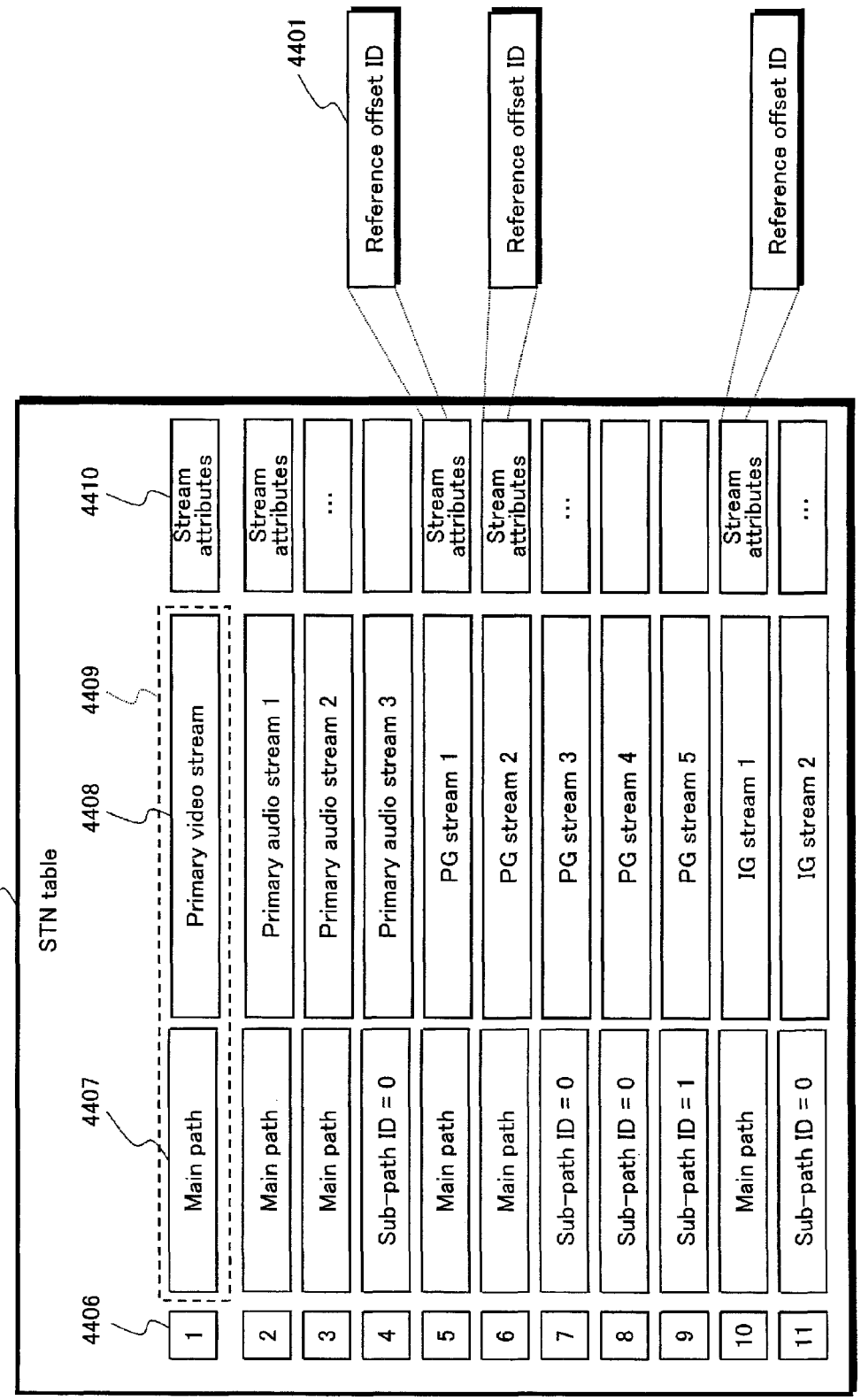
FIG. 44 is a schematic diagram showing an STN table 4405 included in a main path 4301 of the 3D playlist file 1222 shown in FIG. 43.

FIG. 44 is a schematic diagram showing an STN table 4405 included in a main path 4301 of the 3D playlist file 1222. As shown in FIG. 44, the stream identification information 4408 allocated to STN 4406 with the value from "5" to "11" indicates PIDs for a PG stream or IG stream. In this case, the stream attribute information 4410 allocated to the same STN further includes a reference offset ID (stream_ref_offset_id) 4401. In the file DEP 1242, as shown in FIG. 21, offset metadata 2110 is placed in VAU #1 of each video sequence. The reference offset ID 4401 is the same as one of the offset sequence IDs 2112 included in the offset metadata 2110. In other words, the reference offset ID 4401 defines the offset sequence that should be associated with each of the STNs "5" to "11" from among the plurality of offset sequences included in the offset metadata 2110.

[STN Table SS]

Figure 45:
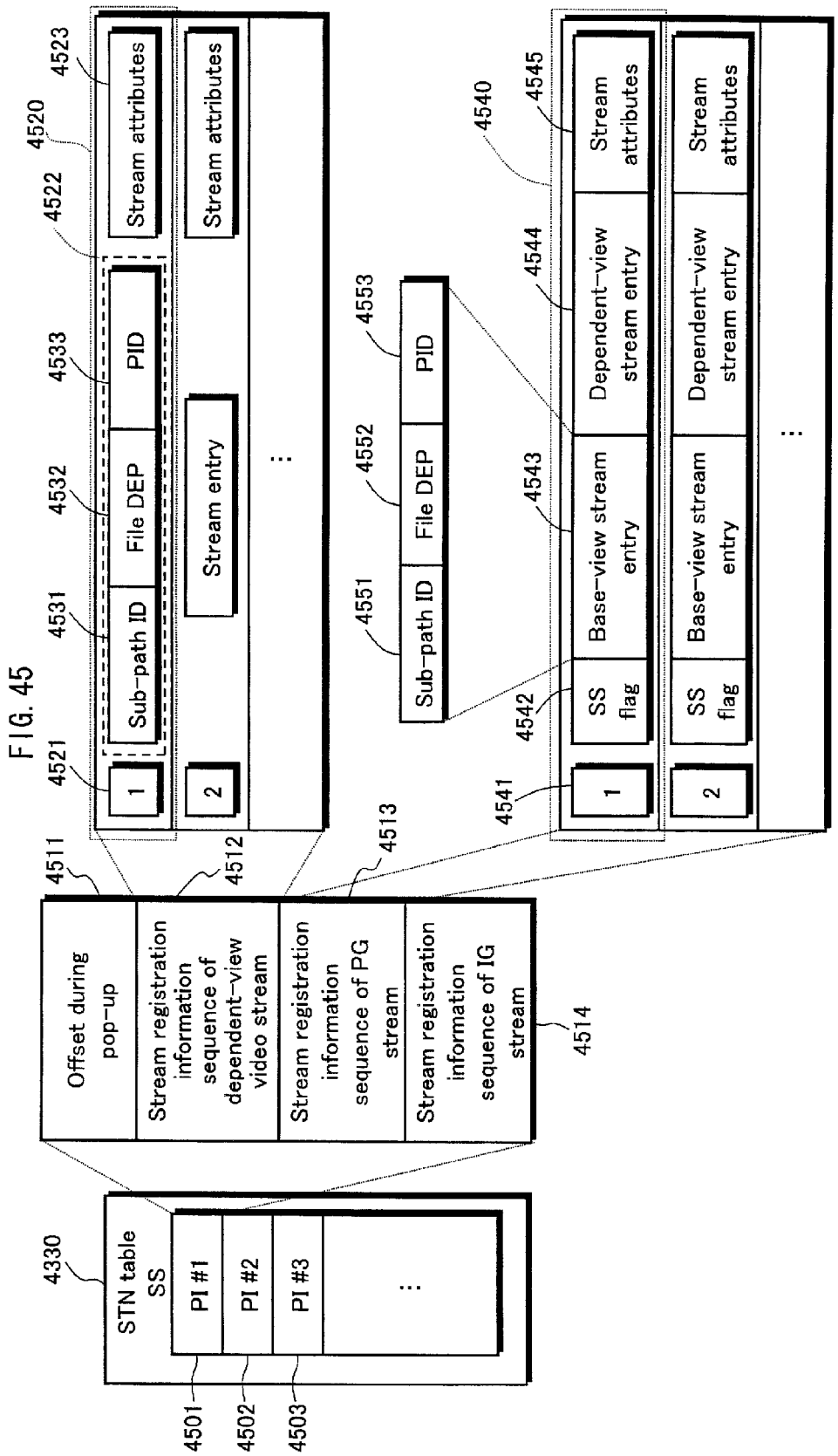
FIG. 45 is a schematic diagram showing a data structure of the STN table SS 4430 shown in FIG. 44.

FIG. 45 is a schematic diagram showing a data structure of the STN table SS 4430. As shown in FIG. 45, an STN table SS 4430 includes stream registration information sequences 4501, 4502, 4503, . . . . The stream registration information sequences 4501, 4502, 4503, . . . individually correspond to the PI #1, PI #2, PI #3, . . . in the main path 4301. The playback device 102 in 3D playback mode uses the stream registration information sequences 4501, . . . in combination with stream registration information sequences included in the STN table in the corresponding PI. The stream registration information sequence 4501 corresponding to each PI includes an offset during pop-up (Fixed_offset_during_Popup) 4511, stream registration information sequence 4512 for the dependent-view video stream, stream registration information sequence 4513 for the PG stream, and stream registration information sequence 4514 for the IG stream.

The offset during pop-up 4511 indicates whether a pop-up menu is played back from the IG stream. The playback device 102 in 3D playback mode changes the presentation mode of the video plane and the PG plane in accordance with the value of the offset 4511. There are two types of presentation modes for the video plane: B-D presentation mode and B-B presentation mode. There are three types of presentation modes for the PG plane and IG plane: 2 plane mode, 1 plane+offset mode, and 1 plane+zero offset mode. For example, when the value of the offset during pop-up 4511 is "0", a pop-up menu is not played back from the IG stream. At this point, B-D presentation mode is selected as the video plane presentation mode, and either 2 plane mode or 1 plane+offset mode is selected as the presentation mode for the PG plane. On the other hand, when the value of the offset during pop-up 4511 is "1", a pop-up menu is played back from the IG stream. At this point, B-B presentation mode is selected as the video plane presentation mode, and 1 plane+zero offset mode is selected as the presentation mode for the PG plane.

In an example shown in FIGS. 13B and 13C, a sub-TS may include both the base-view and dependent-view graphics streams. In this case, the playback device 102 in "2 plane mode" decodes and alternately outputs left-view and right-view graphics plane data from the respective graphics streams. In "1 plane+offset mode", the playback device 102 generates, via offset control, a pair of left-view and right-view graphics planes from the graphics stream in the main TS and alternately outputs these graphics planes. In any of the modes, left-view and right-view graphics planes are alternately displayed on the screen of the display device 103. In this case, the viewer perceives these graphics planes as 3D graphics images. In "1 plane+zero offset mode", the playback device 102 temporarily stops offset control and outputs a graphics plane decoded from the graphics stream in the main TS twice for a frame while maintaining the operation mode in 3D playback mode. Accordingly, only either the left-view or right-view graphics planes are displayed on the screen of the display device 103, and thus the viewer perceives these planes simply as 2D graphics images.

The playback device 102 in 3D playback mode refers to the offset during pop-up 4511 for each PI and selects B-B presentation mode and 1 plane+zero offset mode when a pop-up menu is played back from an IG stream. While a pop-up menu is displayed, other 3D video images are thus temporarily changed to 2D video images, regardless of whether the display device 103 operates in 2D presentation mode or 3D presentation mode. This improves the visibility and usability of the pop-up menu.

The stream registration information sequence 4512 for the dependent-view video stream, the stream registration information sequence 4513 for the PG stream, the stream registration information sequence 4514 for the IG stream each include stream registration information indicating the dependent-view video stream, PG stream and IG stream that can be selected for playback from the sub-TS. These stream registration information sequences 4512, 4513, and 4514 are used in combination with the stream registration information sequences, included in the STN table of the corresponding PI, that indicate base-view video stream, PG stream, and IG stream. When reading a piece of stream registration information from an STN table, the playback device 102 in 3D playback mode automatically also reads the stream registration information sequence, located in the STN table SS, that has been combined with the piece of stream registration information. When simply switching from 2D playback mode to 3D playback mode, the playback device 102 can thus maintain already recognized STNs and stream attributes such as language.

The stream registration information sequence 4512 of the dependent-view video stream generally includes a plurality of pieces of stream registration information (SS_dependet_view_block) 4520. These are the same in number as the pieces of stream registration information in the corresponding PI that indicate the base-view video stream. Each piece of stream registration information 4520 includes an STN 4521, stream entry 4522, and stream attribute information 4523. The STN 4521 is a serial number assigned individually to pieces of stream registration information 4520 and is the same as the STN of the piece of stream registration information, located in the corresponding PI, with which the piece of stream registration information 4520 is combined. The stream entry 4522 includes sub-path ID reference information (ref_to_Subpath_id) 4531, stream file reference information (ref_to_subClip_entry_id) 4532, and a PID (ref_to_stream_PID_subclip) 4533. The sub-path ID reference information 4531 indicates the sub-path ID of the sub-path that specifies the playback path of the dependent-view video stream. The stream file reference information 4532 is information to identify the file DEP storing this dependent-view video stream. The PID 4533 is the PID for this dependent-view video stream. The stream attribute information 4523 includes attributes for this dependent-view video stream, such as frame rate, resolution, and video format. In particular, these attributes are the same as those for the base-view video stream shown by the piece of stream registration information, located in the corresponding PI, with which each piece of stream registration information is combined.

The stream registration information sequence 4513 of the PG stream generally includes a plurality of pieces of stream registration information 4540. These are the same in number as the pieces of stream registration information in the corresponding PI that indicate the PG stream. Each piece of stream registration information 4540 includes an STN 4541, stereoscopic flag (is_SS_PG) 4542, base-view stream entry (stream_entry_for_base_view) 4543, dependent-view stream entry (stream_entry_for_dependent_view) 4544, and stream attribute information 4545. The STN 4541 is a serial number assigned individually to pieces of stream registration information 4540 and is the same as the STN of the piece of stream registration information, located in the corresponding PI, with which the piece of stream registration information 4540 is combined. The stereoscopic flag 4542 indicates "whether PG streams of both the base-view and dependent-view (for example, left-view and right-view) are included on the BD-ROM disc 101". If the stereoscopic flag 4542 is ON, both PG streams are included in the sub-TS. Accordingly, the playback device 102 reads all of the fields in the base-view stream entry 4543, the dependent-view stream entry 4544, and the stream attribute information 4545. If the stereoscopic flag 4542 is OFF, the playback device 102 ignores all of these fields 4543-4545. Both the base-view stream entry 4543 and the dependent-view stream entry 4544 include sub-path ID reference information 4551, stream file reference information 4552, and PIDs 4553. The sub-path ID reference information 4551 indicates the sub-path IDs of the sub-paths that specify the playback paths of the base-view and dependent-view PG streams. The stream file reference information 4552 is information to identify the file DEP storing the PG streams. The PIDs 4553 are the PIDs for the PG streams. The stream attribute information 4545 includes attributes for the PG streams, such as language type. The stream registration information sequence 4514 of the IG stream also has a similar data structure.

[Playback of 3D Video Images in Accordance with a 3D Playlist File]

Figure 46:
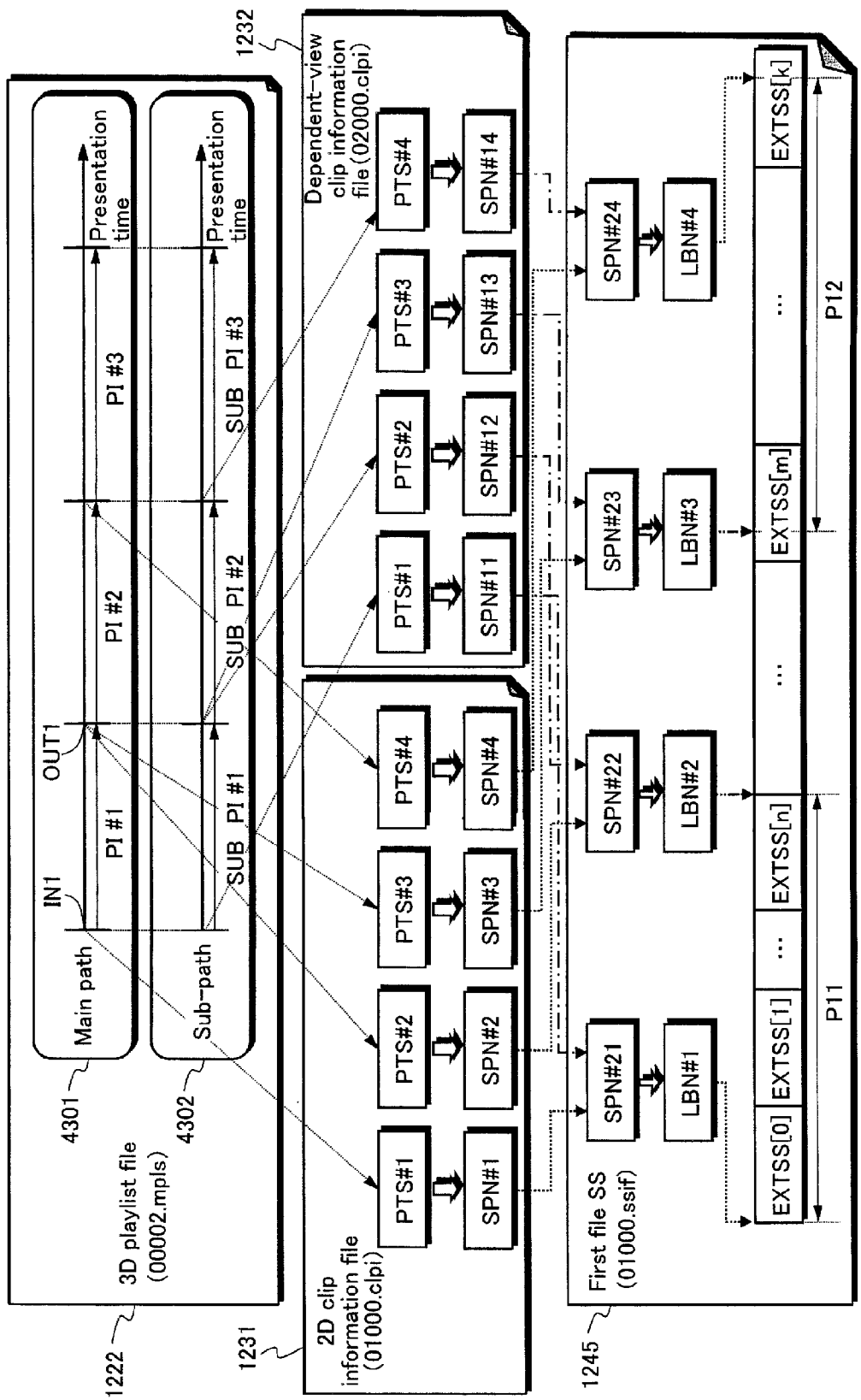
FIG. 46 is a schematic diagram showing a correspondence between PTSs indicated by the 3D playlist file (00002.mpls) 1222 shown in FIG. 43 and sections played back from the first file SS (01000.ssif) 1245.

FIG. 46 is a schematic diagram showing correspondence between PTSs indicated by the 3D playlist file (00002.mpls) 1222 and sections played back from the first file SS (01000.ssif) 1245. As shown in FIG. 46, in the main path 4601 in the 3D playlist file 1222, the PI #1 specifies a PTS #1, which indicates a playback start time IN1, and a PTS #2, which indicates a playback end time OUT1. The reference clip information for the PI #1 indicates the 2D clip information file (01000.clpi) 1231. The sub-path 4602 specifies the PTS #1 and PTS #2 having the same SUB_PI #1 as the PI #1. The reference clip information for the SUB_PI #1 indicates the dependent-view clip information file (02000.clpi) 1232.

When playing back 3D video images in accordance with the 3D playlist file 1222, the playback device 102 first reads PTS #1 and PTS #2 from the PI #1 and SUB_PI #1. Next, with reference to the entry map of the 2D clip information file 1231, the playback device 102 retrieves the SPN #1 and the SPN #2 corresponding, in the file 2D 1241, to the PTS #1 and the PTS #2. In parallel, the playback device 102 refers to the entry map in the dependent-view clip information file 1232 to retrieve from the first file DEP 1242 the SPN #11 and SPN #12 that correspond to the PTS #1 and PTS #2. As described with reference to FIG. 36E, the playback device 102 then uses the extent start points 3442 and 3620 in the clip information files 1231 and 1232 to calculate, from SPN #1 and SPN #11, the number of source packets SPN #21 from the top of the first file SS 1245 to the playback start position. Similarly, the playback device 102 calculates, from SPN #2 and SPN #12, the number of source packets SPN #22 from the top of the first file SS 1245 to the playback end position. The playback device 102 further calculates the numbers of sectors corresponding to the SPN #21 and SPN #22. Next, the playback device 102 refers to these numbers of sectors and the file entry of the first file SS 1245 to specify the LBN #1 and LBN #2 at the top and end, respectively, of the sector group P11 on which the extent SS group EXTSS[0], . . . , EXTSS[n] to be played back is recorded. Calculation of the numbers of sectors and specification of the LBNs are as per the description of FIG. 36E. Finally, the playback device 102 indicates the range from LBN #1 to LBN #2 to the BD-ROM drive 121. The source packet group belonging to the extent SS group EXTSS [0], . . . , EXTSS[n] is thus read from the sector group P11 in this range. Similarly, the pair PTS #3 and PTS #4 indicated by the PI #2 and SUB_PI #2 are first converted into a pair of SPN #3 and SPN #4 and a pair of SPN #13 and SPN #14 by referring to the entry maps in the clip information files 1231 and 1232. Next, the number of source packets SPN #23 from the top of the first file SS 1245 to the playback start position is calculated from SPN #3 and SPN #13. Then, the number of source packets SPN #24 from the top of the first file SS 1245 to the playback end position is calculated from SPN #4 and SPN #14. Next, referring to the file entry for the first file SS 1245, the pair of SPN #23 and SPN #24 are converted into a pair of LBN #3 and LBN #4. Thereafter, a source packet group belonging to the extent SS group is read from the sector group P12 in a range from the LBN #3 to the LBN #4.

In parallel with the above-described read processing, as described with reference to FIG. 36E, the playback device 102 refers to the extent start points 3442 and 3620 in the clip information files 1231 and 1232 to extract base-view extents and dependent-view extents from each extent SS and decode the base-view and dependent-view extents in parallel. The playback device 102 can thus play back 3D video images from the first file SS 1245 in accordance with the 3D playlist file 1222.

<<Index File>>

Figure 47:
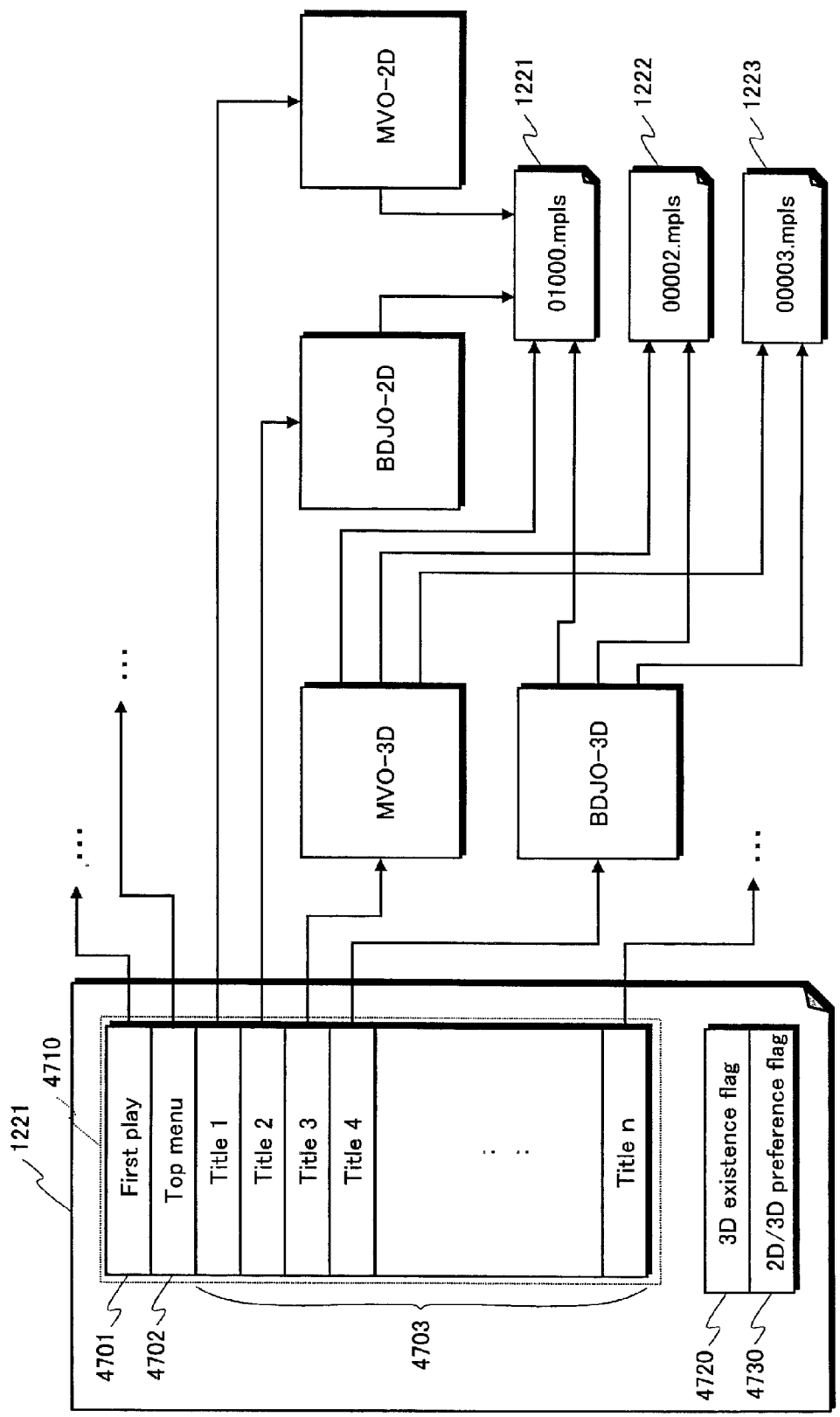
FIG. 47 is a schematic diagram showing a data structure of an index file (index.bdmv) 1211 shown in FIG. 12.

FIG. 47 is a schematic diagram showing a data structure of the index file (index.bdmv) 1211 shown in FIG. 12. As shown in FIG. 47, the index file 1211 includes an index table 4710, 3D existence flag 4720, and 2D/3D preference flag 4730.

The index table 4710 stores the items "first play" 4701, "top menu" 4702, and "title k" 4703 (k=1, 2, . . . , n; the letter n represents an integer greater than or equal to 1). Each item is associated with either a movie object MVO-2D, MVO-3D, . . . , or a BD-J object BDJO-2D, BDJO-3D, . . . . Each time a title or a menu is called in response to a user operation or an instruction from an application program, a control unit in the playback device 102 refers to a corresponding item in the index table 4710. Furthermore, the control unit calls an object associated with the item from the BD-ROM disc 101 and accordingly executes a variety of processes. Specifically, the item "first play" 4701 specifies an object to be called when the BD-ROM disc 101 is loaded into the BD-ROM drive 121. The item "top menu" 4702 specifies an object for displaying a menu on the display device 103 when a command "go back to menu" is input, for example, by user operation. In the items "title k" 4703, the titles that constitute the content on the BD-ROM disc 101 are individually allocated. For example, when a title for playback is specified by user operation, in the item "title k" in which the title is allocated, the object for playing back video images from the AV stream file corresponding to the title is specified.

In the example shown in FIG. 47, the items "title 1" and "title 2" are allocated to titles of 2D video images. The movie object MVO-2D associated with the item "title 1" includes a group of commands related to playback processes for 2D video images to be performed using the 2D playlist file (00001.mpls) 1221. When the playback device 102 refers to the item "title 1", then in accordance with the movie object MVO-2D, the 2D playlist file 1221 is read from the BD-ROM disc 101, and playback processes for 2D video images are executed in accordance with the playback path specified therein. The BD-J object BDJO-2D associated with the item "title 2" includes an application management table related to playback processes for 2D video images to be performed using the 2D playlist file 1221. When the playback device 102 refers to the item "title 2", then in accordance with the application management table in the BD-J object BDJO-2D, a Java application program is called from the JAR file 1261 and executed. In this way, the 2D playlist file 1221 is read from the BD-ROM disc 101, and playback processes for 2D video images are executed in accordance with the playback path specified therein.

Furthermore, in the example shown in FIG. 47, the items "title 3" and "title 4" are allocated to titles of 3D video images. The movie object MVO-3D associated with the item "title 3" includes, in addition to a group of commands related to playback processes for 2D video images to be performed using the 2D playlist file 1221, a group of commands related to playback processes for 3D video images to be performed using either 3D playlist file (00002.mpls) 1222 or (00003.mpls) 1223. In the BD-J object BDJO-3D associated with the item "title 4" the application management table specifies, in addition to a Java application program related to playback processes for 2D video images to be performed using the 2D playlist file 1221, a Java application program related to playback processes for 3D video images to be performed using either 3D playlist file 1222 or 1223.

The 3D existence flag 4720 shows whether or not 3D video image content is recorded on the BD-ROM disc 101. When the BD-ROM disc 101 is inserted into the BD-ROM drive 121, the playback device 102 first checks the 3D existence flag 4720. When the 3D existence flag 4720 is ON, the playback device 102 exchanges CEC messages with the display device 103 via the HDMI cable 122 to inquire as to whether or not the display device 103 supports playback of 3D video images. In order to make the inquiry, the playback device 102 needs to perform HDCP authentication on the display device 103. On the other hand, when the 3D existence flag 4720 is OFF, the playback device 102 does not need to select 3D playback mode, and thus promptly proceeds in 2D playback mode without performing HDCP authentication on the display device 103. By skipping HDCP authentication in the above manner, the time between insertion of the BD-ROM disc 101 and the start of playback of 2D video images is shortened.

The 2D/3D preference flag 4730 indicates whether playback of 3D video images should be prioritized when both the playback device and the display device support playback of both 2D video images and 3D video images. The 2D/3D preference flag 4730 is set by the content provider. When the 3D existence flag 4720 in the BD-ROM disc 101 is ON, the playback device 102 then additionally checks the 2D/3D preference flag 4730. When the 2D/3D preference flag 4730 is ON, playback of 3D video images takes priority, and thus the playback device 102 does not make the user select the playback mode. Rather, playback device 102 performs HDCP authentication without displaying a playback mode selection screen on the display device 103. Based on the authentication result, the playback device 102 operates in either 2D playback mode or 3D playback mode. When it is determined that the display device 103 supports playback of 3D video images, the playback device 102 immediately starts operating in 3D playback mode. This makes it possible to avoid delays in starting up caused by processing to switch from 2D playback mode to 3D playback mode, such as switching frame rates, etc.

[Selection of Playlist File When Selecting a 3D Video Title]

In the example shown in FIG. 47, when the playback device 102 refers to item "title 3" in the index table 4710, the following determination processes are performed in accordance with the movie object MVO-3D: (1) whether the 3D existence flag 4720 is ON or OFF; (2) whether the playback device 102 itself supports playback of 3D video images or not; (3) whether the 2D/3D preference flag 4730 is ON or OFF; (4) whether the user has selected 3D playback mode or not; (5) whether the display device 103 supports playback of 3D video images or not; and (6) whether the 3D playback mode of the playback device 102 is in L/R mode or depth mode. Next, in accordance with the results of these determinations, the playback device 102 selects one of the playlist files 1221-1223 for playback. On the other hand, when the playback device 102 refers to item "title 4", a Java application program is called from the JAR file 1261, in accordance with the application management table in the BD-J object BDJO-3D, and executed. The above-described determination processes (1)-(6) are thus performed, and a playlist file is then selected in accordance with the results of determination.

Figure 48:
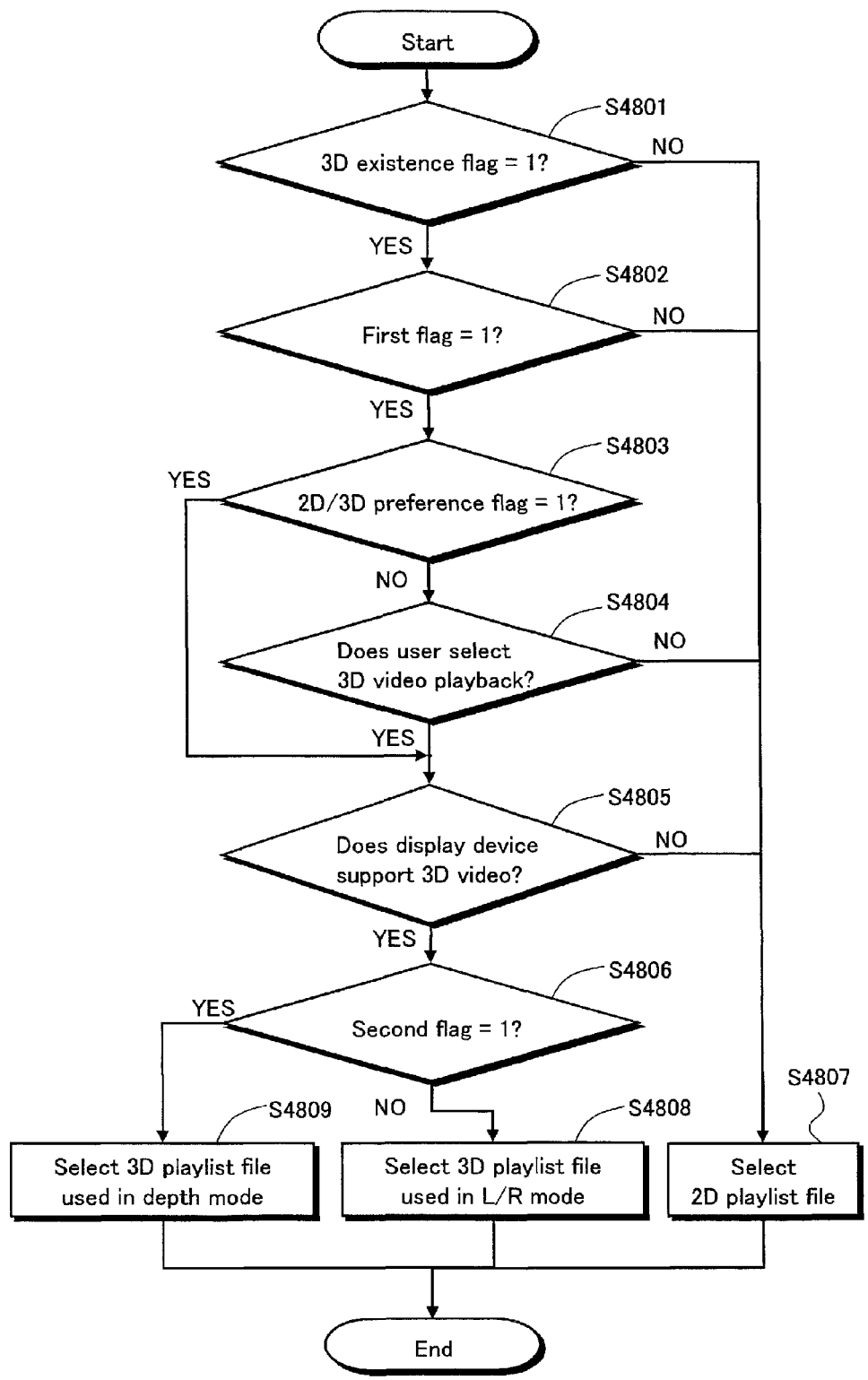
FIG. 48 is a flowchart of processing whereby the playback device 102 selects a playlist file for playback by using six types of determination processes (1)-(6), with reference to the item "title 3" of an index table 4710 shown in FIG. 47.

FIG. 48 is a flowchart of selection processing for a playlist file to be played back using the above determination processes (1)-(6). For this selection processing, it is assumed that the playback device 102 includes a first flag and a second flag. The first flag indicates whether the playback device 102 supports playback of 3D video images. For example, a value of "0" for the first flag indicates that the playback device 102 only supports playback of 2D video images, whereas "1" indicates support of 3D video images as well. The second flag indicates whether the 3D playback mode is L/R mode or depth mode. For example, a value of "0" for the second flag indicates that the 3D playback mode is L/R mode, whereas "1" indicates depth mode. Furthermore, the respective values of the 3D existence flag 4720 and 2D/3D preference flag 4730 are set to "1" when these flags are ON, and to "0" when these flags are OFF.

In step S4801, the playback device 102 checks the value of the 3D existence flag 4720. If the value is "1", processing proceeds to step S4802. If the value is "0", processing proceeds to step S4807.

In step S4802, the 3D playback mode may be selected because the 3D existence flag 4720 is ON. Therefore, the playback device 102 checks the value of the first flag. If the value is "1", processing proceeds to step S4803. If the value is "0", processing proceeds to step S4807.

In step S4803, the first flag is ON, which means that the playback device 102 supports playback of 3D video images. The playback device 102 further checks the value of the 2D/3D preference flag 4730. If the value is "0", processing proceeds to step S4804. If the value is "1", processing proceeds to step S4805.

In step S4804, playback of 3D video images is not prioritized because the 2D/3D preference flag 4730 is OFF. Therefore, the playback device 102 displays a menu on the display device 103 for the user to select either 2D playback mode or 3D playback mode. If the user selects 3D playback mode via operation of a remote control 105 or the like, processing proceeds to step S4805, whereas if the user selects 2D playback mode, processing proceeds to step S4807.

In step S4805, playback of 3D video images is prioritized or 3D playback mode is selected in advance by the user. Therefore, the playback device 102 performs HDCP authentication to check whether the display device 103 supports playback of 3D video images. If the display device 103 supports playback of 3D video images, processing proceeds to step S4806. If the display device 103 does not support playback of 3D video images, processing proceeds to step S4807.

In step S4806, it is determined to start the 3D playback mode. Therefore, the playback device 102 checks the value of the second flag. If the value is "0", processing proceeds to step S4808. If the value is "1", processing proceeds to step S4809.

In step S4807, it is determined to start the 2D playback mode. Therefore, the playback device 102 selects for playback the 2D playlist file 1221. Note that, at this time, the playback device 102 may cause the display device 103 to display the reason why playback of 3D video images was not selected. Processing then terminates.

In step S4808, the playback device 102 starts up in L/R mode. That is, the playback device 102 selects for playback the 3D playlist file 1222 used in L/R mode. Processing then terminates.

In step S4809, the playback device 102 starts up in depth mode. That is, the playback device 102 selects for playback the 3D playlist file 1223 used in depth mode. Processing then terminates.

<Structure of 2D Playback Device>

Figure 49:
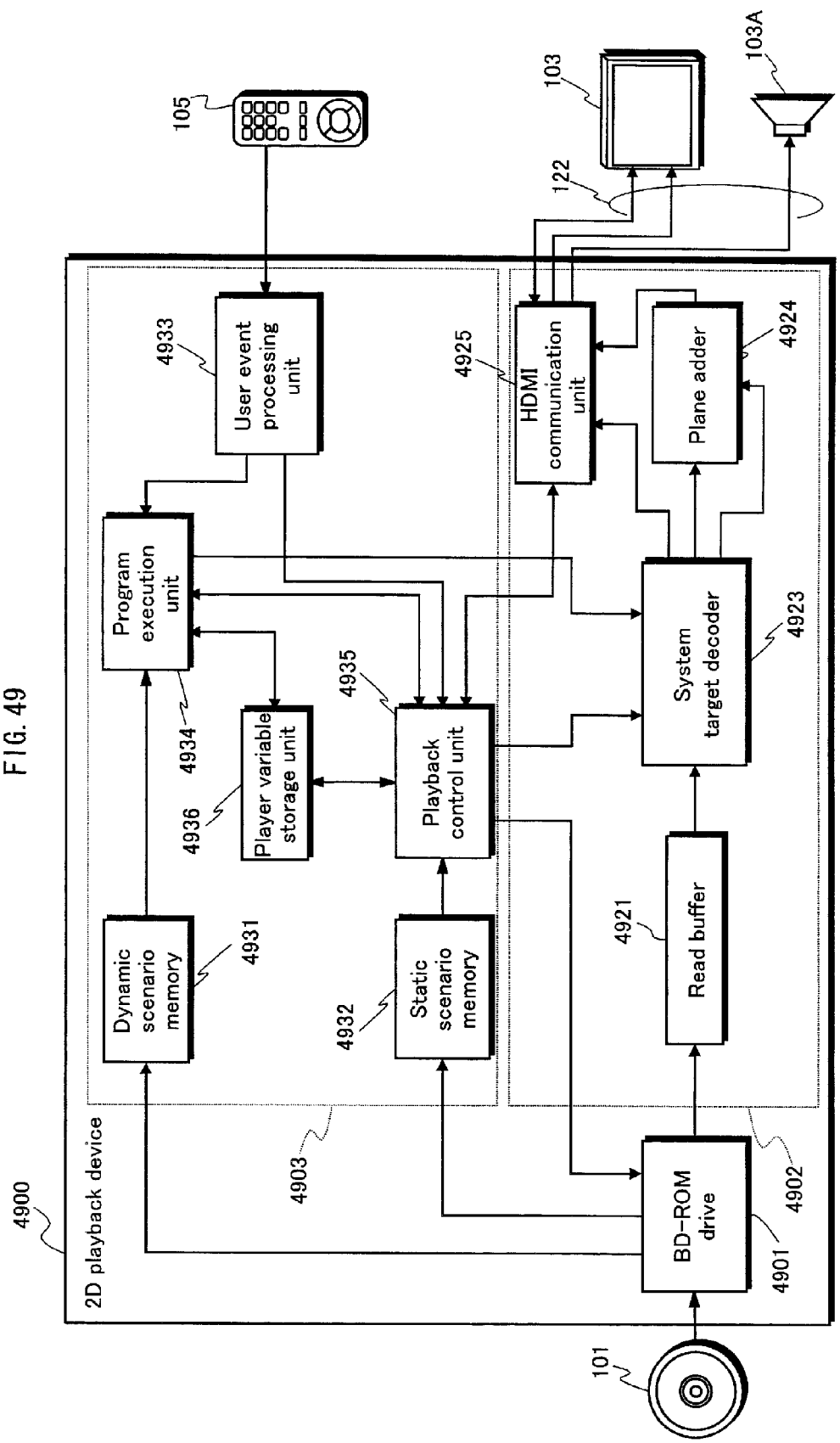
FIG. 49 is a functional block diagram of a 2D playback device 4900.

When playing back 2D video image content from the BD-ROM disc 101 in 2D playback mode, the playback device 102 operates as a 2D playback device. FIG. 49 is a functional block diagram of a 2D playback device 4900. As shown in FIG. 49, the 2D playback device 4900 includes a BD-ROM drive 4901, playback unit 4902, and control unit 4903. The playback unit 4902 includes a read buffer 4921, system target decoder 4923, plane adder 4924, and HDMI communication unit 4925. The control unit 4903 includes a dynamic scenario memory 4931, static scenario memory 4932, user event processing unit 4933, program execution unit 4934, playback control unit 4935, and player variable storage unit 4936. The playback unit 4902 and the control unit 4903 are each implemented on a different integrated circuit. Alternatively, however, both the units may be integrated into a single integrated circuit.

When the BD-ROM disc 101 is loaded into the BD-ROM drive 4901, the BD-ROM drive 4901 radiates laser light to the disc 101 and detects change in the reflected light. Furthermore, using the change in the amount of reflected light, the BD-ROM drive 4901 reads data recorded on the disc 101. Specifically, the BD-ROM drive 4901 has an optical pickup, i.e. an optical head. The optical head has a semiconductor laser, collimate lens, beam splitter, objective lens, collecting lens, and optical detector. A beam of light radiated from the semiconductor laser sequentially passes through the collimate lens, beam splitter, and objective lens to be collected on a recording layer of the disc 101. The collected beam is reflected and diffracted by the recording layer. The reflected and diffracted light passes through the objective lens, the beam splitter, and the collecting lens, and is collected onto the optical detector. The optical detector generates a playback signal at a level in accordance with the amount of collected light. Furthermore, data is decoded from the playback signal.

The BD-ROM drive 4901 reads data from the BD-ROM disc 101 based on a request from the playback control unit 4935. Out of the read data, the extents in the file 2D, i.e. the 2D extents, are transferred to the read buffer 4921; dynamic scenario information is transferred to the dynamic scenario memory 4931; and static scenario information is transferred to the static scenario memory 4932. "Dynamic scenario information" includes an index file, movie object file, and BD-J object file. On the other hand, "static scenario information" includes a 2D playlist file and a 2D clip information file.

The read buffer 4921, dynamic scenario memory 4931, and static scenario memory 4932 are each a buffer memory. The read buffer 4921 is implemented using an area of a memory element included in the playback unit 4902. The dynamic scenario memory 4931 and static scenario memory 4932 are each implemented using a memory element included in the control unit 4903. Alternatively, different areas in a single memory element may be used as part or all of these buffer memories 4921, 4931, and 4932. The read buffer 4921 stores 2D extents, the dynamic scenario memory 4931 stores dynamic scenario information, and the static scenario memory 4932 stores static scenario information.

The system target decoder 4923 reads 2D extents from the read buffer 4921 in units of source packets and demultiplexes the 2D extents. The system target decoder 4923 then decodes each of the elementary streams obtained by the demultiplexing. At this point, information necessary for decoding each elementary stream, such as the type of codec and attributes of the stream, is transferred in advance from the playback control unit 4935 to the system target decoder 4923. After decoding, the system target decoder 4923 converts the VAUs of the decoded primary video stream, secondary video stream, IG stream, and PG stream into primary video plane, secondary video plane, IG plane, and PG plane to output to the plane adder 4924. On the other hand, the system target decoder 4923 mixes the decoded primary audio stream and secondary audio stream and transmits the resultant data to an audio output device, such as an internal speaker 103A of the display device 103. In addition, the system target decoder 4923 receives graphics data from the program execution unit 4934. The graphics data is used for rendering graphics elements for a GUI, such as a menu, on the screen and is in a raster data format such as JPEG and PNG. The system target decoder 4923 converts the graphics data into image plane and outputs the image plane to the plane adder 4924. Details on the system target decoder 4923 are provided below.

The plane adder 4924 receives the primary video plane, secondary video plane, IG plane, PG plane, and image plane from the system target decoder 4923 and superimposes these planes to generate one combined video frame or field. The video plane thus superimposed is output to the HDMI communication unit 4925.

The HDMI communication unit 4925 receives combined video data from the plane adder 4924, audio data from the system target decoder 4923, and control data, in particular a playback mode, from the playback control unit 4935. Then, the HDMI communication unit 4925 converts the received data pieces into serial signals in the HDMI format, and transmits the signals to the display device 103 over the TMDS channel available within the HDMI cable 122. The HDMI communication unit 4925 generates the serial signals in the format shown in FIG. 4. Note that the 3D structure 401 and the playback mode 402 do not need to be set in an info frame. According to the serial signals, the display device 103 displays video images represented by the video data and produces audio output represented by the audio data from the speaker 103A. On the other hand, the HDMI communication unit 4925 exchanges CEC messages with the display device 103 via the CEC line available within the HDMI cable 122 and reads EDID from the display device 103 via the display data channel available within the HDMI cable 122. Details of the HDMI communication unit 4925 are provided below.

The user event processing unit 4933 detects a user operation via the remote control 105 or the front panel of the playback device 102. Based on the user operation, the user event processing unit 4933 requests the program execution unit 4934 or the playback control unit 4935 to perform processing. For example, when a user instructs to display a pop-up menu by pushing a button on the remote control 105, the user event processing unit 4933 detects the push and identifies the button. The user event processing unit 4933 further requests the program execution unit 4934 to execute a command corresponding to the button, i.e. a command to display the pop-up menu. On the other hand, when a user pushes a fast-forward or a rewind button on the remote control 105, the user event processing unit 4933 detects the push and identifies the button. The user event processing unit 4933 then requests the playback control unit 4935 to fast-forward or rewind the playlist currently being played back.

The program execution unit 4934 is a processor that reads programs from movie object files and BD-J object files stored in the dynamic scenario memory 4931 and executes these programs. Furthermore, the program execution unit 4934 performs the following operations in accordance with the programs: (1) the program execution unit 4934 orders the playback control unit 4935 to perform playlist playback processing; (2) the program execution unit 4934 generates graphics data for a menu or game as PNG or JPEG raster data and transfers the generated data to the system target decoder 4923 where the received data is combined with other video data. Via program design, specific details on these processes can be designed relatively flexibly. In other words, during the authoring process of the BD-ROM disc 101, the nature of these processes is determined while programming the movie object files and BD-J object files.

The playback control unit 4935 controls transfer of different types of data, such as 2D extents, an index file, etc. from the BD-ROM disc 101 to the read buffer 4921, dynamic scenario memory 4931, and static scenario memory 4932. A file system managing the directory file structure shown in FIG. 12 is used for this control. The playback control unit 4935 provides a file name of the file to be retrieved to the file system using a system call for opening files and search the directory/file structure for the file. When the file retrieval is successful, the file system first transfers the file entry for the target file to memory in the playback control unit 4935 and a File Control Block (FCB) is generated in the memory. Subsequently, the file system returns a file handle for the target file to the playback control unit 4935. The playback control unit 4935 then presents the file handle to the BD-ROM drive 4901. In response, the BD-ROM drive 4901 transfers the target file from the BD-ROM disc 101 to the respective buffer memories 4921, 4931, and 4932.

The playback control unit 4935 decodes the file 2D to output video data and audio data by controlling the BD-ROM drive 4901 and the system target decoder 4923. Specifically, the playback control unit 4935 first reads a 2D playlist file from the static scenario memory 4932, in response to an instruction from the program execution unit 4934 or a request from the user event processing unit 4933, and interprets the content of the file. In accordance with the interpreted content, particularly with the playback path, the playback control unit 4935 then specifies a file 2D to be played back and instructs the BD-ROM drive 4901 and the system target decoder 4923 to read and decode this file. Such playback processing based on a playlist file is called "playlist playback processing".

In addition, the playback control unit 4935 sets various types of player variables in the player variable storage unit 4936 using the static scenario information. With reference to the player variables, the playback control unit 4935 further specifies to the system target decoder 4923 elementary streams to be decoded and provides the information necessary for decoding the elementary streams. With reference to the player variables, the playback control unit 4935 provides the HDMI communication unit 4923 with control data accompanying video data, in particular a playback mode.

The player variable storage unit 4936 is composed of a group of registers for storing player variables. Types of player variables include system parameters (SPRM) and general parameters (GPRM). An SPRM indicates the status of the playback device 102. FIG. 50 is a list of SPRMs. As shown in FIG. 50, each SPRM is assigned a serial number 5001, and each serial number 5001 is associated with a unique variable value 5002. In one example, there are total of 64 SPRMs and each indicates the following meaning. Here, the numbers in parentheses indicate the serial numbers 5001.

SPRM(0): Language code
SPRM(1): Primary audio stream number
SPRM(2): Subtitle stream number
SPRM(3): Angle number
SPRM(4): Title number
SPRM(5): Chapter number
SPRM(6): Program number
SPRM(7): Cell number
SPRM(8): Key name
SPRM(9): Navigation timer
SPRM(10): Current playback time
SPRM(11): Player audio mixing mode for karaoke
SPRM(12): Country code for parental management
SPRM(13): Parental level SPRM(14): Player configuration for video
SPRM(15): Player configuration for audio
SPRM(16): Language code for audio stream
SPRM(17): Language code extension for audio stream
SPRM(18): Language code for subtitle stream
SPRM(19): Language code extension for subtitle stream
SPRM(20): Player region code
SPRM(21): Secondary video stream number
SPRM(22): Secondary audio stream number
SPRM(23): Player status
SPRM(24)-SPRM(63): Reserved The SPRM(10) indicates the PTS of the picture currently being decoded and is updated every time a picture is decoded and written into the primary video plane memory. Accordingly, the current playback point can be known by referring to the SPRM(10).

The parental level in SPRM(13) indicates a predetermined restricted age of a viewer permitted to use the playback device 102 and is used for parental control of viewing of titles recorded on the BD-ROM disc 101. A user of the playback device 102 sets the value of the SPRM(13) via, for example, an OSD of the playback device 102. "Parental control" refers to restricting viewing of a title in accordance with the viewer's age. The following is an example of how the playback device 102 performs parental control. The playback device 102 first reads, from the BD-ROM disc 101, the age for which viewing of a title is permitted and compares this age with the value of the SPRM(13). The restricted age indicates the minimum age of viewers permitted to view a corresponding title. If the restricted age is equal to or less than the value of the SPRM(13), the playback device 102 continues with playback of the title. If the restricted age is greater than the value of the SPRM(13), the playback device 102 stops playback of the title.

The language code for audio stream in SPRM(16) and the language code for subtitle stream in SPRM(18) show default language codes of the playback device 102. These codes may be changed by a user with use of the OSD or the like of the playback device 102, or the codes may be changed by an application program via the program execution unit 4934. For example, if the SPRM(16) shows "English", then during playback processing of a playlist, the playback control unit 4935 first searches the STN table in the PI showing the current playback section, i.e. the current PI, for a stream entry having the language code for "English". The playback control unit 4935 then extracts the PID from the stream identification information of the stream entry and transmits the extracted PID to the system target decoder 4923. As a result, an audio stream having the PID is selected and decoded by the system target decoder 4923. These processes can be executed by the playback control unit 4935 with use of the movie object file or the BD-J object file.

During playback processing, the playback control unit 4935 updates the player variables in accordance with the status of playback. The playback control unit 4935 updates the SPRM(1), SPRM(2), SPRM(21), and SPRM(22) in particular. These SPRM respectively show, in the stated order, the STN of the audio stream, subtitle stream, secondary video stream, and secondary audio stream that are currently being processed. For example, suppose that the SPRM(1) has been changed by the program execution unit 4934. In this case, the playback control unit 4935 first refers to the STN shown by the new SPRM(1) and retrieves the stream entry that includes this STN from the STN table in the current PI. The playback control unit 4935 then extracts the PID from the stream identification information of the stream entry and transmits the extracted PID to the system target decoder 4923. As a result, an audio stream having the PID is selected and decoded by the system target decoder 4923. This is how the audio stream to be played back is switched. The subtitle stream and the secondary video stream to be played back can be similarly switched.

<Playback Processing of 2D Playback Device>

FIG. 51 is a flowchart of playback processing by the 2D playback device 4900. This processing is started when the playback device 102 is activated in 2D playback mode as a result of the selection shown in FIG. 48.

In step S5101, the 2D playback device 4900 controls the BD-ROM drive 4901 to read stream data from the BD-ROM disc 101 and stores the read data to the read buffer 4921. Thereafter, processing proceeds to step S5102.

In step S5102, the 2D playback device 4900 controls the system target decoder 4923 to read stream data from the read buffer 4921 and demultiplex the stream data into separate elementary streams. Thereafter, processing proceeds to step S5103.

In step S5103, the 2D playback device 4900 controls the system target decoder 4923 to decode the respective elementary streams. In particular, the primary video stream, secondary video stream, IG stream, and PG stream are decoded into a primary video plane, secondary video plane, IG plane, and PG plane, respectively. Furthermore, the primary audio stream and secondary audio stream are mixed. In addition, graphics data received from the program execution unit 4934 is converted into an image plane. Thereafter, processing proceeds to step S5104.

In step S5104, the 2D playback device 4900 controls the plane adder 4924 to combine the primary video plane, secondary video plane, IG plane, PG plane, and image plane, each of which is decoded by the system target decoder 4923, into one video plane. Thereafter, processing proceeds to step S5105.

In step S5105, the 2D playback device 4900 controls the HDMI communication unit 4925 to convert the video plane combined by the plane adder 4924, audio data mixed by the system target decoder 4923, control data received from the playback control unit 4935 all into serial signals and to transmit the resulting signal signals to the display device 103 via the HDMI cable 122. In particular, the serial signals are generated in the format shown in FIG. 4. Thereafter, processing proceeds to step S5106.

In step S5106, the 2D playback device 4900 checks whether there is any unprocessed stream data remaining in the read buffer 4921. When an unprocessed stream data remains, processing is repeated from step S5101. When no unprocessed stream data remains, processing ends.

<<2D Playlist Playback Processing>>

Figure 52:
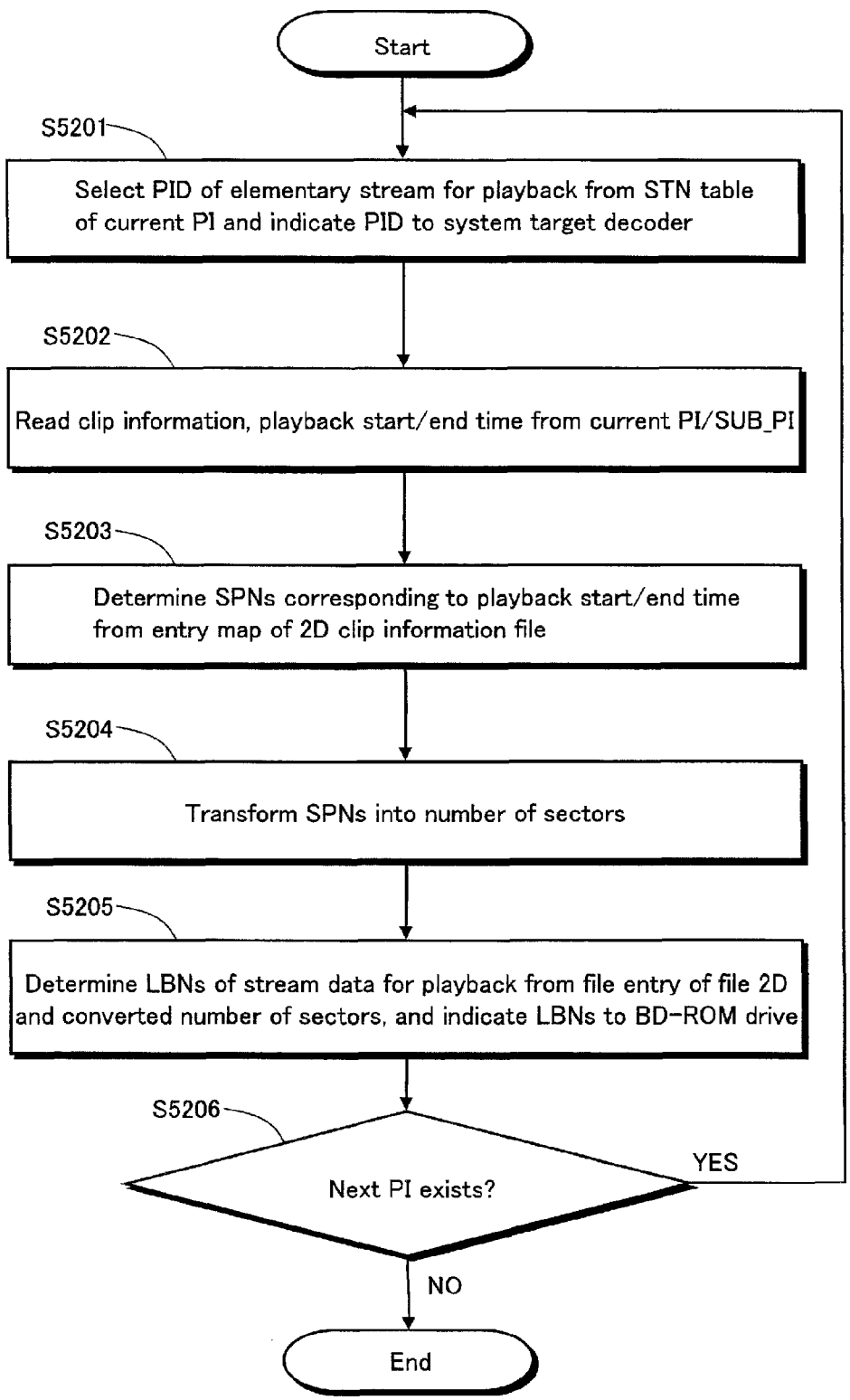
FIG. 52 is a flowchart of 2D playlist playback processing by a playback control unit 4935 shown in FIG. 49.

FIG. 52 is a flowchart of 2D playlist playback processing by the playback control unit 4935. 2D playlist playback processing is performed according to a 2D playlist file and is started by the playback control unit 4935 reading a 2D playlist file from the static scenario memory 4932.

In step S5201, the playback control unit 4935 first reads a single PI from a main path in the 2D playlist file and then sets the PI as the current PI. Next, from the STN table of the current PI, the playback control unit 4935 selects PIDs of elementary streams to be played back and specifies attribute information necessary for decoding the elementary streams. The selected PIDs and attribute information are indicated to the system target decoder 4923. The playback control unit 4935 further specifies a SUB_PI associated with the current PI from the sub-paths in the 2D playlist file. Thereafter, processing proceeds to step S5202.

In step S5202, the playback control unit 4935 reads reference clip information, a PTS #1 indicating a playback start time IN1, and a PTS #2 indicating a playback end time OUT1 from the current PI. From this reference clip information, a 2D clip information file corresponding to the file 2D to be played back is specified. Furthermore, when a SUB_PI exists that is associated with the current PI, similar information is also read from the SUB_PI. Thereafter, processing proceeds to step S5203.

In step S5203, the playback control unit 4935 refers to the entry map in the 2D clip information file to retrieve from the file 2D the SPN #1 and SPN #2 that correspond to the PTS #1 and PTS #2. The pair of PTSs indicated by the SUB_PI are also converted to a pair of SPNs. Thereafter, processing proceeds to step S5204.

In step S5204, from the SPN #1 and the SPN #2, the playback control unit 4935 calculates a number of sectors corresponding to each of the SPN #1 and the SPN #2. Specifically, the playback control unit 4935 first obtains the product of each of the SPN #1 and the SPN #2 multiplied by the data amount per source packet, i.e. 192 bytes. Next, the playback control unit 4935 obtains a quotient by dividing each product by the data amount per sector, i.e. 2048 bytes: N1=SPN #1×192/2048, N2=SPN #2×192/2048. The quotients N1 and N2 are the same as the total number of sectors, in the main TS, recorded in portions previous to the source packets to which SPN #1 and SPN #2 are allocated, respectively. The pair of SPNs converted from the pair of PTSs indicated by the SUB_PI is similarly converted to a pair of numbers of sectors. Thereafter, processing proceeds to step S5205.

In step S5205, the playback control unit 4935 specifies, from the numbers of sectors N1 and N2 obtained in step S5204, LBNs of the top and end of the 2D extent group to be played back. Specifically, with reference to the file entry of the file 2D to be played back, the playback control unit 4935 counts from the top of the sector group in which the 2D extent group is recorded, and thereby specifies the LBN of the (N1+1)$^{th}$ sector=LBN #1, and the LBN of the (N2+1)$^{th}$ sector=LBN #2. The playback control unit 4935 further specifies a range from the LBN #1 to the LBN #2 to the BD-ROM drive 4901. The pair of numbers of sectors converted from the pair of PTSs indicated by the SUB_PI is similarly converted to a pair of LBNs and specified to the BD-ROM drive 4901. As a result, from the sector group in the specified range, a source packet group belonging to a 2D extent group is read in aligned units. Thereafter, processing proceeds to step S5206.

In step S5206, the playback control unit 4935 checks whether an unprocessed PI remains in the main path. When an unprocessed PI remains, processing is repeated from step S5201. When no unprocessed PI remains, processing ends.

<System Target Decoder>

Figure 53:
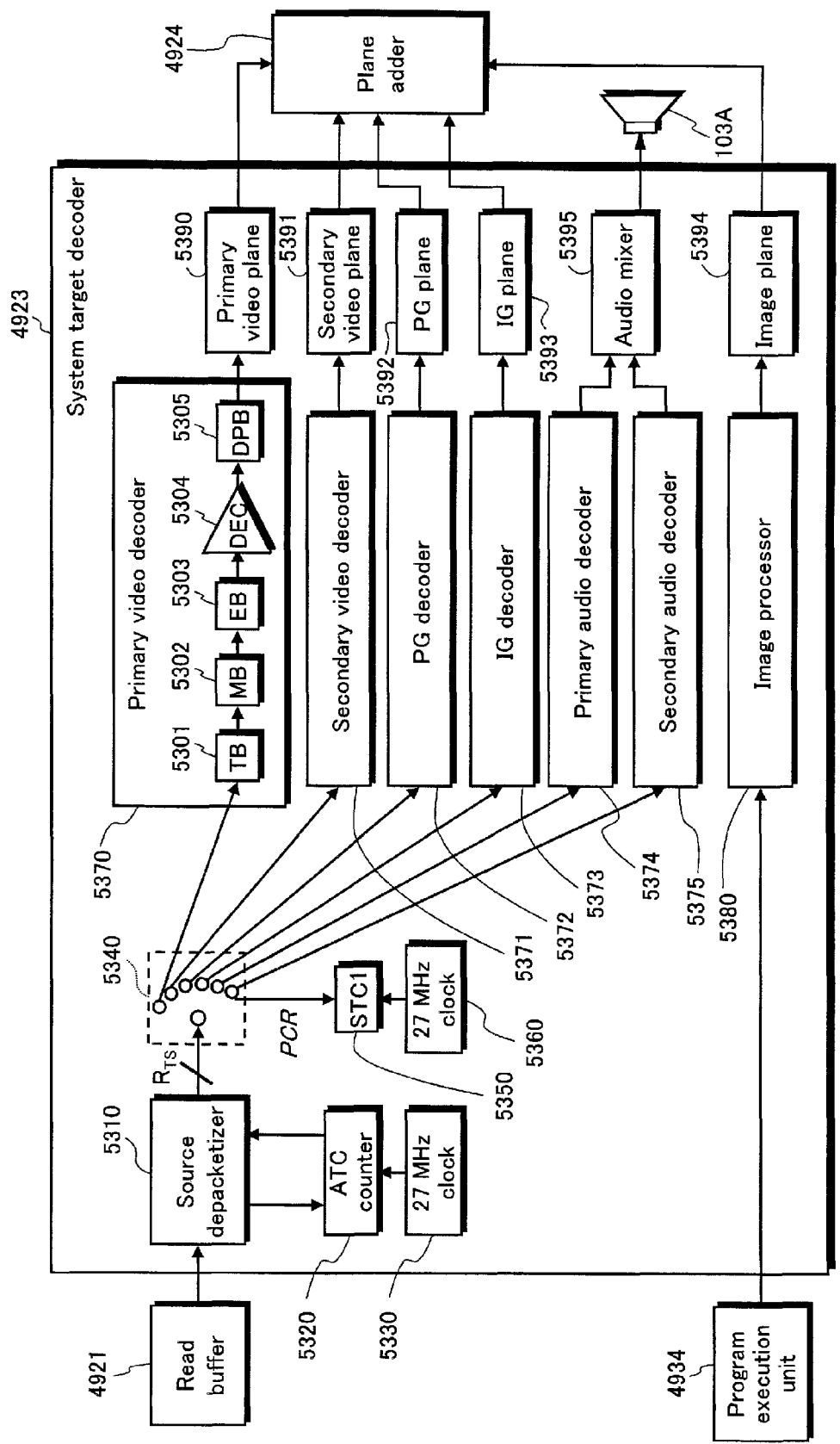
FIG. 53 is a functional block diagram of a system target decoder 4923 shown in FIG. 49.

FIG. 53 is a functional block diagram of a system target decoder 4923. As shown in FIG. 53, the system target decoder 4923 includes a source depacketizer 5310, ATC counter 5320, first 27 MHz clock 5330, PID filter 5340, STC counter (STC1) 5350, second 27 MHz clock 5360, primary video decoder 5370, secondary video decoder 5371, PG decoder 5372, IG decoder 5373, primary audio decoder 5374, secondary audio decoder 5375, image processor 5380, primary video plane memory 5390, secondary video plane memory 5391, PG plane memory 5392, IG plane memory 5393, image plane memory 5394, and audio mixer 5395.

The source depacketizer 5310 reads source packets from the read buffer 4921, extracts the TS packets from the read source packets, and transfers the TS packets to the PID filter 5340. Furthermore, the source depacketizer 5310 synchronizes the time of the transfer with the time shown by the ATS of each source packet. Specifically, the source depacketizer 5310 first monitors the value of the ATC generated by the ATC counter 5320. In this case, the value of the ATC depends on the ATC counter 5320 and is incremented in accordance with a pulse of a clock signal from the first 27 MHz clock 5330. Subsequently, at the instant the value of the ATC matches the ATS of a source packet, the source depacketizer 53110 transfers the TS packets extracted from the source packet to the PID filter 5340. By adjusting the time of transfer in this way, the mean transfer rate of TS packets from the source depacketizer 5310 to the PID filter 5340 does not surpass the value RTS specified by the system rate 3411 in the 2D clip information file 1231 shown in FIG. 34.

The PID filter 5340 first monitors a PID that includes each TS packet outputted by the source depacketizer 5310. When the PID matches a PID specified in advance by the playback control unit 4935, the PID filter 5340 selects the TS packet and transfers it to the decoder 5370-5375 appropriate for decoding of the elementary stream indicated by the PID. For example, if a PID is 0x1011, the TS packets are transferred to the primary video decoder 5370. TS packets with PIDs ranging from 0x1B00-0x1B1F, 0x1100-0x111F, 0x1A00-0x1A1F, 0x1200-0x121F, and 0x1400-0x141F are transferred to the secondary video decoder 5371, primary audio decoder 5374, secondary audio decoder 5375, PG decoder 5372, and IG decoder 5373, respectively.

The PID filter 5340 further detects a PCR from TS packets using the PIDs of the TS packets. At each detection, the PID filter 5340 sets the value of the STC counter 5350 to a predetermined value. Then, the value of the STC counter 5350 is incremented in accordance with a pulse of the clock signal of the second 27 MHz clock 5360. In addition, the value to which the STC counter 5350 is set is indicated to the PID filter 5340 from the playback control unit 4935 in advance. The decoders 5370-5375 each use the value of the STC counter 5350 as the STC. Specifically, the decoders 5370-5375 first reconstruct the TS packets received from the PID filter 5340 into PES packets. Next, the decoders 5370-5375 adjust the timing of the decoding of data included in the PES payloads in accordance with the times indicated by the PTSs or the DTSs included in the PES headers.

As shown in FIG. 53, the primary video decoder 5370 includes a transport stream buffer (TB) 5301, multiplexing buffer (MB) 5302, elementary stream buffer (EB) 5303, compressed video decoder (DEC) 5304, and decoded picture buffer (DPB) 5305.

The TB 5301, MB 5302, and EB 5303 are each a buffer memory and use an area of a memory element internally provided in the primary video decoder 5370. Alternatively, some or all of the buffer memories may be separated in discrete memory elements. The TB 5301 stores the TS packets received from the PID filter 5340 as they are. The MB 5302 stores PES packets reconstructed from the TS packets stored in the TB 5301. Note that when the TS packets are transferred from the TB 5301 to the MB 5302, the TS header is removed from each TS packet. The EB 5303 extracts encoded VAUs from the PES packets and stores the VAUs therein. A VAU includes a compressed picture, i.e. an I picture, B picture, or P picture. Note that when data is transferred from the MB 5302 to the EB 5303, the PES header is removed from each PES packet.

The DEC 5304 is a hardware decoder specifically for decoding of compressed pictures and is composed of an LSI that includes, in particular, a function to accelerate the decoding. The DEC 5304 decodes a picture from each VAU in the EB 5303 at the time shown by the DTS included in the original PES packet. During decoding, the DEC 5304 first analyzes the VAU header to specify the compression encoding method used to compress the pictures stored therein and the stream attribute, selecting a decoding method in accordance with this information. Examples of the compression encoding methods include MPEG-2, MPEG-4 AVC, and VC1. Furthermore, the DEC 5304 transmits the decoded and thus uncompressed picture to the DPB 5305.

Like the TB 5301, MB 5302, and EB 5303, the DPB 5305 is a buffer memory that uses an area of a built-in memory element in the primary video decoder 5370. Alternatively, the DPB 5305 may be located in a memory element separate from the other buffer memories 5301, 5302, and 5303. The DPB 5305 temporarily stores the decoded pictures. When a P picture or B picture is to be decoded by the DEC 5304, the DPB 5305 retrieves reference pictures, in response to an instruction from the DEC 5304, from among stored decoded pictures. The DPB 5305 then provides the reference pictures to the DEC 5304. Furthermore, the DPB 5305 writes the stored pictures into the primary video plane memory 5390 at the time shown by the PTSs included in the original PES packets.

The secondary video decoder 5371 includes the same structure as the primary video decoder 5370. The secondary video decoder 5371 first decodes the TS packets of the secondary video stream received from the PID filter 5340 into uncompressed pictures. Subsequently, the secondary video decoder 5371 writes the uncompressed pictures into the secondary video plane memory 5391 at the time shown by the PTSs included in the PES packets.

The PG decoder 5372 decodes the TS packets received from the PID filter 5340 into uncompressed graphics objects and writes the uncompressed graphics objects to the PG plane memory 5392 at the time shown by the PTSs included in the PES packets. Details of the write processing are provided below.

The IG decoder 5373 decodes the TS packets received from the PID filter 5340 into uncompressed graphics object. The IG decoder 5373 further writes the uncompressed graphics object to the IG plane memory 5393 at the time shown by the PTSs included in the PES packets restored from the TS packets. Details on these processes are the same as in the PG decoder 5372.

The primary audio decoder 5374 first stores the TS packets received from the PID filter 5340 in a buffer provided therein. Subsequently, the primary audio decoder 5374 removes the TS header and the PES header from each TS packet in the buffer, and decodes the remaining data into uncompressed LPCM audio data. Furthermore, the primary audio decoder 5374 transmits the resultant audio data to the audio mixer 5395 at the time shown by the PTS included in the original PES packet. The primary audio decoder 5374 selects the decoding method for compressed audio data in accordance with the compression encoding method and stream attributes for the primary audio stream included in the TS packets. Compression encoding methods include, for example, AC-3 and DTS.

The secondary audio decoder 5375 has the same structure as the primary audio decoder 5374. The secondary audio decoder 5375 first reconstructs PES packets from the TS packets of the secondary audio stream received from the PID filter 5340 and then decodes the data included in the PES payloads into uncompressed LPCM audio data. Subsequently, the secondary audio decoder 5375 transmits the uncompressed LPCM audio data to the audio mixer 5395 at the times shown by the PTSs included in the PES headers. The secondary audio decoder 5375 selects the decoding method for compressed audio data in accordance with the compression encoding method and stream attributes for the secondary audio stream included in the TS packets. Examples of the compression encoding methods include Dolby Digital Plus and DTS-HD LBR.

The audio mixer 5395 receives uncompressed audio data from both the primary audio decoder 5374 and the secondary audio decoder 5375 and then mixes the received data. The audio mixer 5395 also transmits the synthesized sound yielded by mixing audio data to, for example, the internal speaker 103A of the display device 103.

The image processor 5380 receives graphics data, i.e., PNG or JPEG raster data, from the program execution unit 4934. Upon receiving the graphics data, the image processor 5380 renders the graphics data and writes the graphics data to the image plane memory 5394.

<<Decoding Processing by PG Decoder>>

FIG. 54A is a flowchart of processing whereby the PG decoder 5372 decodes a graphics object from one data entry in the PG stream. The processing is started when the PG decoder 5372 receives from the PID filter 5340 a group of TS packets constituting one data entry shown in FIG. 16. FIGS. 54B-54E are schematic diagrams showing the graphics object changing as the processing shown in FIG. 54A proceeds.

In step S5401, the PG decoder 5372 first identifies an ODS having the same object ID as the reference object ID 1605 in the PCS. Next, the PG decoder 5372 decodes a graphics object from the identified ODS, and writes the decoded graphics object into the object buffer. Here, the "object buffer" is a buffer memory embedded in the PG decoder 5372. The "smile mark" FOB shown in FIG. 54B is an example of the graphics object written into the object buffer.

In step S5402, the PG decoder 5372 performs the cropping process in accordance with the cropping information 1602 in the PCS, extracts a part of the graphics object from the graphics object, and writes the extracted part into the object buffer. FIG. 54C shows that strips LST and RST are removed from the left-hand and right-hand ends of the smile mark FOB, and the remaining part OBJ is written into the object buffer.

In step S5403, the PG decoder 5372 first identifies a WDS having the same window ID as the reference window ID 1603 in the PCS. Next, the PG decoder 5372 determines a display position of the graphics object in the graphics plane from a window position 1612 indicated by the identified WDS and an object display position 1601 in the PCS. In FIG. 54D, the top left position of the window WIN in the graphics plane GPL and the top left position DSP of the graphics object OBJ are determined.

In step S5404, the PG decoder 5372 writes the graphics object held in the object buffer into the display position determined in step S5403. When doing so, the PG decoder 5372 determines a range in which the graphics object is rendered by using a window size 1613 indicated by the WDS. In FIG. 54D, the graphics object OBJ is written into the graphics plane GPL in the range of window WIN starting from the top left position DSP.

In step S5405, the PG decoder 5372 first identifies a PDS having the same pallet ID as the reference object ID 1604 in the PCS. Next, the PG decoder 5372, by using CLUT 1622 in the PDS, determines color coordinate values to be indicated by each piece of pixel data in the graphics object OBJ. In FIG. 54E, the color of each pixel in the graphics object OBJ have been determined. In this way, processing of rendering a graphics object included in one data entry is completed. Steps S5401-S5405 are executed by the time indicated by the PTS included in the same PES packet as the graphics object.

<HDMI Communication Unit>

Figure 55:
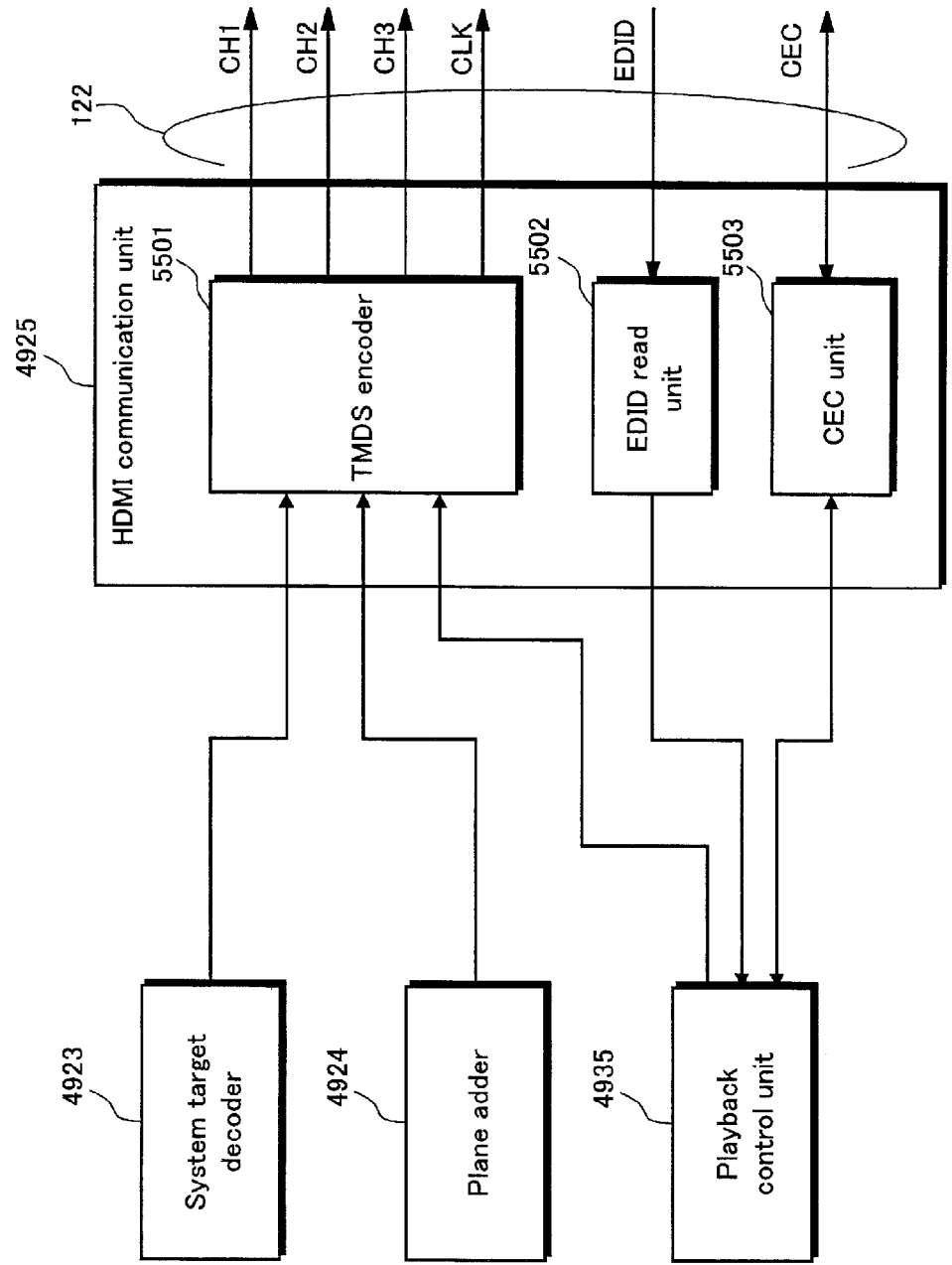
FIG. 55 is a functional block diagram showing a structure of an HDMI communication unit 4925 shown in FIG. 49.

FIG. 55 is a functional block diagram showing a structure of the HDMI communication unit 4925. The HDMI communication unit 4925 is connected to the display device 103, in particular to the HDMI communication unit 211 shown in FIG. 3, with the HDMI cable 122. With the above connection, the HDMI communication unit 4925 relays stream data outputted from the system target decoder 4923 and the plane adder 4924 to the display device 103. Furthermore, the HDMI communication unit 4925 relays data to be exchanged between the playback control unit 4935 and display device 103. As shown in FIG. 55, the HDMI communication unit 4925 includes a TMDS encoder 5501, EDID read unit 5502, and CEC unit 5503.

The TMDS encoder 5501 transmits serial signals carrying video data, audio data, auxiliary data, and control signal to the display device 103 through the TMDS channels CH1, CH2, CH3 and CLK in the HDMI cable 122. In particular, the TMDS encoder 5501 converts 8-bit pixel data pieces specifying the respective colors of R, G and B, 4-bit audio data, 4-bit auxiliary data (info frame), and a 2-bit control signal (containing horizontal sync signal and vertical sync signal) all into 10-bit data sequences and outputs the resulting 10-bit data sequences through the respective data channels CH1-CH3. In particular, the TMDS encoder 5501 generates the serial signals in the format shown in FIG. 4.

The EDID read unit 5502 is connected to the EDID storage unit 302 shown in FIG. 3, via the display data channel DDC available within the HDMI cable 122. The EDID read unit 5502 reads EDID representing the functions, characteristics and states of the display device 103 from the EDID storage unit 302. In addition, the EDID read unit 5502 performs HDCP authentication with the signal processing unit 220 shown in FIG. 3 through the display data channel DDC.

The CEC unit 5503 exchanges CEC messages with the CEC unit 303 shown in FIG. 3, via the CEC line CEC available within the HDMI cable 122. In particular, the CEC unit 5503 converts information that the playback device 102 receives from the remote control 105 into a CEC message and issues the CEC message to the signal processing unit 220. Reversely, the CEC unit 5503 is notified by the signal processing unit 220 of a CEC message indicating information that the display device 103 receives from the remote control 105.

<Structure of 3D Playback Device>

When playing back 3D video image content from the BD-ROM disc 101, the playback device 102 in 3D playback mode operates as a 3D playback device. The fundamental part of the device's structure is identical to the 2D playback device shown in FIGS. 49, 53, and 55. Therefore, the following is a description of sections of the structure of the 2D playback device that are enlarged or modified. Details on the fundamental parts of the 3D playback device can be found in the above description of the 2D playback device. The 3D playback device also uses the same structure as the 2D playback device for 2D playlist playback processing. Accordingly, the details on this structure can be found in the description of the 2D playback device. The following description assumes playback processing of 3D video images in accordance with 3D playlist files, i.e. 3D playlist playback processing.

Figure 56:
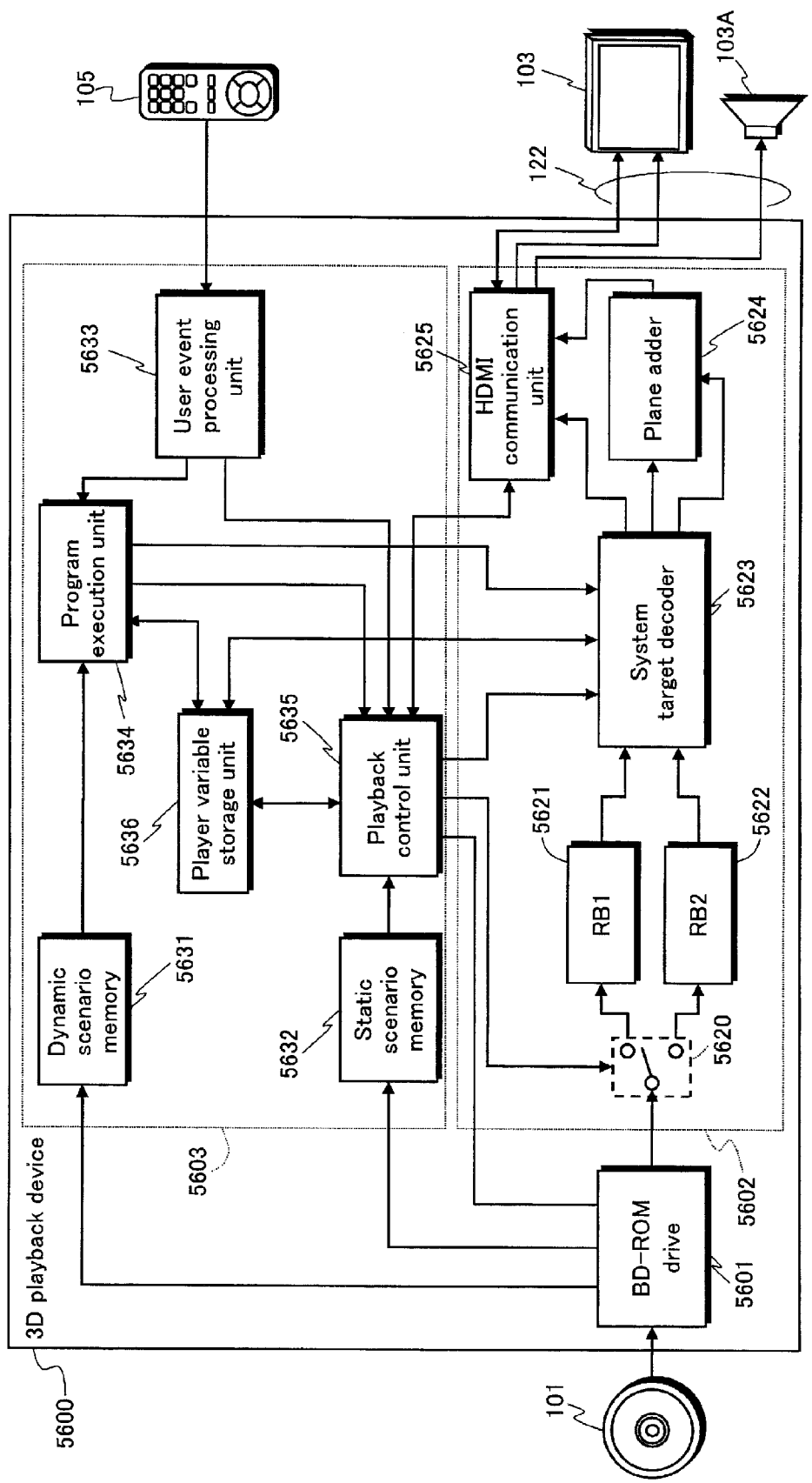
FIG. 56 is a functional block diagram of a 3D playback device 5600.

FIG. 56 is a functional block diagram of a 3D playback device 5600. The 3D playback device 5600 includes a BD-ROM drive 5601, playback unit 5602, and control unit 5603. The playback unit 5602 includes a switch 5620, first read buffer (RB1) 5621, a second read buffer (RB2) 5622, system target decoder 5623, plane adder 5624, and HDMI communication unit 5625. The control unit 5603 includes a dynamic scenario memory 5631, static scenario memory 5632, user event processing unit 5633, program execution unit 5634, playback control unit 5635, and player variable storage unit 5636. The playback unit 5602 and the control unit 5603 are each implemented on a different integrated circuit. Alternatively, however, both the units may be integrated into a single integrated circuit. In particular, the dynamic scenario memory 5631, static scenario memory 5632, user event processing unit 5633, and program execution unit 5634 have an identical structure with those in the 2D playback device shown in FIG. 49. Accordingly, details thereof can be found in the above description of the 2D playback device.

When instructed by the program execution unit 5634 or other unit to perform 3D playlist playback processing, the playback control unit 5635 reads a PI from the 3D playlist file stored in the static scenario memory 5632 in order, setting the read PI as the current PI. Each time the playback control unit 5635 sets a current PI, it sets operation conditions on the system target decoder 5623 and the plane adder 5624 in accordance with the STN table of the PI and the STN table SS in the 3D playlist file. Specifically, the playback control unit 5635 selects the PID of the elementary stream for decoding and transmits the PID, together with the attribute information necessary for decoding the elementary stream, to the system target decoder 5623. If a PG stream or IG stream is included in the elementary stream indicated by the selected PID, the playback control unit 5635 specifies the reference offset ID 4401 allocated to the stream data, setting the reference offset ID 4401 to the SPRM(27) in the player variable storage unit 5636. The playback control unit 5635 also selects the playback mode of each piece of plane data in accordance with the offset during pop-up 4511 indicated by the STN table SS, indicating the selected presentation mode to the system target decoder 5636 and plane adder (33).

Next, in accordance with the current PI, the playback control unit 5635 indicates the range of the LBNs in the sector group recorded in the extent SS to be read to the BD-ROM drive 5601 via the procedures in the description of FIG. 36E. Meanwhile, the playback control unit 5635 refers to the extent start points in the clip information file stored in the static scenario memory 5632 to generate information indicating the boundary of the data blocks in each extent SS. Hereinafter, the information is referred to as "data block boundary information". The data block boundary information indicates, for example, the number of source packets from the top of the extent SS to each boundary. The playback control unit 5635 then transmits this information to the switch 5620.

Suppose that during playback of 3D video images, a user instructs to display a pop-up menu by pushing a button on the remote control 105. In this case, the user event processing unit 5633 detects the push, identifies the button, and requests the program execution unit 5634 to perform processing for displaying the pop-up menu. In response to the request, the program execution unit 5634 reads a corresponding program from the dynamic scenario memory 5631, and executes the program. According to the program, the program execution unit 5634 further instructs the playback control unit 5635 to update the SPRM(33), and generates graphics data for the menu and transfers the graphics data to the system target decoder 5623. In response to the instruction from the program execution unit 5634 or the request from the user event processing unit 5633, the playback control unit 5635 changes the value of a playback mode set in the SPRM(33) from "3D" to "2D". The playback control unit 5635 also notifies the HDMI communication unit 4923 of the change in playback mode.

The player variable storage unit 5636 includes the SPRMs, like the player variable storage unit 4936 in the 2D playback device. However, unlike FIG. 50, SPRM(24), SPRM(25), SPRM(27), and SPRM(33) include the following data. SPRM(24) includes the first flag and SPRM(25) includes the second flag, as shown in FIG. 48. In this case, when the SPRM(24) is "0", the playback device 102 only supports playback of 2D video images, and when the SPRM(24) is "1", the playback device 102 also supports playback of 3D video images. When the SPRM(25) is "0", "1" or "2", the playback device 102 is in L/R mode, depth mode, or 2D playback mode, respectively. The SPRM(27) includes a storage area for a reference offset ID 4401 assigned to each plane. In particular, the SPRM(27) includes an area for storing any of four types of reference offset IDs. The reference offset IDs are one for a PG plane (PG_ref_offset_id), one for an IG plane (IG_ref_offset_id), one for a secondary video plane (SV_ref_offset_id), and one for an image plane (IM_ref_offset_id). SPRM(33) includes a parameter "playback status". In addition to the playback mode, the playback status indicates the output mode (whether it is B-D presentation mode or B-B presentation mode, etc.) of the playback unit 5602 relating to video data. Values indicated by the playback status come in four types, i.e., types A to D. Details on the correspondence between types A-D, playback mode, and the output mode of the playback unit 5602 are provided below.

The BD-ROM drive 5601 includes the same structural elements as the BD-ROM drive 4901 of the 2D playback device shown in FIG. 49. Upon receiving an indication from the playback control unit 5635 of a range of LBNs, the BD-ROM drive 5601 reads data from the sectors on the BD-ROM disc 101 as indicated by the range. In particular, a source packet group belonging to an extent in the file SS, i.e. belonging to an extent SS, are transmitted from the BD-ROM drive 5601 to the switch 5620. Each extent SS includes one or more pairs of a base-view and dependent-view data block, as shown in FIG. 25. These data blocks have to be transferred to the RB1 5621 and RB2 5622 in parallel. Accordingly, the BD-ROM drive 5601 is required to have at least the same access speed as the BD-ROM drive 4901 in the 2D playback device.

The switch 5620 receives extents SS from the BD-ROM drive 5601, and also receives, from the playback control unit 5635, data block boundary information relating to those extents SS. Furthermore, the switch 5620 extracts base-view extents and dependent-view extents from the extents SS with the use of the data block boundary information and sends the extracted base-view extents to the RB1 5621 and the extracted dependent-view extents to the RB2 5622.

The RB1 5621 and RB2 5622 are each a buffer memory that use a memory element in the playback unit 5602. In particular, different areas in a single memory element are used as the RB1 5621 and RB2 5622. Alternatively, the different memory elements may be used as the RB1 5621 and RB2 5622. The RB1 5621 and RB2 5622 receive to store base-view extents and dependent-view extents from the switch 5620 respectively.

In 3D playlist playback processing, the system target decoder 5623 first receives, from the playback control unit 5635, PIDs for stream data to be decoded as well as attribute information necessary for decoding the stream data. The system target decoder 5623 then reads source packets alternately from base-view extents stored in the RB1 5621 and dependent-view extents stored in the RB2 5622. Next, the system target decoder 5623 separates, from each source packet, elementary streams indicated by the PIDs received from the playback control unit 5635 and decodes the elementary streams. The system target decoder 5623 then writes the decoded elementary streams in internal plane memory according to the type thereof. The base-view video stream is written in the left-video plane memory, and the dependent-view video stream is written in the right-video plane memory. On the other hand, the secondary video stream is written in the secondary video plane memory, the IG stream in the IG plane memory, and the PG stream in the PG plane memory. As in the PG stream etc. shown in FIGS. 13B and 11C, a stream other than a video stream may be composed of a pair of base-view and dependent-view video stream data. In that case, a pair of plane memories is provided for the stream data, so that both the left-view and right-view plane data pieces are separately rendered on the respective planes. The system target decoder 5623 additionally renders graphics data from the program execution unit 5634, such as JPEG, PNG, etc. raster data, and writes this data in the image plane memory.

The system target decoder 5623 refers to the SPRM(33) in the player variable storage unit 5636 and, according to the value indicated by the SPRM(33), sets the output mode of plane data from the left-video and right-video plane memories to either B-D presentation mode or B-B presentation mode. Specifically, when the playback status indicates B-D presentation mode, the system target decoder 5623 outputs plane data alternately from the left-video and right-video plane memories once every $\frac{1}{48}$ second. On the other hand, when the playback status indicates B-B presentation mode, the system target decoder 5623 outputs plane data from only one of the left-video memory or the right-video plane memory twice per frame, i.e., twice every $\frac{1}{48}$ second.

Furthermore, according to the value of the playback status indicated by the SPRM(33), the system target decoder 5623 sets the output mode of plane data received from the graphics plane and secondary video plane memories to one of 2 plane mode, 1 plane+offset mode, and 1 plane+zero offset mode. The graphics plane memory includes PG plane memory, IG plane memory, and image plane memory. When the playback status indicates 2 plane mode, the system target decoder 5623 alternately outputs base-view plane and dependent-view plane from the respective plane memories to the plane adder 5424. When the playback status indicates 1 plane+offset mode, the system target decoder 5623 outputs 2D plane data from the respective plane memories to the plane adder 5624. In parallel with the above operation, the system target decoder 5623 reads the offset metadata 2110 from a VAU at the top of each video sequence, each time such a VAU is read from the dependent-view video stream. In the playback section of the video sequence, the system target decoder 5623 first specifies the PTS stored in the same PES packet along with each VAU and specifies the frame number represented by the compressed picture data of that VAU. The system target decoder 5623 then reads the offset information associated with the frame number from the offset metadata and transmits the offset information to the plane adder 5624 at the time indicated by the specified PTS. When the playback status indicates 1 plane+zero offset mode, the system target decoder 5623 outputs 2D plane data from the respective plane memories to the plane adder 5624. In parallel with the above operation, the system target decoder 5623 sends the plane adder 5624 the offset information with the offset value set to "0".

The plane adder 5624 receives each type of plane data from the system target decoder 5623 and superimposes these pieces of plane data into one piece of plane data (frame or field). In particular, in L/R mode, left-video plane data represents a left-view video plane, and right-view plane data represents a right-view video plane. Accordingly, the plane adder 5624 superimposes other plane data representing the left view on the left-video plane data and superimposes other plane data representing the right view on the right-video plane data. In depth mode, on the other hand, the right-video plane represents a depth map of video images represented by the left-video plane. Accordingly, the plane adder 5624 first generates pairs of right-view and left-view video planes from both the video planes. The combination processing performed thereafter is basically the same as the processing performed in L/R mode.

The plane adder 5624 refers to the SPRM(33) in the player variable storage unit 3656. Then, according to a value of the playback status indicated by the SPRM(33), the plane adder 5624 selects the display mode for a secondary video plane or a graphics plane (i.e., PG plane, IG plane, or image plane). Specifically, when the playback status for a piece of plane data indicates 1 plane+offset mode, offset control is performed on the piece of plane data as follows. The plane adder 5624 first reads a reference offset ID that corresponds to the piece of plane data, from the SPRM(27) in the player variable storage unit 5636. Next, the plane adder 5624 refers to the offset information received from the system target decoder 5623, and retrieves the offset information belonging to the offset sequence 2113 indicated by the reference offset ID, i.e., a pair of the offset direction 2122 and the offset value 2123. The plane adder 5624 then uses the retrieved offset value to perform offset control on the piece of plane data. Accordingly, the plane adder 5624 generates a pair of a left-view plane and a right-view plane from the piece of plane data, and combines the pair with a corresponding video plane. When the playback status indicates 1 plane+zero offset mode, the plane adder 5624 sets the offset value of each piece of plane data to "0" without referring to the SPRM(27). In this way, the plane adder 5624 temporarily stops offset control on each piece of plane data. Accordingly, the same piece of plane data is combined with both a left-view video plane and a right-view video plane. When the playback status indicates 2 plane mode, the plane adder 5624 receives a pair of a base-view plane and a dependent-view plane from the system target decoder 5623. Here, in L/R mode, the base-view plane represents a left-view plane, and the dependent-view plane represents a right-view plane. Accordingly, the plane adder 5624 superimposes the base-view plane on a left video plane, and the dependent-view plane on a right video plane. On the other hand, in depth mode, the dependent-view plane represents a depth map for video images represented by the base-view plane. Accordingly, the plane adder 5624 generates a pair of a left-view plane and a right-view plane from a pair of a base-view plane and a dependent-view plane, and thereafter performs processing for combining with video planes.

In addition to the above-stated processing, the plane adder 5624 converts the output format of the combined plane data into a format that complies with the display method of 3D video images adopted in a device such as the display device 103 to which the data is output. If an alternate-frame sequencing method is adopted in the device, for example, the plane adder 5624 outputs the combined plane data pieces as one video plane (frame or one field). On the other hand, if a method that uses a lenticular lens is adopted in the device, the plane adder 5624 combines a pair of left-view and right-view planes into one video plane with use of internal buffer memory. Specifically, the plane adder 5624 temporarily stores and holds in the buffer memory the left-view plane that has been combined first. Subsequently, the plane adder 5624 combines the right-view plane, and further combines the resultant data with the left-view plane held in the buffer memory. During combination, the left-view and right-view planes are each divided into small rectangular areas that are long and thin in a vertical direction, and the small rectangular areas are arranged alternately in the horizontal direction in one frame or one field so as to re-constitute the frame or the field. In this manner, a pair of left-view and right-view planes is combined into one video plane.

The HDMI communication unit 5625 receives combined video data from the plane adder 5624, audio data from the system target decoder 5623, and control data, in particular a playback mode, from the playback control unit 5635. Then, the HDMI communication unit 5625 converts the received data pieces into serial signals in the HDMI format, and transmits the signals to the display device 103 over the TMDS channel in the HDMI cable 122. The HDMI communication unit 5625 generates the serial signals in the format shown in FIG. 4. In this case, a pair of a left-view plane and a right-view plane constituting a frame of 3D video images is preferably transmitted in the frame packing method shown in FIG. 5A. It is also possible to adopt any of the formats shown in FIGS. 5B to 5E. The HDMI communication unit 5625 also sets the 3D structure 401 within an info frame to a value indicating a transmission format that has been adopted, and sets the playback mode 402 to a value received from the playback control unit 5635. The display device 103 indentifies the transmission format indicated by the 3D structure 401 in the info frame, and detects the value indicated by the playback mode 402. Using these information pieces, the display device 103 displays at least one of a left-view frame L and a right-view frame R received from the HDMI communication unit 5625, in a pattern shown by one of FIGS. 7C to 11C. In parallel, as shown in one of FIGS. 7D to 11D, the display device 103 alternately causes the left and right lenses of the shutter glasses 104 to be transparent synchronously with the switching of the frames L and R.

Additionally, the HDMI communication unit 5625 exchanges CEC messages with the display device 103 via the HDMI cable 122. Furthermore, the HDMI communication unit 5625 reads EDID from the display device 103 over the Display Data Channel (DDC), performs HDCP authentication on the display device 103, and issues to the display device 103 an inquiry as to whether it supports playback of 3D video images.

<Playback Processing of 3D Playback Device>

Figure 57:
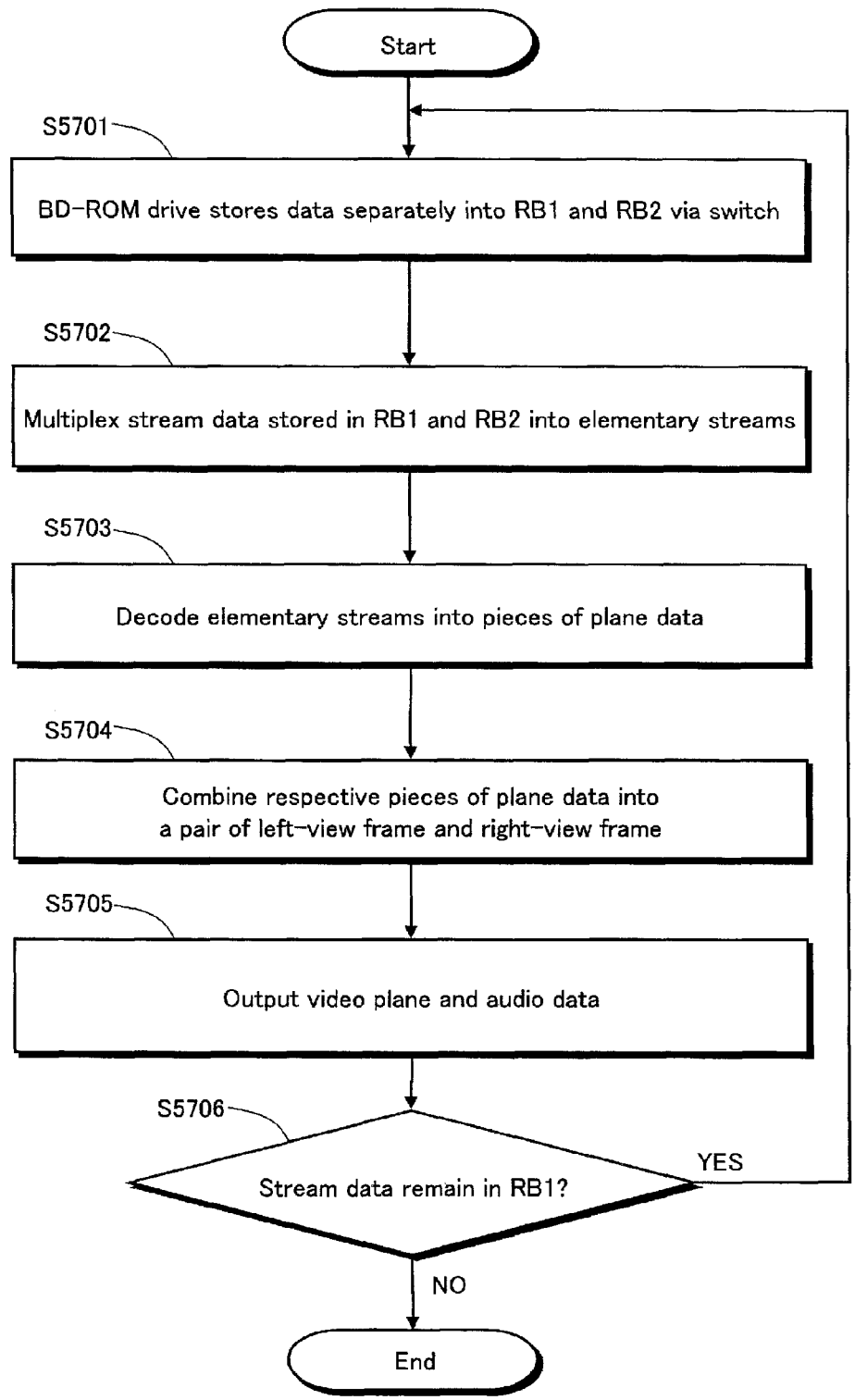
FIG. 57 is a flowchart of playback processing by the 3D playback device 5600 shown in FIG. 56.

FIG. 57 is a flowchart of playback processing by the 3D playback device 5600. This processing is started when the playback device 102 is activated in 3D playback mode as a result of the selection shown in FIG. 48.

In step S5701, the 3D playback device 5600 first controls the BD-ROM drove 5601 to read stream data from the BD-ROM disc 101. Then, the 3D playback device 5600 uses the switch 5620 to extract base-view extents and dependent-view extents from the stream data and stores each of the extracted extents into a corresponding one of the RB1 5621 and RB2 5622. Thereafter, processing proceeds to step S5702.

In step S5702, the 3D playback device 5600 controls the system target decoder 5623 to read base-view extents from the RB1 5621 and dependent-view extents from the RB2 5622. The 3D playback device 5600 then demultiplexes the extents into separate elementary streams. Thereafter, processing proceeds to step S5703.

In step S5703, the 3D playback device 5600 controls the system target decoder 5623 to decode the respective elementary streams. In particular, the primary video stream decoded from the base-view extents and dependent-view extents are decoded into a base-view video plane and dependent-view video plane. In addition, the secondary video stream, IG stream, and PG stream are decoded into a secondary video plane, IG plane, and PG plane, respectively. Furthermore, the primary audio stream and secondary audio stream are mixed. In addition, graphics data received from the program execution unit 5634 is converted into an image plane. Thereafter, processing proceeds to step S5704.

In step S5704, the 3D playback device 5600 first controls the plane adder 5624 to convert a pair of base-view video plane and a dependent-view video plane having been decoded by the system target decoder 5623, into a pair of a left-view plane and a right-view plane. The 3D playback device 5600 then controls the plane adder 5624 to combine the secondary video plane, IG plane, PG plane, and image plane into each of the left-view plane and right-view plane. At this point, the plane adder 5624 may provide offset to the secondary video plane, IG plane, PG plane or image plane to convert the plane into a pair of a left-view plane and a right-view plane. Thereafter, processing proceeds to step S5705.

In step S5705, the 3D playback device 5600 controls the HDMI communication unit 5625 to convert the video plane combined by the plane adder 5624, audio data mixed by the system target decoder 5623, control data received from the playback control unit 5635 all into serial signals and to transmit the resulting signal signals to the display device 103 via the HDMI cable 122. In particular, a playback mode is transmitted by an info frame during the vertical blanking period VBLK shown in FIG. 4. Thereafter, processing proceeds to step S5706.

In step S5706, the 3D playback device 5600 checks whether or not there is any unprocessed base-view extents remaining in the RB1 5621. When an unprocessed base-view extent remains, processing is repeated from step S5701. When no unprocessed base-view extent remains, processing ends.

<3D Playlist Playback Processing>

Figure 58:
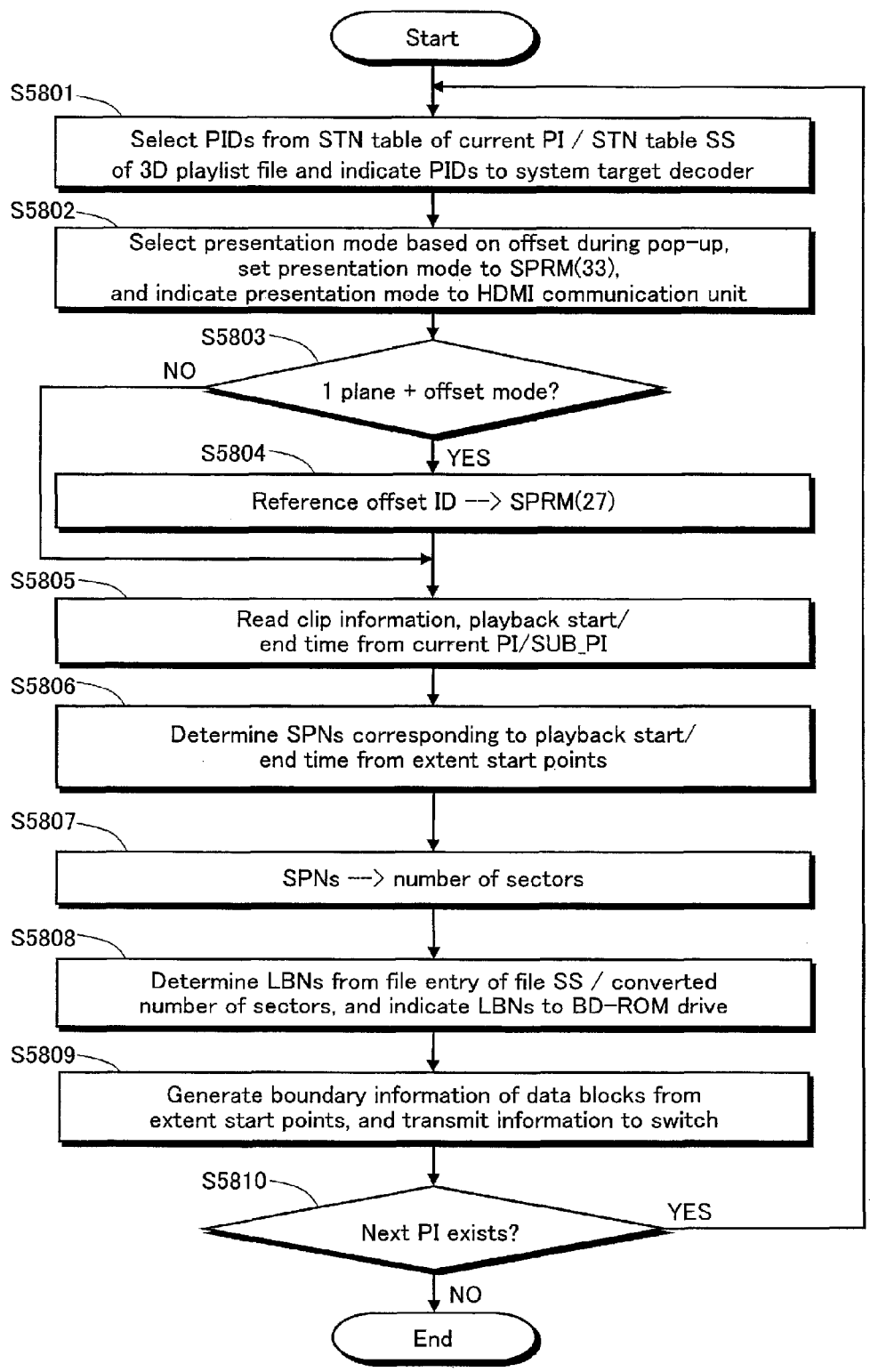
FIG. 58 is a flowchart of 3D playlist playback processing by a playback control unit 5635 shown in FIG. 56.

FIG. 58 is a flowchart of 3D playlist playback processing by the playback control unit 5635. 3D playlist playback processing is started by the playback control unit 5635 reading a 3D playlist file from the static scenario memory 5632.

In step S5801, the playback control unit 5635 first reads a single PI from a main path in the 3D playlist file and then sets the PI as the current PI. Next, from the STN table of the current PI, the playback control unit 5635 selects PIDs of elementary streams to be played back and specifies attribute information necessary for decoding the elementary streams. The playback control unit 5635 further selects, from among the elementary streams corresponding to the current PI in the STN table SS4330 in the 3D playlist file, a PID of elementary streams that are to be added to the elementary streams to be played back, and playback control unit 5635 specifies attribute information necessary for decoding these elementary streams. The selected PIDs and attribute information are indicated to the system target decoder 5623. The playback control unit 5635 additionally specifies, from among subpaths in the 3D playlist file, a SUB_PI to be referenced at the same time as the current PI, specifying this SUB_PI as the current SUB_PI. Thereafter, processing proceeds to step S5802.

In step S5802, the playback control unit 5635 selects the playback mode for the current PI depending on the offset during pop-up 4511 indicated by the STN table SS, and sets the playback mode in the SPRM(33) in the player variable storage unit 5636. Specifically, when the value of the offset during pop-up is "0", "3D" is selected as the playback mode. When the value of the offset during pop-up is "1", "2D" is selected as the playback mode. Also, the playback control unit 5635 selects one of B-D presentation mode and B-B presentation mode as the presentation mode for the video plane, and also selects one of 2 plane mode, 1 plane+offset mode, and 1 plane+zero offset mode as the presentation mode for the graphics plane. Thereafter, processing proceeds to step S5803.

In step S5803, it is checked as to whether or not 1 plane+offset mode is selected as the presentation mode of the graphics plane. If 1 plane+offset mode is selected, processing proceeds to step S5804. On the other hand, if 2 plane mode or 1 plane+zero offset mode is selected, processing proceeds to step S5805.

In step S5804, offset information needs to be extracted from the dependent-view video stream since 1 plane+offset mode has been selected. Accordingly, the playback control unit 5635 refers to the STN table of the current PI and retrieves the PG stream or IG stream from among the elementary streams indicated by the selected PIDs. Furthermore, the playback control unit 5635 specifies the reference offset ID allocated to the pieces of stream data, setting the reference offset ID to the SPRM(27) in the player variable storage unit 5636. Thereafter, processing proceeds to step S5805.

In step S5805, the playback control unit 5635 reads reference clip information, a PTS #1 indicating a playback start time IN1, and a PTS #2 indicating a playback end time OUT1 from the current PI and the SUB_PI. From this reference clip information, a clip information file corresponding to each of the file 2D and the file DEP to be played back is specified. Thereafter, processing proceeds to step S5806.

In step S5806, with reference to the entry map in each of the clip information files specified in step S5805, the playback control unit 5635 retrieves the SPN #1 and SPN #2 in the file 2D, and the SPN #11 and SPN #12 in the file DEP, corresponding to the PTS #1 and the PTS #2, as shown in FIG. 46. By using the extent start points of each clip information file, the playback control unit 5635 further calculates, from the SPN #1 and the SPN #11, the number of source packets SPN #21 from the top of the file SS to the playback start position. The playback control unit 5635 also calculates, from the SPN #2 and the SPN #12, the number of source packets SPN #22 from the top of the file SS to the playback end position. Specifically, the playback control unit 5635 first retrieves, from among SPNs shown by extent start points of the 2D clip information files, a value "Am" that is the largest value less than or equal to SPN #1, and retrieves, from among the SPNs shown by extent start points of dependent-view clip information files, a value "Bm" that is the largest value less than or equal to the SPN #11. Next, the playback control unit 5635 obtains the sum of the retrieved SPNs Am+Bm and sets the sum as SPN #21. Next, the playback control unit 5635 retrieves, from among SPNs shown by the extent start points of the 2D clip information files, a value "An" that is the smallest value that is larger than the SPN #2. The playback control unit 5635 also retrieves, from the SPNs of the extent start points of the dependent-view clip information files, a value "Bn" that is the smallest value that is larger than the SPN #12. Next, the playback control unit 5635 obtains the sum of the retrieved SPNs An+Bn and sets the sum as SPN #22. Thereafter, processing proceeds to step S5807.

In step S5807, the playback control unit 5635 converts the SPN #21 and the SPN #22, determined in step S5806, into a pair of numbers of sectors N1 and N2. Specifically, the playback control unit 5635 first obtains the product of SPN #21 and the data amount per source packet, i.e. 192 bytes. Next, the playback control unit 5635 divides this product by the data amount per sector, i.e. 2048 bytes: SPN #21×192/2048. The resulting quotient is the same as the number of sectors N1 from the top of the file SS to immediately before the playback start position. Similarly, from the SPN #22, the playback control unit 5635 calculates SPN #22×192/2048. The resulting quotient is the same as the number of sectors N2 from the top of the file SS to immediately before the playback end position. Thereafter, processing proceeds to step S5808.

In step S5808, the playback control unit 5635 specifies, from the numbers of sectors N1 and N2 obtained in step S5807, LBNs of the top and end of the extent SS group to be played back. Specifically, with reference to the file entry of the file SS to be played back, the playback control unit 5635 counts from the top of sector group in which the extent SS group is recorded, and specifies the LBN of the $(N1+1)^{th}$ sector=LBN #1, and the LBN of the $(N2+1)^{th}$ sector=LBN #2. The playback control unit 5635 further specifies a range from the LBN #1 to the LBN #2 to the BD-ROM drive 5601. As a result, from the sector group in the specified range, a source packet group belonging to an extent SS group is read in aligned units. Thereafter, processing proceeds to step S5809.

In step S5809, referring to the extent start points of the clip information file used in step S5806, the playback control unit 5635 generates data block boundary information relating to the extent SS group, transmitting the data block boundary information to the switch 5620. As a specific example, assume that the SPN #21 indicating the playback start position is the same as the sum of SPNs indicating the extent start points, An+Bn, and that the SPN #22 indicating the playback end position is the same as the sum of SPNs indicating the extent start points, Am+Bm. In this case, the playback control unit 5635 obtains a sequence of differences between SPNs from the respective extent start points, A(n+1)−An, B(n+1)−Bn, A(n+2)−A(n+1), B(n+2)−B(n+1), . . . , Am−A(m−1), and Bm−B(m−1), and transmits the sequence to the switch 5620 as the data block boundary information. As shown in FIG. 36E, this sequence indicates the number of source packets of data blocks included in the extent SS. The switch 5620 counts, from zero, the number of source packets of the extents SS received from the BD-ROM drive 5601. Each time the count is the same as the difference between SPNs indicated by the data block boundary information, the switch 5620 switches the destination of output of the source packets between RB1 5621 and RB2 5622 and resets the count to zero. As a result, [B(n+1)−Bn] source packets from the top of the extent SS are output to the RB2 5622 as the first dependent-view extent, and the following [A(n+1)−An] source packets are transmitted to the RB1 5621 as the first base-view extent. Thereafter, dependent-view extents and base-view extents are extracted from the extent SS alternately in the same way, alternating each time the number of source packets received by the switch 5620 is the same as the difference between SPNs indicated by the data block boundary information. Thereafter, processing proceeds to step S5810.

In step S5810, the playback control unit 5635 checks whether an unprocessed PI remains in the main path. When an unprocessed PI remains, processing is repeated from step S5801. When no unprocessed PI remains, processing ends.

<Update of Playback Mode>

Figure 59:
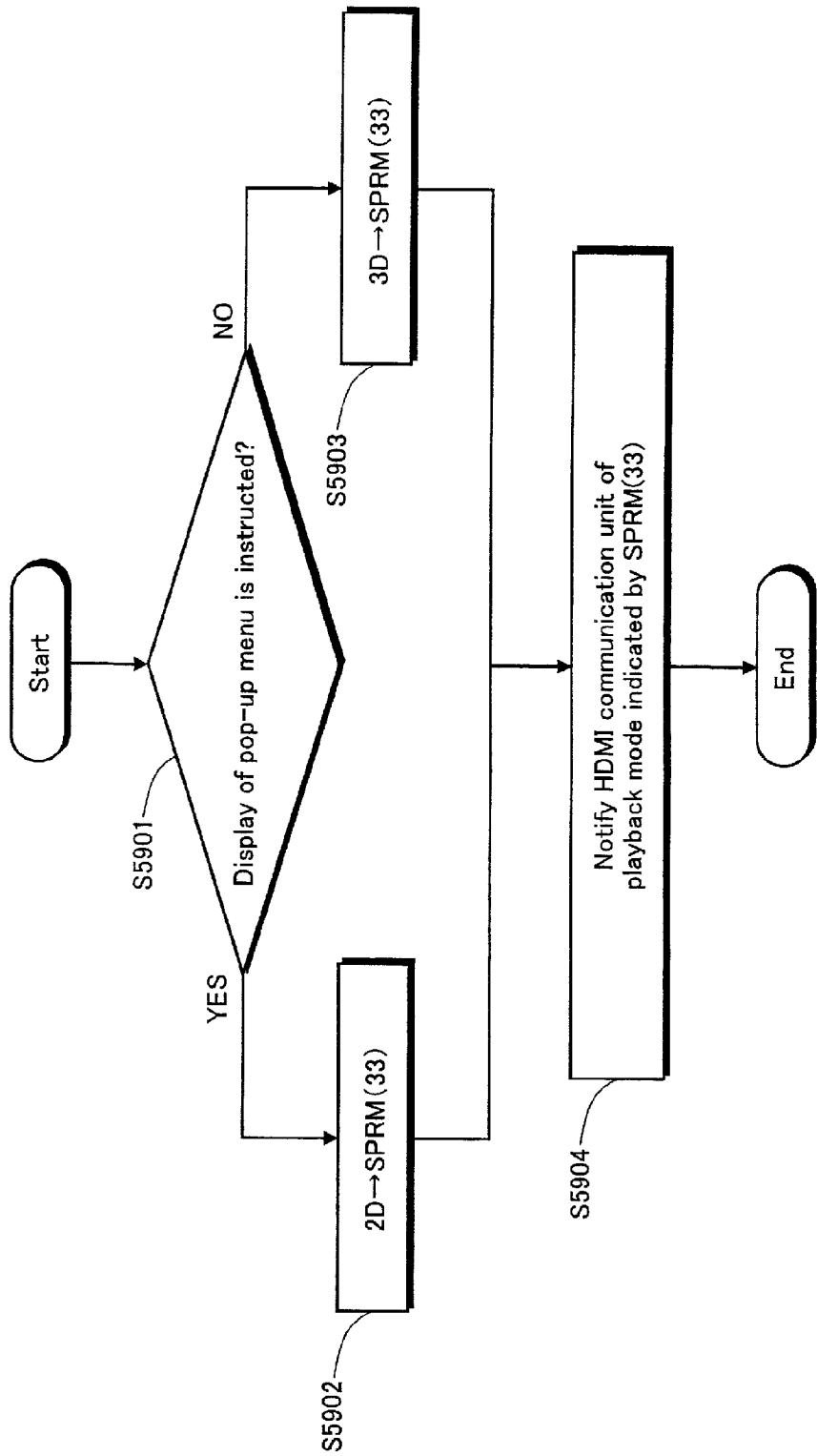
FIG. 59 is a flowchart of update processing of a playback mode by a playback control unit 5635 shown in FIG. 56.

FIG. 59 is a flowchart of update processing of a playback mode by the playback control unit 5635. The update processing is started in the following case: during playback of 3D video images, a user instructs to display a pop-up menu by, for example, pushing a button on the remote control 105. At this point, the user event processing unit 5633 detects the push, and requests the program execution unit 5634 to perform the processing for displaying the pop-up menu. In response to the request, the program execution unit 5634 instructs the playback control unit 5635 to update the SPRM(33). Here, the SPRM(33) indicates "3D" as a playback mode.

In step S5901, the playback control unit 5635 identifies whether an instruction from the program execution unit 5634 or a request from the user event processing unit 5633 corresponds to an instruction for displaying the pop-up menu. If a result of the identification is affirmative, the processing proceeds to step S5902. If it is negative, the processing proceeds to step S5903.

In step S5902, displaying of the pop-up menu is instructed. Accordingly, the playback control unit 5635 sets the SPRM (33) to "2D" as a playback mode. Thereafter, processing proceeds to step S5904.

In step S5903, displaying of the pop-up menu is not instructed. Such cases include in particular a case where cancelling the pop-up menu is instructed. Accordingly, the playback control unit 5635 sets the SPRM(33) to "3D" as a playback mode. Thereafter, processing proceeds to step S5904.

In step S5904, the playback control unit 5635 notifies the HDMI communication unit 5623 of the value of the playback mode indicated by the SPRM(33). In response to the notification, the HDMI communication unit 5625 sets the new playback mode in an info frame, and thereby notifies the display device 103 of the new playback mode. Processing then terminates.

<System Target Decoder>

Figure 60:
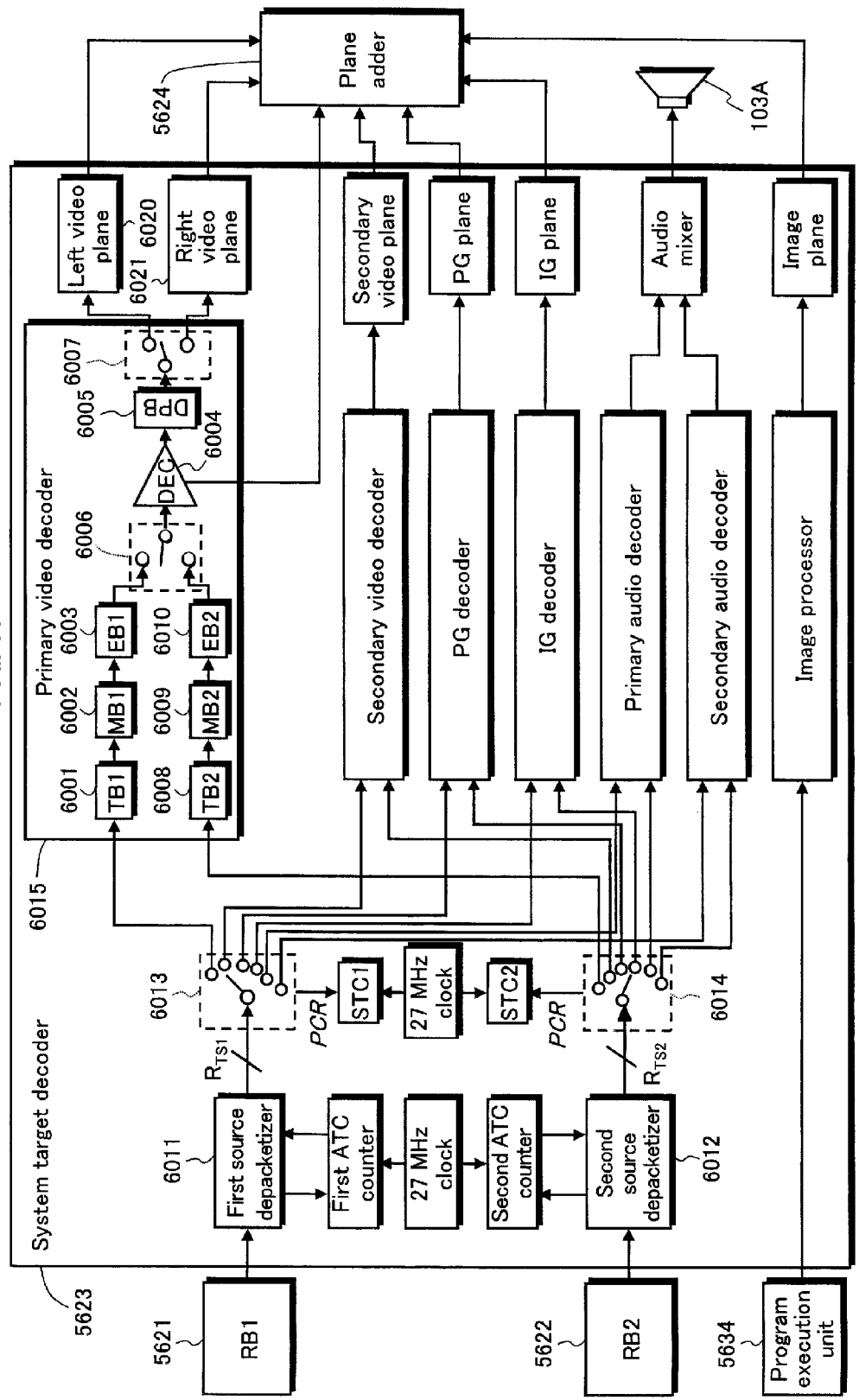
FIG. 60 is a functional block diagram of a system target decoder 5623 shown in FIG. 56.

FIG. 60 is a functional block diagram of the system target decoder 5623. The components shown in FIG. 60 differ from the components of the system target decoder 5323 in the 2D playback device shown in FIG. 53 in the following two points: (1) the input system from the read buffers to the decoders has a duplex configuration; and (2) the primary video decoder supports 3D playback mode, whereas the secondary video decoder, PG decoder, and IG decoder support 2 plane mode. That is, each of the video decoder is capable of alternately decoding base-view and dependent-view video streams. In particular, each decoder supporting 2 plane mode may be composed of separate portions, one for decoding base-view plane and the other for decoding dependent-view plane. On the other hand, the primary audio decoder, secondary audio decoder, audio mixer, image processor, and plane memories are the same as those in the 2D playback device shown in FIG. 53. Accordingly, among the structural elements shown in FIG. 60, those differing from the structural elements shown in FIG. 53 are described below, and description of the common structural elements can be found in the description given with reference to FIG. 53. Furthermore, since the video decoders each have a similar structure, only the structure of the primary video decoder 6015 is described below. This description is also valid for the structure of other video decoders.

The first source depacketizer 6011 reads source packets from the RB1 5621, furthermore extracting TS packets from the read source packets and transmitting the TS packets to the first PID filter 6013. The second source depacketizer 6012 reads source packets from the RB2 5622, furthermore extracting TS packets from the read source packets and transmitting the TS packets to the second PID filter 6014. Each of the source depacketizers 6011 and 6012 further synchronizes the time of transfer the TS packets with the time shown by the ATS of each source packet. This synchronization method is the same method as the source depacketizer 5310 shown in FIG. 53. Accordingly, details thereof can be found in the description provided for FIG. 53. With this sort of adjustment of transfer time, the mean transfer rate $R_{TS1}$ of TS packets from the first source depacketizer 6011 to the first PID filter 6013 does not exceed the system rate indicated by the 2D clip information file. Similarly, the mean transfer rate $R_{TS2}$ of TS packets from the second source depacketizer 6012 to the second PID filter 6014 does not exceed the system rate indicated by the dependent-view clip information file.

The first PID filter 6013 compares the PID of each TS packet received from the first source depacketizer 6011 with the selected PID. The playback control unit 5635 designates the selected PID beforehand in accordance with the STN table in the 3D playlist file. When the two PIDs match, the first PID filter 6013 transfers the TS packets to the decoder assigned to the PID. For example, if a PID is 0x1011, the TS packets are transferred to TB16001 in the primary video decoder 6015. On the other hand, TS packets with PIDs ranging from 0x1B00-0x1B1F, 0x1100-0x111F, 0x1A00-0x1A1F, 0x1200-0x121F, and 0x1400-0x141F are transferred to the secondary video decoder, primary audio decoder, secondary audio decoder, PG decoder, or IG decoder respectively.

The second PID filter 6014 compares the PID of each TS packet received from the second source depacketizer 6012 with the selected PID. The playback control unit 5635 designates the selected PID beforehand in accordance with the STN table SS in the 3D playlist file. When the two PIDs match, the second PID filter 6014 transfers the TS packets to the decoder assigned to the PID. For example, if a PID is 0x1012 or 0x1013, the TS packets are transferred to TB2 6008 in the primary video decoder 6015. On the other hand, TS packets with PIDs ranging from 0x1B20-0x1B3F, 0x1220-0x127F, and 0x1420-0x147F are transferred to the secondary video decoder, PG decoder, or IG decoder respectively.

The primary video decoder 6015 includes a TB1 6001, MB1 6002, EB1 6003, TB2 6008, MB2 6009, EB2 6010, buffer switch 6006, DEC 6004, DPB 6005, and picture switch 6007. The TB1 6001, MB1 6002, EB1 6003, TB2 6008, MB2 6009, EB2 6010, and DPB 6005 are all buffer memories. Each of these buffer memories uses an area of a memory element included in the primary video decoder 6015. Alternatively, some or all of these buffer memories may be separated on different memory elements.

The TB1 6001 receives TS packets that include a base-view video stream from the first PID filter 6013 and stores the TS packets as they are. The MB1 6002 stores PES packets reconstructed from the TS packets stored in the TB1 6001. The TS headers of the TS packets are removed at this point. The EB1 6003 extracts and stores encoded VAUs from the PES packets stored in the MB1 6002. The PES headers of the PES packets are removed at this point.

The TB2 6008 receives TS packets that include a dependent-view video stream from the second PID filter 6014 and stores the TS packets as they are. The MB2 6009 stores PES packets reconstructed from the TS packets stored in the TB2 6008. The TS headers of the TS packets are removed at this point. The EB2 6010 extracts and stores encoded VAUs from the PES packets stored in the MB2 6009. The PES headers of the PES packets are removed at this point.

The buffer switch 6006 transfers the headers of the VAUs stored in the EB1 6003 and the EB2 6010 in response to a request from the DEC 6004. Furthermore, the buffer switch 6006 transfers the compressed picture data for the VAUs to the DEC 6004 at the times indicated by the DTSs included in the original TS packets. In this case, the DTSs are equal between a pair of pictures belonging to the same 3D VAU between the base-view video stream and dependent-view video stream. Accordingly, for a pair of VAUs that have the same DTS, the buffer switch 6006 first transmits the VAU stored in the EB1 6003 to the DEC 6004.

Like the DEC 5304 shown in FIG. 53, the DEC 6004 is a hardware decoder specifically for decoding of compressed pictures and is composed of an LSI that includes, in particular, a function to accelerate the decoding. The DEC 6004 decodes the compressed picture data transferred from the buffer switch 6006 in order. During decoding, the DEC 6004 first analyzes each VAU header to specify the compressed picture, compression encoding method, and stream attribute stored in the VAU, selecting a decoding method in accordance with this information. Examples of the compression encoding methods include MPEG-2, MPEG-4 AVC, and VC1. Furthermore, the DEC 6004 transmits the decoded and thus uncompressed picture to the DPB 6005.

Each time the DEC 6004 reads the VAU at the top of one video sequence in the dependent-view video stream, the DEC 6004 also reads the offset metadata from the VAU. In the playback section of the video sequence, the DEC 6004 first specifies the PTS stored in the same PES packet along with the VAU and specifies the number of the frame represented by the compressed picture data of the VAU. The DEC 6004 then reads the offset information associated with the frame number from the offset metadata and transmits the offset information to the plane adder 5624 at the time indicated by the specified PTS.

The DPB 6005 temporarily stores the decoded and thus uncompressed pictures. When the DEC 6004 decodes a P picture or a B picture, the DPB 6005 retrieves reference pictures from among the stored, uncompressed pictures in response to a request from the DEC 6004 and supplies the retrieved reference pictures to the DEC 6004.

The picture switch 6007 writes the uncompressed pictures from the DPB 6005 to either the left-video plane memory 6020 or the right-video plane memory 6021 at the time indicated by the PTS included in the original TS packet. In this case, the PTSs are equal between a base-view picture and a dependent-view picture belonging to the same 3D VAU. Accordingly, for a pair of pictures that have the same PTS and that are stored by the DPB 6005, the picture switch 6007 first writes the base-view picture in the left-video plane memory 6020 and then writes the dependent-view picture in the right-video plane memory 6021.

<Plane Adder in 1 Plane+Zero Offset Mode>

Figure 61:
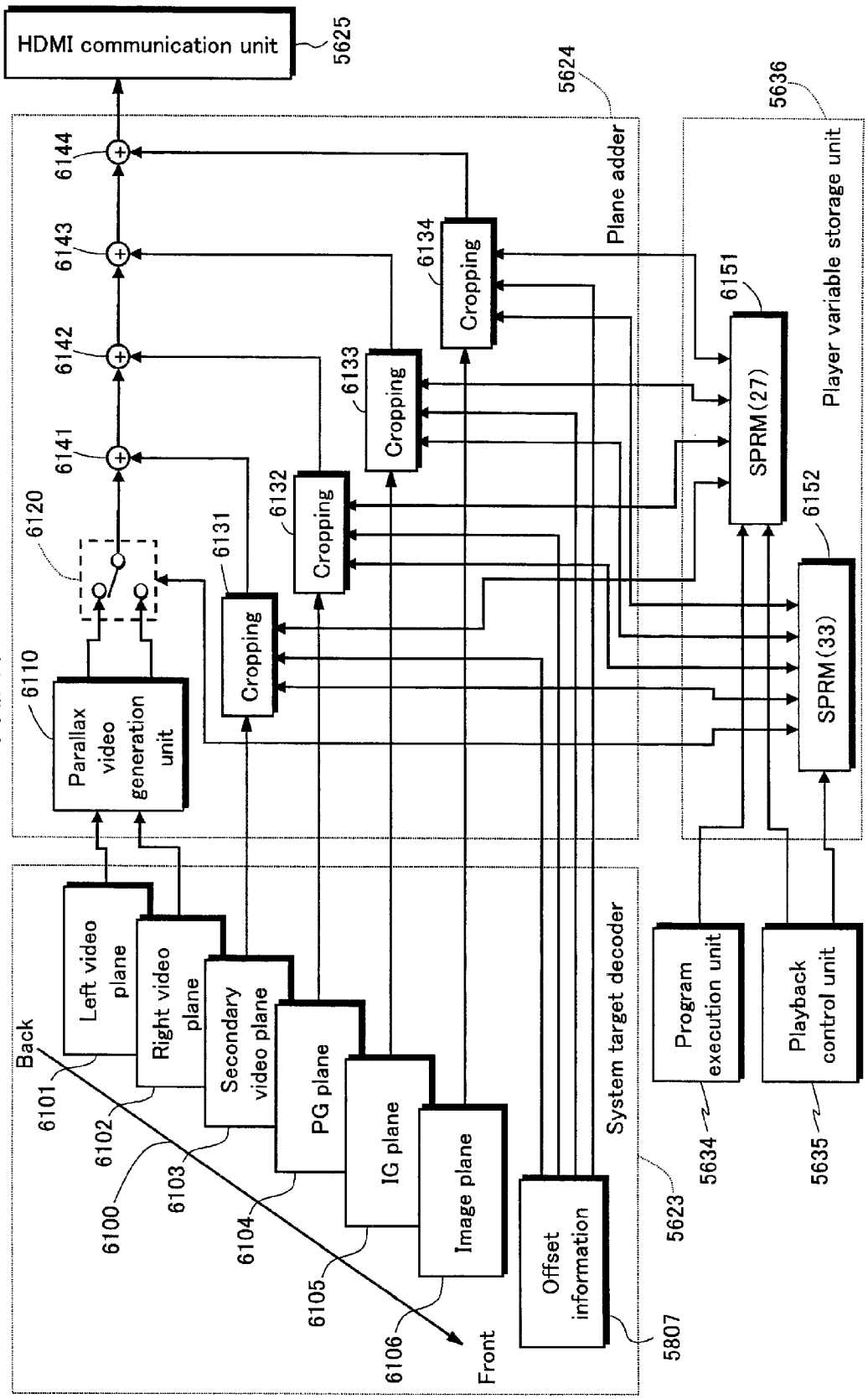
FIG. 61 is a functional block diagram of a plane adder 5624 shown in FIG. 56 in 1 plane+offset mode or 1 plane+zero offset mode.

FIG. 61 is a functional block diagram of the plane adder 5624 in 1 plane+offset mode or 1 plane+zero offset mode. As shown in FIG. 61, the plane adder 5624 includes a parallax video generation unit 6110, switch 6120, four cropping units 6131-6134, and four adders 6141-6144.

The parallax video generation unit 6110 receives a left-video plane 6101 and a right-video plane 6102 from the system target decoder 6123. In the playback device 102 in L/R mode, the left-video plane 6101 represents the left-view video plane, and the right-video plane 6102 represents the right-view video plane. At this point, the parallax video generation unit 6110 transmits the respective video planes 6101 and 6102 as they are to the switch 6120. On the other hand, in the playback device 102 in depth mode, the left-video plane 6101 represents the video plane for 2D video images, and the right-video plane 6102 represents a depth map for the 2D video images. In this case, the parallax video generation unit 6110 first calculates the binocular parallax for each element in the 2D video images using the depth map. Next, the parallax video generation unit 6110 processes the left-video plane 6101 to shift the presentation position of each element in the video plane for 2D video images to the left or right according to the calculated binocular parallax. This generates a pair of a left-view video plane and a right-view video plane. Furthermore, the parallax video generation unit 6110 outputs the pair of video planes thus generated to the switch 6120 as a pair of left-video plane and right-video plane.

The switch 6120 refers to the SPRM(33) 6152 in the player variable storage unit 5636. Then, according to the value of the playback status indicated by the SPRM(33) 6152, the switch 6120 outputs, to the first adder 6141, at least one of the left-view video plane 6101 and the right-view video plane 6102 which have the same PTS. Specifically, when the playback status indicates B-D presentation mode, the switch 6120 outputs the left-video plane 6101 and the right-video plane 6102 to the first adder 6141 in that order. When the playback status indicates B-B presentation mode, the switch 6120 outputs the left-video plane 6101 to the first adder 6141 twice, and discards the right-video plane 6102.

The first cropping unit 6131 refers to the SPRM(33) 6152 in the player variable storage unit 5636. Then, according to the value of the playback status indicated by the SPRM(33) 6152, the first cropping unit 6131 performs offset control on the secondary video plane 6103. Specifically, when the playback status indicates 1 plane+offset mode, the first cropping unit 6131 first receives offset information 6107 from the system target decoder 5623. At this point, the first cropping unit 6131 reads the reference offset ID corresponding to the secondary video plane from the SPRM(27) 6151 in the player variable storage unit 5636. Next, the first cropping unit 6131 retrieves the offset information belonging to the offset sequence indicated by the reference offset ID from the offset information 6107 received from the system target decoder 5623. After that, the first cropping unit 6131 refers to the offset information to perform offset control on the secondary video plane 6103. As a result, the secondary video plane 6103 is converted into a pair of pieces of plane data representing a left view and right view. Furthermore, the secondary video plane representing a left view and right view is alternately output to the first adder 6141.

Generally, the playback control unit 5635 updates the value of the SPRM(27) 6151 each time the current PI changes. Additionally, the program execution unit 5634 may set the value of the SPRM(27) 6151 in accordance with a movie object or BD-J object.

Similarly, the second cropping unit 6132 converts the PG plane 6104 into PG planes representing a left view and right view. The PG planes are then alternately output to the second adder 6142. Similarly, the third cropping unit 6133 converts the IG plane 6105 into a pair of IG plane representing a left view and right view. The IG planes are then alternately output to the third adder 6143. Similarly, the fourth cropping unit 6134 converts the image plane 6106 into image planes representing a left view and right view. The image planes are then alternately output to the fourth adder 6144.

On the other hand, when the playback status indicates 1 plane+zero offset mode, the first cropping unit 6131 does not perform offset control on the secondary video plane 6103, instead outputting the secondary video plane 6103 twice as is to the first adder 6141. The same description applies to the other cropping units 6132-6134.

The first adder 6141 receives a video plane from the switch 6120 and a secondary video plane from the first cropping unit 6131. At this point, the first adder 6141 superimposes each pair of the video plane and secondary video plane thus received and transmits the result to the second adder 6142. The second adder 6142 receives a PG plane from the second cropping unit 6132, superimposes this PG plane on the plane data received from the first adder 6141, and transmits the result to the third adder 6143. The third adder 6143 receives an IG plane from the third cropping unit 6133, superimposes this IG plane on the plane data received from the second adder 6142, and transmits the result to the fourth adder 6144. The fourth adder 6144 receives an image plane from the fourth cropping unit 6134, superimposes this image plane on the plane data received from the third adder 6143, and outputs the result to the HDMI communication unit 6125. The adders 6141-6144 each make use of alpha blending when superimposing plane data. In this way, the secondary video plane 6103, PG plane 6104, IG plane 6105, and image plane 6106 are superimposed in the order shown by the arrow 6100 in FIG. 61 on the left-video plane 6101 or right-video plane 6102. As a result, the video images indicated by each piece of plane data are displayed on the screen of the display device 103 so that the left-video plane or right-video plane appears to overlap with the secondary video plane, IG plane, PG plane, and image plane in that order.

<<Flowchart of Offset Control>>

FIG. 62 is a flowchart of offset control by the cropping units 6131-6134. Each of the cropping units 6131-6134 begins offset control upon receiving offset information 6107 from the system target decoder 5623. In the following description, it is assumed that the second cropping unit 6132 performs offset control on the PG plane 6104. The other cropping units 6131, 6133, and 6134 perform similar processing respectively on the secondary video plane 6103, IG plane 6105, and image plane 6106.

In step S6201, the second cropping unit 6132 first receives PG plane 6104 from the system target decoder 5623. At this point, the second cropping unit 6132 reads the reference offset ID for the PG plane from the SPRM(27) 6151. Next, the second cropping unit 6131 retrieves the offset information belonging to the offset sequence indicated by the reference offset ID from the offset information 6107 received from the system target decoder 5623. Thereafter, processing proceeds to step S6202.

In step S6202, the second cropping unit 6132 checks whether the video plane selected by the switch 6120 represents a left view or right view. If the video plane represents a left view, processing proceeds to step S6203. If the video plane represents a right view, processing proceeds to step S6206.

In step S6203, the second cropping unit 6132 checks the value of the retrieved offset direction. Hereinafter, the following is assumed: if the offset direction value is "0", the 3D graphics image appears closer to the viewer than the screen, and if the offset direction value is "1", the image appears further back than the screen. If the offset direction value is "0", processing proceeds to step S6204. If the offset direction value is "1", processing proceeds to step S6205.

In step S6204, the video plane represents a left view and the offset direction indicates a direction closer to the viewer than the screen. Accordingly, the second cropping unit 6132 provides a right offset to the PG plane 6104. In other words, the position of each piece of pixel data included in the PG plane 6104 is shifted to the right by the offset value. Thereafter, processing proceeds to step S6209.

In step S6205, the video plane represents a left view and the offset direction indicates a direction further back than the screen. Accordingly, the second cropping unit 6132 provides a left offset to the PG plane 6104. In other words, the position of each piece of pixel data included in the PG plane data 6104 is shifted to the left by the offset value. Thereafter, processing proceeds to step S6209.

In step S6206, the second cropping unit 6132 checks the value of the retrieved offset direction. If the offset direction value is "0", processing proceeds to step S6207. If the offset direction value is "1", processing proceeds to step S6208.

In step S6207, the video plane represents a right view and the offset direction indicates a direction closer to the viewer than the screen. Accordingly, the second cropping unit 6132 provides a left offset to the PG plane 6104. In other words, the position of each piece of pixel data included in the PG plane

6104 is shifted to the left by the offset value. Thereafter, processing proceeds to step S6209.

In step S6208, the video plane represents a right view and the offset direction indicates a direction further back than the screen. Accordingly, the second cropping unit 6132 provides a right offset to the PG plane 6104. In other words, the position of each piece of pixel data included in the PG plane 6104 is shifted to the right by the offset value. Thereafter, processing proceeds to step S6209.

In step S6209, the second cropping unit 6132 outputs the processed PG plane 6104 to the third cropping unit 6134. Processing then terminates.

<<Changes in Plane Data Via Offset Control>>

FIG. 63B is a schematic diagram showing a PG plane GP before the offset control by the second cropping unit 6132. As shown in FIG. 63B, the PG plane GP includes pixel data representing the subtitle "I love you", i.e. subtitle data STL. This subtitle data STL is located at a first distance D0 from the left edge of the PG plane data GP before offset control.

FIG. 63A is a schematic diagram showing the PG plane RGP with a right offset. With reference to FIG. 63A, when providing a right offset to the PG plane GP, the second cropping unit 6132 changes the position of each piece of pixel data in the PG plane GP from its original position to the right by a number of pixels OFS equal to the offset value. Specifically, the second cropping unit 6132 performs cropping to remove, from the right edge of the PG plane GP, pixel data included in a strip AR1 of a width OFS equal to the offset value. Next, the second cropping unit 6132 forms a strip AU of width OFS by adding pixel data to the left edge of the PG plane GP. The pixel data included in this strip AU is set as transparent. This process yields PG plane RGP to which a right offset has been provided. In practice, this subtitle data STL is located at a second distance DR from the left edge of the PG plane RGP before offset control. The second distance DR equals the first distance D0 plus the offset value OFS: DR=D0+OFS.

FIG. 63C is a schematic diagram showing the PG plane LGP with a left offset. With reference to FIG. 63C, when providing a left offset to the PG plane GP, the second cropping unit 6132 changes the position of each piece of pixel data in the PG plane GP from its original position to the left by a number of pixels OFS equal to the offset value. Specifically, the second cropping unit 6132 performs cropping to remove, from the left edge of the PG plane GP, pixel data included in a strip AL2 of a width OFS equal to the offset value. Next, the second cropping unit 6132 forms a strip AR2 of a width OFS by adding pixel data to the right edge of the PG plane data GP. The pixel data included in this strip AR2 is set as transparent. This process yields PG plane LGP to which a left offset has been provided. In practice, this subtitle data STL is located at a third distance DL from the left edge of the PG plane LGP before offset control. The third distance DL equals the first distance D0 minus the offset value OFS: DL=D0−OFS.

<Plane Adder in 2 Plane+Zero Offset Mode>

Figure 64:
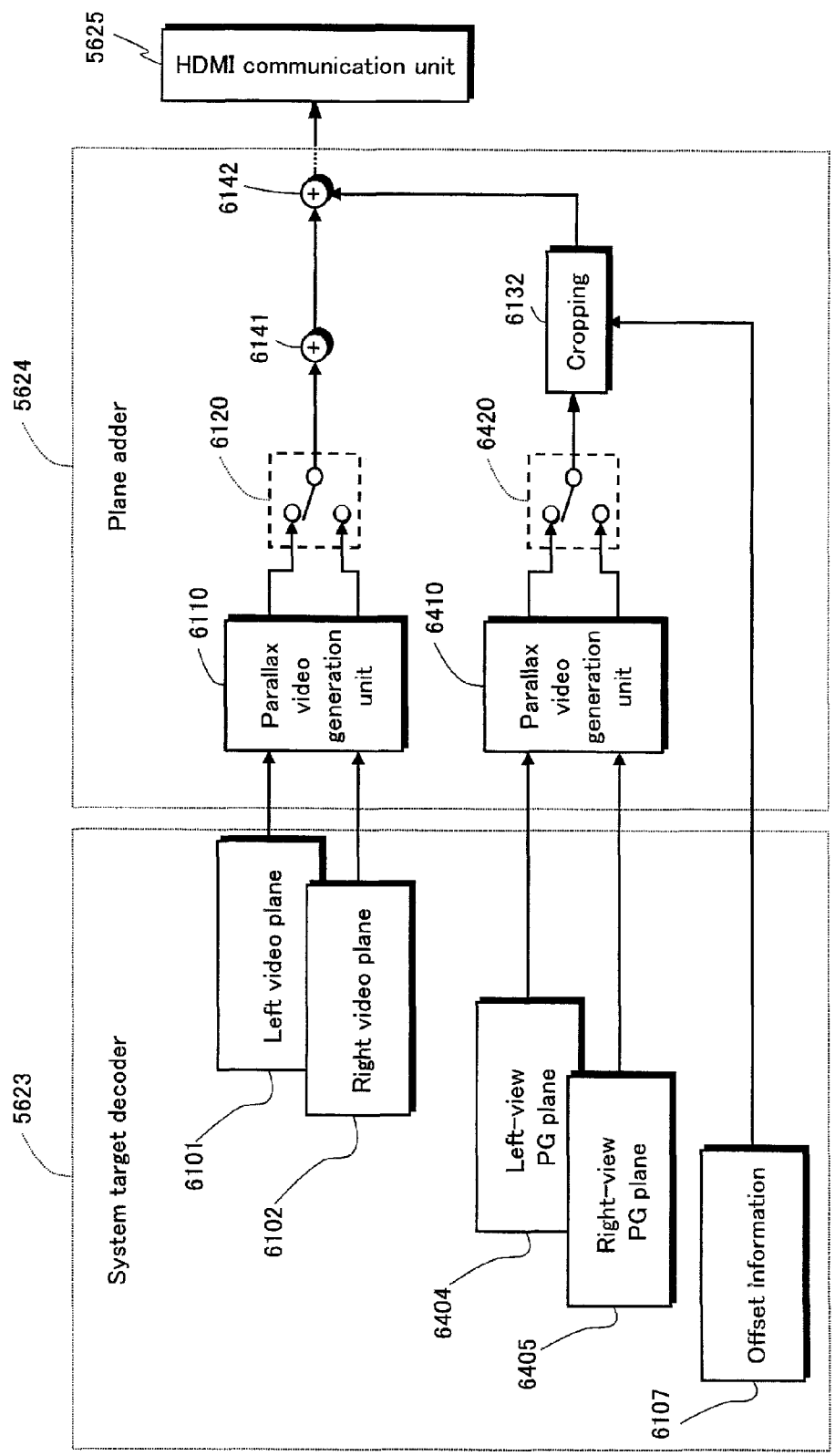
FIG. 64 is a partial functional block diagram of the plane adder 5624 in 2 plane mode.

FIG. 64 is a partial functional block diagram of the plane adder 5624 in 2 plane mode. As shown in FIG. 64, the plane adder 5624 in 2 plane mode includes a parallax video generation unit 6110, switch 6120, and first adder 6141, second adder 6142, and second cropping unit 6132, like the plane adder 5624 in 1 plane+offset mode shown in FIG. 61. Although not shown in FIG. 64, the plane adder 5424 in 2 plane mode additionally includes the other cropping units 6131, 6133, and 6134 and the other adders 6143 and 6144 shown in FIG. 61. The plane adder 5624 in 2 plane mode further includes a second parallax video generation unit 6410 and a second switch 6420 as units for input of PG planes 6104 and 6105. Although not shown in FIG. 64, each input unit for secondary video plane, IG plane, and image plane also includes similar structural elements.

The second parallax video generation unit 6410 receives a left-view PG plane 6404 and right-view PG plane data 6405 from the system target decoder 5623. In the playback device 102 in L/R mode, the left-view PG plane 6404 and the right-view PG plane 6405 literally represent a left-view PG plane and a right-view PG plane, respectively. Accordingly, the second parallax video generation unit 6410 transmits the pieces of plane data 6404 and 6405 as they are to the second switch 6120. On the other hand, in the playback device 102 in depth mode, the left-view PG plane 6404 represents the PG plane of 2D graphics images, and the right-view PG plane 6405 represents a depth map corresponding to the 2D graphics images. Accordingly, the second parallax video generation unit 6410 first calculates the binocular parallax for each element in the 2D graphics images using the depth map. Next, the second parallax video generation unit 6410 processes the left-view PG plane 6404 to shift the presentation position of each element in the 2D graphics image in the PG plane to the left or right in accordance with the calculated binocular parallax. This generates a pair of a left-view PG plane and right-view PG plane. Furthermore, the second parallax video generation unit 6410 outputs this pair of PG planes to the second switch 6420.

The second switch 6420 refers to the SPRM(33) 6152 in the player variable storage unit 5636. Then, according to the value of the playback status indicated by the SPRM(33) 6152, the second switch 6420 outputs, to the second cropping processing unit 6132, at least one of the left-view PG plane 6404 and the right-view PG plane 6405 which have the same PTS. Specifically, when the playback status indicates 2 plane mode, the second switch 6420 outputs the left-view PG plane 6404 and the right-view PG plane 6405 in this order to the second cropping processing unit 6132. When the playback status indicates 1 plane+zero offset mode, the second switch 6420 outputs the left-view PG plane 6404 twice to the second cropping processing unit 6132, and discards the right-view PG plane 6405.

The second cropping unit 6132 outputs the respective PG planes 6404 and 6405 as they are to the second adder 6142. The second adder 6142 superimposes the PG planes 6404 and 6405 on the plane data received from the first adder 6141, and transmits the result to the third adder 6143. As a result, the left-view PG plane 6404 is superimposed on the left-video plane 6101, where the right-view PG plane 6405 is superimposed on the right-video plane 6102.

The second cropping unit 6132 in 2 plane mode may refer to the offset information 6107 to perform offset control on the left-view PG plane 6404. The offset control provides the following advantages. In L/R mode, instead of the left-view PG stream in the sub-TS, the PG stream in the main TS (hereinafter, abbreviated as "2D PG stream") may be used as the left-view PG plane. Note, however, that one graphics image represented by the 2D PG stream may be used also as a 2D video image, so that the presentation position is normally set to be constant. On the other hand, the presentation position of each graphics image represented by the right-view PG stream is set to shift to the left or right in accordance with the change in the depth of a corresponding 3D graphics image. Accordingly, in order to change the depth without shifting 3D graphics images to the left or right, the center between the left view and right view needs to be kept constant. Therefore, for playback of 3D graphics images, offset is provided to the graphics images represented by the 2D PG stream to shift the presentation position to the left or right. As a result, the center between the left view and right view of graphics images is kept constant, so that the 3D graphics images appear without any shift in the horizontal direction. In this way, by using the 2D PG stream as the left-view PG stream, the risk of causing the viewer to feel uncomfortable is prevented.

<Types of Playback Status>

FIG. 65 is a table showing, for each type of playback status shown by the SPRM (33), the value of a playback mode corresponding to the type, and a video plane and a graphics plane to be outputted from the playback unit 5602. In FIG. 65, one of two types of video planes or graphics planes alternately outputted by the playback unit 5602 is referred to as a "first plane", and the other is referred to as a "second plane". Referring to FIG. 65, values indicated by the playback status come in four types, i.e., A to D. First, when the types of the playback status are distinguished by the values of playback modes, the playback modes of types A and B indicate "2D", and the playback modes of types C and D indicate "3D". Secondly, suppose that the types of playback status are distinguished by the output modes of the playback unit 5602 for video planes. In this case, regarding types A and C, the first plane of video planes is "L (left-view plane)", and the second plane thereof is "R (right-view plane)". This means that the output mode of the playback unit 5602 is B-D presentation mode. Regarding types B and D, the first and the second planes of video planes are both "L". This means that the output mode of the playback unit 5602 is B-B presentation mode. Thirdly, suppose that the types of playback status are distinguished by the output modes of the playback unit 5602 for graphics planes. In this case, regarding types A and B, the first and the second planes of graphics planes are both "C (plane at the center, i.e., plane without an offset)". This means that the output mode of the playback unit 5602 is 1 plane+zero offset mode. Regarding types C and D, the first plane of graphics planes is "L (left-view plane)", and the second plane thereof is "R (right-view plane)". This means that the output mode of the playback unit 5602 is 2 plane mode or 1 plane+offset mode.

Figure 66:
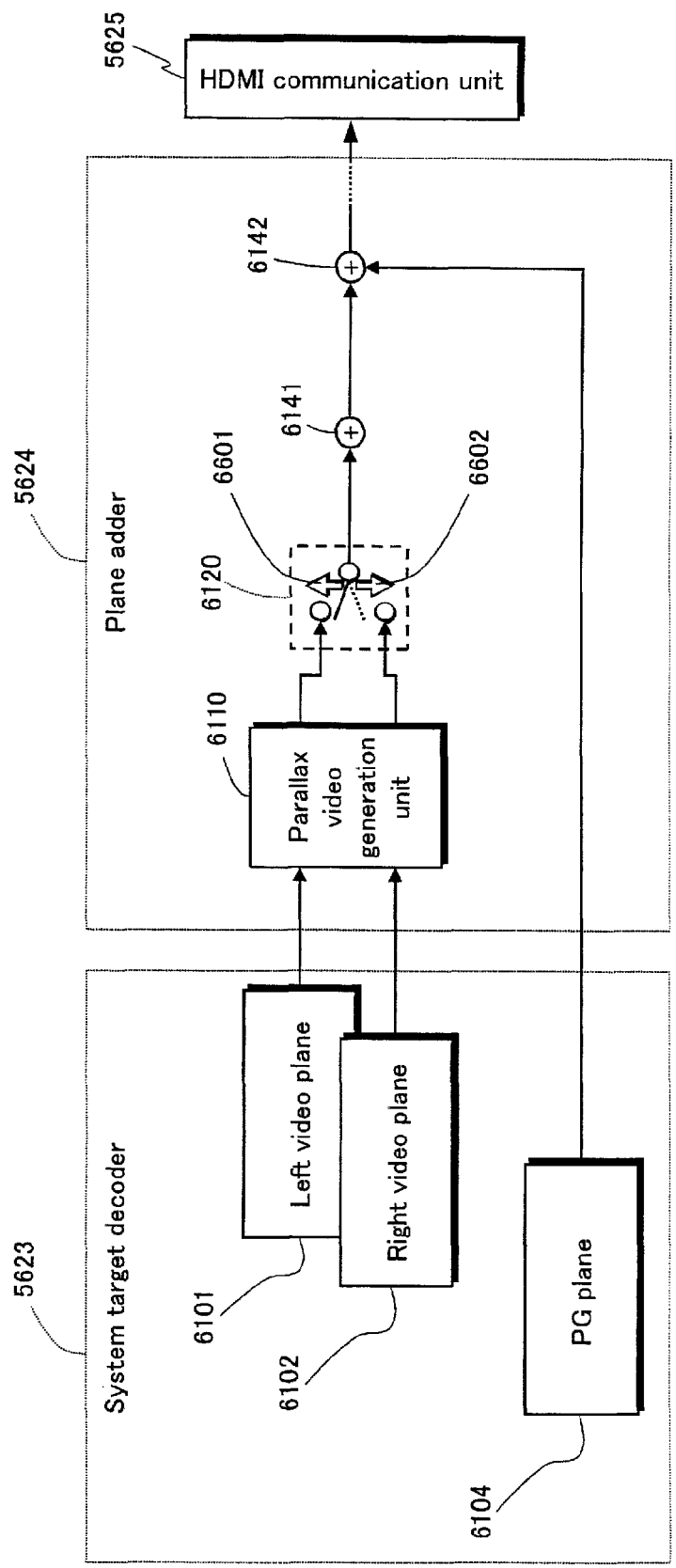
FIG. 66 is a partial functional block diagram of the plane adder 5624 when the playback status is type A.

FIG. 66 is a partial functional block diagram of the plane adder 5624 when the playback status is type A. As shown in FIG. 66, the plane adder 5624 includes the parallax video generation unit 6110, the switch 6120, the first adder 6141 and the second adder 6142, like the plane adder 5624 in 1 plane+offset mode shown in FIG. 61. Although not shown in FIG. 66, the plane adder 5624 further includes the other adders 6143 and 6144 shown in FIG. 61. As shown in FIG. 65, in type A, the output mode for video planes is B-D presentation mode. Therefore, the switch 6120 alternately outputs, to the first adder 6141, a left-view video plane and a right-view video plane received from the parallax video generation unit 6110 (the arrow 6601 shown in FIG. 66 indicates the output operation). Meanwhile, the output mode for graphics planes is 1 plane+zero offset mode. Therefore, the cropping processing units 6131, 6132, 6133, and 6134 do not substantially perform processing for plane data. Accordingly, a graphics plane, such as the PG plane 6104, is outputted to the second adder 6142 as is.

Figure 67:
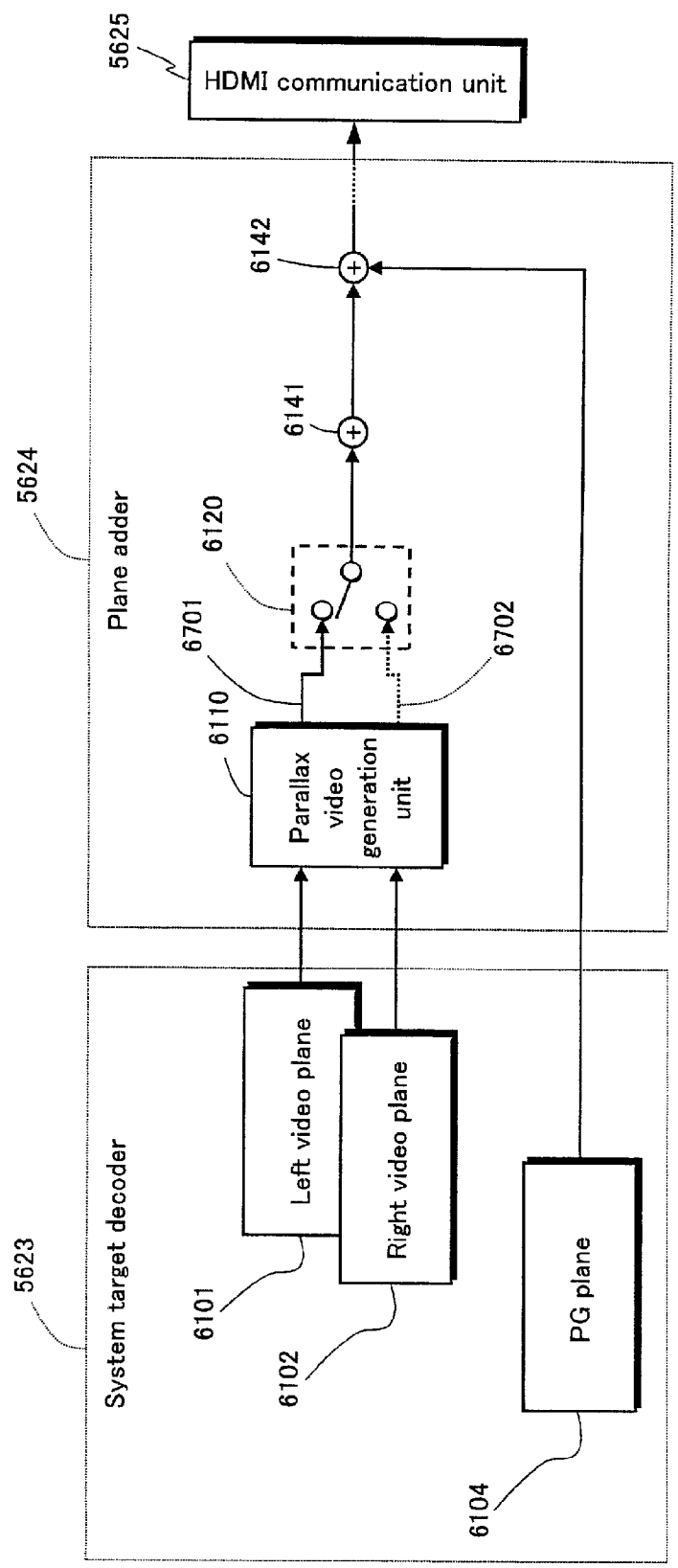
FIG. 67 is a partial functional block diagram of the plane adder 5624 when the playback status is type B.

FIG. 67 is a partial functional block diagram of the plane adder 5624 when the playback status is type B. As shown in FIG. 67, the plane adder 5624 includes the parallax video generation unit 6110, the switch 6120, the first adder 6141 and the second adder 6142, like the plane adder shown in FIG. 66. Although not shown in FIG. 67, the plane adder 5624 further includes the other adders 6143 and 6144 shown in FIG. 61. As shown in FIG. 65, in type B, the output mode for video planes is B-B presentation mode. Therefore, the switch 6120 outputs, to the first adder 6141, only a left-view video plane received from the parallax video generation unit 6110, and discards a right-view video plane (the solid line 6701 and the dashed line 6702 shown in FIG. 66 indicate the output operation). Meanwhile, the output mode for graphics planes is 1 plane+zero offset mode. Therefore, the cropping processing units 6131, 6132, 6133, and 6134 do not substantially perform processing for plane data. Accordingly, a graphics plane, such as the PG plane 6104, is outputted to the second adder 6142 as is.

Figure 68:
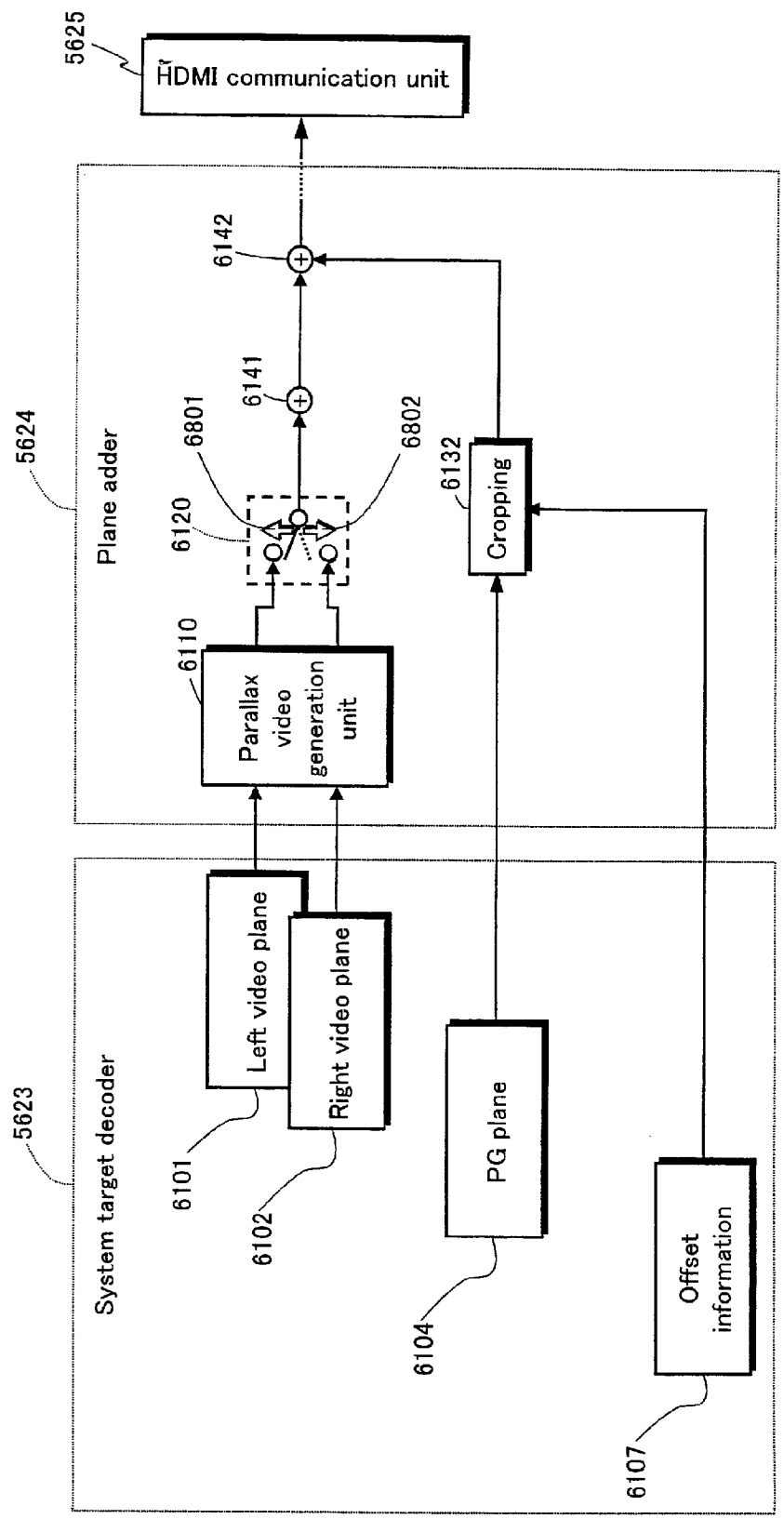
FIG. 68 is a partial functional block diagram of the plane adder 5624 when the playback status is type C.

FIG. 68 is a partial functional block diagram of the plane adder 5624 when the playback status is type C. As shown in FIG. 68, the plane adder 5624 includes the parallax video generation unit 6110, the switch 6120, the first adder 6141 and the second adder 6142, like the plane adder shown in FIG. 66, and also includes the second cropping processing unit 6132. Although not shown in FIG. 67, the plane adder 5624 further includes the other adders 6143 and 6144 and the other cropping processing units 6131, 6133, and 6134 shown in FIG. 61. As shown in FIG. 65, in type C, the output mode for video planes is B-D presentation mode. Therefore, the switch 6120 alternately outputs, to the first adder 6141, a left-view video plane and a right-view video plane received from the parallax video generation unit 6110 (the arrow 6801 shown in FIG. 68 indicates the output operation). Meanwhile, when the output mode for graphics planes is 1 plane+offset mode, the second cropping processing unit 6132 provides a horizontal offset for the PG plane 6104, and alternately outputs a left-view PG plane and a right-view PG plane to the second adder 6142.

Figure 69:
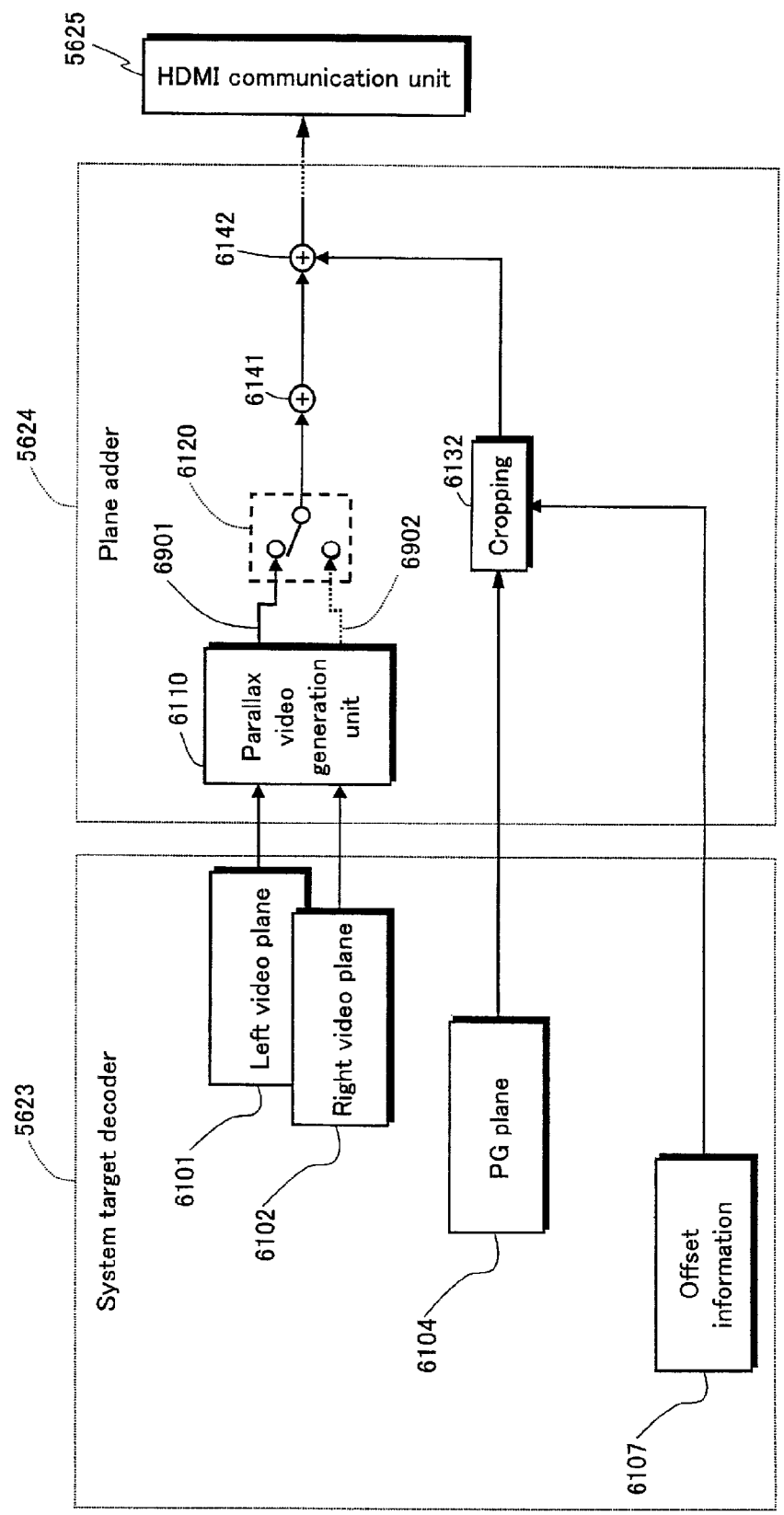
FIG. 69 is a partial functional block diagram of the plane adder 5624 when the playback status is type D.

FIG. 69 is a partial functional block diagram of the plane adder 5624 when the playback status is type D. As shown in FIG. 69, the plane adder 5624 includes the parallax video generation unit 6110, the switch 6120, the first adder 6141, the second adder 6142 and the second cropping processing unit 6132, like the plane adder shown in FIG. 68. Although not shown in FIG. 69, the plane adder 5624 further includes the other adders 6143 and 6144 and the other cropping processing units 6131, 6133, and 6134 shown in FIG. 61. As shown in FIG. 65, in type D, the output mode for video planes is B-B presentation mode. Therefore, the switch 6120 outputs, to the first adder 6141, only a left-view video plane received from the parallax video generation unit 6110, and discards a right-view video plane (the solid line 6901 and the dashed line 6902 shown in FIG. 69 indicate the output operation). Meanwhile, when the output mode for graphics planes is 1 plane+offset mode, the second cropping processing unit 6132 provides a horizontal offset for the PG plane 6104, and alternately outputs a left-view PG plane and a right-view PG plane to the second adder 6142.

In types C and D, when the output mode for graphics planes is 2 plane mode, a partial functional block diagram of the plane adder 5624 is different from FIGS. 68 and 69 and the same as FIG. 64. In other words, the second switch 6420 alternately outputs, to the second cropping processing unit 6132, a left-view PG plane and a right-view PG plane received from the second parallax video generation unit 6410. The second cropping processing unit 6132 outputs each PG plane as is or after providing a horizontal offset for a left-view PG plane by using the offset information 6107.

<Changes in Video Images According to Changes in Playback Statuses>

In the playback period $P_{3D}$ of 3D video images, the output mode for video planes is BD presentation mode, and the output mode for graphics planes is 2 plane mode or 1 plane+offset mode. Accordingly, the playback status indicates type C. On the other hand, when a playback period $P_{2D}$ of 2D video images is inserted into the playback period $P_{3D}$ of 3D video images, a combination of output modes for the respective planes in the playback period $P_{2D}$ of 2D video images is changeable according to a user operation or an instruction from an application program. Specifically, suppose that a pop-up menu is displayed during playback of 3D video images. In this case, the value of the playback status to be indicated by the SPRM(33) while the pop-up menu is displayed is selected from among types A, B, and D by a user or an application program. An OSD of the playback device 102 or the like may be used for the selection.

Figure 70:
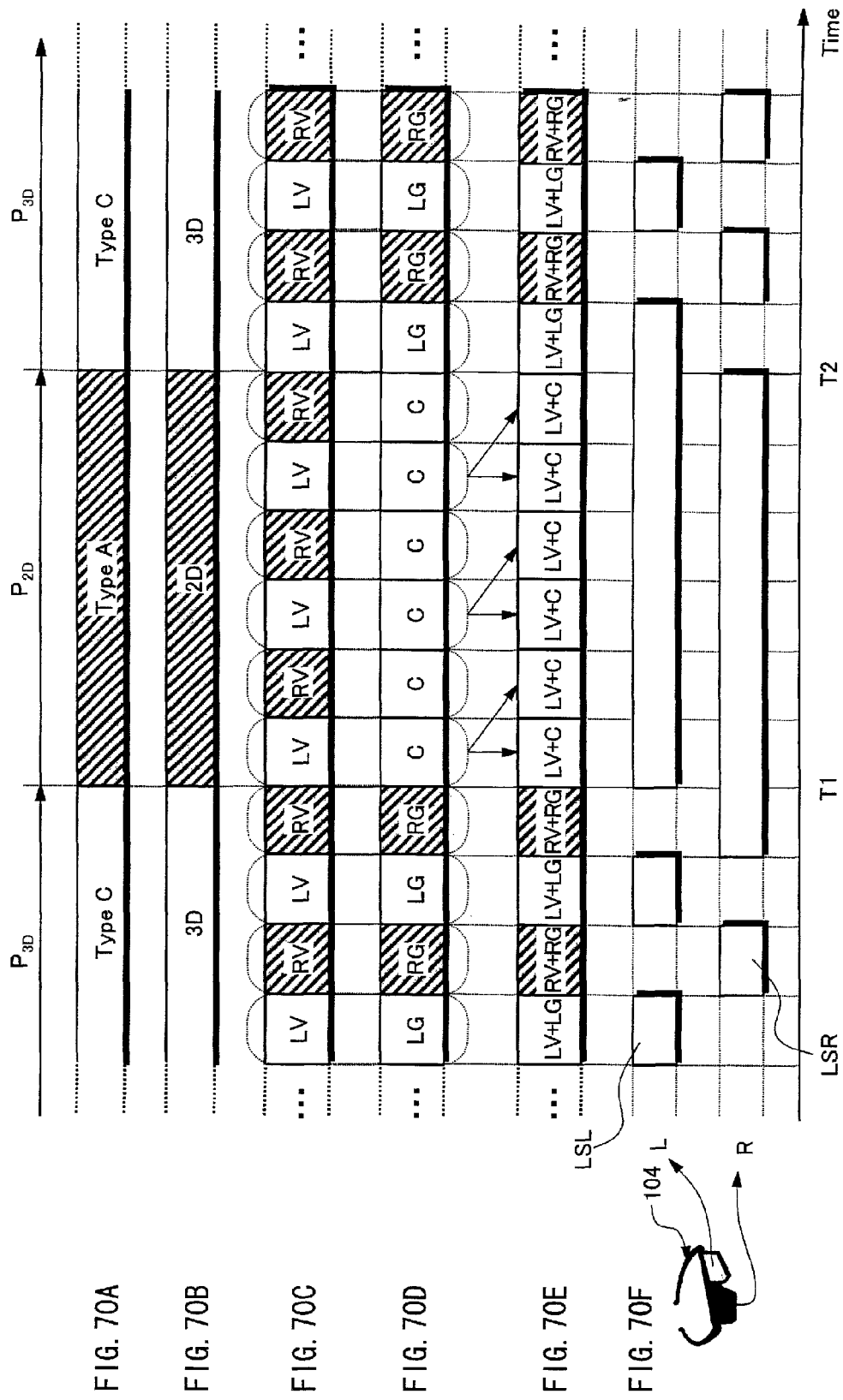
FIGS. 70A to 70F are schematic diagrams showing: changes in a playback mode and frames L, R, and C outputted from the playback device 102; changes in frames L, R, and C displayed by the display device 103; and the periods LSL and LSR during which shutter glasses 104 cause the left and right lenses to be transparent, when type A is selected as a playback status in the playback period $P_{2D}$ of 2D video images.

FIGS. 70A to 70F are schematic diagrams showing: changes in a playback mode and frames L, R, and C outputted from the playback device 102; changes in frames L, R, and C displayed by the display device 103; and the periods LSL and LSR during which shutter glasses 104 cause the left and right lenses to be transparent, when type A is selected as the playback status in the playback period $P_{2D}$ of 2D video images. Referring to FIG. 70A, the playback period $P_{3D}$ of 3D video images continues up to the first time T1, and the playback status of the playback period $P_{3D}$ is type C. Accordingly, the playback device 102 operates in B-D presentation mode, and also in either of 2 plane mode and 1 plane+offset mode. In other words, the playback device 102 alternately outputs left-view frames LV+LG and right-view frames RV+RG to the display device 103, as shown in FIGS. 70C and 70D. Here, the left-view frames LV+LG are obtained by combining left-view video planes LV with left-view graphics planes LG. The right-view frames RV+RG are obtained by combining right-view video planes RV with right-view graphics planes RG. Meanwhile, as shown in FIG. 70B, the playback mode is set to "3D". Accordingly, as shown in FIG. 7E, the display device 103 alternately displays the left-view frames LV+LG and the right-view frames RV+RG. In parallel, as shown in FIG. 70F, the display device 103 alternately causes the left and right lenses of the shutter glasses 104 to be transparent synchronously with the switching of the frames LV+LG and RV+RG. As a result, a left-view frame LV+LG and a right-view frame RV+RG are each seen by only one of the viewer's eyes. Therefore, a pair of these frames LV+LG and RV+RG is perceived as a single 3D video image by the viewer.

Further referring to FIG. 70A, the playback period $P_{3D}$ of 3D video images is changed to the playback period $P_{2D\ of}$ 2D video images at the first time T1. Specifically, the playback device 102 changes the playback status indicated by the SPRM(33) from type C to type A, according to a user operation or an instruction from an application program. According to the changing of the playback status, the playback device 102 shifts to 1 plane+zero offset mode while maintaining B-D presentation mode, after the first time T1. In other words, as shown in FIGS. 70C and 70D, graphics planes C at the center are alternately combined with left-view video planes LV and right-view video planes RV. The combined frames (i.e., planes C combined with left-view video planes LV, and planes C combined with right-view video planes RV) are alternately outputted to the display device 103. Meanwhile, as shown in FIG. 70B, the playback mode is changed from "3D" to "2D" at the first time T1. The display device 103 detects from an info frame that the playback mode is changed to "2D", and displays only left-view frames LV+C twice per frame, as shown in FIG. 70E. In parallel, as shown in FIG. 70F, the display device 103 causes the shutter glasses 104 to maintain both the left and right lenses to be transparent. Accordingly, both of the viewer's eyes see only left-view frames LV+C. In this way, 3D video images represented by video planes and 3D video images represented by graphics planes are both switched to 2D video images at the first time T1.

Referring again to FIG. 70A, the playback period $P_{2D}$ of 2D video images continues from the first time T1 to the second time T2, and the playback period $P_{3D\ of}$ 3D video images starts again from the second time T2. Specifically, the playback device 102 changes the playback status indicated by the SPRM(33) from type A to type C, according to a user operation or an instruction from an application program. According to the changing of the playback status, the playback device 102 returns to 2 plane mode or 1 plane+offset mode while maintaining B-D presentation mode, after the second time T2. In other words, after the second time T2, as shown in FIGS. 70C and 70D, left-view frames LV+LG (left-view video planes LV+left-view graphics planes LG) and right-view frames RV+RG (right-view video planes RV+right-view graphics planes RG) are alternately outputted to the display device 103. Meanwhile, as shown in FIG. 70B, the playback mode is changed from "2D" to "3D" at the second time T2. The display device 103 detects from an info frame that the playback mode is changed to "3D", and alternately displays left-view frames LV+LG and right-view frames RV+RG, as shown in FIG. 70E. In parallel, as shown in FIG. 70F, the display device 103 alternately causes the left and right lenses of the shutter glasses 104 to be transparent synchronously with the switching of the frames LV+LG and RV+RG. As a result, a viewer perceives a pair of a 2D video image represented by a left-view frame LV+LG and a 2D video image represented by a right-view frame RV+RG as a single 3D video image again.

As clearly understood from FIG. 70A to 70F, when switching 3D video images to 2D video images, the playback device 102 maintains B-D presentation mode for video planes, and temporarily stops offset control for graphics planes. In this way, the switching operation is performed promptly. On the other hand, the display device 103 may determine whether to display right-view frames according to the value of the playback mode in an info frame. The frame rate does not need to be changed. In this way, even if video images represented by graphics planes are included in 3D video images, the display device 103 can switch 3D video images to 2D video images seamlessly.

Figure 71:
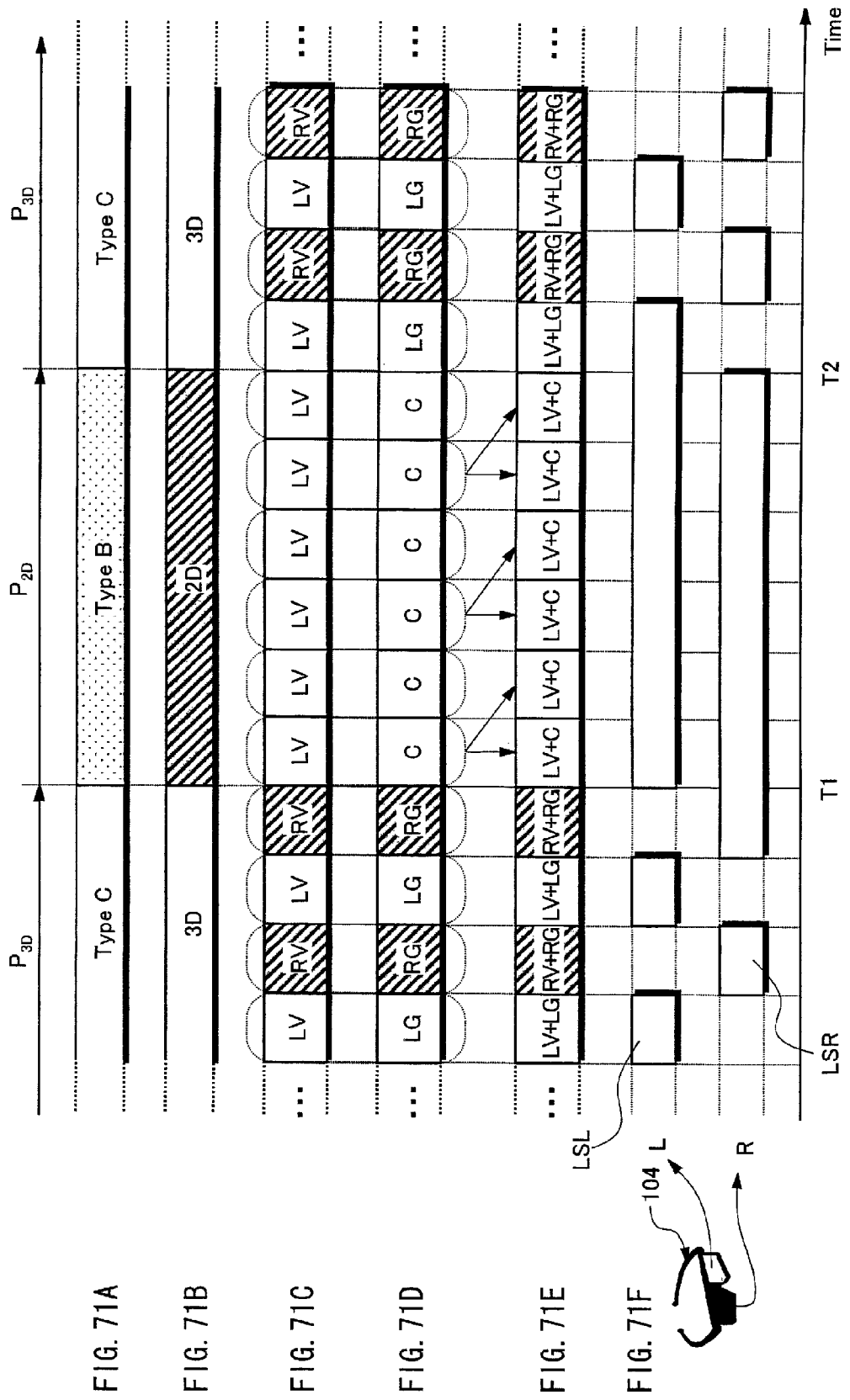
FIGS. 71A to 71F are schematic diagrams showing: changes in a playback mode and frames L, R, and C outputted from the playback device 102; changes in frames L, R, and C displayed by the display device 103; and the periods LSL and LSR during which shutter glasses 104 cause the left and right lenses to be transparent, when type B is selected as a playback status in the playback period $P_{2D}$ of 2D video images.

FIGS. 71A to 71F are schematic diagrams showing: changes in a playback mode and frames L, R, and C outputted from the playback device 102; changes in frames L, R, and C displayed by the display device 103; and the periods LSL and LSR during which shutter glasses 104 cause the left and right lenses to be transparent, when type B is selected as the playback status in the playback period $P_{2D}$ of 2D video images. Referring to FIG. 71A, the playback period $P_{3D}$ of 3D video images continues up to the first time T1, and the playback status of the playback period $P_{3D}$ is type C. Accordingly, FIGS. 71C to 71F are the same as FIGS. 70C to 70F in terms of the playback period $P_{3D}$ of 3D video images. As a result, a viewer perceives a pair of a 2D video image represented by a left-view frame LV+LG and a 2D video image represented by a right-view frame RV+RG as a single 3D video image.

Further referring to FIG. 71A, the playback period $P_{3D}$ of 3D video images is changed to the playback period $P_{2D}$ of 2D video images at the first time T1. Specifically, the playback device 102 changes the playback status indicated by the SPRM(33) from type C to type B, according to a user operation or an instruction from an application program. Type B is different from type A in that B-D presentation mode is changed to B-B presentation mode. Therefore, after the first time T1, graphics planes C at the center are combined only with left-view video planes LV, as shown in FIGS. 71C and 71D. The combined frames are each outputted twice to the display device 103. Meanwhile, as shown in FIG. 71E, the display device 103 displays, for each left-view frame LV+C received twice, only the left-view frame LV+C received first, according to the change in the playback mode. In parallel, as shown in FIG. 71F, the display device 103 causes the shutter glasses 104 to maintain both the left and right lenses to be transparent. Accordingly, both of the viewer's eyes see only left-view frames LV+C. In this way, 3D video images represented by video planes and 3D video images represented by graphics planes are both switched to 2D video images at the first time T1.

Referring back to FIG. 71A, the playback status is switched from type A back to type C at the second time T2. In other words, after the second time T2, FIGS. 71C to 71F are the same as FIGS. 70C to 70F. As a result, a viewer perceives a pair of a 2D video image represented by a left-view frame LV+LG and a 2D video image represented by a right-view frame RV+RG as a single 3D video image again.

As clearly understood by comparing FIGS. 71A to 71F with FIGS. 70A to 70F, even if the playback device 102 switches B-D presentation mode to B-B presentation mode upon switching 3D video images to 2D video images, the display device 103 can switch 3D video images to 2D video images seamlessly without specially changing its own operation.

Figure 72:
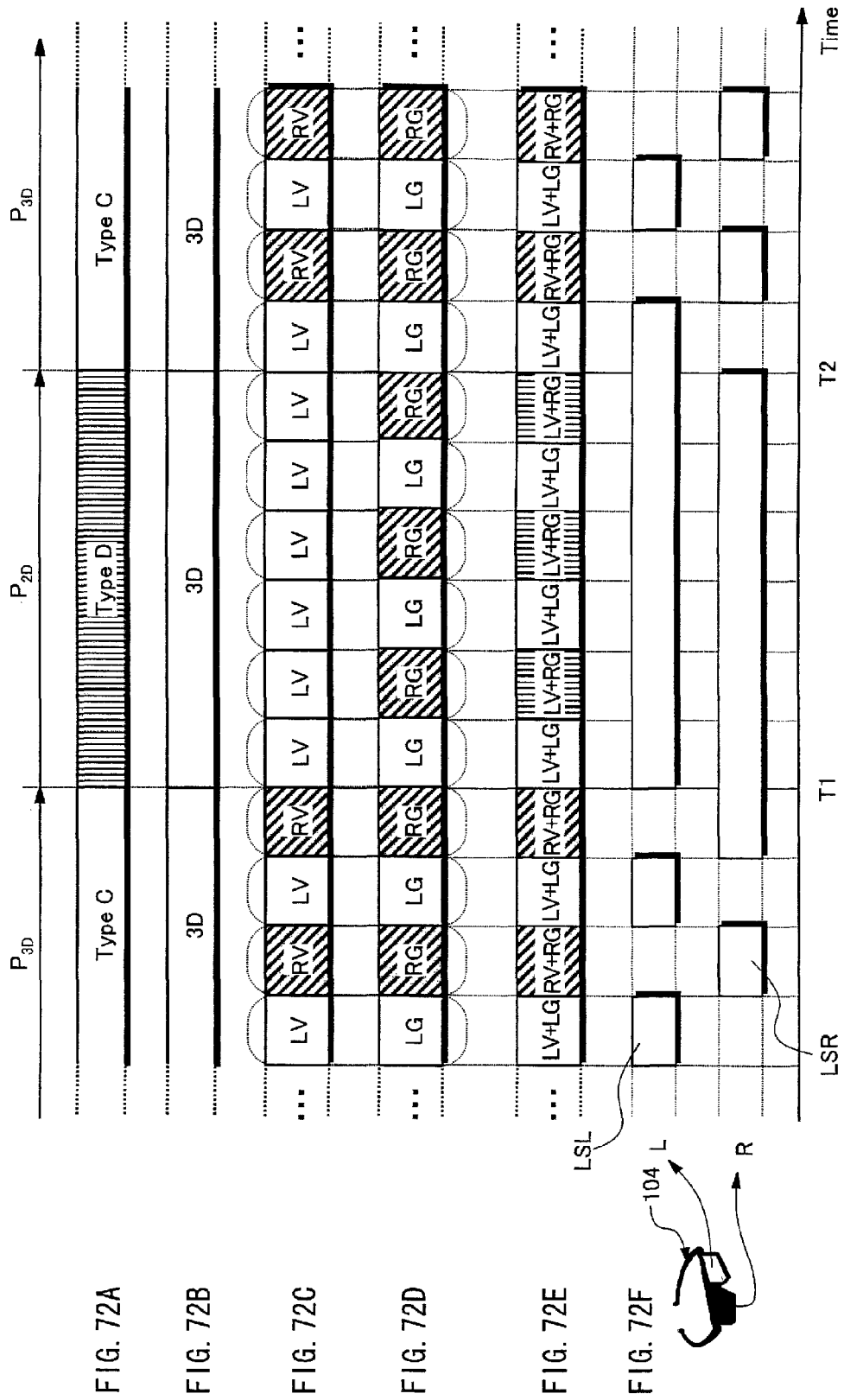
FIGS. 72A to 72F are schematic diagrams showing: changes in a playback mode and frames L, R, and C outputted from the playback device 102; changes in frames L, R, and C displayed by the display device 103; and the periods LSL and LSR during which shutter glasses 104 cause the left and right lenses to be transparent, when type D is selected as a playback status in the playback period $P_{2D}$ of 2D video images.

FIGS. 72A to 72F are schematic diagrams showing: changes in a playback mode and frames L, R, and C outputted from the playback device 102; changes in frames L, R, and C displayed by the display device 103; and the periods LSL and LSR during which shutter glasses 104 cause the left and right lenses to be transparent, when type D is selected as the playback status in the playback period $P_{2D}$ of 2D video images. Referring to FIG. 72A, the playback period $P_{3D}$ of 3D video images continues up to the first time T1, and the playback status of the playback period $P_{3D}$ is type C. Accordingly, FIGS. 72C to 72F are the same as FIGS. 70C to 70F in terms of the playback period $P_{3D}$ of 3D video images. As a result, a viewer perceives a pair of a 2D video image represented by a left-view frame LV+LG and a 2D video image represented by a right-view frame RV+RG as a single 3D video image.

Further referring to FIG. 72A, the playback period $P_{3D}$ of 3D video images is changed to the playback period $P_{2D}$ of 2D video images at the first time T1. Specifically, the playback device 102 changes the playback status indicated by the SPRM(33) from type C to type D, according to a user operation or an instruction from an application program. Type D is different from type A in the following respects. First, B-D presentation mode is changed to B-B presentation mode. Second, either 2 plane mode or 1 plane+zero offset mode is maintained. Therefore, after the first time T1, as shown in FIGS. 72C and 72D, the left-view frames LV+LG are obtained by combining left-view video planes LV with left-view graphics planes LG; and the right-view frames LV+RG are obtained by combining left-view video planes LV with right-view graphics planes RG. The combined frames LV+LG and LV+RG are alternately outputted to the display device 103. On the other hand, the value of a playback mode is maintained at "3D" even after the first time T1. Accordingly, as shown in FIG. 72E, the display device 103 alternately displays left-view frames LV+LG and right-view frames LV+RG. In parallel, as shown in FIG. 72F, the display device 103 alternately causes the left and right lenses of the shutter glasses 104 to be transparent synchronously with the switching of the frames LV+LG and LV+RG. As a result, a viewer only sees 2D video images represented by left-view video planes LV; however, sees a pair of a 2D graphics image represented by a left-view graphics plane LG and a 2D graphics image represented by a right-view graphics plane RG as a single 3D graphics image. In this way, after the first time T1, only a graphics image, such as a pop-up menu represented by an IG plane, can be presented as a 3D video image to a viewer.

Referring back to FIG. 72A, the playback status is switched from type D back to type C at the second time T2. In other words, after the second time T2, FIGS. 72C to 72F are the same as FIGS. 70C to 70F. As a result, the viewer perceives both 2D video images represented by video planes and 2D video images represented by graphics planes as 3D video images again.

As described above, even if the playback device 102 switches B-D presentation mode to B-B presentation mode while maintaining only graphics images as 3D video images, the display device 103 can switch 3D video images to 2D video images seamlessly without specially changing its own operation.

<Modifications>

(1-E) According to Embodiment 1 of the present invention, the playback status is set in accordance with a user operation or an instruction from an application program. Alternatively, the playback status may be set as an attribute of each PI in a 3D playlist file as shown in FIG. 43. In this case, during processing for playing back 3D playlists, the playback control unit 5635 decodes the playback status from the current PI, and determines the playback mode and the output mode of the playback unit 5602. Also, the playback status may be stored in stream data, as shown in FIG. 14. For example, the playback status may be stored in a descriptor in the PMT shown in FIG. 24. Alternatively, the playback status may be stored in supplementary data or a header in the VAU shown in FIG. 18. Here, the playback status is generally set in units of relatively long presentation periods, such as units of GOPs. Therefore, in the case where the playback status is stored in supplementary data, the supplementary data may be arranged only at the top of each GOP. This reduces the total amount of data indicating the playback status.

(1-F) According to Embodiment 1 of the present invention, the playback device 102 directly receives a user operation or an instruction from an application program via the remote control 105 or the like. Then, the playback device 102 determines the playback status according to the user operation or the instruction from the application program. Alternatively, the display device 103 may directly receive a user operation or an instruction from an application program via the remote control 105 or the like. Then, the display device 103 may transmit a CEC message to the playback device 102 in HDMI format, thereby giving an instruction for changing a playback status according to the user operation or the instruction from the application program. In this case, the playback device 102 changes the playback status according to the instruction.

(1-G) In the example shown in FIG. 1, the playback device 102 and the display device 103 are separate independent devices. Alternatively, the playback device 102 may be integrally combined with the display device 103. In addition, as shown in FIG. 2, the display device 103 may acquire stream data of 3D video images not only from the BD-ROM disc 101, but also from various recording media, including the memory card 201, external network 202, and broadcast wave 203. In such a case, the receiving unit 210 of the display device 103 includes interfaces appropriate for the respective media. In particular, the display device 103 has the same structure as the playback unit 5602 of the 3D playback device shown in FIG. 56 and decodes stream data acquired from each medium into left-view frames and right-view frames, etc. 1

(1-H) The display device 103 according to the embodiments of the present invention reproduces 3D video images according to the stream data read by the playback device 102 from the BD-ROM disc 101. Alternatively, the display device 103 may reproduce 3D video images according to stream data transmitted over the external network 202 or by the broadcast wave 203, as shown in FIG. 2. In such a case, the stream data is transmitted from a transmission device such as following.

Figure 73:
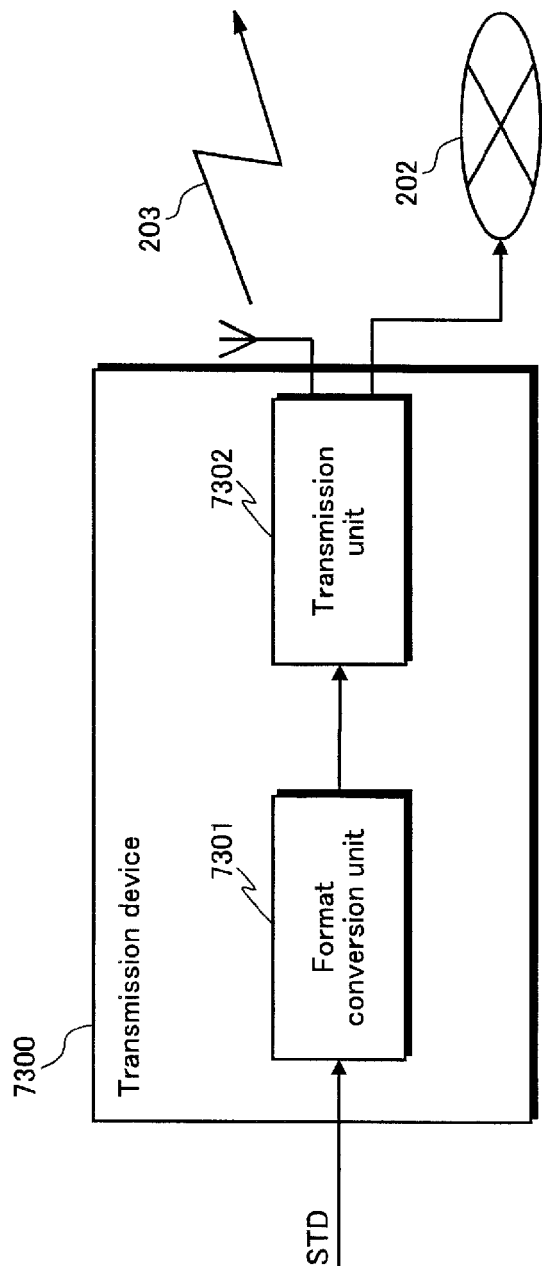
FIG. 73 is a functional block diagram of a transmission device 7300.

FIG. 73 is a functional block diagram of a recording device 7300. As shown in FIG. 73, the transmission device 7300 includes a format conversion unit 7301 and a transmitting unit 7302. The format conversion unit 7301 receives stream data STD from an external source and converts STD into a predetermined transmission format. The stream data STD has a data structure according to Embodiment 1 shown in FIGS. 13-21. The transmitting unit 7302 distributes the stream data converted by the format conversion unit 7301 on the broadcast wave 203 from an antenna or over the external network 202 such as the Internet.

(1-I) In L/R mode according to the embodiments of the present invention, the base-view video stream represents the left view, and the dependent-view video stream represents the right view. Conversely, however, the base-view video stream may represent the right view and the dependent-view video stream the left view. On the BD-ROM disc 101 according to the embodiments of the present invention, the base-view video stream and the dependent-view video stream are multiplexed in different TSs. Alternatively, the base-view video stream and the dependent-view video stream may be multiplexed into a single TS.

(1-J) The offset metadata shown in FIG. 21 is stored in the dependent-view video stream. Alternatively, the offset metadata may be stored in the base-view video stream. In this case as well, the offset metadata is preferably stored in the supplementary data in the VAU located at the top of each video sequence. Furthermore, the 3D playlist file may be provided with a flag indicating whether the base-view video stream or the dependent-view video stream includes the offset metadata. This allows for an increase in the degree of freedom when creating each piece of stream data. Alternatively, the offset metadata may be stored in each VAU (i.e., each frame or field) instead of only being stored in the top VAU in each video sequence (i.e., each GOP). Alternatively, offset metadata may be set at arbitrary intervals, such as three frames or greater, for each content. In this case, it is preferable that offset metadata always be stored in the top VAU in each video sequence and that the interval between the offset metadata and the immediately prior offset metadata be restricted to three frames or greater. Accordingly, the playback device can reliably perform processing to change offset information in parallel with interrupt playback.

Instead of being stored in the video stream, offset metadata may be multiplexed in a main TS or a sub-TS as independent stream data. In this case, a unique PID is allocated to the offset metadata. The system target decoder refers to this PID to separate the offset metadata from other stream data. Thereafter, the offset metadata may first be preloaded into a dedicated buffer and later undergo playback processing. In this case, the offset metadata is stored at constant frame intervals. Accordingly, a PTS is not necessary for the offset metadata, thus reducing the data amount of the PES header. This reduces the capacity of the buffer for preloading. Note that the offset metadata may be stored in a playlist file.

(1-K) As shown in FIG. 23, the base-view data blocks and dependent-view data blocks are recorded in an interleaved arrangement on the BD-ROM disc 101. In general, the extent ATC times are the same between a pair of contiguous data blocks. For pairs of data blocks with equal extent ATC times, i.e. extent pairs, the playback period may also match, and the playback time of the video stream may be equal. In other words, the number of VAUs may be equal between these data blocks in any extent pair. The significance of such equality is explained below.

Figures 74A, 74B:
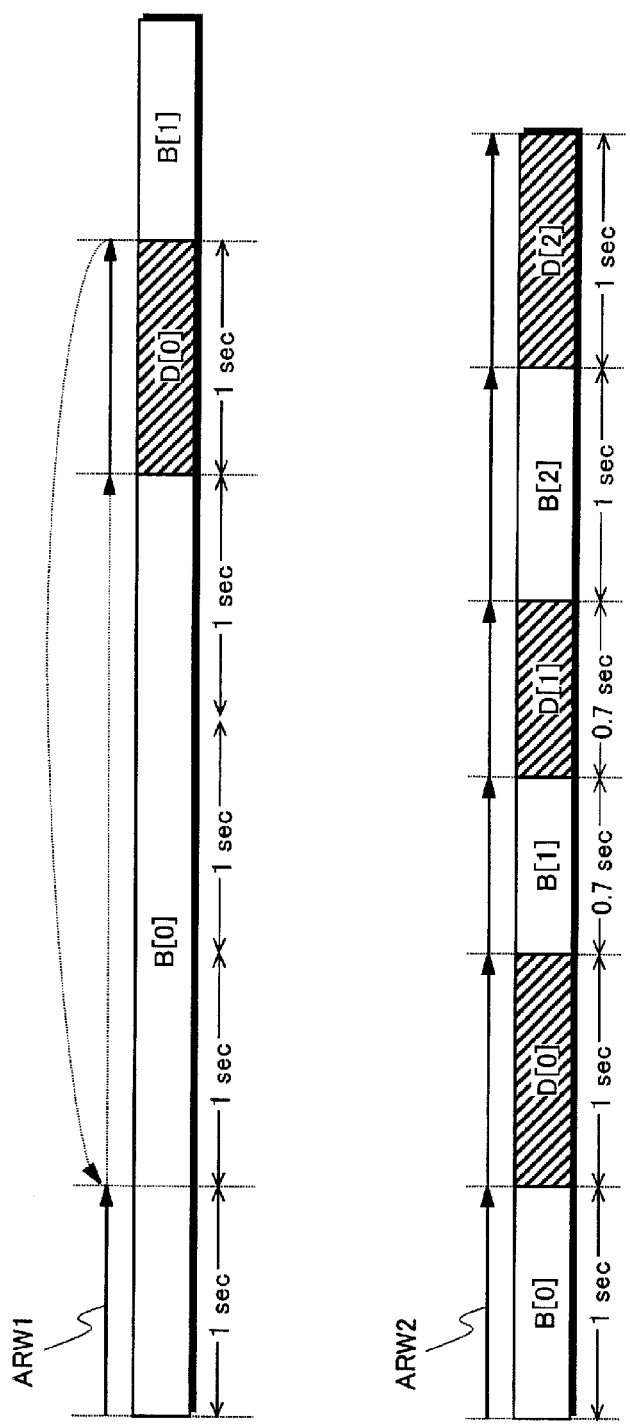
FIG. 74A is a schematic diagram showing a playback path when extent ATC times and playback times of the video stream differ between contiguous base-view data blocks and dependent-view data blocks.
FIG. 74B is a schematic diagram showing a playback path when the playback times of the video stream are equal for contiguous base-view and dependent-view data blocks.

FIG. 74A is a schematic diagram showing a playback path when extent ATC times and playback times of the video stream differ between contiguous base-view data blocks and dependent-view data blocks. As shown in FIG. 74A, the playback time of the top base-view data block B[0] is four seconds, and the playback time of the top dependent-view data block D[0] is one second. In this case, the section of the base-view video stream that is necessary for decoding of the dependent-view data block D[0] has the same playback time as the dependent-view data block D[0]. Accordingly, to save read buffer capacity in the playback device, it is preferable, as shown by the arrow ARW1 in FIG. 74A, to have the playback device alternately read the base-view data block B[0] and the dependent-view data block D[0] by the same amount of playback time, for example one second at a time. In that case, however, as shown by the dashed lines in FIG. 74A, jumps occur during read processing. As a result, it is difficult to cause read processing to keep up with decoding processing, and thus it is difficult to stably maintain seamless playback.

FIG. 74B is a schematic diagram showing a playback path when the playback times of the video stream are equal for contiguous base-view and dependent-view data blocks. As shown in FIG. 74B, the playback time of the video stream between two contiguous data blocks may be the same. For example, for the pair of the top data blocks B[0] and D[0], the playback times of the video stream both equal one second, and the playback times of the video stream for the second pair of data blocks B[1] and D[1] both equal 0.7 seconds. In this case, during 3D playback mode, the playback device reads data blocks B[0], D[0], B[1], D[1], . . . in order from the top, as shown by arrow ARW2 in FIG. 74B. By simply reading these data blocks in order, the playback device can smoothly read the main TS and sub-TS alternately in the same increments of playback time. In particular, since no jump occurs during read processing, seamless playback of 3D video images can be stably maintained.

If the extent ATC time is actually the same between contiguous base-view and dependent-view data blocks, jumps do not occur during reading, and synchronous decoding can be maintained. Accordingly, even if the playback period or the playback time of the video stream are not equal, the playback device can reliably maintain seamless playback of 3D video images by simply reading data block groups in order from the top, as in the case shown in FIG. 74B.

The number of any of the headers in a VAU, as well as the number of PES headers, may be equal between data blocks in an extent pair. These headers are used to synchronize decoding between data blocks in an extent pair. Accordingly, if the number of headers is equal between data blocks in an extent pair, it is relatively easy to maintain synchronous decoding, even if the number of VAUs is not equal. Furthermore, unlike when the number of VAUs is equal, all of the data in the VAUs need not be multiplexed in the same data block. Therefore, there is a high degree of freedom for multiplexing stream data during the authoring process of the BD-ROM disc 101.

In other words, the number of VAUs may be equal between such data blocks in an extent pair. That is, the file base and file DEP may be set so that the extents EXT1[k] and EXT2[k], located at the same position in the respective files in the order from the top, have the same number of entry points. Whether jumps are present differs between 2D playback mode and 3D playback mode. When the number of entry points is equal between data blocks, however, the playback time is substantially equal. Accordingly, it is easy to maintain synchronous decoding regardless of jumps. Furthermore, unlike when the number of VAUs is equal, all of the data in the VAUs need not be multiplexed in the same data block. Therefore, there is a high degree of freedom for multiplexing stream data during the authoring process of the BD-ROM disc 101. 1

(1-L) An AV stream file representing 3D video images may additionally include a 3D descriptor in the PMT 2410 shown in FIG. 24. The "3D descriptors" are information on the playback format of 3D video images, are shared by the entire AV stream file, and particularly include 3D format information. The "3D format information" indicates the playback format, such as L/R mode or depth mode, of the 3D video images in the AV stream file. Furthermore, a 3D stream descriptor may be added to each piece of stream information 2403 included in the PMT 2410. Each "3D stream descriptor" indicates information on the playback format of 3D video images for each elementary stream included in the AV stream file. In particular, the 3D stream descriptors of the video stream include a 3D display type. The "3D display type" indicates whether the video images indicated by the video stream are a left view or a right view when the video images are displayed in L/R mode. The 3D display type also indicates whether the video images indicated by the video stream are 2D video images or depth maps when the video images are played back in depth mode. When the PMT 2410 thus includes information regarding the playback format of 3D video images, the playback system of these video images can acquire such information simply from the AV stream file. This sort of data structure is therefore useful when distributing 3D video image content via a broadcast.

(1-M) The dependent-view clip information file may include a predetermined flag in the video stream attribute information allocated to PID=0x1012, 0x1013 of the dependent-view video stream. When turned on, this flag indicates that the dependent-view video stream refers to the base-view video stream. Furthermore, the video stream attribute information may include information regarding the base-view video stream to which the dependent-view video stream refers. This information can be used to confirm the correspondence between video streams when verifying, via a predetermined tool, whether the 3D video image content has been created in accordance with a prescribed format. 1

In Embodiment 1 of the present invention, the size of base-view extents and dependent-view extents can be calculated from the extent start points included in the clip information file. Alternatively, a list of the sizes of the respective extents may be stored in, for example, the clip information file as part of the metadata.

(1-N) The 3D playlist file 1222 shown in FIG. 43 includes one sub-path 4302. Alternatively, the 3D playlist file may include a plurality of sub-paths. For example, if the sub-path type of one sub-path is "3D L/R", then the sub-path type of the other sub-path may be "3D depth". When 3D video images are played back in accordance with the 3D playlist file, the sub-path to be played back is switched between these two types of sub-paths, so that the playback device 102 can easily switch between L/R mode and depth mode. In particular, such switching can be performed more rapidly than switching the 3D playlist file itself.

Alternatively, the 3D playlist file may include a plurality of sub-paths of the same sub-path type. For example, when 3D video images for the same scenes but with different binocular parallax are expressed based on differences with a common left view, a plurality of files DEP representing different right views are recorded on the BD-ROM disc 101. In this case, the 3D playlist file includes a plurality of sub-paths with the sub-path type "3D L/R". These sub-paths separately specify playback paths of different files DEP. When 3D video images are played back according to the 3D playlist file, the sub-path to be played back is promptly switched in response, for example, to a user operation, which ensures the binocular parallax to be changed without causing any substantial interruption in 3D video images. This configuration easily allows the user to select 3D video images with a desired binocular parallax.

In the 3D playlist file 1222 shown in FIG. 43, the base-view video stream is registered in the STN table in the main path 4301, and the dependent-view video stream is registered in the STN table SS 4330 in the extension data 4303. Alternatively, the dependent-view video stream may be registered in the STN table. In that case, the STN table may include a flag indicating which of the base view and the dependent view is represented by the registered video stream.

According to Embodiment 1 of the present invention, 2D playlist files and 3D playlist files are stored separately in the BD-ROM disc 101. Alternatively, in a similar manner to the extension data 4303, the sub-path 4302 shown in FIG. 43 may be recorded in an area that is referenced only by the playback device 102 in the 3D playback mode. In that case, the 3D playlist files as they are can be used as the 2D playlist files since there is no risk that the sub-path 4302 causes the playback device 102 in the 2D playback mode to malfunction. As a result, the authoring of the BD-ROM disc is simplified.

(1-O) The index file 1211 shown in FIG. 47 includes a 3D existence flag 4720 and a 2D/3D preference flag 4730 that is shared by all titles. Alternatively, the index file may set a different 3D existence flag or 2D/3D preference flag for each title.

(1-P) In the 3D playback device, in addition to the setting of parental level in SPRM(13), 3D parental level may be set in SPRM(30). The 3D parental level indicates the minimum age of viewers of 3D playback device for which viewing of 3D video images is permitted and is used for parental control of viewing of 3D video titles recorded on the BD-ROM disc 101. Similarly to the value of the SPRM(13), the user of the 3D playback device sets the value of SPRM(30) via, for example, an OSD of the 3D playback device. The following is an example of how the 3D playback device performs parental control on each title of 3D video images. The 3D playback device first reads, from the BD-ROM disc 101, the restricted age for viewing of 2D video images and compares this age with the value of the SPRM(13). The restricted age indicates the minimum age of viewers for which viewing of the title in 2D playback mode is permitted. If the restricted age is greater than the value of the SPRM(13), the 3D playback device stops playback of the title. If this age is equal to or less than the value of the SPRM(13), the 3D playback device then reads, from the BD-ROM disc 101, the restricted age for which viewing of a title in the 3D playback mode is permitted and compares this age with the value of the SPRM(30). The restricted age indicates the minimum age of viewers for which viewing of the title in 3D playback mode is permitted. If the restricted age is equal to or smaller than the value of the SPRM(30), the 3D playback device plays back the title in 3D playback mode. If the restricted age is greater than the value of the SPRM(30), the 3D playback device plays back the title in 2D playback mode. In this way, the difference in viewer's interpupillary distance by the age taken into account, it is possible to realize a parental control so that, for example, "children whose ages are less than a predetermined value can view 3D video images only as 2D video images". Preferably the parental control is performed when it is determined that "the display device supports playback of 3D video images" in the processing of selecting a playlist file for playback shown in FIG. 48, namely when the determination in step S4805 results in "Yes". Note that a value indicating permission/prohibition of 3D playback mode may be set in SPRM(30) instead of the restricted age, and the 3D playback device may determine whether the 3D playback mode is valid or invalid in accordance with the value.

(1-Q) In the 3D playback device, a value indicating "which of 2D playback mode and 3D playback mode is to be prioritized" may be set in SPRM(31). A user of the 3D playback device sets the value of the SPRM(31) via, for example, an OSD of the 3D playback device. In step S4803 in the processing of selecting a playlist file for playback shown in FIG. 48, the 3D playback device refers to the SPRM(31) as well as the 2D/3D preference flag. When both the SPRM(31) and 2D/3D preference flag indicate the 2D playback mode, the 3D playback device selects the 2D playback mode. When both the SPRM(31) and 2D/3D preference flag indicate the 3D playback mode, the 3D playback device proceeds to step S4805 to perform the HDCP authentication, without displaying the playback mode selection screen. As a result, when the display device supports the 3D video images, the 3D playback device selects the 3D playback mode. When the SPRM(31) and 2D/3D preference flag indicate different playback modes, the 3D playback device executes step S4804, i.e. displays the playback mode selection screen to have the user select a playback mode. Alternatively, the 3D playback device may have the application program select a playback mode. In this way, even if the 2D/3D preference flag is set in the 3D video content, it is possible to have the user select a playback mode only when the playback mode indicated by the 2D/3D preference flag does not match the playback mode indicated by the SPRM(31) which is the playback mode having been set by the user in advance.

An application program such as a BD-J object may select a playback mode by referring to the SPRM(31). Furthermore, the application program may determine the initial state of the menu to be displayed on the selection screen depending on the value of the SPRM(31), when causing a user to select a playback mode at step S4804. For example, when the value of the SPRM(31) indicates that the 2D playback mode has a high priority, the menu is displayed in the state in which a cursor is positioned on a button for selecting the 2D playback mode; when the value of the SPRM(31) indicates that the 3D playback mode has a high priority, the menu is displayed in the state in which the cursor is positioned on a button for selecting the 3D playback mode. Alternatively, when the 3D playback device has a function to manage the accounts of a plurality of users such as a father, a mother, and a child, the 3D playback device may set a value to the SPRM(31) depending on the account of a user who is logged in at the current time.

The value of the SPRM(31) may indicate "which of 2D playback mode and 3D playback mode is to be always set", in addition to "which of 2D playback mode and 3D playback mode is to be prioritized". When the value of the SPRM(31) indicates "2D playback mode is to be always set", the 3D playback device always selects the 2D playback mode irrespectively of the value of the 2D/3D preference flag. In that case, the value of the SPRM(25) is set to indicate the 2D playback mode. When the value of the SPRM(31) indicates "3D playback mode is to be always set", the 3D playback device performs the HDCP authentication without displaying the playback mode selection screen irrespectively of the value of the 2D/3D preference flag. In that case, the value of the SPRM(25) is set to indicate the 3D playback mode (L/R mode or depth mode). In this way, even if the 2D/3D preference flag is set in the 3D video content, it is possible to allow the playback mode having been set by the user in advance to be always prioritized.

Embodiment 2

The following describes, as Embodiment 2 of the present invention, a device and method for recording data on the recording media of Embodiment 1 of the present invention. The recording device described here is called an authoring device. The authoring device is generally located at a creation studio and used by authoring staff to create movie content to be distributed. First, in response to operations by the authoring staff, the recording device converts movie content into AV stream files using a predetermined compression encoding method. Next, the recording device generates a scenario. A "scenario" is information defining how each title included in the movie content is to be played back. Specifically, a scenario includes dynamic scenario information and static scenario information. Then, the recording device generates a volume image for a BD-ROM disc from the AV stream files and scenario. Lastly, the recording device records the volume image on the recording medium.

Figure 75:
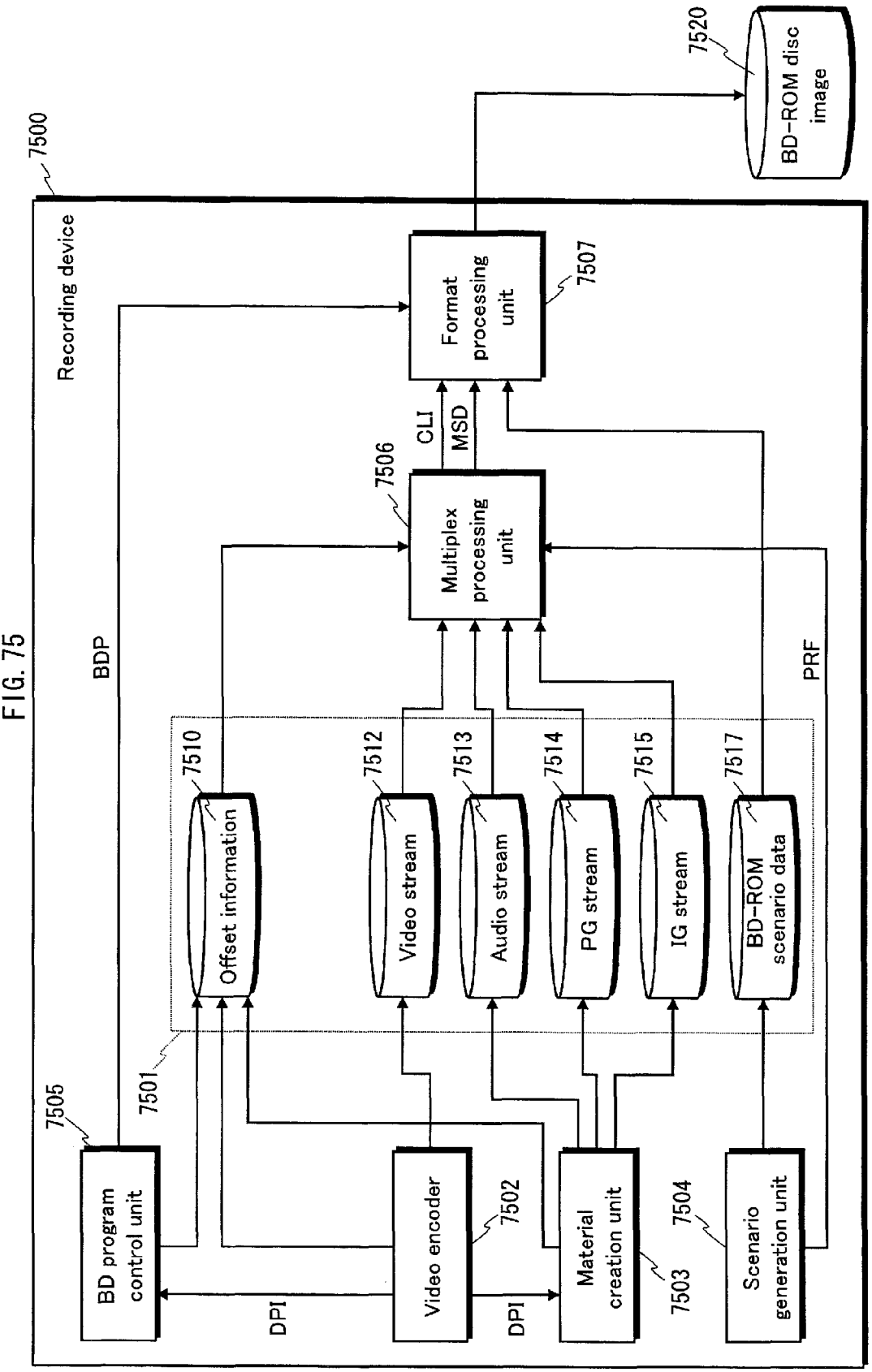
FIG. 75 is a functional block diagram of a recording device 7500 according to Embodiment 2 of the present invention.

FIG. 75 is a functional block diagram of a recording device 7500. As shown in FIG. 75, the recording device 7500 includes a database unit 7501, video encoder 7502, material creation unit 7503, scenario generation unit 7504, BD program creation unit 7505, multiplex processing unit 7506, and format processing unit 7507.

The database unit 7501 is a nonvolatile storage device embedded in the recording device and is in particular a hard disk drive (HDD). Alternatively, the database unit 7501 may be an external HDD connected to the recording device, or a nonvolatile semiconductor memory device internal or external to the recording device.

The video encoder 7502 receives video data, such as uncompressed bit map data, from the authoring staff and compresses the received video data in accordance with a compression encoding method such as MPEG-4 AVC or MPEG-2. This process converts primary video data into a primary video stream and secondary video data into a secondary video stream. In particular, 3D video image data is converted into a pair of a base-view video stream and a dependent-view video stream, as shown in FIG. 17, using a multiview coding method such as MVC. In other words, the video frame sequence representing the left view is converted into a base-view video stream via inter-picture predictive encoding on the pictures in these video frames. On the other hand, the video frame sequence representing the right view is converted into a dependent-view video stream via predictive encoding on not only the pictures in these video frames, but also the base-view pictures. Note that the video frames representing the right view may be converted into a base-view video stream, and the video frames representing the left view may be converted into a dependent-view video stream. The converted video streams 7512 are stored in the database unit 7501.

Figure 76B:
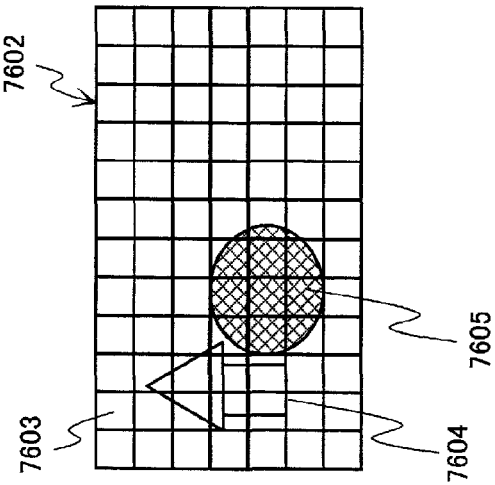
FIGS. 76A and 76B are schematic diagrams respectively showing a left-view picture and a right-view picture used to display one scene of 3D video images.
Figure 76A:
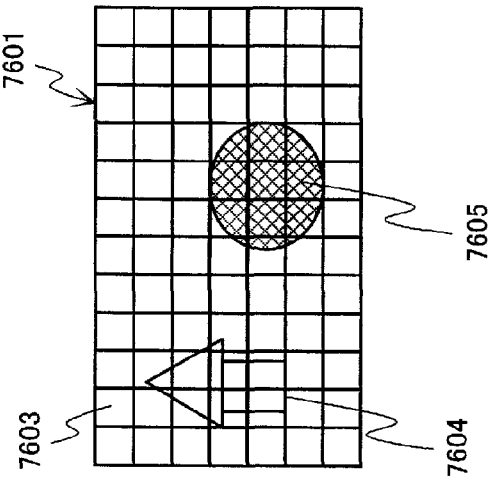

During the process of inter-picture predictive encoding, the video encoder 7502 detects motion vectors between individual images in the left view and right view and calculates depth information of each 3D video image based on the detected motion vectors. FIGS. 76A and 76B are schematic diagrams respectively showing a picture in a left view and a right view used to display one scene of 3D video images, and FIG. 70C is a schematic diagram showing depth information calculated from these pictures by the video encoder 7502.

The video encoder 7502 compresses left-view and right-view pictures using the redundancy between the pictures. In other words, the video encoder 7502 compares both uncompressed pictures on a per-macroblock basis, i.e. per matrices of 8×8 or 16×16 pixels, so as to detect a motion vector for each image in the two pictures. Specifically, as shown in FIGS. 76A and 76B, a left-view picture 7601 and a right-view picture 7602 are first each divided into a matrix of macroblocks 7603. Next, the areas occupied by the image data in picture 7601 and picture 7602 are compared for each macroblock 7603, and a motion vector for each image is detected based on the result of the comparison. For example, the area occupied by image 7604 showing a "house" in picture 7601 is substantially the same as that in picture 7602. Accordingly, a motion vector is not detected from these areas. On the other hand, the area occupied by image 7605 showing a "circle" in picture 7601 is substantially different from the area in picture 7602. Accordingly, a motion vector of the image 7605 is detected from these areas.

Figure 76C:
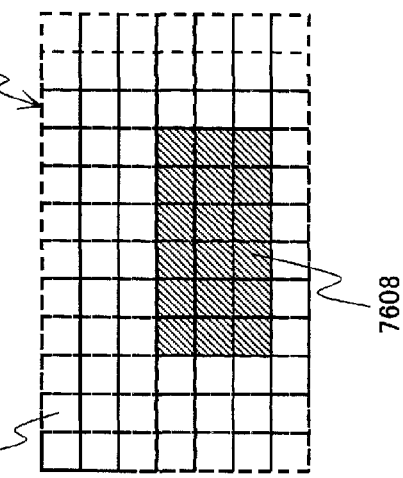
FIG. 76C is a schematic diagram showing depth information calculated from these pictures by a video encoder 7502 shown in FIG. 75.

The video encoder 7502 uses the detected motion vector to compress the pictures 7601 and 7602. On the other hand, the video encoder 7502 uses the motion vector to calculate the binocular parallax of the each image, such as the "house" image 7604 and "circle" image 7605. The video encoder 7502 further calculates the depth of each image from the image's binocular parallax. The information indicating the depth of each image may be organized into a matrix 7606 the same size as the matrix of the macroblocks in pictures 7601 and 7602, as shown in FIG. 76C. In this matrix 7606, blocks 7607 are in one-to-one correspondence with the macroblocks 7603 in pictures 7601 and 7602. Each block 7607 indicates the depth of the image shown by the corresponding macroblocks 7603 by using, for example, a depth of 8 bits. In the example shown in FIG. 76, the depth of the image 7605 of the "circle" is stored in each of the blocks in an area 7608 in the matrix 7606. This area 7608 corresponds to the entire areas in the pictures 7601 and 7602 that represent the image 7605.

When encoding a secondary video stream from 2D video image data, the video encoder 7502 may also create offset information 7510 for a secondary video plane in accordance with operations by the authoring staff. The generated offset information 7510 is stored in the database unit 7501.

The material creation unit 7503 creates elementary streams other than video streams, such as an audio stream 7513, PG stream 7514, and IG stream 7515 and stores the created streams into the database unit 7501. For example, the material creation unit 7503 receives uncompressed LPCM audio data from the authoring staff, encodes the uncompressed LPCM audio data in accordance with a compression encoding method such as AC-3, and converts the encoded LPCM audio data into the audio stream 7513. The material creation unit 7503 additionally receives a subtitle information file from the authoring staff and creates the PG stream 7514 in accordance with the subtitle information file. The subtitle information file defines image data or text data for showing subtitles, display timings of the subtitles, and visual effects to be added to the subtitles, such as fade-in and fade-out. Furthermore, the material creation unit 7503 receives bit map data and a menu file from the authoring staff and creates the IG stream 7515 in accordance with the bit map data and the menu file. The bit map data shows images that are to be displayed on a menu. The menu file defines how each button on the menu is to be transitioned from one status to another and defines visual effects to be added to each button.

In response to operations by the authoring staff, the material creation unit 7503 furthermore creates offset information 7510 corresponding to the PG stream 7514 and IG stream 7515. In this case, the material creation unit 7503 may use the depth information DPI generated by the video encoder 7502 to adjust the depth of the 3D graphics video images with the depth of the 3D video images. In this case, when the depth of the 3D video images changes greatly per frame, the material creation unit 7503 may further process a series of offset values created with use of the depth information DPI in the low-path filter to decrease the change per frame. The offset information 7510 thus generated is stored in the database unit 7501.

The scenario generation unit 7504 creates BD-ROM scenario data 7517 in response to an instruction received from the authoring staff via GUI and then stores the created BD-ROM scenario data 7517 in the database unit 7501. The BD-ROM scenario data 7517 defines methods of playing back the elementary streams 7512-7516 stored in the database unit 7501. Of the file group shown in FIG. 12, the BD-ROM scenario data 7517 includes the index file 1211, the movie object file 1212, and the playlist files 1221-1223. The scenario generation unit 7504 further creates a parameter file PRF and transfers the created parameter file PRF to the multiplex processing unit 7506. The parameter file PRF defines, from among the elementary streams 7512-7515 stored in the database unit 7501, stream data to be multiplexed into the main TS and sub-TS. Alternatively, the scenario generation unit 7504 may set the playback status of each video stream 7512 in units of GOPs or PIs. Information indicating the respective playback statuses may be stored in the database unit 7501 as part of a 3D playlist file or in the original form.

The BD program creation unit 7505 provides the authoring staff with a programming environment for programming BD-J objects and Java application programs. The BD program creation unit 7505 receives a request from a user via GUI and creates each program's source code according to the request. The BD program creation unit 7505 further creates a BD-J object file 1251 from the BD-J objects and compresses the Java application programs in the JAR file 1261. The program files BDP are transferred to the format processing unit 7507.

In this context, it is assumed that a BD-J object is programmed in the following way: the BD-J object causes the program execution unit 5634 shown in FIG. 56 to transfer graphics data for GUI to the system target decoder 5623. Furthermore, the BD-J object causes the system target decoder 5623 to process graphics data as image plane data and to output image plane data to the plane adder 5624 in 1 plane+offset mode. In this case, the BD program creation unit 7505 may create offset information 7510 corresponding to the image plane and store the offset information 7510 in the database unit 7501. The BD program creation unit 7505 may use the depth information DPI generated by the video encoder 7502 when creating the offset information 7510.

In accordance with the parameter file PRF, the multiplex processing unit 7506 multiplexes each of the elementary streams 7512-7515 stored in the database unit 7501 to form a stream file in MPEG-2 TS format. More specifically, as shown in FIG. 75, each of the elementary streams 7512-7515 is first converted into a source packet sequence, and the source packets included in each sequence are multiplexed into a single piece of stream data. In this way, the main TS and sub-TS are created. These pieces of multiplexed stream data MSD are output to the format processing unit 7507.

Furthermore, the multiplex processing unit 7506 creates the offset metadata based on the offset information 7510 stored in the database unit 7501. As shown in FIG. 21, the created offset metadata 2110 is stored as the supplementary data 2101 in the top VAU in each video sequence included in the dependent-view video stream. Note that the multiplex processing unit 7506 may process each piece of graphics data to adjust the arrangement of the graphics elements in the left and right video image frames. Consequently, the multiplex processing unit 7506 prevents the 3D graphics images represented by each graphics plane from being displayed as overlapping in the same visual direction as 3D graphics images represented by the other graphics planes. Alternatively, the multiplex processing unit 7506 may adjust the offset value for each graphics plane so that the depths of 3D graphics images do not overlap. In the case where information pertaining to the playback status is stored in the database unit 7501, the multiplex processing unit 7506 may store the information in the supplementary data in each VAU included in the base-view video stream and dependent-view video stream, in a similar manner to the offset metadata shown in FIG. 21.

Additionally, the multiplex processing unit 7506 creates a 2D clip information file and a dependent-view clip information file via the following four steps (I) to (IV). (I) Create entry maps 3430 shown in FIG. 35 for the file 2D and file DEP. (II) Using each file's entry map, the extent start points 3442 and 3620 shown in FIGS. 36A and 36B are created. At this point, extent ATC times are aligned between contiguous data blocks. Furthermore, it designs the arrangement of extents so that the sizes of 2D extents, base-view extents, and dependent-view extents satisfy predetermined conditions 1 and 2. (III) Extract the stream attribute information 3420 shown in FIG. 34 from each elementary stream to be multiplexed into the main TS and sub-TS. (IV) As shown in FIG. 34, a combination of an entry map 3430, 3D metadata 3440, and stream attribute information 3420 is associated with a piece of clip information 3410. Each clip information file CLI is thus created and transmitted to the format processing unit 7507.

The format processing unit 7507 creates a BD-ROM disc image 7520 of the directory structure shown in FIG. 12 from (i) the BD-ROM scenario data 7517 stored in the database unit 7501, (ii) a group of program files BDP such as BD-J object files created by the BD program creation unit 7505, and (iii) multiplexed stream data MSD and clip information files CLI generated by the multiplex processing unit 7506. In this directory structure, UDF is used as the file system.

When creating file entries for each of the files 2D, files DEP, and files SS, the format processing unit 7507 refers to the entry maps and 3D metadata included in the 2D clip information files and dependent-view clip information files. The SPN for each entry point and extent start point is thereby used in creating each allocation descriptor. In particular, the value of the LBN and the extent size to be represented by each allocation descriptor are determined so as to express an interleaved arrangement of data blocks like the one shown in FIG. 25. As a result, each base-view data block is shared by a file SS and file 2D, and each dependent-view data block is shared by a file SS and file DEP.

<Recording Method of BD-ROM Disc Image>

FIG. 77 is a flowchart of a method for recording movie content onto a BD-ROM disc using the recording device 7500 shown in FIG. 75. This method begins, for example, when power to the recording device 7500 is turned on.

In step S7701, the elementary streams, programs, and scenario data to be recorded on a BD-ROM disc are created. In other words, the video encoder 7502 creates a video stream 7512. The material creation unit 7503 creates an audio stream 7513, PG stream 7514, and IG stream 7515. The scenario generation unit 7504 creates BD-ROM scenario data 7517. These created pieces of data 7512-7517 are stored in the database unit 7501. On the other hand, the video encoder 7502 and the material creation unit 7503 each create offset information 7510 and store this information in the database unit 7501. The scenario generation unit 7504 creates a parameter file PRF and transfers this file to the multiplex processing unit 7506. The BD program creation unit 7505 creates a group of program files BDP, which include a BD-J object file and a JAR file, and transfers this group BDP to the format processing unit 7507. The BD program creation unit 7505 also creates offset information 7510 and stores this information in the database unit 7501. Thereafter, processing proceeds to step S7702.

In step S7702, the multiplex processing unit 7506 creates offset metadata based on the offset information 7510 stored in the database unit 7501. The created offset metadata is stored in the dependent-view video stream as the supplementary data 2101. Thereafter, processing proceeds to step S7703.

In step S7703, the multiplex processing unit 7506 reads the elementary streams 7512-7515 from the database unit 7501 in accordance with the parameter file PRF and multiplexes these streams into a stream file in MPEG2-TS format. Thereafter, processing proceeds to step S7704.

In step S7704, the multiplex processing unit 7506 creates a 2D clip information file and a dependent-view clip information file. In particular, during creation of the entry map and extent start points, the extent ATC time is aligned between contiguous data blocks. Furthermore, the 2D extents, base-view extents, and dependent-view extents are designed to satisfy predetermined conditions 1 and 2. Thereafter, processing proceeds to step S7705.

In step S7705, the format processing unit 7507 creates a BD-ROM disc image 7520 from the BD-ROM scenario data 7517, group of program files BDP, multiplexed stream data MDS, and clip information file CLI. Thereafter, processing proceeds to step S7706.

In step S7706, the BD-ROM disc image 7520 is converted into data for BD-ROM pressing. Furthermore, this data is recorded on a master BD-ROM disc. Thereafter, processing proceeds to step S7707.

In step S7707, BD-ROM discs 101 are mass produced by pressing the master obtained in step S7706. Processing thus concludes.

<<Supplementary Explanation>>

<Principle of 3D Video Image Playback>

Playback methods of 3D video images are roughly classified into two categories: methods using a holographic technique, and methods using parallax video.

A method using a holographic technique is characterized by allowing the viewer to perceive objects in video as stereoscopic by giving the viewer's visual perception substantially the same information as optical information provided to visual perception by human beings of actual objects. A technical theory for utilizing these methods for moving video display has been established. However, it is extremely difficult to construct, with present technology, a computer that is capable of real-time processing of the enormous amount of calculation required for moving video display and a display device having super-high resolution of several thousand lines per 1 mm. Accordingly, at the present time, the realization of these methods for commercial use is hardly in sight.

"Parallax video" refers to a pair of 2D video images shown to each of the viewer's eyes for the same scene, i.e. the pair of a left view and a right view. A method using parallax video is characterized by playing back the left-view and right-view of a single scene so that the viewer sees each view in only one eye, thereby allowing the user to perceive the scene as stereoscopic.

Figure 78B:
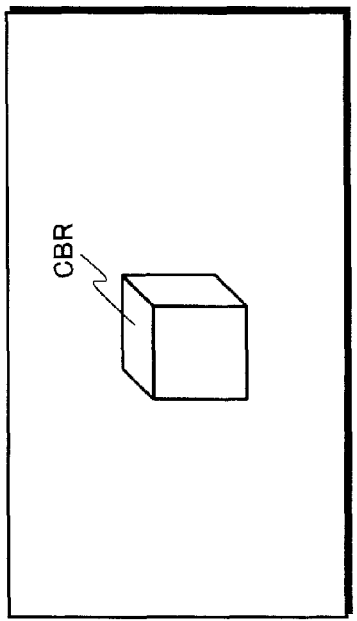
FIGS. 78A to 78C are schematic diagrams illustrating the principle behind playback of 3D video images (stereoscopic video images) in a method using parallax.
Figure 78C:
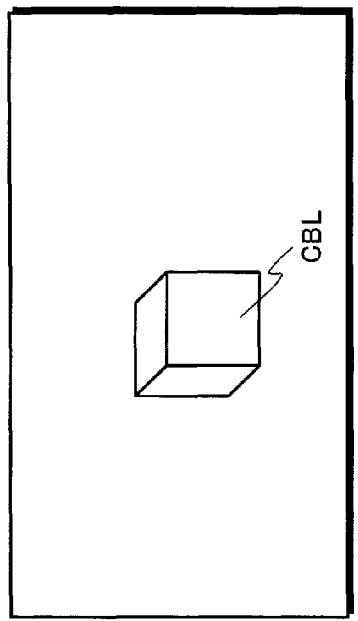
Figure 78A:
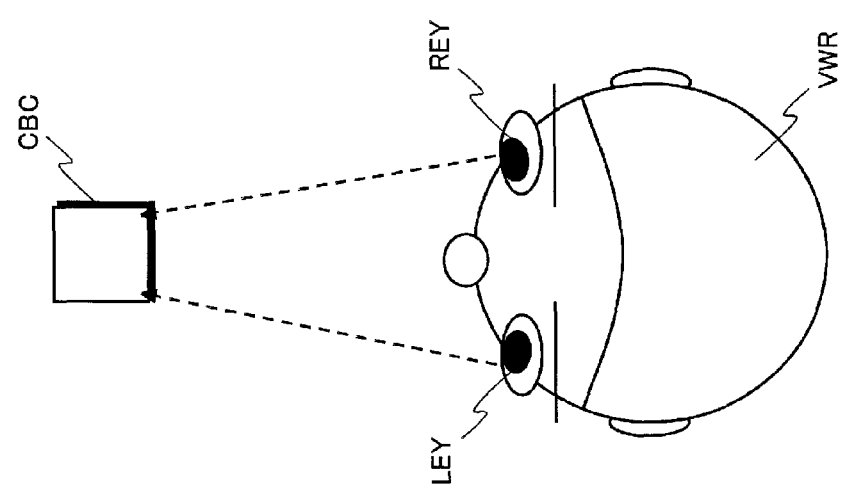

FIGS. 78A to 78C are schematic diagrams illustrating the principle behind playback of 3D video images (stereoscopic video images) in a method using parallax. FIG. 78A is a top view of the viewer VWR looking at a cube CBC placed directly in front of the viewer's face. FIGS. 78B and 78C are schematic diagrams showing the outer appearance of the cube CBC as a 2D video image as perceived respectively by the left eye LEY and the right eye REY of the viewer VWR. As is clear from comparing FIG. 78B and FIG. 78C, the outer appearances of the cube CBC as perceived by the eyes are slightly different. The difference in the outer appearances, i.e., the binocular parallax allows the viewer VWR to recognize the cube CBC as three-dimensional. Thus, according to a method using parallax video, left and right 2D video images with different viewpoints are first prepared for a single scene. For example, for the cube CBC shown in FIG. 78A, the left view of the cube CBC shown in FIG. 78B and the right view shown in FIG. 78C are prepared. In this context, the position of each viewpoint is determined by the binocular parallax of the viewer VWR. Next, each 2D video image is played back so as to be perceived only by the corresponding eye of the viewer VWR. Consequently, the viewer VWR recognizes the scene played back on the screen, i.e., the video image of the cube CBC, as stereoscopic. Unlike methods using a holography technique, methods using parallax video thus have the advantage of requiring preparation of 2D video images from merely two viewpoints.

Several concrete methods for how to use parallax video have been proposed. From the standpoint of how these methods show left and right 2D video images to the viewer's eyes, the methods are divided into alternate frame sequencing methods, methods that use a lenticular lens, two-color separation methods, etc.

In the alternate frame sequencing method, left and right 2D video images are alternately displayed on a screen for a predetermined time, while the viewer watches the screen using shutter glasses. Each lens in the shutter glasses is formed by a liquid crystal panel, for example. The lenses pass or block light in a uniform and alternate manner in synchronization with switching of the 2D video images on the screen. That is, each lens functions as a shutter that periodically blocks an eye of the viewer. More specifically, while a left-video image is displayed on the screen, the shutter glasses make the left-side lens transmit light and the right-hand side lens block light. Conversely, while a right-video image is displayed on the screen, the shutter glasses make the right-side lens transmit light and the left-side lens block light. As a result, the viewer sees afterimages of the right and left-video images overlaid on each other and thus perceives a single 3D video image.

According to the alternate-frame sequencing method, as described above, right and left-video images are alternately displayed in a predetermined cycle. For example, when 24 video frames are displayed per second for playing back normal 2D video images, 48 video frames in total for both right and left eyes need to be displayed for 3D video images. Accordingly, a display device capable of quickly executing rewriting of the screen is preferred for this method.

In a method using a lenticular lens, a right-video frame and a left-video frame are respectively divided into vertically long and narrow rectangular shaped small areas. The small areas of the right-video frame and the small areas of the left-video frame are alternately arranged in a horizontal direction on the screen and displayed at the same time. The surface of the screen is covered by a lenticular lens. The lenticular lens is a sheet-shaped lens constituted from multiple long and thin hog-backed lenses arranged in parallel. Each hog-backed lens lies in the longitudinal direction on the surface of the screen. When the viewer sees the left and right-video frames through the lenticular lens, only the viewer's left eye perceives light from the display areas of the left-video frame, and only the viewer's right eye perceives light from the display areas of the right-video frame. The viewer thus sees a 3D video image from the binocular parallax between the video images respectively perceived by the left and right eyes. Note that according to this method, another optical component having similar functions, such as a liquid crystal device, may be used instead of the lenticular lens. Alternatively, for example, a longitudinal polarization filter may be provided in the display areas of the left image frame, and a lateral polarization filter may be provided in the display areas of the right image frame. In this case, the viewer sees the screen through polarization glasses. In the polarization glasses, a longitudinal polarization filter is provided for the left lens, and a lateral polarization filter is provided for the right lens. Consequently, the right and left-video images are each perceived only by the corresponding eye, thereby allowing the viewer to perceive 3D video images.

In a method using parallax video, in addition to being constructed from the start by a combination of left and right-video images, the 3D video content can also be constructed from a combination of 2D video images and a depth map. The 2D video images represent 3D video images projected on a hypothetical 2D screen, and the depth map represents the depth of each pixel in each portion of the 3D video images as compared to the 2D screen. When the 3D content is constructed from a combination of 2D video images with a depth map, the 3D playback device or display device first constructs left and right-video images from the combination of 2D video images with a depth map and then creates 3D video images from these left and right-video images using one of the above-described methods.

FIG. 79 is a schematic diagram showing an example of constructing a left-view LVW and a right-view RVW from the combination of a 2D video image MVW and a depth map DPH. As shown in FIG. 79, a circular plate DSC is shown in the background BGV of the 2D video image MVW. The depth map DPH indicates the depth for each pixel in each portion of the 2D video image MVW. According to the depth map DPH, in the 2D video image MVW, the display area DA1 of the circular plate DSC is closer to the viewer than the screen, and the display area DA2 of the background BGV is deeper than the screen. The parallax video generation unit PDG in the playback device first calculates the binocular parallax for each portion of the 2D video image MVW using the depth of each portion indicated by the depth map DPH. Next, the parallax video generation unit PDG shifts the presentation position of each portion in the 2D video image MVW to the left or right in accordance with the calculated binocular parallax to construct the left-view LVW and the right-view RVW. In the example shown in FIG. 79, the parallax video generation unit PDG shifts the presentation position of the circular plate DSC in the 2D video image MVW as follows: the presentation position of the circular plate DSL in the left-view LVW is shifted to the right by half of its binocular parallax, S1, and the presentation position of the circular plate DSR in the right-view RVW is shifted to the left by half of its binocular parallax, S1. In this way, the viewer perceives the circular plate DSC as being closer than the screen. Conversely, the parallax video generation unit PDG shifts the presentation position of the background BGV in the 2D video image MVW as follows: the presentation position of the background BGL in the left-view LVW is shifted to the left by half of its binocular parallax, S2, and the presentation position of the background BGR in the right-view RVW is shifted to the right by half of its binocular parallax, S2. In this way, the viewer perceives the background BGV as being deeper than the screen.

A playback system for 3D video images with use of parallax video is in general use, having already been established for use in movie theaters, attractions in amusement parks, and the like. Accordingly, this method is also useful for implementing home theater systems that can play back 3D video images. In the embodiments of the present invention, among methods using parallax video, an alternate-frame sequencing method or a method using polarization glasses is assumed to be used. However, apart from these methods, the present invention can also be applied to other, different methods, as long as they use parallax video. This will be obvious to those skilled in the art from the above explanation of the embodiments.

<File System on the BD-ROM Disc>

When UDF is used as the file system for the BD-ROM disc 101, the volume area 1202B shown in FIG. 12 generally includes areas in which a plurality of directories, a file set descriptor, and a terminating descriptor are respectively recorded. Each "directory" is a data group composing the directory. A "file set descriptor" indicates the LBN of the sector in which a file entry for the root directory is stored. The "terminating descriptor" indicates the end of the recording area for the file set descriptor.

Each directory shares a common data structure. In particular, each directory includes a file entry, directory file, and a subordinate file group.

The "file entry" includes a descriptor tag, Information Control Block (ICB) tag, and allocation descriptor. The "descriptor tag" indicates that the type of the data that includes the descriptor tag is a file entry. For example, when the value of the descriptor tag is "261", the type of that data is a file entry. The "ICB tag" indicates attribute information for the file entry itself. The "allocation descriptor" indicates the LBN of the sector on which the directory file belonging to the same directory is recorded.

The "directory file" typically includes a plurality of each of a file identifier descriptor for a subordinate directory and a file identifier descriptor for a subordinate file. The "file identifier descriptor for a subordinate directory" is information for accessing the subordinate directory located directly below that directory. This file identifier descriptor includes identification information for the subordinate directory, directory name length, file entry address, and actual directory name. In particular, the file entry address indicates the LBN of the sector on which the file entry of the subordinate directory is recorded. The "file identifier descriptor for a subordinate file" is information for accessing the subordinate file located directly below that directory. This file identifier descriptor includes identification information for the subordinate file, file name length, file entry address, and actual file name. In particular, the file entry address indicates the LBN of the sector on which the file entry of the subordinate file is recorded. The "file entry of the subordinate file", as described below, includes address information for the data constituting the actual subordinate file.

By tracing the file set descriptors and the file identifier descriptors of subordinate directories/files in order, the file entry of an arbitrary directory/file recorded on the volume area 1002B can be accessed. Specifically, the file entry of the root directory is first specified from the file set descriptor, and the directory file for the root directory is specified from the allocation descriptor in this file entry. Next, the file identifier descriptor for the directory immediately below the root directory is detected from the directory file, and the file entry for that directory is specified from the file entry address therein. Furthermore, the directory file for that directory is specified from the allocation descriptor in the file entry. Subsequently, from within the directory file, the file entry for the subordinate directory or subordinate file is specified from the file entry address in the file identifier descriptor for that subordinate directory or subordinate file.

"Subordinate files" include extents and file entries. The "extents" are a generally multiple in number and are data sequences whose logical addresses, i.e. LBNs, are consecutive on the disc. The entirety of the extents comprises the actual subordinate file. The "file entry" includes a descriptor tag, ICB tag, and allocation descriptors. The "descriptor tag" indicates that the type of the data that includes the descriptor tag is a file entry. The "ICB tag" indicates attribute information for the file entry itself. The "allocation descriptors" are provided in a one-to-one correspondence with each extent and indicate the arrangement of each extent on the volume area 1202B, specifically the size of each extent and the LBN for the top of the extent. Accordingly, by referring to each allocation descriptor, each extent can be accessed. Also, the two most significant bits of each allocation descriptor indicate whether an extent is actually recorded on the sector for the LBN indicated by the allocation descriptor. Specifically, when the two most significant bits are "0", an extent has been assigned to the sector and has been actually recorded thereat. When the two most significant bits are "1", an extent has been assigned to the sector but has not been yet recorded thereat.

Like the above-described file system adopting a UDF, when each file recorded on the volume area is divided into a plurality of extents, the file system for the volume area also generally stores the information showing the locations of the extents, as with the above-mentioned allocation descriptors, in the volume area. By referring to the information, the location of each extent, particularly the logical address thereof, can be found.

<Decoding Switch Information>

Figure 80A:
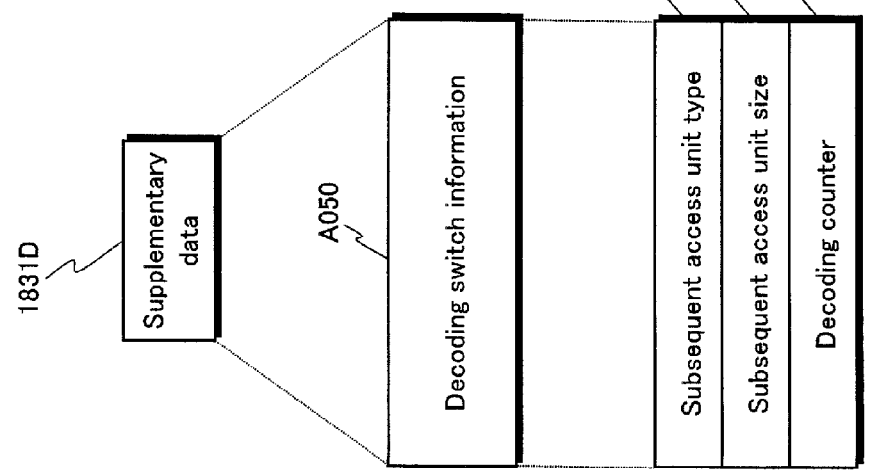
FIG. 80A is a schematic diagram showing a data structure of decoding switch information A050.

FIG. 80A is a schematic diagram showing a data structure of a decoding switch information A050. The decoding switch information A050 is included in the pieces of supplementary data 1831D and 1832D in VAUs in the base-view video stream and the dependent-view video stream shown in FIG. 18. However, in VAU #1 located at the top of each GOP in the dependent-view video stream, the decoding switch information A050 is stored in supplementary data that is different from the supplementary data 1832D containing the offset metadata. The pieces of supplementary data 1831D and 1832D, in particular in MPEG-4 AVC and MVC, correspond to "SEI" that is a kind of NAL unit. The decoding switch information A050 is information to cause the decoder in the playback device 102 to easily specify the next VAU to decode. As described below, the decoder alternately decodes the base-view video stream and the dependent-view video stream in units of VAUs. When doing so, the decoder generally specifies the next VAU to be decoded in alignment with the time shown by the DTS assigned to each VAU. Many types of decoders, however, continue to decode VAUs in order, ignoring the DTS. For such decoders, it is preferable for each VAU to include decoding switch information A050 in addition to a DTS.

As shown in FIG. 80A, the decoding switch information A050 includes a subsequent access unit type A051, subsequent access unit size A052, and decoding counter A053. The subsequent access unit type A051 indicates whether the next VAU to be decoded belongs to a base-view video stream or a dependent-view video stream. For example, when the value of the subsequent access unit type A051 is "1", the next VAU to be decoded belongs to a base-view video stream, and when the value of the subsequent access unit type A051 is "2", the next VAU to be decoded belongs to a dependent-view video stream. When the value of the subsequent access unit type A051 is "0", the current VAU is located at the end of the stream targeted for decoding, and the next VAU to be decoded does not exist. The subsequent access unit size A052 indicates the size of the next VAU that is to be decoded. By referring to the subsequent access unit size A052, the decoder in the playback device 102 can specify the size of a VAU without analyzing its actual structure. Accordingly, the decoder can easily extract VAUs from the buffer. The decoding counter A053 shows the decoding order of the VAU to which it belongs. The order is counted from a VAU that includes an I picture in the base-view video stream.

Figure 80B:
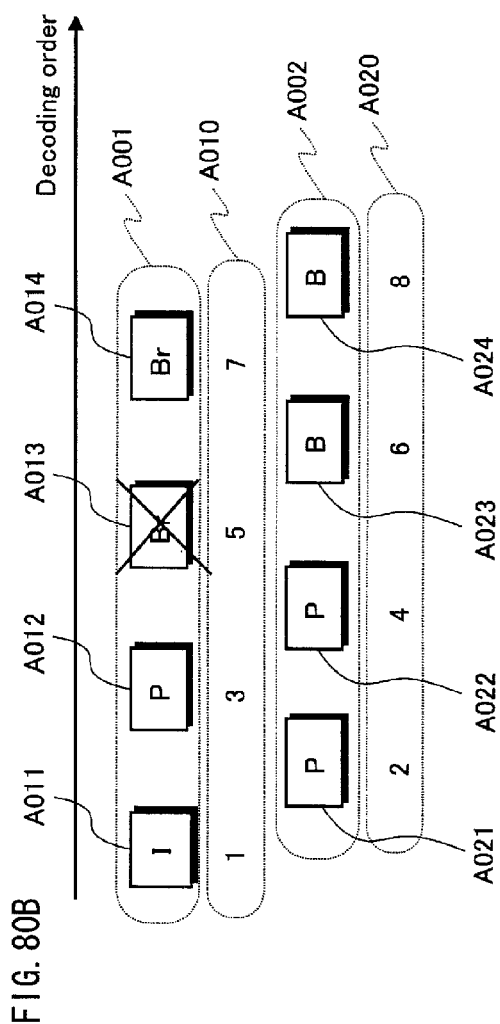
FIG. 80B is a schematic diagram showing an example of decoding counters A010 and A020 allocated to each picture in a base-view video stream A001 and a dependent-view video stream A002.
Figure 80C:
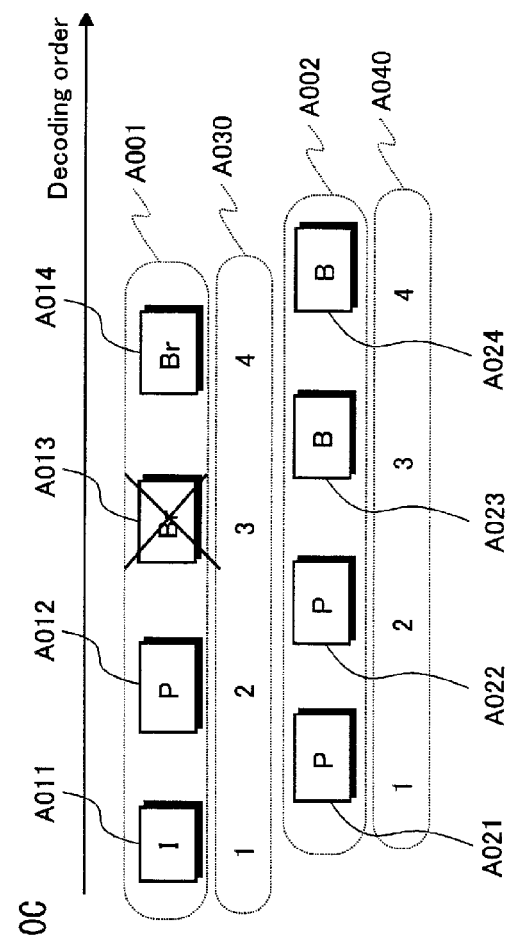
FIG. 80C is a schematic diagram showing another example of decoding counters A030 and A040 allocated to each picture in the video streams A001 and A002.
Figure 81:
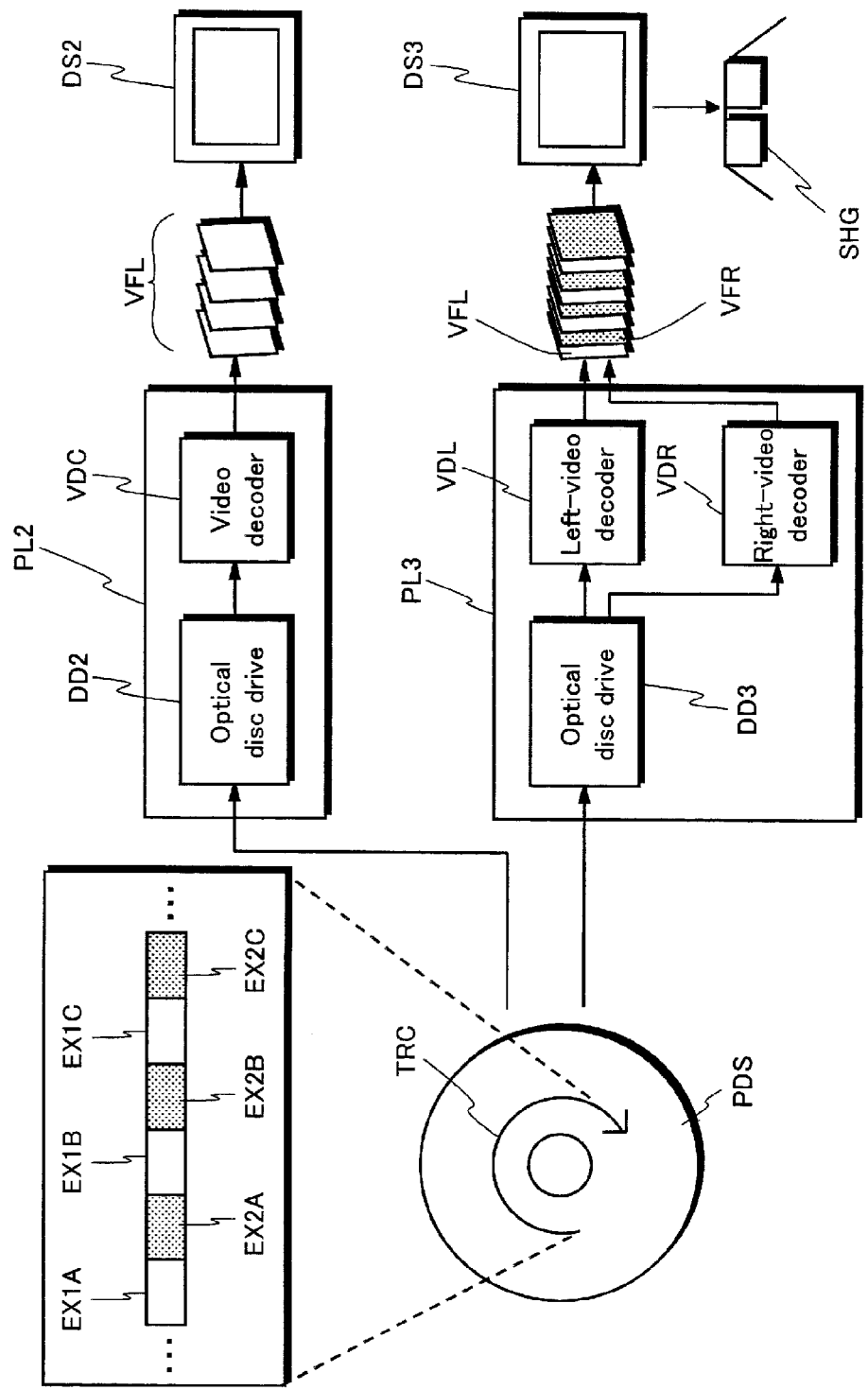
FIG. 81 is a schematic diagram illustrating a technology for ensuring the compatibility of an optical disc storing 3D video content with 2D playback devices.

FIG. 80C is a schematic diagram showing another example of the decoding counters A010 and A020 allocated to each picture in a base-view video stream A001 and a dependent-view video stream A002. As shown in FIG. 80B, the decoding counters A010 and A020 are incremented alternately between the two video streams A001 and A002. For example, for VAU A011 that includes an I picture in the base-view video stream A001, a value of "1" is assigned to the decoding counter A010. Next, a value of "2" is assigned to the decoding counter A020 for the VAU A021 that includes the next P picture to be decoded in the dependent-view video stream A002. Furthermore, a value of "3" is assigned to the decoding counter A010 for the VAU A012 that includes the next P picture to be decoded in the base-view video stream A001. By assigning values in this way, even when the decoder in the playback device 102 fails to read one of the VAUs due to some error, the decoder can immediately specify the missing picture using the decoding counters A010 and A020. Accordingly, the decoder can perform error processing appropriately and promptly.

In the example shown in FIG. 80B, an error occurs during the reading of the third VAU A013 in the base-view video stream A001, and the Br picture is missing. During decoding processing of the P picture contained in the second VAU A022 in the dependent-view video stream A002, however, the decoder has read the decoding counter A020 for this VAU A022 and retained the value. Accordingly, the decoder can predict the decoding counter A010 for the next VAU to be processed. Specifically, the decoding counter A020 in the VAU A022 that includes the P picture is "4". Therefore, the decoding counter A010 for the next VAU to be read can be predicted to be "5". The next VAU that is actually read, however, is the fourth VAU A014 in the base-view video stream A001, whose decoding counter A010 is "7". The decoder can thus detect that it failed to read a VAU. Accordingly, the decoder can execute the following processing: "skip decoding processing of the B picture extracted from the third VAU A023 in the dependent-view video stream A002, since the Br picture to be used as a reference is missing". In this way, the decoder checks the decoding counters A010 and A020 during each decoding process. Consequently, the decoder can promptly detect errors during reading of VAUs and can promptly execute appropriate error processing. As a result, the decoder can prevent noise from contaminating the playback video.

FIG. 80C is a schematic diagram showing another example of the decoding counters A030 and A040 allocated to each picture in a base-view video stream A001 and a dependent-view video stream A002. As shown in FIG. 80B, the decoding counters A030 and A040 are incremented alternately between the two video streams A001 and A002. Therefore, the decoding counters A030 and A040 are the same for a pair of pictures in the same 3D VAU. In this case, when the decoder has decoded one VAU in the base-view video stream A001, it can predict that "the decoding counter A030 is the same as the decoding counter A040 for the next VAU to be decoded in the dependent-view video stream A002". Conversely, when the decoder has decoded a VAU in the dependent-view video stream A002, it can predict that "the decoding counter A030 for the next VAU to be decoded in the base-view video stream A001 is the same as the decoding counter A040 plus one". Accordingly, at any point in time, the decoder can promptly detect an error in reading a VAU using the decoding counters A030 and A040 and can promptly execute appropriate error processing. As a result, the decoder can prevent noise from contaminating the playback video.

In the system target decoder 5623 shown in FIG. 60, the DEC 6004 may refer to the decoding switch information A050 to sequentially decode pictures from the respective VAUs, irrespective of their DTSs. Additionally, the buffer switch 6006 may cause the DEC 6004 to return the decoding switch information A050 in the VAU. In such a case, the buffer switch 6006 can determine if it should transfer the next VAU from the EB1 6003 or EB2 6010 by referring to the decoding switch information A050.

<Data Distribution Via Broadcasting or Communication Circuit>

The recording medium according to Embodiment 1 of the present invention may be, in addition to an optical disc, a general removable medium available as a package medium, such as a portable semiconductor memory device, including an SD memory card. Also, Embodiment 1 describes an example of an optical disc in which data has been recorded beforehand, namely, a conventionally available read-only optical disc such as a BD-ROM or a DVD-ROM. However, the embodiments of the present invention are not limited in this way. For example, when a terminal device writes 3D video content that has been distributed via broadcasting or a network onto a conventionally available writable optical disc such as a BD-RE or a DVD-RAM, arrangement of the extents according to Embodiment 1 may be used. The terminal device may be incorporated in a playback device or may be a device different from the playback device.

<Playback of Semiconductor Memory Card>

The following describes a data read unit of a playback device in the case where a semiconductor memory card is used as the recording medium according to Embodiment 1 of the present invention instead of an optical disc.

The part of the playback device that reads data from an optical disc is composed of, for example, an optical disc drive. Conversely, the part of the playback device that reads data from a semiconductor memory card is composed of an exclusive interface (I/F). Specifically, a card slot is provided with the playback device, and the I/F is mounted in the card slot. When the semiconductor memory card is inserted into the card slot, the semiconductor memory card is electrically connected with the playback device via the I/F. Furthermore, the data is read from the semiconductor memory card to the playback device via the I/F.

<Copyright Protection Technique for Data Stored in BD-ROM Disc>

The mechanism for protecting copyright of data recorded on a BD-ROM disc is now described as an assumption for the following supplementary explanation.

From a standpoint, for example, of improving copyright protection or confidentiality of data, there are cases in which a part of the data recorded on the BD-ROM is encrypted. The encrypted data is, for example, a video stream, an audio stream, or other stream. In such a case, the encrypted data is decoded in the following manner.

The playback device has recorded thereon beforehand a part of data necessary for generating a "key" to be used for decoding the encrypted data recorded on the BD-ROM disc, namely, a device key. On the other hand, the BD-ROM disc has recorded thereon another part of the data necessary for generating the "key", namely, a media key block (MKB), and encrypted data of the "key", namely, an encrypted title key. The device key, the MKB, and the encrypted title key are associated with one another, and each are further associated with a particular ID written into a BCA 1201 recorded on the BD-ROM disc 101 shown in FIG. 12, namely, a volume ID. When the combination of the device key, the MKB, the encrypted title key, and the volume ID is not correct, the encrypted data cannot be decoded. In other words, only when the combination is correct, the above-mentioned "key", namely the title key, can be generated. Specifically, the encrypted title key is first decrypted using the device key, the MKB, and the volume ID. Only when the title key can be obtained as a result of the decryption, the encrypted data can be decoded using the title key as the above-mentioned "key".

When a playback device tries to play back the encrypted data recorded on the BD-ROM disc, the playback device cannot play back the encrypted data unless the playback device has stored thereon a device key that has been associated beforehand with the encrypted title key, the MKB, the device, and the volume ID recorded on the BD-ROM disc. This is because a key necessary for decoding the encrypted data, namely a title key, can be obtained only by decrypting the encrypted title key based on the correct combination of the MKB, the device key, and the volume ID.

In order to protect the copyright of at least one of a video stream and an audio stream that are to be recorded on a BD-ROM disc, a stream to be protected is encrypted using the title key, and the encrypted stream is recorded on the BD-ROM disc. Next, a key is generated based on the combination of the MKB, the device key, and the volume ID, and the title key is encrypted using the key so as to be converted to an encrypted title key. Furthermore, the MKB, the volume ID, and the encrypted title key are recorded on the BD-ROM disc. Only a playback device storing thereon the device key to be used for generating the above-mentioned key can decode the encrypted video stream and/or the encrypted audio stream recorded on the BD-ROM disc using a decoder. In this manner, it is possible to protect the copyright of the data recorded on the BD-ROM disc.

The above-described mechanism for protecting the copyright of the data recorded on the BD-ROM disc is applicable to a recording medium other than the BD-ROM disc. For example, the mechanism is applicable to a readable and writable semiconductor memory device and in particular to a portable semiconductor memory card such as an SD card.

<Recording Data on a Recording Medium through Electronic Distribution>

The following describes processing to transmit data, such as an AV stream file for 3D video images (hereinafter, "distribution data"), to the playback device according to Embodiment 1 of the present invention via electronic distribution and to cause the playback device to record the distribution data on a semiconductor memory card. Note that the following operations may be performed by a specialized terminal device for performing the processing instead of the above-mentioned playback device. Also, the following description is based on the assumption that the semiconductor memory card that is a recording destination is an SD memory card.

The playback device includes the above-described card slot. An SD memory card is inserted into the card slot. The playback device in this state first transmits a transmission request of distribution data to a distribution server on a network. At this point, the playback device reads identification information of the SD memory card from the SD memory card and transmits the read identification information to the distribution server together with the transmission request. The identification information of the SD memory card is, for example, an identification number specific to the SD memory card and, more specifically, is a serial number of the SD memory card. The identification information is used as the above-described volume ID.

The distribution server has stored thereon pieces of distribution data. Distribution data that needs to be protected by encryption such as a video stream and/or an audio stream has been encrypted using a predetermined title key. The encrypted distribution data can be decrypted using the same title key.

The distribution server stores thereon a device key as a private key common with the playback device. The distribution server further stores thereon an MKB in common with the SD memory card. Upon receiving the transmission request of distribution data and the identification information of the SD memory card from the playback device, the distribution server first generates a key from the device key, the MKB, and the identification information and encrypts the title key using the generated key to generate an encrypted title key.

Next, the distribution server generates public key information. The public key information includes, for example, the MKB, the encrypted title key, signature information, the identification number of the SD memory card, and a device list. The signature information includes for example a hash value of the public key information. The device list is a list of devices that need to be invalidated, that is, devices that have a risk of performing unauthorized playback of encrypted data included in the distribution data. The device list specifies the device key and the identification number for the playback device, as well as an identification number or function (program) for each element in the playback device such as the decoder.

The distribution server transmits the distribution data and the public key information to the playback device. The playback device receives the distribution data and the public key information and records them in the SD memory card via the exclusive I/F of the card slot.

Encrypted distribution data recorded on the SD memory card is decrypted using the public key information in the following manner, for example. First, three types of checks (1)-(3) are performed as authentication of the public key information. These checks may be performed in any order.

(1) Does the identification information of the SD memory card included in the public key information match the identification number stored in the SD memory card inserted into the card slot?

(2) Does a hash value calculated based on the public key information match the hash value included in the signature information?

(3) Is the playback device excluded from the device list indicated by the public key information? Specifically, is the device key of the playback device excluded from the device list?

If at least any one of the results of the checks (1) to (3) is negative, the playback device stops decryption processing of the encrypted data. Conversely, if all of the results of the checks (1) to (3) are affirmative, the playback device authorizes the public key information and decrypts the encrypted title key included in the public key information using the device key, the MKB, and the identification information of the SD memory card, thereby obtaining a title key. The playback device further decrypts the encrypted data using the title key, thereby obtaining, for example, a video stream and/or an audio stream.

The above mechanism has the following advantage. If a playback device, compositional elements, and a function (program) that have the risk of being used in an unauthorized manner are already known when data is transmitted via the electronic distribution, the corresponding pieces of identification information are listed in the device list and are distributed as part of the public key information. On the other hand, the playback device that has requested the distribution data inevitably needs to compare the pieces of identification information included in the device list with the pieces of identification information of the playback device, its compositional elements, and the like. As a result, if the playback device, its compositional elements, and the like are identified in the device list, the playback device cannot use the public key information for decrypting the encrypted data included in the distribution data even if the combination of the identification number of the SD memory card, the MKB, the encrypted title key, and the device key is correct. In this manner, it is possible to effectively prevent distribution data from being used in an unauthorized manner.

The identification information of the semiconductor memory card is desirably recorded in a recording area having high confidentiality included in a recording area of the semiconductor memory card. This is because if the identification information such as the serial number of the SD memory card has been tampered with in an unauthorized manner, it is possible to realize an illegal copy of the SD memory card easily. In other words, if the tampering allows generation of a plurality of semiconductor memory cards having the same identification information, it is impossible to distinguish between authorized products and unauthorized copy products by performing the above check (1). Therefore, it is necessary to record the identification information of the semiconductor memory card on a recording area with high confidentiality in order to protect the identification information from being tampered with in an unauthorized manner.

The recording area with high confidentiality is structured within the semiconductor memory card in the following manner, for example. First, as a recording area electrically disconnected from a recording area for recording normal data (hereinafter, "first recording area"), another recording area (hereinafter, "second recording area") is provided. Next, a control circuit exclusively for accessing the second recording area is provided within the semiconductor memory card. As a result, access to the second recording area can be performed only via the control circuit. For example, assume that only encrypted data is recorded on the second recording area and a circuit for decrypting the encrypted data is incorporated only within the control circuit. As a result, access to the data recorded on the second recording area can be performed only by causing the control circuit to store therein an address of each piece of data recorded in the second recording area. Also, an address of each piece of data recorded on the second recording area may be stored only in the control circuit. In this case, only the control circuit can identify an address of each piece of data recorded on the second recording area.

In the case where the identification information of the semiconductor memory card is recorded on the second recording area, then when an application program operating on the playback device acquires data from the distribution server via electronic distribution and records the acquired data in the semiconductor memory card, the following processing is performed. First, the application program issues an access request to the control circuit via the memory card I/F for accessing the identification information of the semiconductor memory card recorded on the second recording area. In response to the access request, the control circuit first reads the identification information from the second recording area. Then, the control circuit transmits the identification information to the application program via the memory card I/F. The application program transmits a transmission request of the distribution data together with the identification information. The application program further records, in the first recording area of the semiconductor memory card via the memory card I/F, the public key information and the distribution data received from the distribution server in response to the transmission request.

Note that it is preferable that the above-described application program check whether the application program itself has been tampered with before issuing the access request to the control circuit of the semiconductor memory card. The check may be performed using a digital certificate compliant with the X.509 standard. Furthermore, it is only necessary to record the distribution data in the first recording area of the semiconductor memory card, as described above. Access to the distribution data need not be controlled by the control circuit of the semiconductor memory card.

<Application to Real-Time Recording>

Embodiment 2 of the present invention is based on the assumption that an AV stream file and a playlist file are recorded on a BD-ROM disc using the prerecording technique of the authoring system, and the recorded AV stream file and playlist file are provided to users. Alternatively, it may be possible to record, by performing real-time recording, the AV stream file and the playlist file on a writable recording medium such as a BD-RE disc, a BD-R disc, a hard disk, or a semiconductor memory card (hereinafter, "BD-RE disc or the like") and provide the user with the recorded AV stream file and playlist file. In such a case, the AV stream file may be a transport stream that has been obtained as a result of real-time decoding of an analog input signal performed by a recording device. Alternatively, the AV stream file may be a transport stream obtained as a result of partialization of a digitally input transport stream performed by the recording device.

The recording device performing real-time recording includes a video encoder, an audio encoder, a multiplexer, and a source packetizer. The video encoder encodes a video signal to convert it into a video stream. The audio encoder encodes an audio signal to convert it into an audio stream. The multiplexer multiplexes the video stream and audio stream to convert them into a digital stream in the MPEG-2 TS format. The source packetizer converts TS packets in the digital stream in MPEG-2 TS format into source packets. The recording device stores each source packet in the AV stream file and writes the AV stream file on the BD-RE disc or the like.

In parallel with the processing of writing the AV stream file, the control unit of the recording device generates a clip information file and a playlist file in the memory and writes the files on the BD-RE disc or the like. Specifically, when a user requests performance of recording processing, the control unit first generates a clip information file in accordance with an AV stream file and writes the file on the BD-RE disc or the like. In such a case, each time a head of a GOP of a video stream is detected from a transport stream received from outside, or each time a GOP of a video stream is generated by the video encoder, the control unit acquires a PTS of an I picture positioned at the head of the GOP and an SPN of the source packet in which the head of the GOP is stored. The control unit further stores a pair of the PTS and the SPN as one entry point in an entry map of the clip information file. At this time, an "is_angle_change" flag is added to the entry point. The is_angle_change flag is set to "ON" when the head of the GOP is an IDR picture, and "OFF" when the head of the GOP is not an IDR picture. In the clip information file, stream attribute information is further set in accordance with an attribute of a stream to be recorded. In this manner, after writing the AV stream file and the clip information file into the BD-RE disc or the like, the control unit generates a playlist file using the entry map in the clip information file, and writes the file on the BD-RE disc or the like.

<Managed Copy>

The playback device according to the embodiments of the present invention may write a digital stream recorded on the BD-ROM disc 101 on another recording medium via a managed copy. "Managed copy" refers to a technique for permitting copy of a digital stream, a playlist file, a clip information file, and an application program from a read-only recording medium such as a BD-ROM disc to a writable recording medium only in the case where authentication via communication with the server succeeds. This writable recording medium may be a writable optical disc, such as a BD-R, BD-RE, DVD-R, DVD-RW, or DVD-RAM, a hard disk, or a portable semiconductor memory element such as an SD memory card, Memory Stick™, Compact Flash™, Smart Media™ or Multimedia Card™. A managed copy allows for limitation of the number of backups of data recorded on a read-only recording medium and for charging a fee for backups.

When a managed copy is performed from a BD-ROM disc to a BD-R disc or a BD-RE disc and the two discs have an equivalent recording capacity, the bit streams recorded on the original disc may be copied in order as they are.

If a managed copy is performed between different types of recording media, a trans code needs to be performed. This "trans code" refers to processing for adjusting a digital stream recorded on the original disc to the application format of a recording medium that is the copy destination. For example, the trans code includes the process of converting an MPEG-2 TS format into an MPEG-2 program stream format and the process of reducing a bit rate of each of a video stream and an audio stream and re-encoding the video stream and the audio stream. During the trans code, an AV stream file, a clip information file, and a playlist file need to be generated in the above-mentioned real-time recording.

<Method for Describing Data Structure>

Among the data structures in Embodiment 1 of the present invention, a repeated structure "there is a plurality of pieces of information having a predetermined type" is defined by describing an initial value of a control variable and a cyclic condition in a "for" sentence. Also, a data structure "if a predetermined condition is satisfied, predetermined information is defined" is defined by describing, in an "if" sentence, the condition and a variable to be set at the time when the condition is satisfied. In this manner, the data structure described in Embodiment 1 is described using a high level programming language. Accordingly, the data structure is converted by a computer into a computer readable code via the translation process performed by a compiler, which includes "syntax analysis", "optimization", "resource allocation", and "code generation", and the data structure is then recorded on the recording medium. By being described in a high level programming language, the data structure is treated as a part other than the method of the class structure in an object-oriented language, specifically, as an array type member variable of the class structure, and constitutes a part of the program. In other words, the data structure is substantially equivalent to a program. Therefore, the data structure needs to be protected as a computer related invention.

<Management of Playlist File and Clip Information File by Playback Program>

When a playlist file and an AV stream file are recorded on a recording medium, a playback program is recorded on the recording medium in an executable format. The playback program makes the computer play back the AV stream file in accordance with the playlist file. The playback program is loaded from a recording medium to a memory element of a computer and is then executed by the computer. The loading process includes compile processing or link processing. By these processes, the playback program is divided into a plurality of sections in the memory element. The sections include a text section, a data section, a bss section, and a stack section. The text section includes a code array of the playback program, an initial value, and non-rewritable data. The data section includes variables with initial values and rewritable data. In particular, the data section includes a file, recorded on the recording medium, that can be accessed at any time. The bss section includes variables having no initial value. The data included in the bss section is referenced in response to commands indicated by the code in the text section. During the compile processing or link processing, an area for the bss section is set aside in the computer's internal RAM. The stack section is a memory area temporarily set aside as necessary. During each of the processes by the playback program, local variables are temporarily used. The stack section includes these local variables. When the program is executed, the variables in the bss section are initially set at zero, and the necessary memory area is set aside in the stack section.

As described above, the playlist file and the clip information file are already converted on the recording medium into computer readable code. Accordingly, at the time of execution of the playback program, these files are each managed as "non-rewritable data" in the text section or as a "file accessed at any time" in the data section. In other words, the playlist file and the clip information file are each included as a compositional element of the playback program at the time of execution thereof. Therefore, the playlist file and the clip information file fulfill a greater role in the playback program than mere presentation of data.

INDUSTRIAL APPLICABILITY

The present invention relates to a technology for displaying stereoscopic video images, and causes a display device to select a frame targeted for display, as described above. The present invention thus clearly has industrial applicability.

REFERENCE SIGNS LIST $P_{3D}$ playback period of 3D video images
$P_{2D}$ playback period of 2D video images
3D value of playback mode indicating "3D playback mode"
2D value of playback mode indicating "2D playback mode"
L left-view frame
R right-view frame
104 shutter glasses
LSL period during which shutter glasses 104 cause left lens to be transparent
LSR period during which shutter glasses 104 cause right lens to be transparent
T1 first time
T2 second time

The invention claimed is:

1. A transmission device for transmitting stream data that includes left-view frames and right-view frames of stereoscopic video images and control information, comprising:
a control unit operable to set a 3D playback mode in the control information when a user operation or an instruction of an application program causes a device being a transmission destination of the stream data to process a pair of a left-view frame and a right-view frame over one frame period of the stereoscopic video images, the control unit operable to set a 2D playback mode in the control information when a user operation or an instruction of an application program causes the device being the transmission destination to process only a left-view frame or a right-view frame over one frame period of the stereoscopic video images;
a format conversion unit operable to convert the stream data into a predetermined transmission format so that a pair of a left-view frame and a right-view frame is transmitted over one frame period of the stereoscopic video images, regardless of whether the control information indicates the 3D playback mode or the 2D playback mode; and
a transmission unit operable to transmit the stream data converted in the transmission format.

2. The transmission device according to claim 1, wherein
the stream data further includes a graphics stream multiplexed therein, the graphics stream representing monoscopic graphics images,
the format conversion unit generates a graphics plane from the graphics stream,
the format conversion unit provides a left offset and a right offset for horizontal coordinates in the graphics plane, combines one of a graphics plane having the left offset and a graphics plane having the right offset with a left-view frame, and combines the other thereof with a right-view frame when the control information indicates the 3D playback mode, and
the format conversion unit combines the graphics plane as generated with each of a left-view frame and a right-view frame when the control information indicates the 2D playback mode.

3. The transmission device according to claim 1, wherein
the stream data further includes a graphics stream multiplexed therein, the graphics stream representing monoscopic graphics images,
the format conversion unit generates a graphics plane from the graphics stream, and
the format conversion unit provides a left offset and a right offset for horizontal coordinates in the graphics plane, combines one of a graphics plane having the left offset and a graphics plane having the right offset with a left-view frame, and combines the other thereof with a right-view frame, regardless of whether the control information indicates the 3D playback mode or the 2D playback mode.

4. The transmission device according to claim 1, wherein
the format conversion unit adopts a format compliant with an HDMI standard as the transmission format and converts the control information into an AVI info frame.

5. A method for transmitting stream data that includes left-view frames and right-view frames of stereoscopic video images and control information, comprising:
receiving a user operation or an instruction of an application program;
setting a 3D playback mode in the control information when the user operation or the instruction of the application program causes a device being a transmission destination of the stream data to process a pair of a left-view frame and a right-view frame over one frame period of the stereoscopic video images;
setting a 2D playback mode in the control information when the user operation or the instruction of the application program causes the device being the transmission destination to process only a left-view frame or a right-view frame over one frame period of the stereoscopic video images; and
converting the stream data into a predetermined transmission format so that a pair of a left-view frame and a right-view frame is transmitted over one frame period of the stereoscopic video images, regardless of whether the control information indicates the 3D playback mode or the 2D playback mode; and
transmitting the stream data converted in the predetermined transmission format.

6. A reception device for receiving stream data that includes left-view frames and right-view frames of stereoscopic video images and control information, comprising:
a reception unit operable to receive the stream data converted into a predetermined transmission format so that a pair of a left-view frame and a right-view frame is received over one frame period of the stereoscopic video images; and
a signal processing unit operable to alternately extract the left-view frames and the right-view frames from the stream data in the predetermined transmission format, then
to transmit a pair of a left-view frame and a right-view frame over one frame period of the stereoscopic video images when the control information indicates a 3D playback mode, and
to reduce a frame rate to a level of one frame per frame period of the stereoscopic video images to transmit only the left-view frames, the right-view frames, or frames of monoscopic video images reconstructed from the left-view frames and the right-view frames, at the reduced frame rate when the control information indicates a 2D playback mode.

7. A reception device for receiving stream data that includes left-view frames and right-view frames of stereoscopic images and control information, comprising:
a reception unit operable to receive the stream data; and
a signal processing unit operable to alternately extract the left-view frames and the right-view frames from the stream data, then
to transmit a pair of a left-view frame and a right-view frame over one frame period of the stereoscopic video images when the control information indicates a 3D playback mode, and
to transmit a single left-view frame or a single right-view frame twice over one frame period of the stereoscopic video images when the control information indicates a 2D playback mode.

8. The reception device according to claim 6, wherein
the reception unit adopts a format compliant with an HDMI standard as the predetermined transmission format and converts the control information into an AVI info frame.

9. A method for receiving stream data that includes left-view frames and right-view frames of stereoscopic video images and control information, comprising:
receiving the stream data converted into a predetermined transmission format so that a pair of a left-view frame and a right-view frame is received over one frame period of the stereoscopic video images;

alternately extracting the left-view frames and the right-view frames from the stream data in the predetermined transmission format;

transmitting a pair of a left-view frame and a right-view frame over one frame period of the stereoscopic video images when the control information indicates a 3D playback mode; and reducing a frame rate to a level of one frame per frame period of the stereoscopic video images to transmit only the left-view frames, the right-view frames, or frames of monoscopic video images reconstructed from the left-view frames and the right-view frames, at the reduced frame rate when the control information indicates a 2D playback mode.

10. A display device for displaying stereoscopic video images on a screen, comprising:

a reception unit operable to receive stream data that includes left-view frames and right-view frames of the stereoscopic video images and control information and that is converted in a predetermined transmission format so that a pair of a left-view frame and a right-view frame is received over one frame period of the stereoscopic video images;

a signal processing unit operable to alternately extract the left-view frames and the right-view frames from the stream data, then
to transmit a pair of a left-view frame and a right-view frame over one frame period of the stereoscopic video images when the control information indicates a 3D playback mode, and
to reduce a frame rate to a level of one frame per frame period of the stereoscopic video images to transmit only the left-view frames, the right-view frames, or frames of monoscopic video images reconstructed from the left-view frames and the right-view frames, at the reduced frame rate when the control information indicates a 2D playback mode; and a display unit operable to display each frame transmitted from the signal processing unit on the screen for a predetermined time period.

11. A display device for displaying stereoscopic video images on a screen, comprising:

a reception unit operable to receive stream data that includes left-view frames and right-view frames of the stereoscopic video images and control information;

a signal processing unit operable to alternately extract the left-view frames and the right-view frames from the stream data, then
to transmit a pair of a left-view frame and a right-view frame over one frame period of the stereoscopic video images when the control information indicates a 3D playback mode, and
to transmit a single left-view frame or a single right-view frame twice over one frame period of the stereoscopic video images when the control information indicates a 2D playback mode; and a display unit operable to display each frame transmitted from the signal processing unit on the screen for a predetermined time period.

12. The display device according to claim 11, further comprising:

a left/right signal transmitting unit operable to control shutter glasses to alternately make a left lens and a right lens of the shutter glasses opaque in synchronization with switching of frames by the display unit, regardless of whether the control information indicates the 3D playback mode or the 2D playback mode.

13. The display device according to claim 10, further comprising:

a left/right signal transmitting unit operable to control shutter glasses to alternately make a left lens and a right lens of the shutter glasses opaque in synchronization with switching of frames by the display unit while the control information indicates the 3D playback mode, and the left/right signal transmitting unit operable to control the shutter glasses to maintain both the left and right lenses transparent while the control information indicates the 2D playback mode.

14. The display device according to claim 10, wherein the reception unit adopts a format compliant with an HDMI standard as the predetermined transmission format and converts the control information into an AVI info frame.

15. A method for controlling a display device to display stereoscopic video images on a screen, comprising:

controlling the display device to receive stream data that includes left-view frames and right-view frames of the stereoscopic video images and control information and that is converted in a predetermined format so that a pair of a left-view frame and a right-view frame is received over one frame period of the stereoscopic video images;

controlling a signal processing unit of the display device to alternately extract the left-view frames and the right-view frames from the stream data;

controlling the signal processing unit to transmit a pair of a left-view frame and a right-view frame over one frame period of the stereoscopic video images when the control information indicates a 3D playback mode;

controlling the signal processing unit to reduce a frame rate to a level of one frame per frame period of the stereoscopic video images to transmit only the left-view frames, the right-view frames, or frames of monoscopic video images reconstructed from the left-view frames and the right-view frames at the reduced frame rate when the control information indicates a 2D playback mode; and controlling a display unit of the display device to display each frame transmitted from the signal processing unit on the screen for a predetermined time period.

16. A method for receiving stream data that includes left-view frames and right-view frames of stereoscopic video images and control information, comprising:

receiving the stream data;

alternately extracting the left-view frames and the right-view frames from the stream data;

transmitting a pair of a left-view frame and a right-view frame over one frame period of the stereoscopic video images when the control information indicates a 3D playback mode; and transmitting a single left-view frame or a single right-view frame twice over one frame period of the stereoscopic video images when the control information indicates a 2D playback mode.

17. A method for controlling a display device to display stereoscopic video images on a screen, comprising:

controlling the display device to receive stream data that includes left-view frames and right-view frames of the stereoscopic video images and control information;

controlling a signal processing unit of the display device to alternately extract the left-view frames and the right-view frames from the stream data;

controlling the signal processing unit to transmit a pair of a left-view frame and a right-view frame over one frame period of the stereoscopic video images when the control information indicates a 3D playback mode;

controlling the signal processing unit to transmit a single left-view frame or a single right-view frame twice over one frame period of the stereoscopic video images when the control information indicates a 2D playback mode; and
controlling a display unit of the display device to display each frame transmitted from the signal processing unit on the screen for a predetermined time period.

\* \* \* \* \*